United States Patent
Van Der Steen et al.

(10) Patent No.: US 9,717,257 B2
(45) Date of Patent: *Aug. 1, 2017

(54) SYSTEM AND METHOD FOR PROCESSING SLAUGHTERED ANIMALS AND/OR PARTS THEREOF

(71) Applicant: MAREL MEAT PROCESSING B.V., Oss (NL)

(72) Inventors: Franciscus Theodorus Henricus Johannes Van Der Steen, Megen (NL); Adrianus Josephes Van Den Nieuwelaar, Gemert (NL); Jan Johannes Meerdink, Neerloon (NL); Cornelis Joannes Janssen, Holthees (NL)

(73) Assignee: MAREL MEAT PROCESSING B.V., Oss (NL)

( * ) Notice: Subject to any disclaimer, the term of this patent is extended or adjusted under 35 U.S.C. 154(b) by 53 days.

This patent is subject to a terminal disclaimer.

(21) Appl. No.: 14/885,660

(22) Filed: Oct. 16, 2015

(65) Prior Publication Data

US 2016/0037787 A1 Feb. 11, 2016

Related U.S. Application Data

(62) Division of application No. 13/516,353, filed as application No. PCT/NL2010/050870 on Dec. 17, 2010, now Pat. No. 9,192,172.

(30) Foreign Application Priority Data

Dec. 17, 2009 (NL) .................................. 2003966
Dec. 17, 2009 (NL) .................................. 2003967

(Continued)

(51) Int. Cl.
*A22B 5/16* (2006.01)
*A22B 7/00* (2006.01)
*A22B 5/00* (2006.01)

(52) U.S. Cl.
CPC .............. *A22B 7/003* (2013.01); *A22B 5/007* (2013.01); *A22B 7/002* (2013.01); *A22B 7/005* (2013.01)

(58) Field of Classification Search
CPC ........... A22B 5/16; A22B 7/005; A22B 7/002; A22B 5/007; A22B 17/02; A22C 17/004
(Continued)

(56) References Cited

U.S. PATENT DOCUMENTS 3,165,781 A 1/1965 Slotkin
3,593,369 A 7/1971 Anderson et al.
(Continued)

FOREIGN PATENT DOCUMENTS

DE 525468 C 5/1931
DE 20 2005 009 048 U1 11/2006
(Continued)

*Primary Examiner* — Richard Price, Jr.
(74) *Attorney, Agent, or Firm* — Birch, Stewart, Kolasch & Birch, LLP

(57) ABSTRACT

A system for processing a carcass or carcass part of a porcine, bovine, ovine, or caprine slaughter animal involves a plurality of processing steps. The system includes a primary transport system that includes an overhead conveyor and a plurality of carriers for holding a carcass or carcass part, a plurality of processing stations, which processing stations are arranged along the track, each of the processing stations being adapted to carry out one or more processing steps on a carcass or carcass part, wherein in at least one processing station a step of removing a part of the carcass or carcass part is carried out, a secondary transport system, which secondary transport system is arranged adjacent to the processing station in which said part is removed from the carcass or carcass part, which secondary transport system is adapted to receive said part.

30 Claims, 84 Drawing Sheets

(30) Foreign Application Priority Data

Dec. 17, 2009 (NL) .................................... 2003968
Dec. 17, 2009 (NL) .................................... 2003969

(58) Field of Classification Search
USPC ... 452/52–54, 106, 107, 125, 127, 135, 136, 452/149, 166, 187
See application file for complete search history.

(56) References Cited

U.S. PATENT DOCUMENTS

| | | | |
|---|---|---|---|
| 3,988,803 A * | 11/1976 | Hamark | A22B 5/206 452/163 |
| 4,090,275 A | 5/1978 | Jorgenson et al. | |
| 4,158,903 A | 6/1979 | Ochylski | |
| 4,797,975 A | 1/1989 | Soullard et al. | |
| 4,873,749 A | 10/1989 | Couture | |
| 5,106,336 A | 4/1992 | Gwyther | |
| 5,668,634 A | 9/1997 | Newman | |
| 5,713,787 A * | 2/1998 | Schoenmakers | A22C 17/004 452/136 |
| 5,954,575 A | 9/1999 | Norling | |
| 8,192,258 B2 | 6/2012 | Janssen et al. | |
| 8,485,870 B2 | 7/2013 | Janssen et al. | |
| 8,540,556 B2 | 9/2013 | Hiddink et al. | |
| 8,808,068 B2 * | 8/2014 | Stooker | A22C 21/0076 452/125 |
| 2003/0065414 A1 | 4/2003 | van den Nieuwelaar et al. | |
| 2003/0220063 A1 | 11/2003 | Tomcak et al. | |
| 2009/0130964 A1 | 5/2009 | Knopik et al. | |

FOREIGN PATENT DOCUMENTS

| | | |
|---|---|---|
| EP | 0 819 381 A1 | 1/1998 |
| EP | 0 898 894 A2 | 3/1999 |
| EP | 1 008 301 A1 | 6/2000 |
| EP | 1 658 774 A1 | 5/2006 |
| JP | 5-38250 A | 2/1993 |
| JP | 9-167181 A | 6/1997 |
| JP | 2000-106818 A | 4/2000 |
| JP | 2002-534069 A | 10/2002 |
| JP | 3092449 U | 3/2003 |
| JP | 2006-230321 A | 9/2006 |
| JP | 2007-246199 A | 9/2007 |
| NL | 1019566 C2 | 8/2003 |
| WO | WO 00/40094 A1 | 7/2000 |
| WO | WO 00/76323 A1 | 12/2000 |
| WO | WO 2005/020695 A1 | 3/2005 |
| WO | WO 2008/013446 A1 | 1/2008 |
| WO | WO 2008/078982 A1 | 7/2008 |
| WO | WO 2008/100138 A1 | 8/2008 |

* cited by examiner

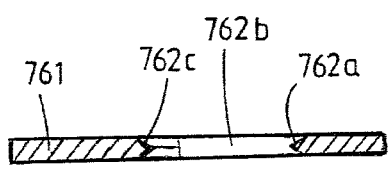
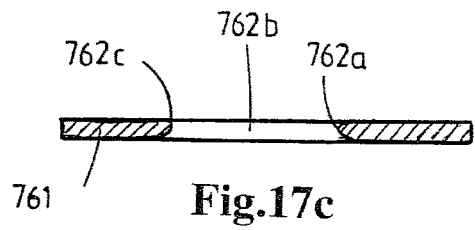
Fig.17b
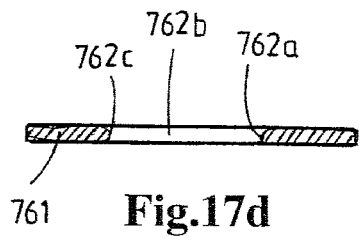
Fig.17c
Fig.17d
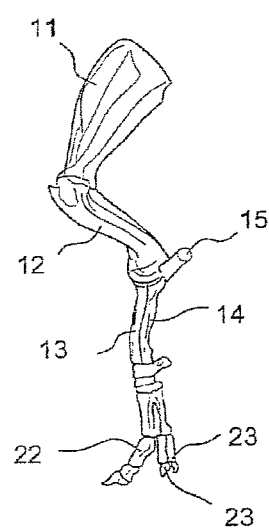 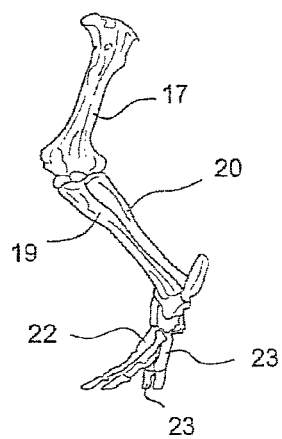
Fig. 18A   Fig. 18B

Figure 25:
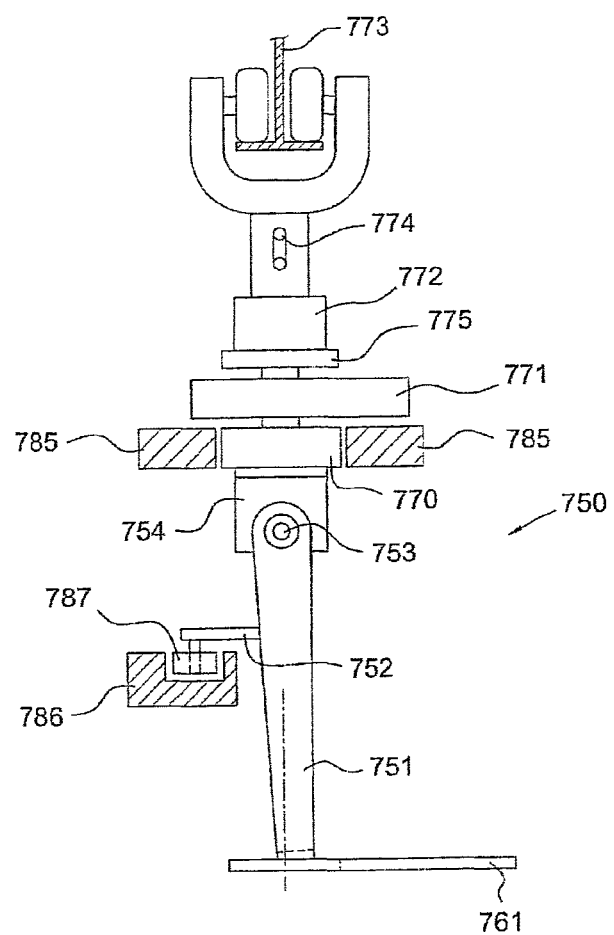
Figure 25:
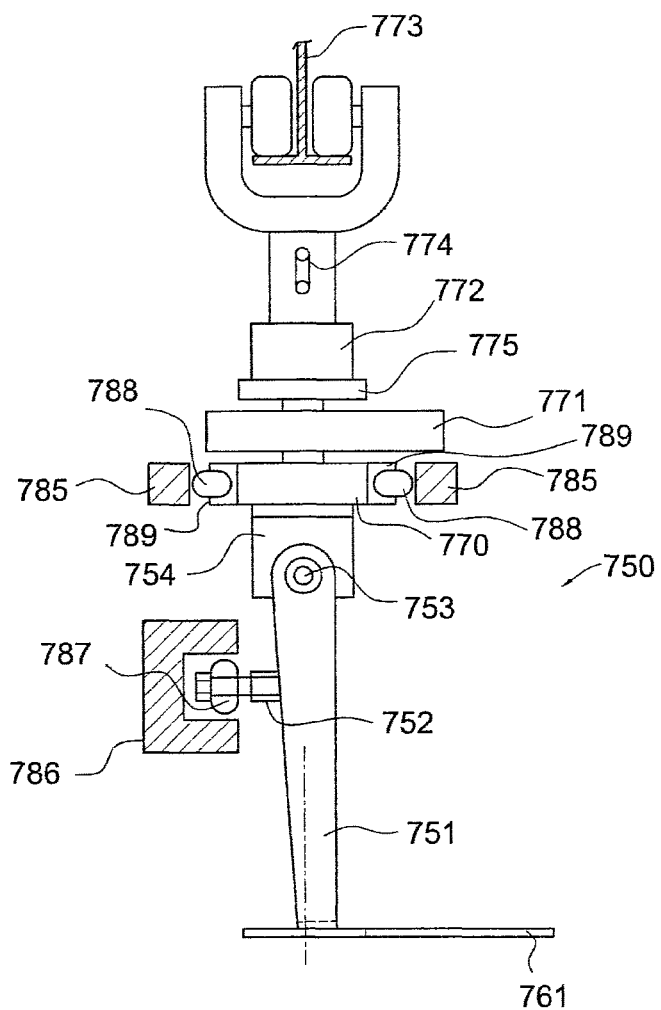
Figure 25:
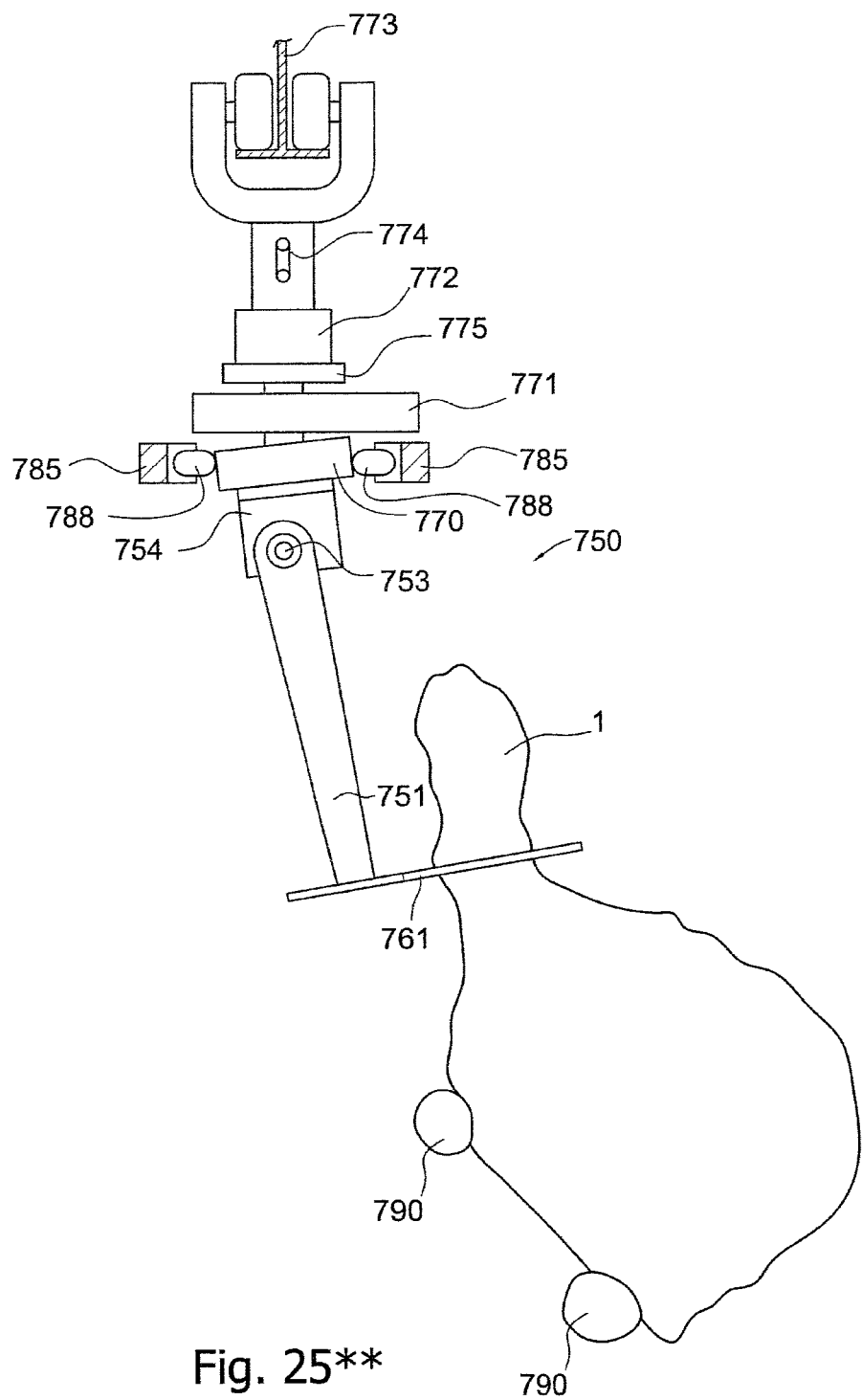

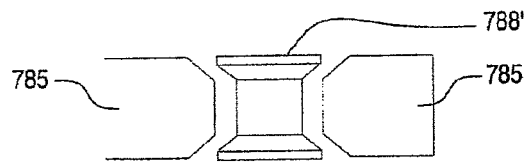
**FIG. 25\*\*\*A**
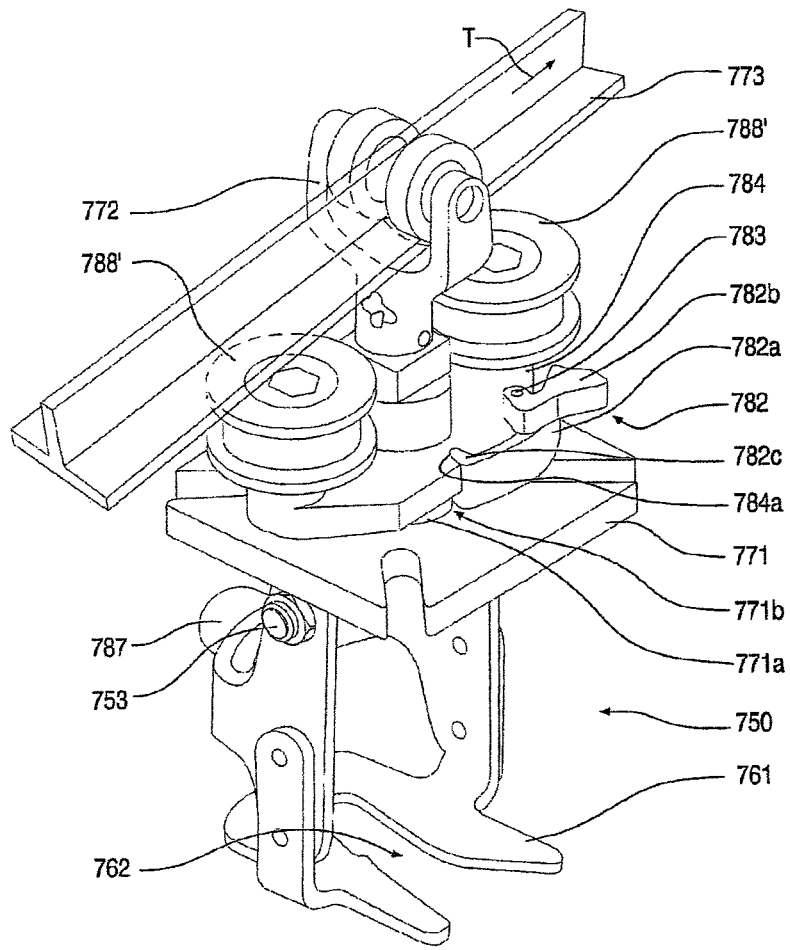
**FIG.25\*\*\***

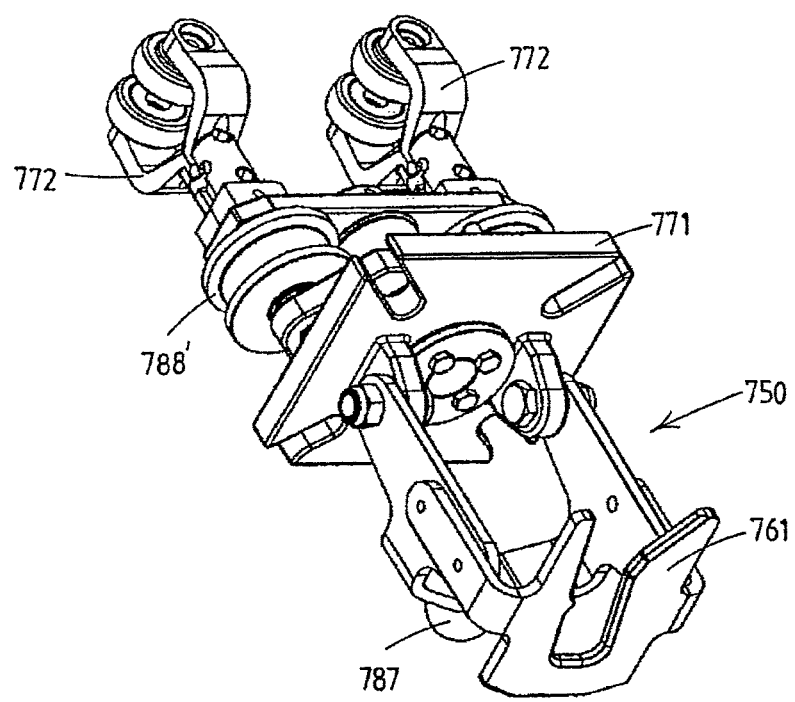
FIG. 25***B

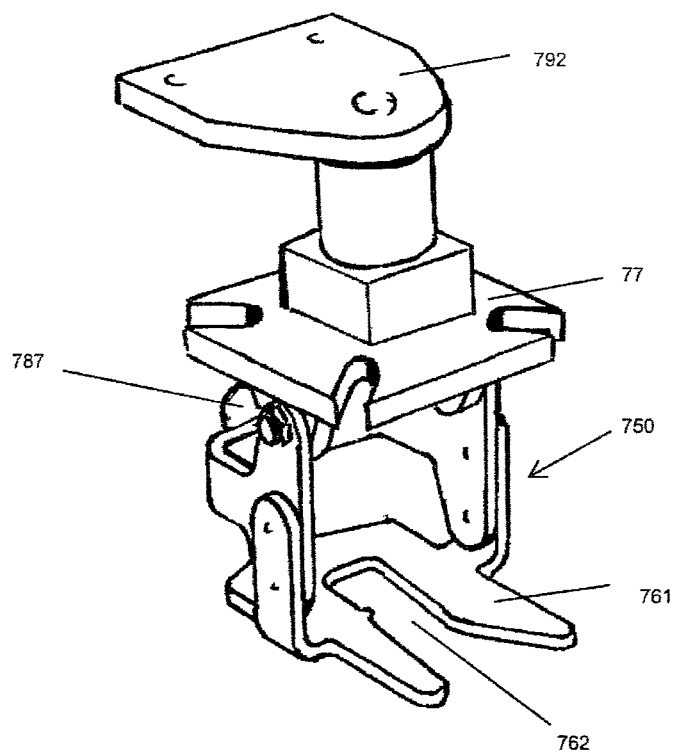
Fig.25#A

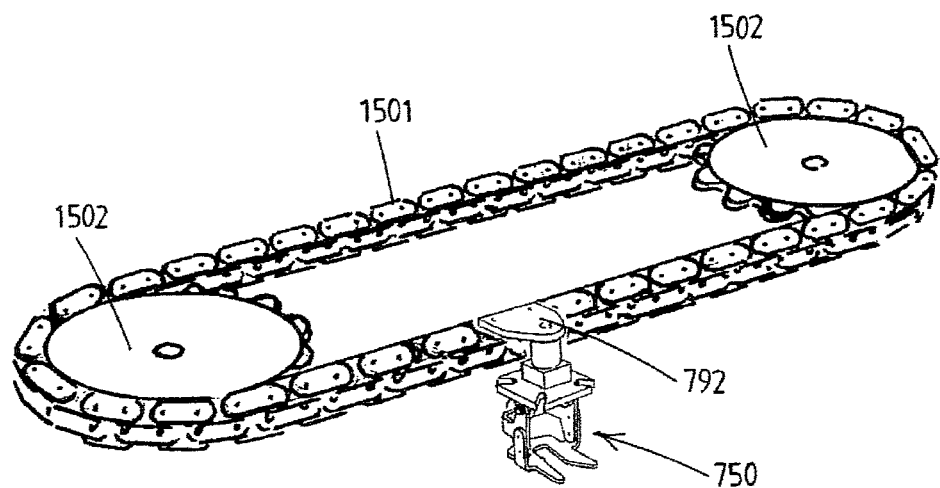
Fig.25#B
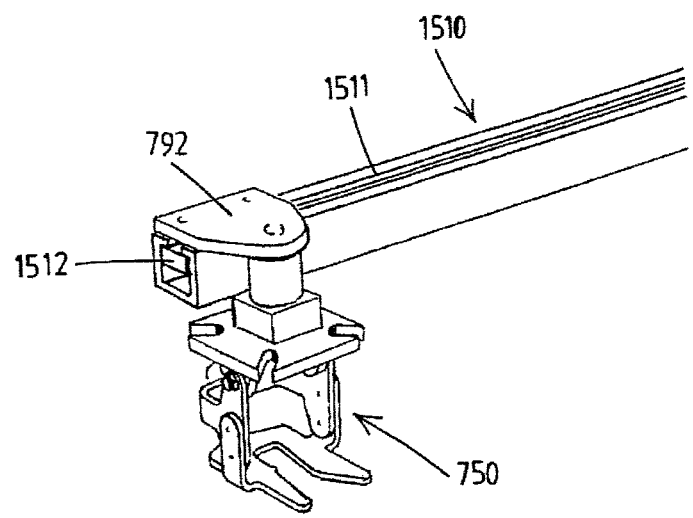
Fig.25#C

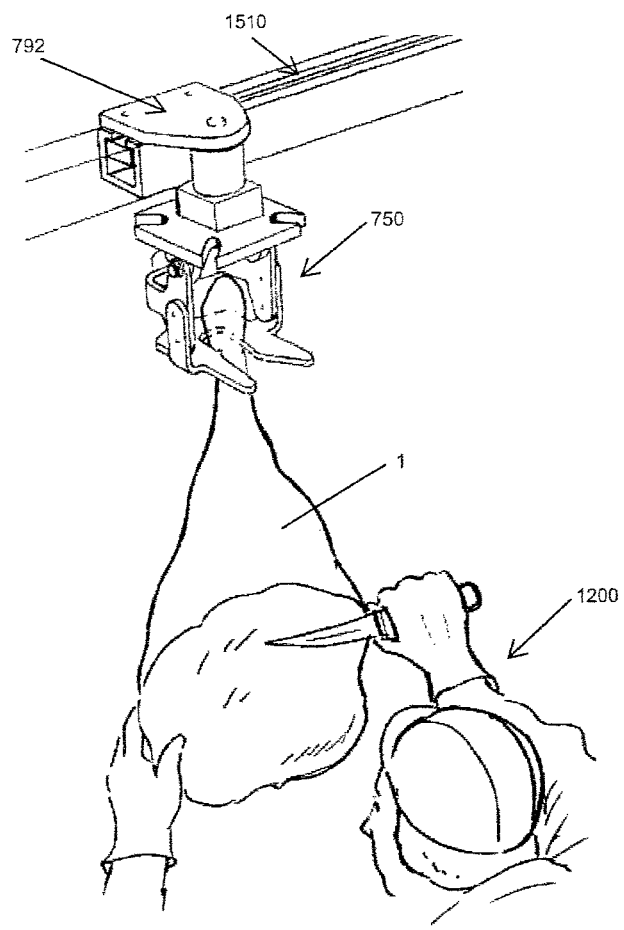
Fig.25#D

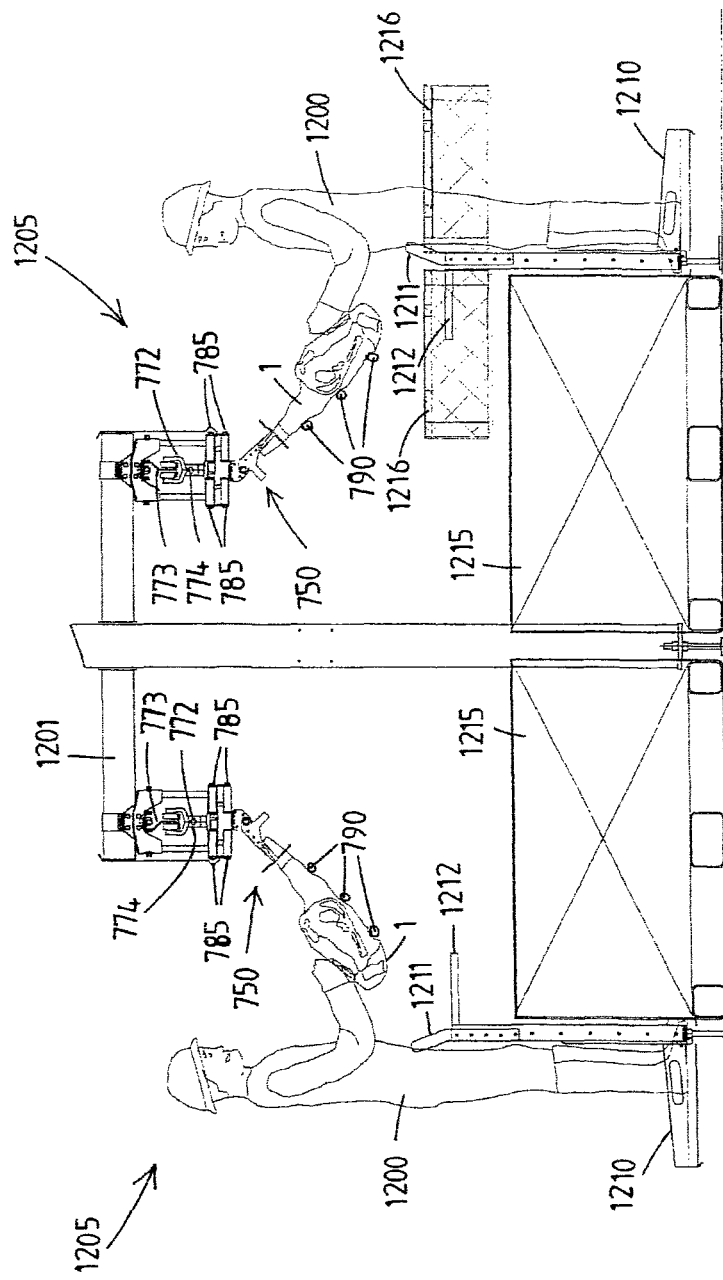
Fig.32*A

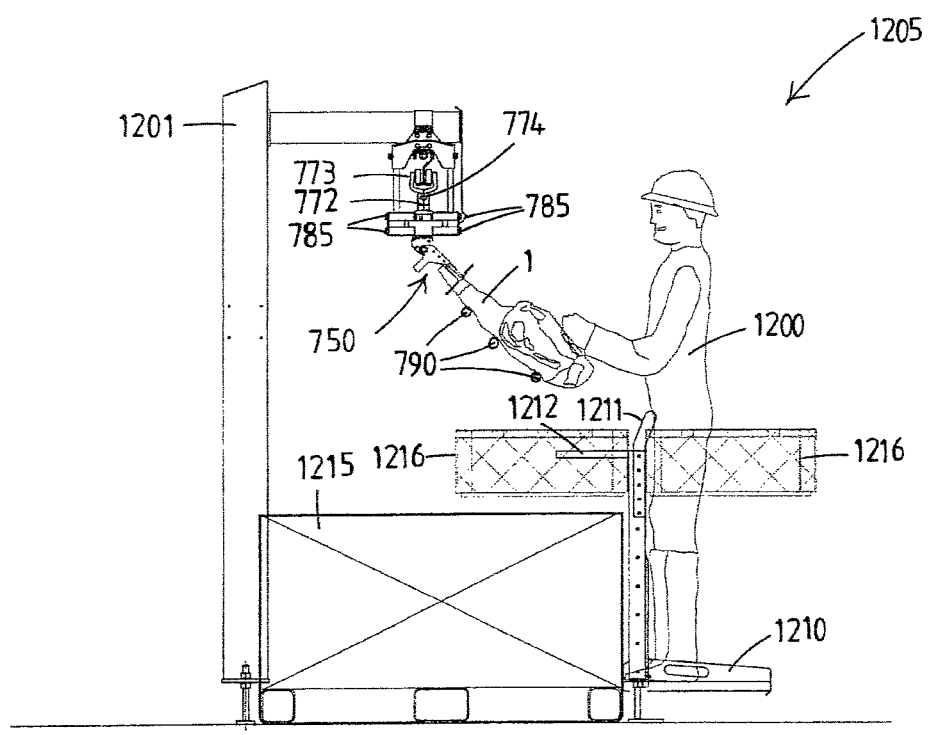
Fig.32*B

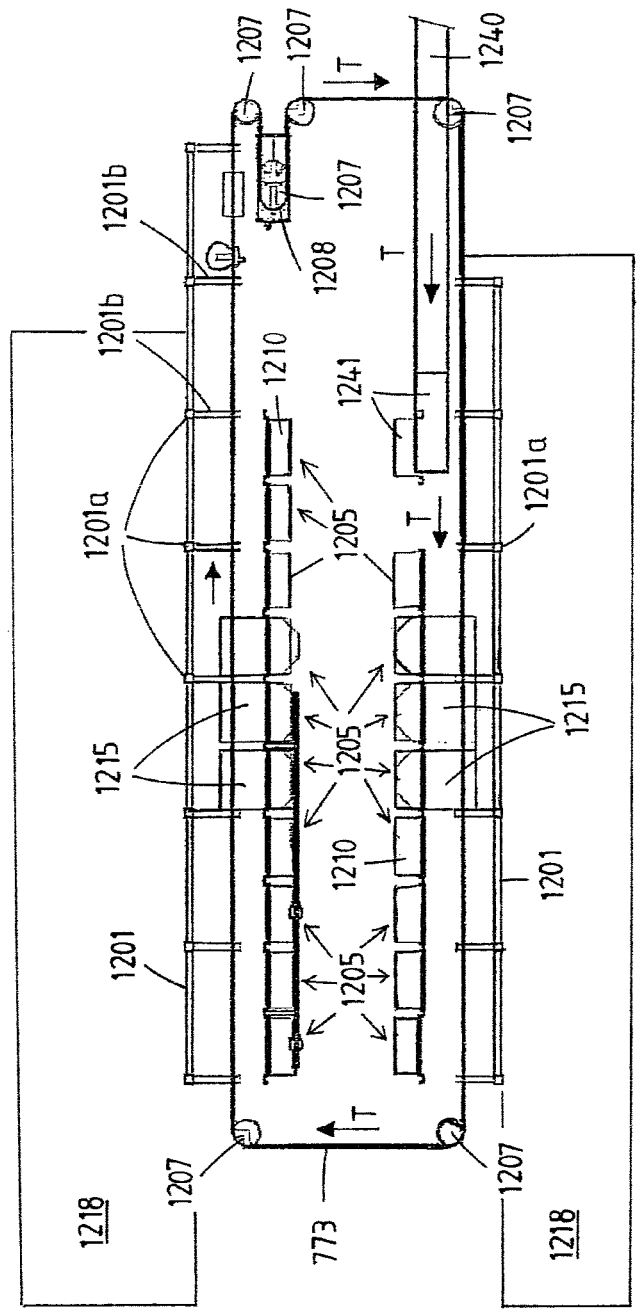
Fig. 32*C

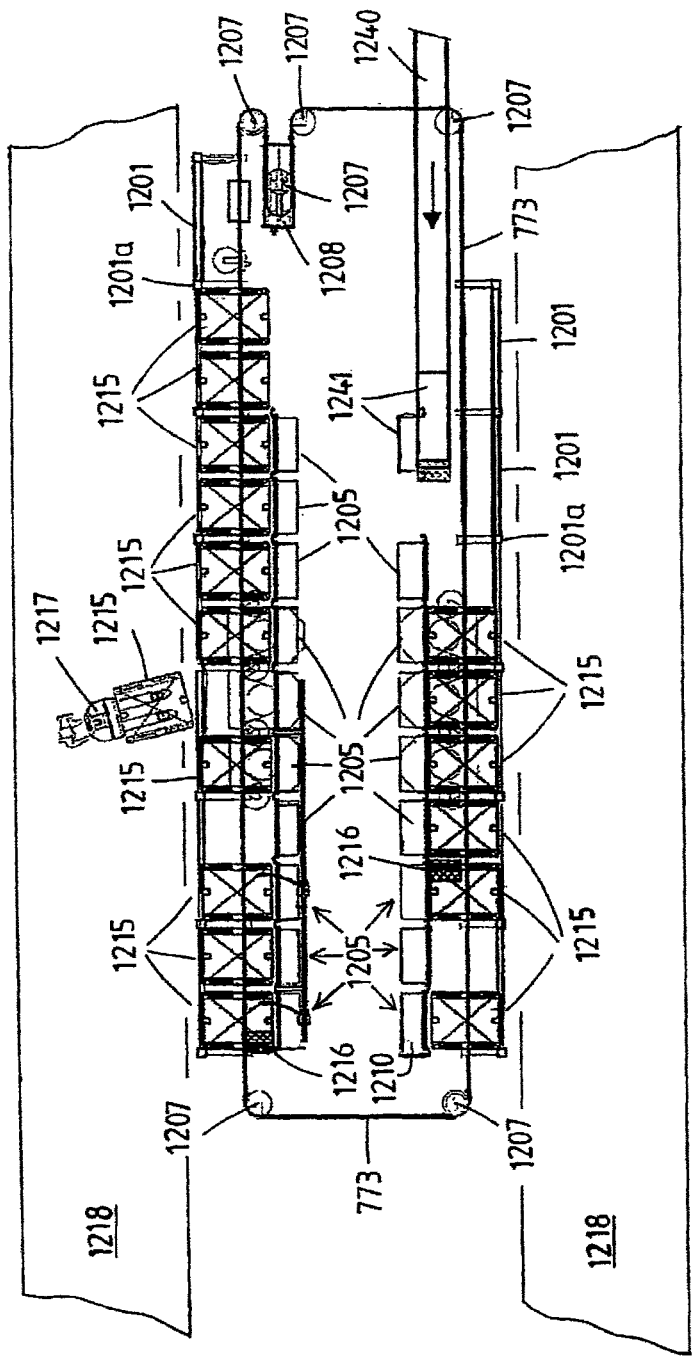
Fig.32*D

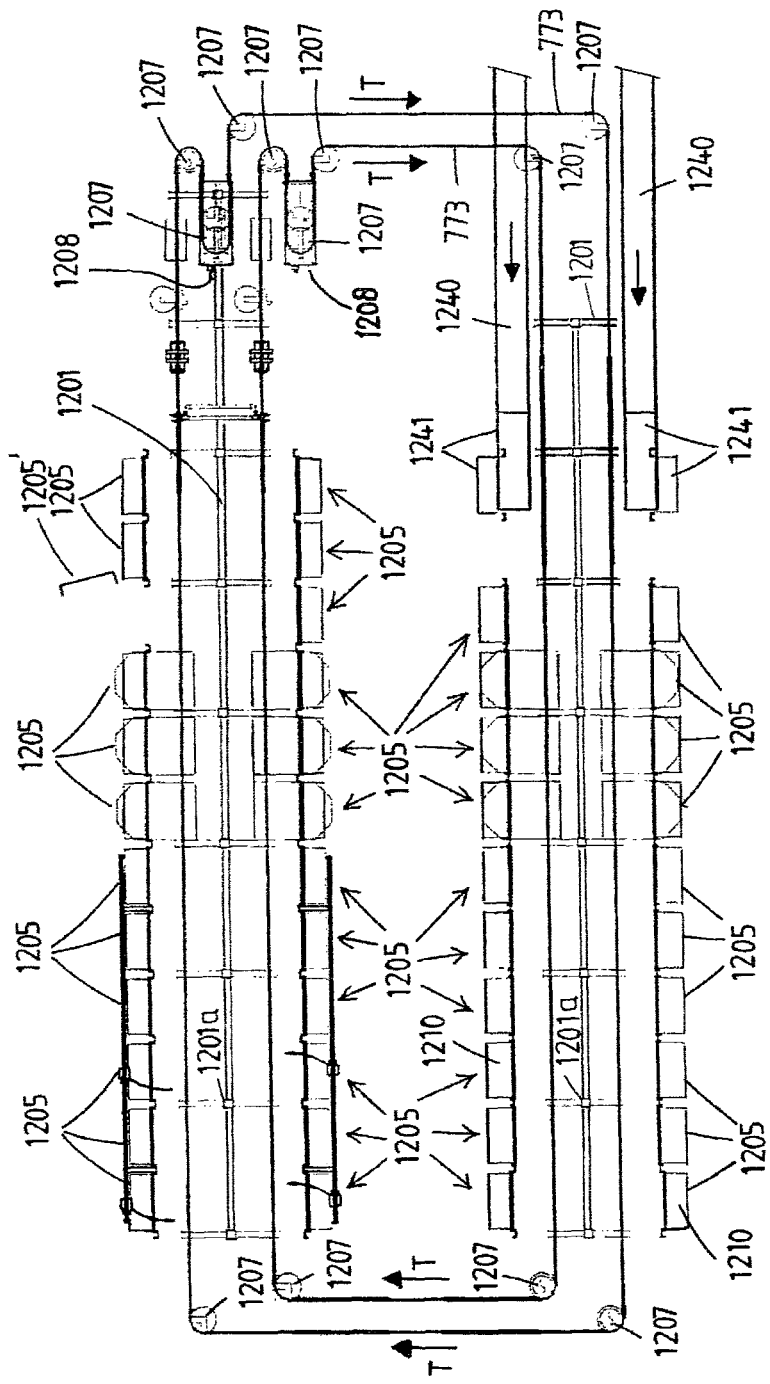
Fig.32*E

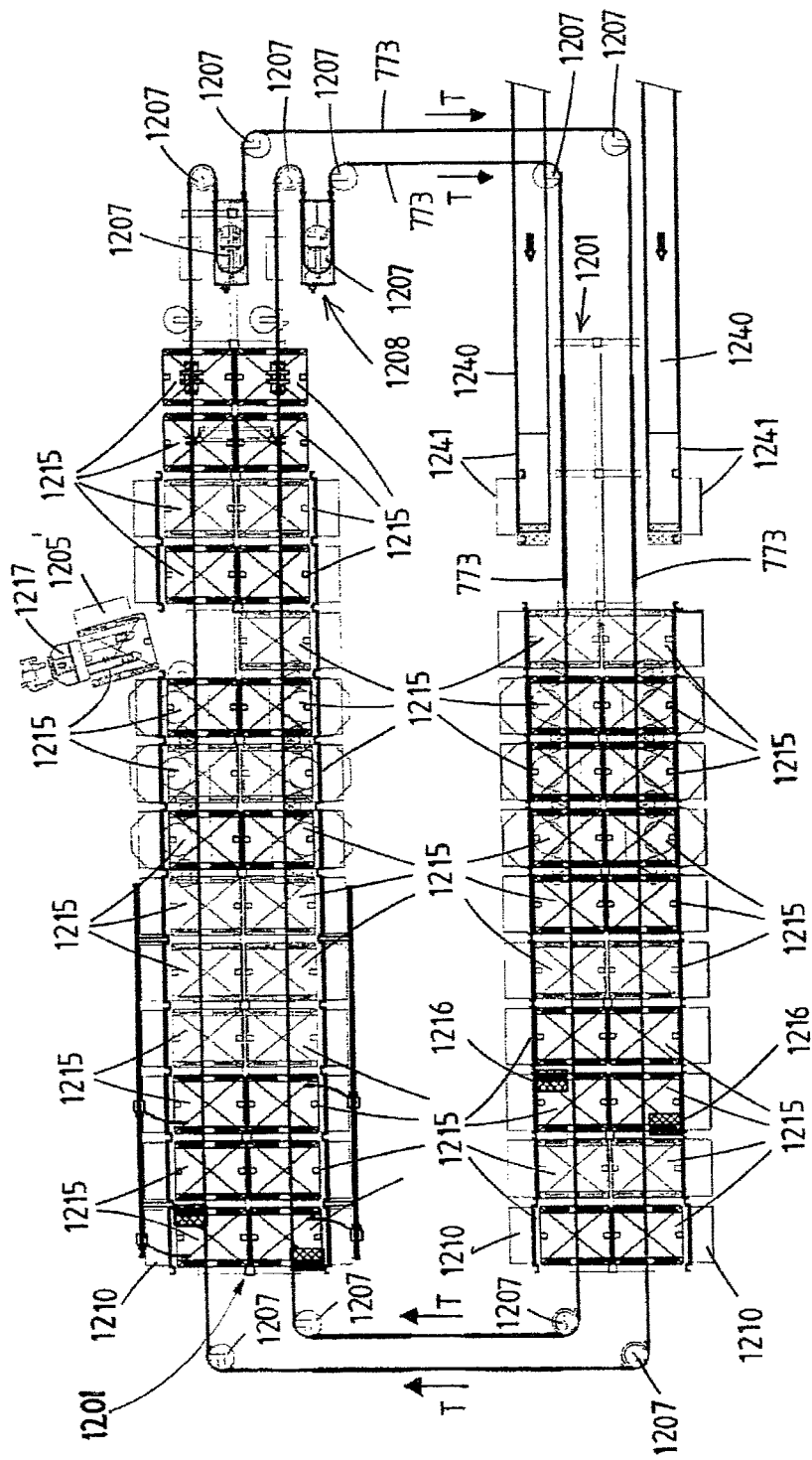
Fig.32*F

Figure 32:
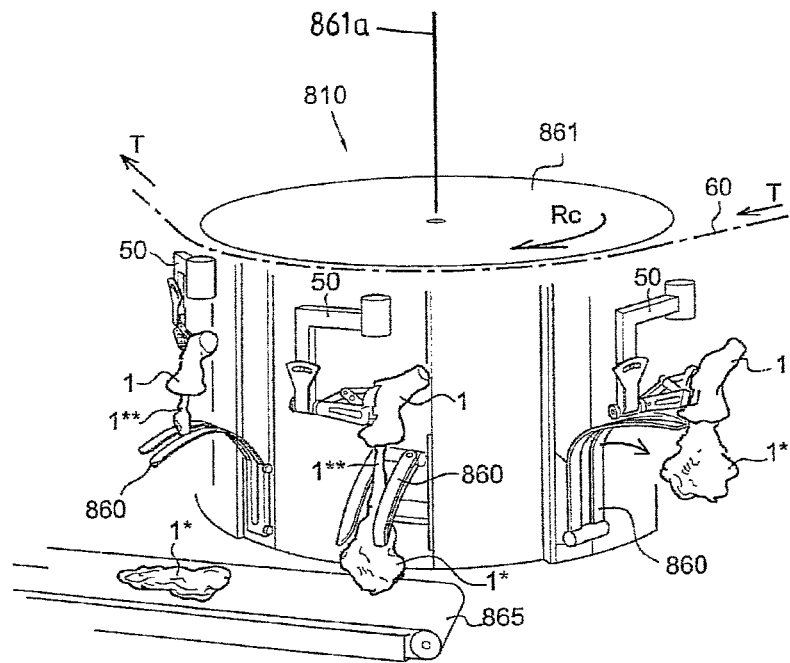
Figure 32:
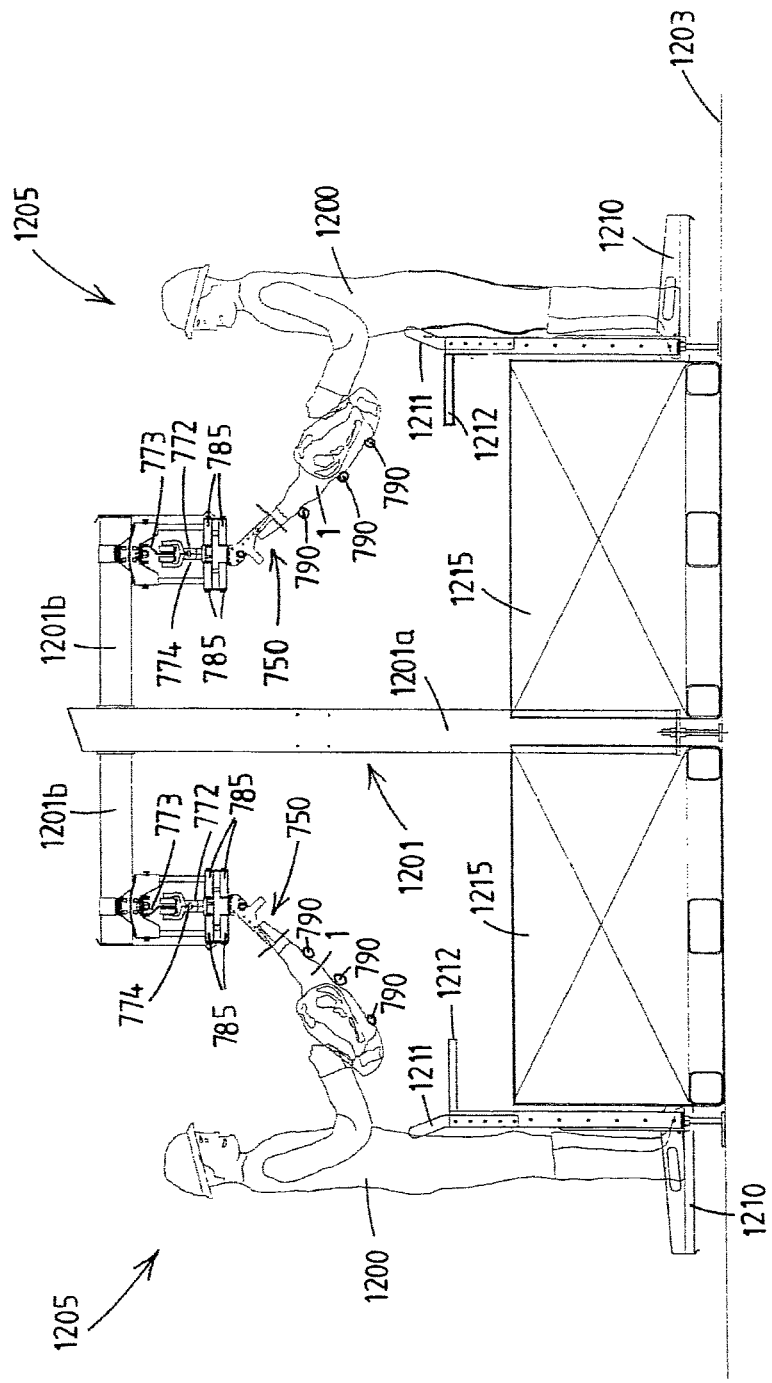
Figure 32:
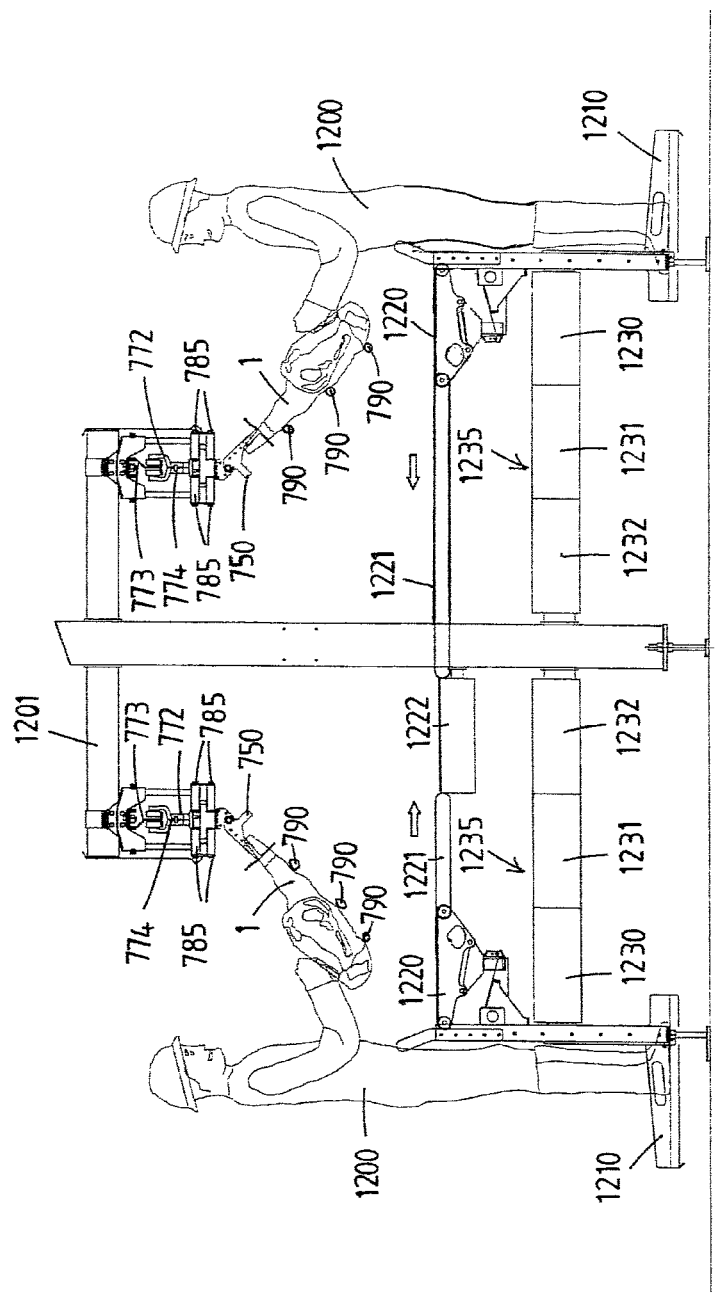

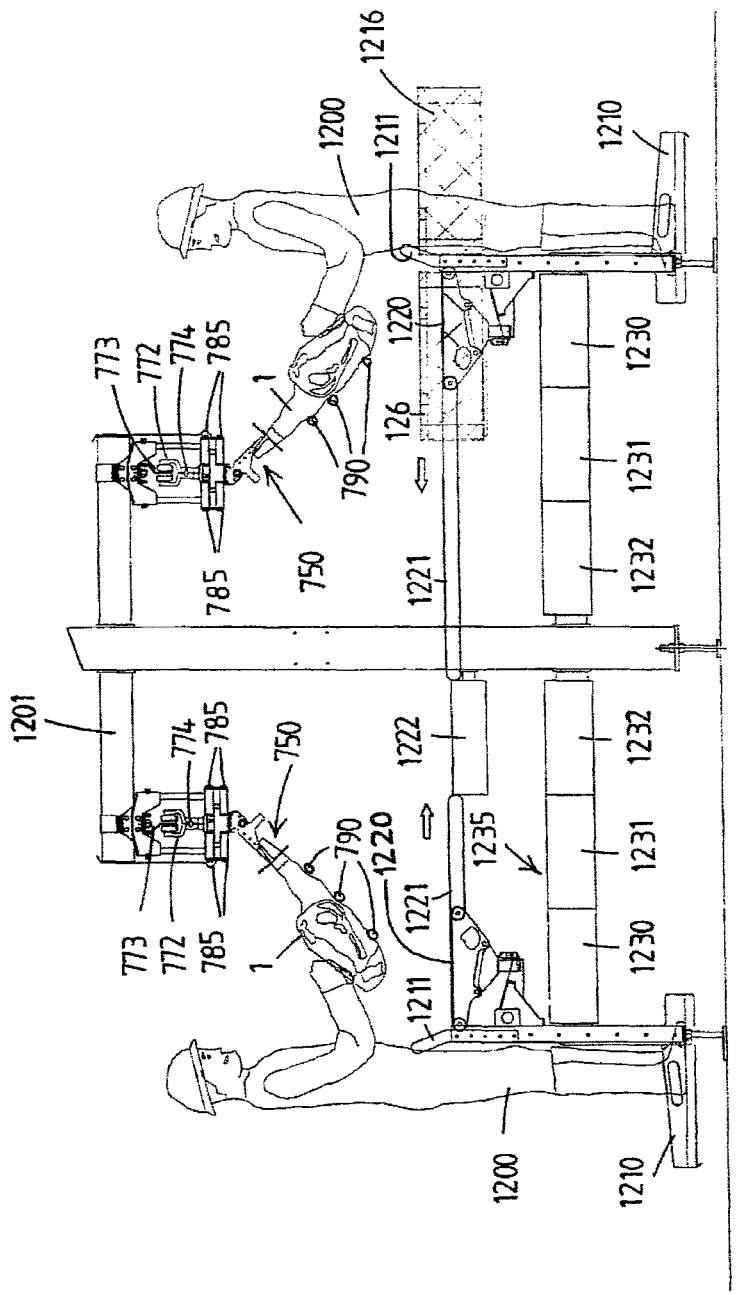
Fig.32**A

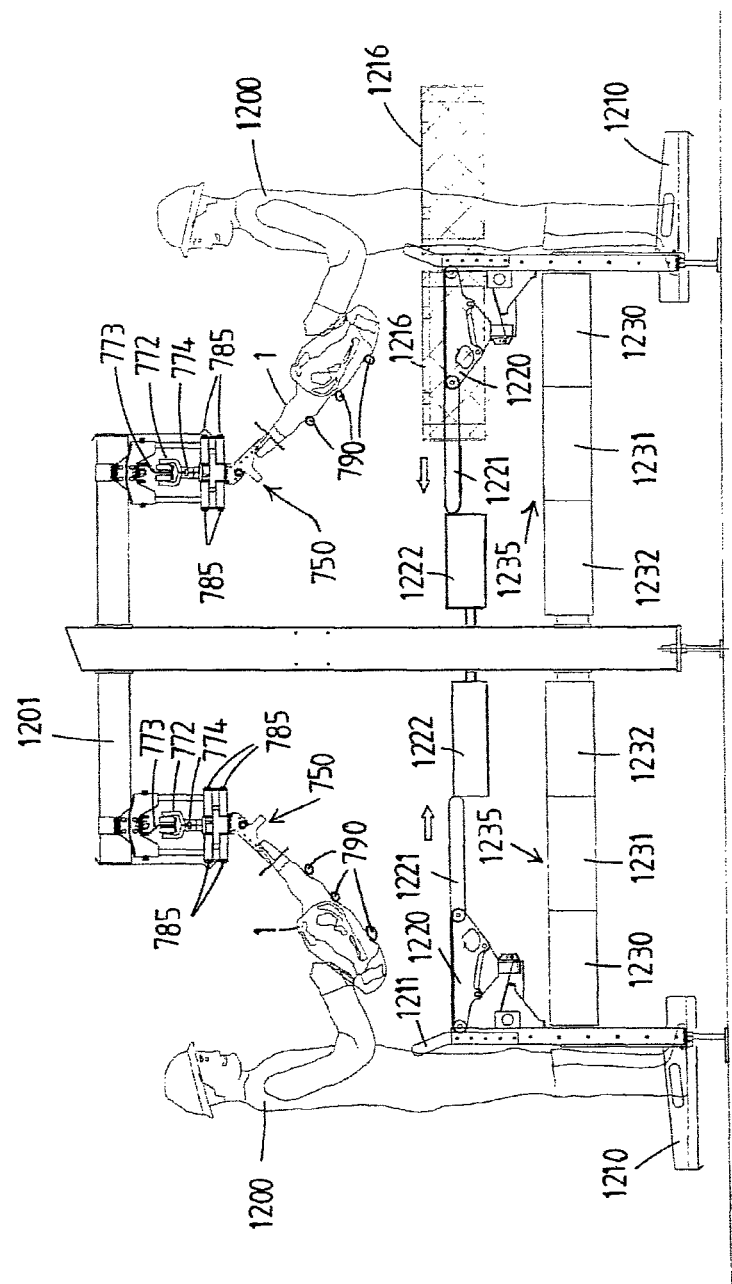
Fig.32**B

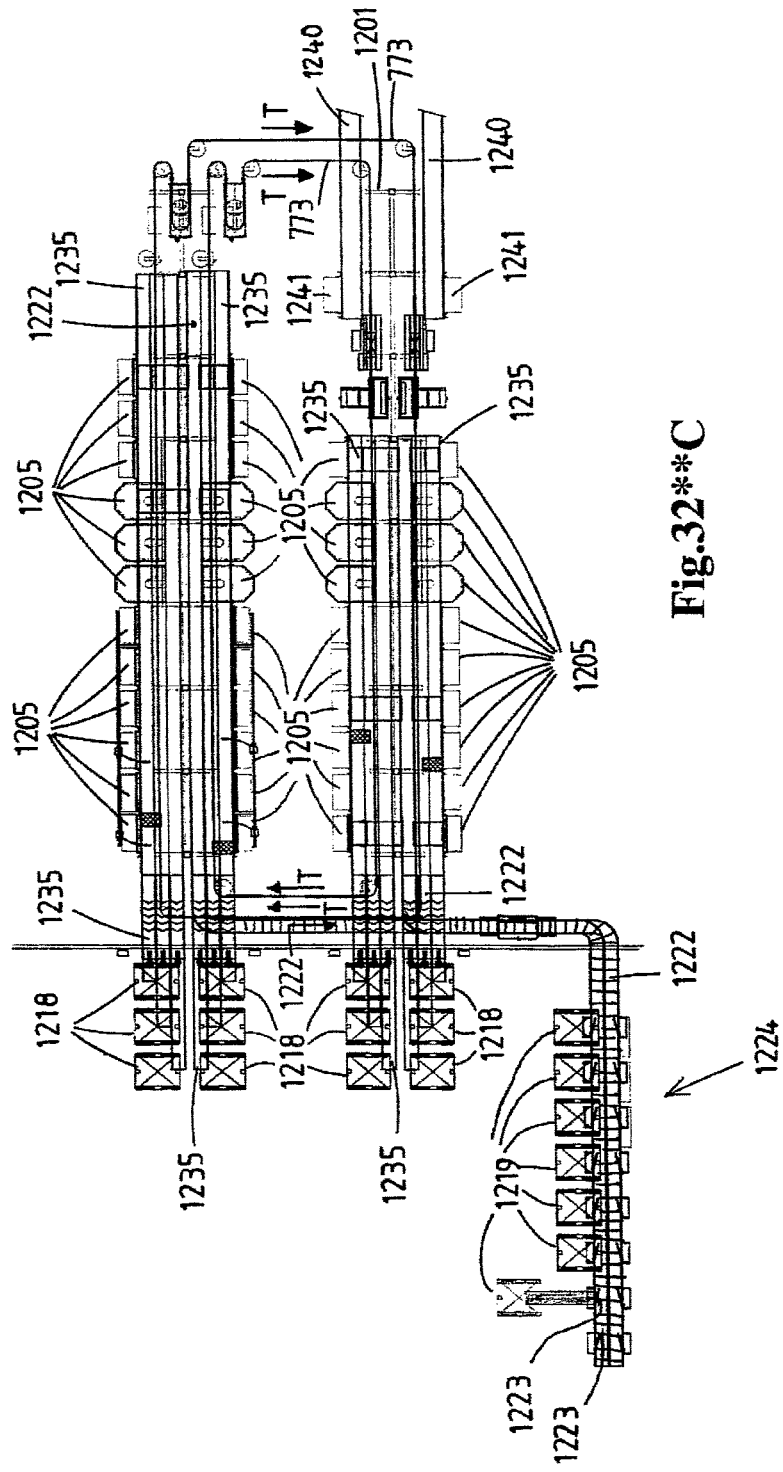
Fig.32**C

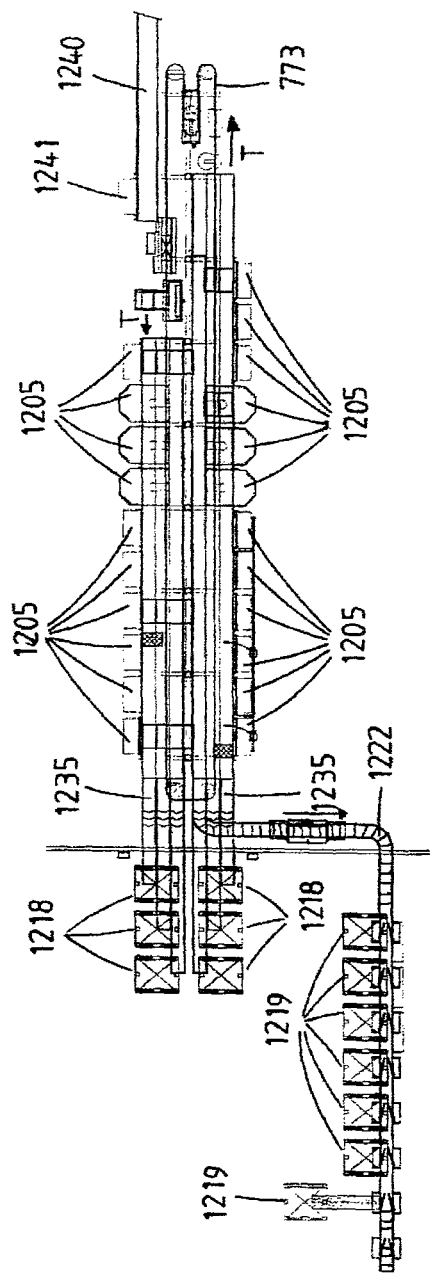
Fig.32**D

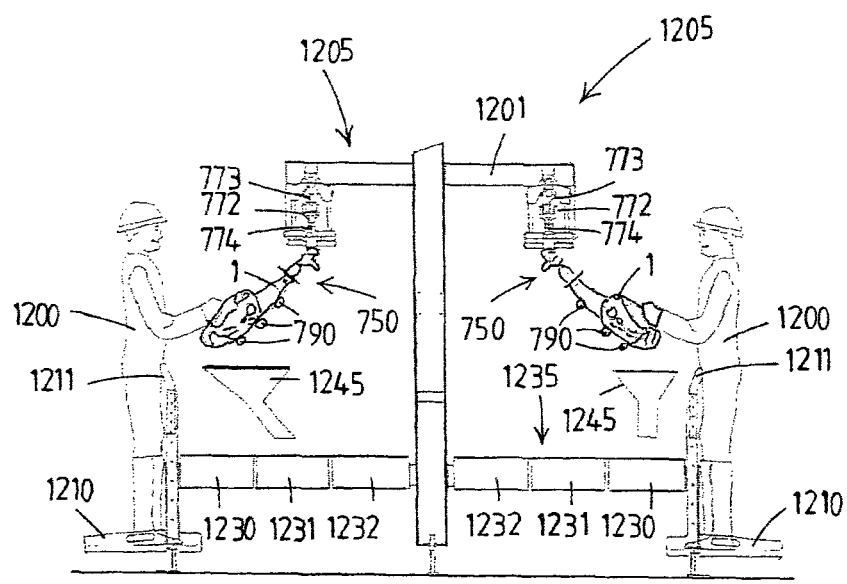
Fig.32***A

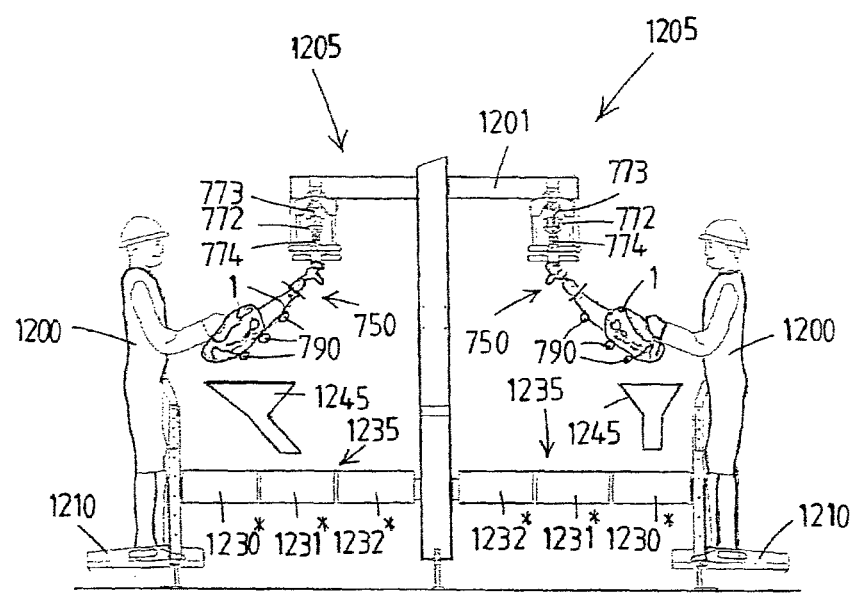
Fig.32***B

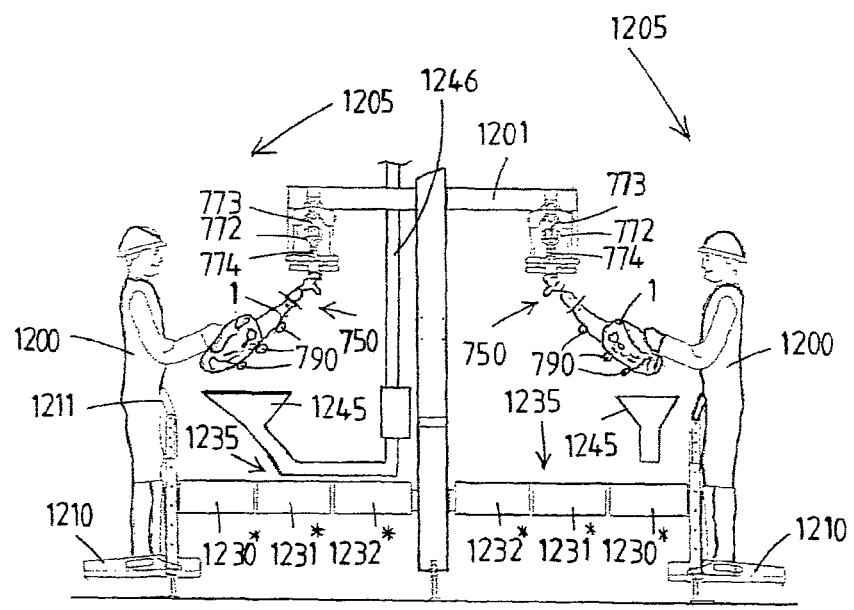
Fig32***C

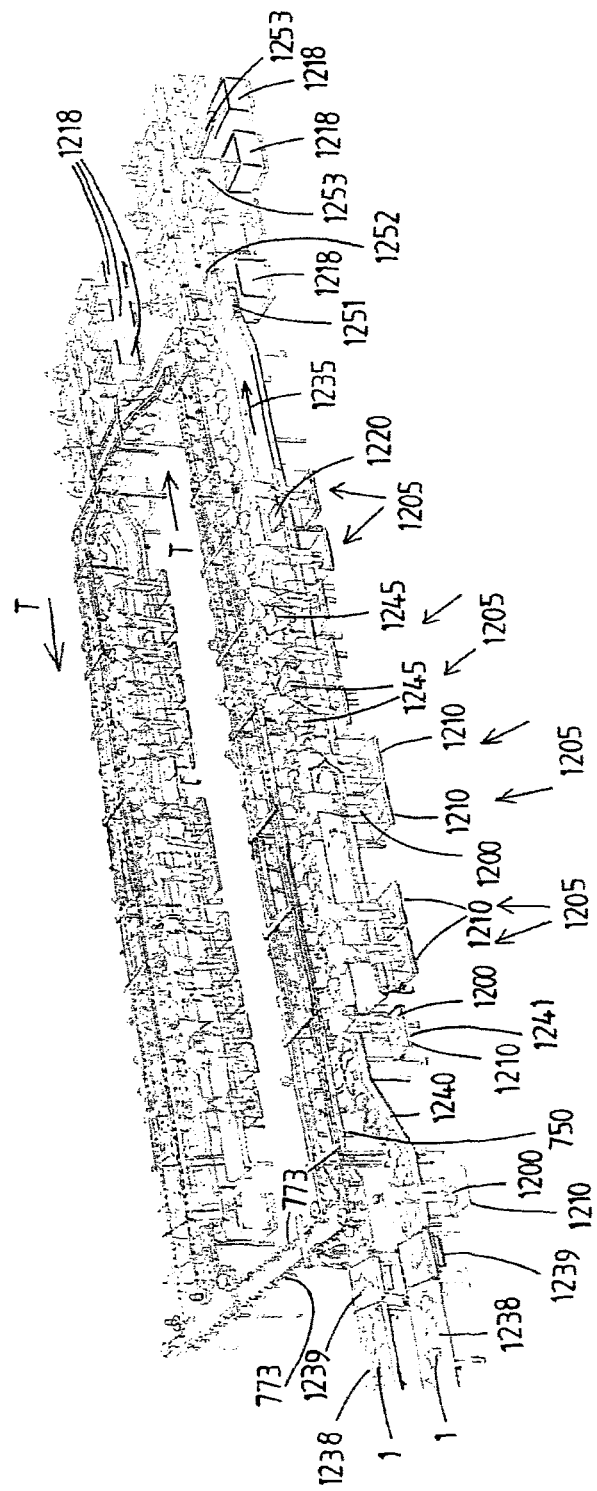
Fig.32***D

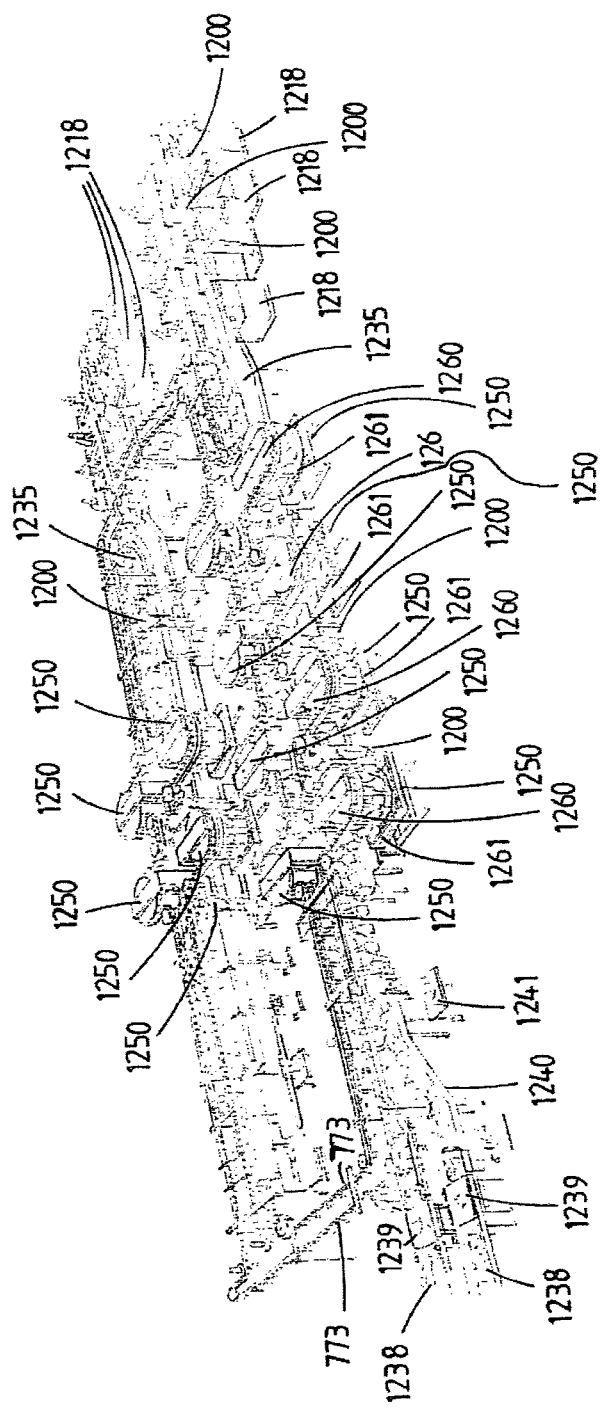
Fig. 32***E

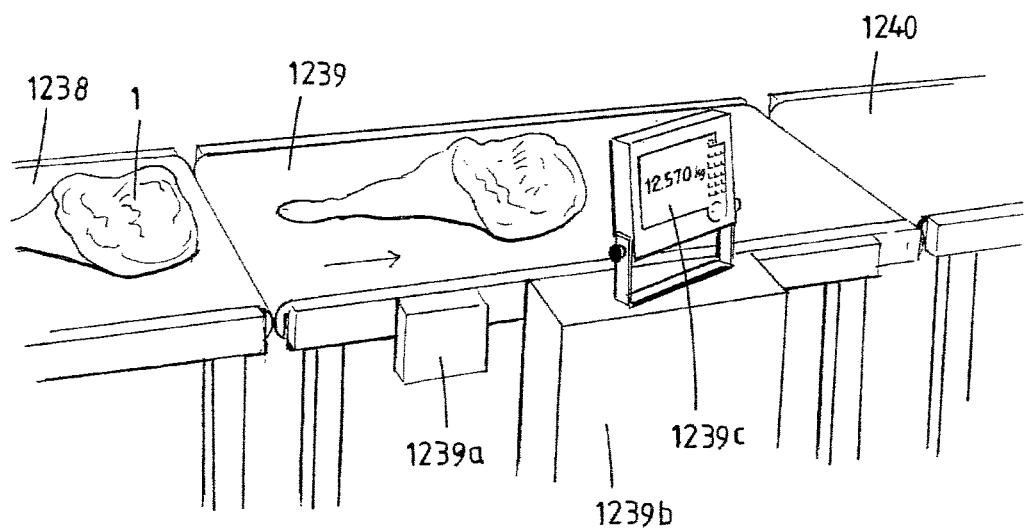
Fig.32***E1

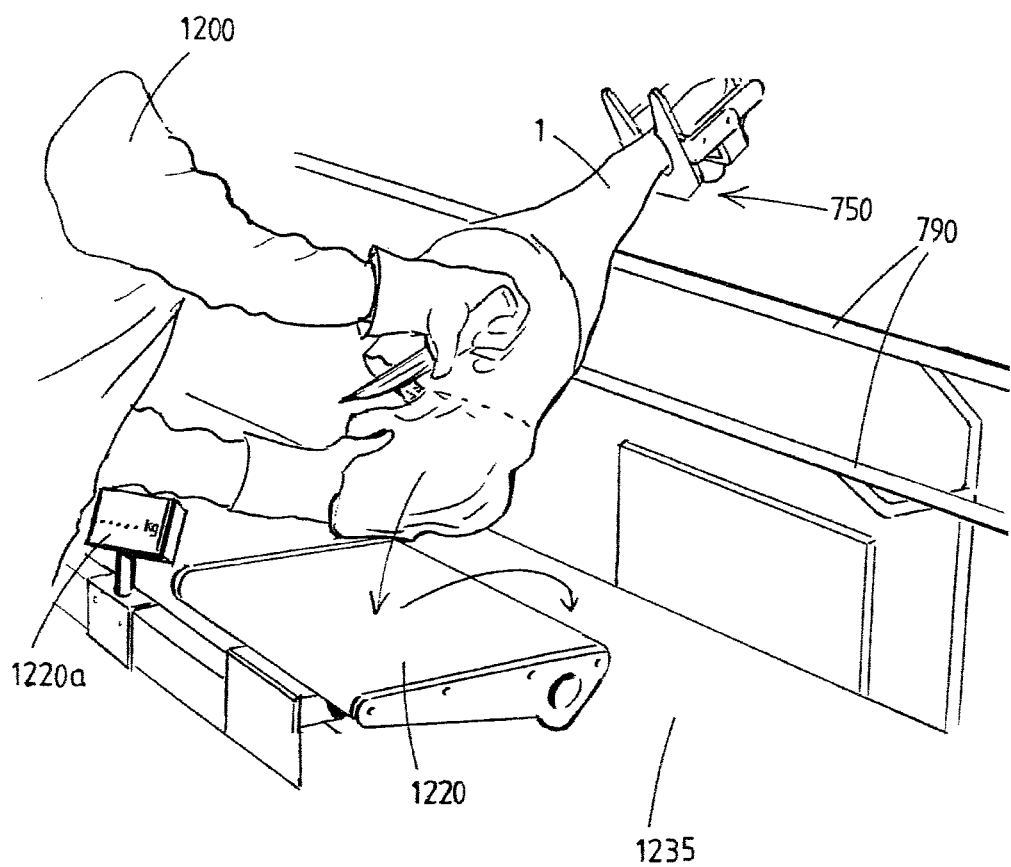
Fig.32***E2

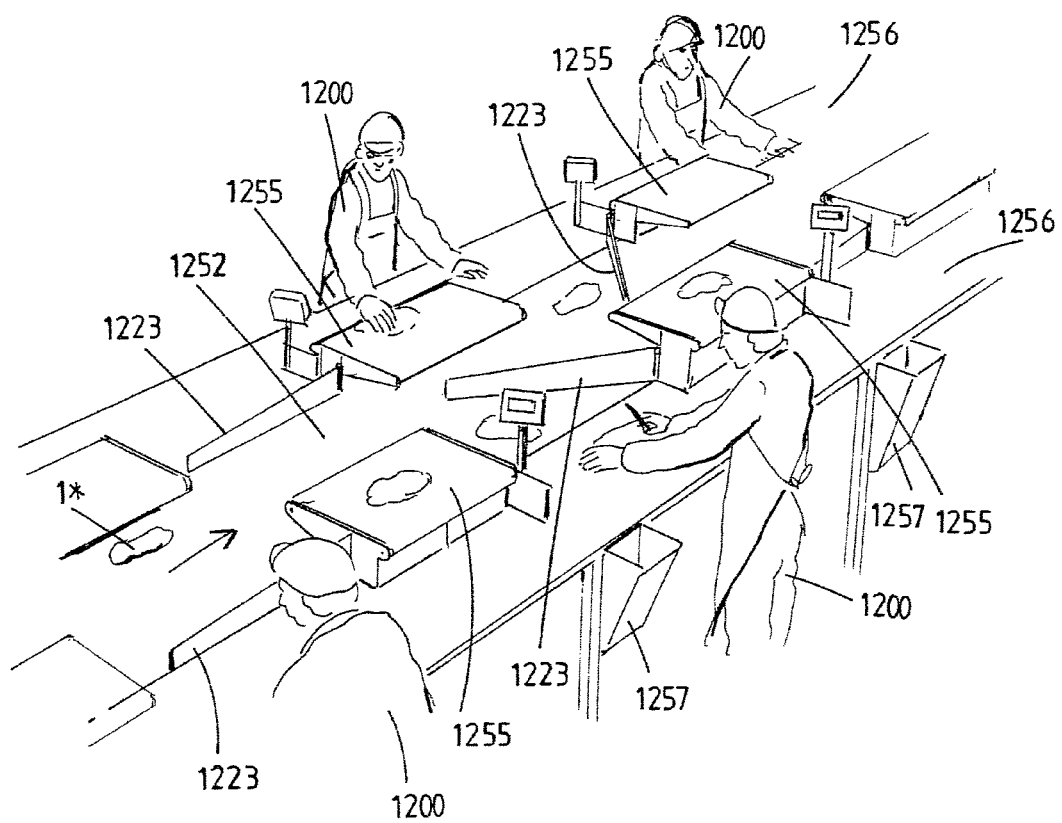
Fig.32***E3

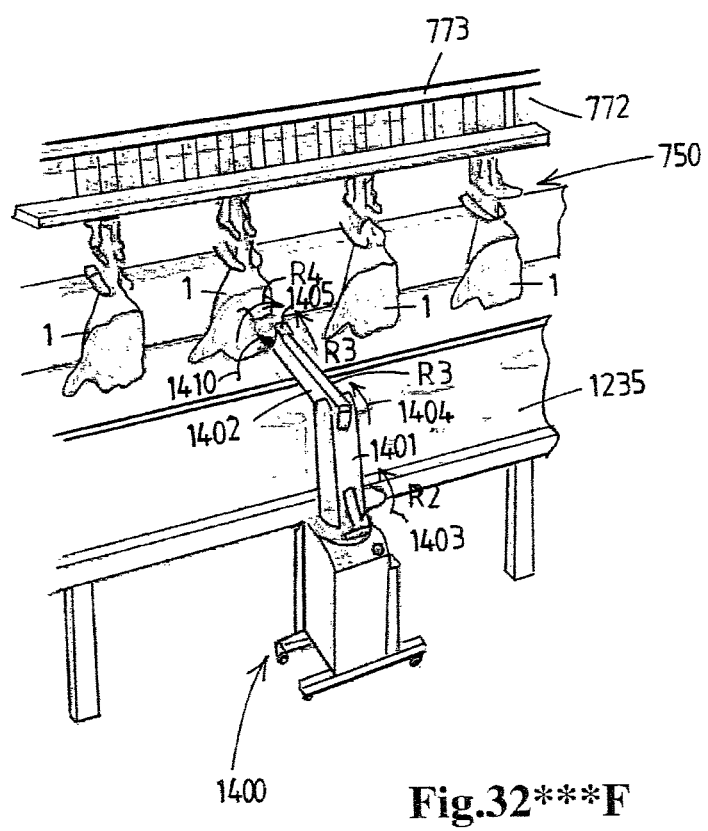
Fig.32***F

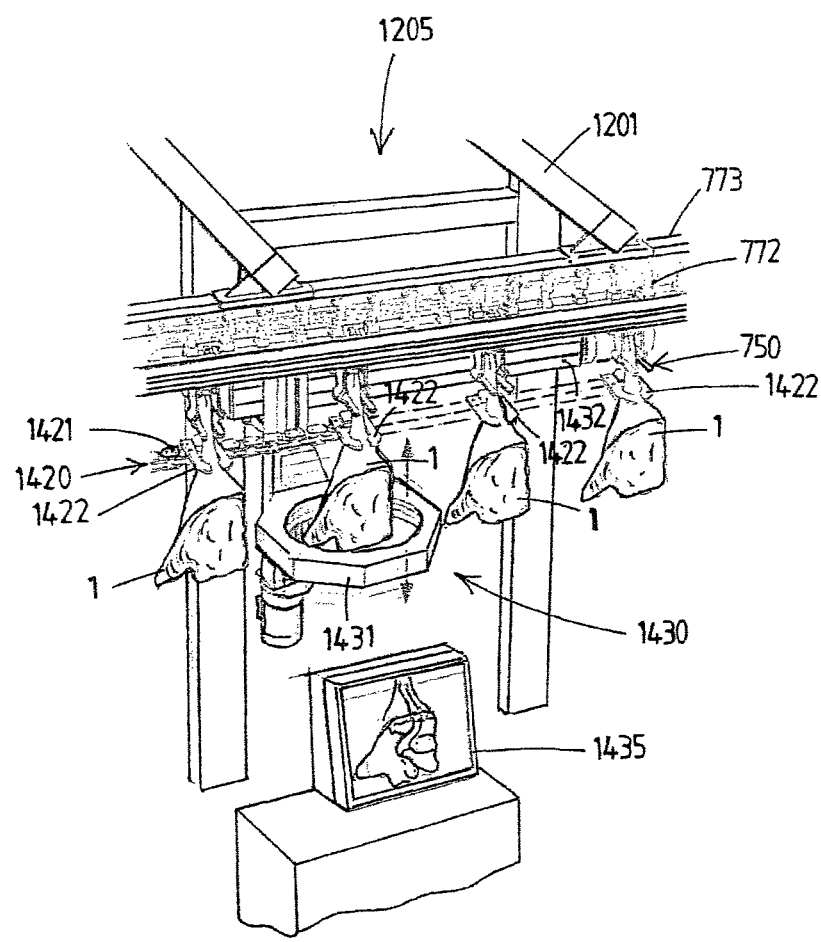
Fig.32***G

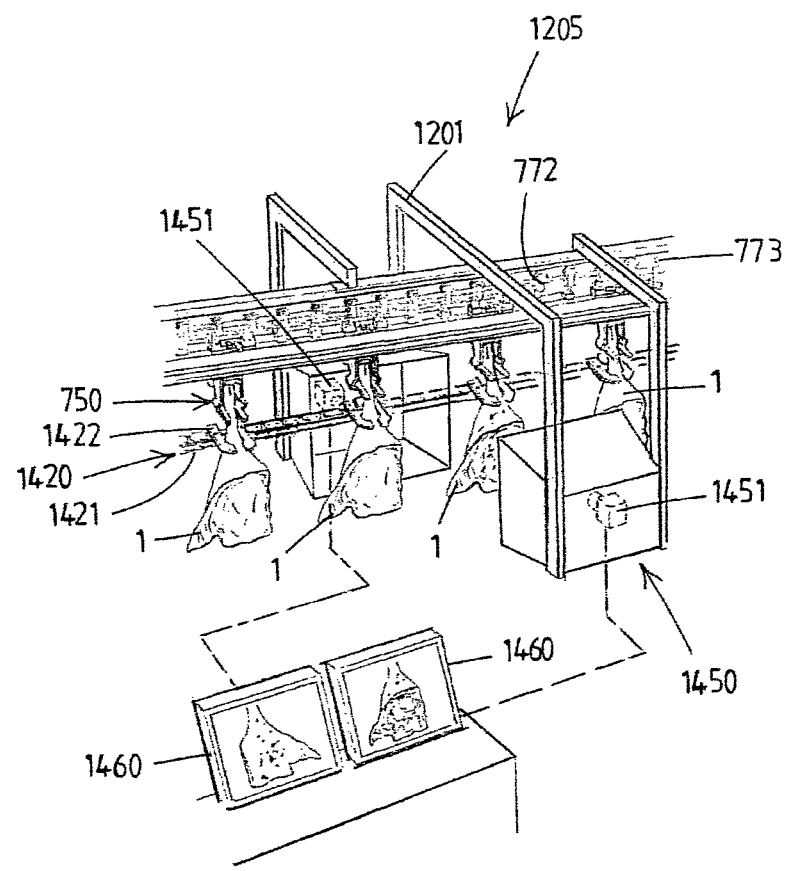
Fig.32***H

SYSTEM AND METHOD FOR PROCESSING SLAUGHTERED ANIMALS AND/OR PARTS THEREOF

This application is a Divisional of copending U.S. application Ser. No. 13/516,353, filed on Aug. 6, 2012. U.S. application Ser. No. 13/516,353 is the National Phase of PCT/NL2010/050870 filed on Dec. 17, 2010, which claims priority under 35 U.S.C. §119(a) to Patent Application Nos. 2003966, 2003967, 2003968, and 2003969 filed in Netherlands on Dec. 17, 2009, all of which are hereby expressly incorporated by reference into the present application.

The invention relates to a system and a method for processing a carcass part of a porcine, bovine, ovine, or caprine animal.

The slaughtering of red meat slaughter animals and the subsequent cutting up of the carcasses takes place in slaughterhouses and/or meat processing plants. Even in relatively modern slaughterhouses and red meat processing plants, many of the processes are carried out partly or entirely by hand. This is at least partly due to the variation in shapes, sizes and weights of the carcasses and carcass parts to be processed and to the harsh environmental conditions that are present in the processing areas of slaughterhouses and red meat processing plants. This manual or semi-automated processing results in harsh labouring conditions for the workers and in high labour costs.

In this document the term porcine animal or pig also includes sows, gilts, barrows, boars and feeder pigs.

In this document the term bovine animal covers cattle, steers, heifers, cows, bulls and also buffalo.

In this document the term ovine animals covers sheep and lamb.

In this document the term caprine animals covers goats.

All these are for the purpose of this application regarded as being red meat.

The present invention relates most prominently to the processing and/or conveying of individual parts of slaughtered pigs, notably leg parts, hams, and shoulder parts of pigs. As explained aspects of the invention are also applicable to other mentioned animals.

In general, when a red meat slaughter animal such as a pig is slaughtered, first it is killed, and then the internal organs are removed. Then the carcass is cut in half lengthwise, along the spine. The halves that are thus created are generally each cut into three pieces: a fore-end, a middle part and a ham part. The fore-end can then be cut up into a picnic shoulder and Boston butt, but that is not necessary for this invention. For other slaughter animals, such as bovine animals, sheep or goats, the names given to the different parts may be different (for example fore/hind foot, fore/hind quarter, fore/hind leg), but the parts themselves are similar. Usually, ovine and caprine animals are not cut in half lengthwise, although it is envisioned that they may be. If the animal is not split lengthwise, the fore/hind portions etc. may be utilized with hanging from either one foot or both, as explained later with respect to pigs (where one foot is present on the work piece).

The invention pertains to the processing of red meat slaughter animals, in particular pigs, but also to bovines, ovine animals, and caprine animals.

The carcass parts that are formed by dividing the intact carcass then are subjected to one or more additional processes. This further processing can involve many kinds of operations, like de-rinding, de-skinning, deboning, removing fat, membranes or other tissues, and/or cutting up into smaller parts or units. Also processes like smoking, curing, drying, marinating, salting, coating, boiling and/or grilling are possible. Before, after or during one or more of the operations, cooling of the carcass parts can take place.

A slaughter animal can be cut up and processed further in many ways. A sheer infinite number of combinations of end products can be made from a single slaughter animal. It has to be determined for each individual slaughter animal which end products will be made from it. Therewith, the processing operations and the order in which they have to take place are determined.

One of the parameters that influences how an individual carcass is to be cut up is the desired output of the slaughterhouse or meat processing plant. This desired output is formulated in terms of how much of which end product has to be made available at a certain point in time. This is determined by the demands of the clients of the slaughterhouse or meat processing plant. Based on the desired output of the slaughterhouse or meat processing plant and the number of available carcasses, it can be determined for each individual carcass how it is to be cut up.

Once it has been determined for each individual carcass how it has to be cut up and how the parts are to be processed further, a routing for the carcass and the carcass parts obtained from it can be determined. The routing takes the carcass and/or carcass parts along one or more processing stations. In each processing station, one or more operations or one or more parts thereof are carried out.

Carcasses and carcass parts have to be transported from one processing station to the next. This can take place in many ways: by means of hooks suspended from a rail, on a conveyor belt, in a container, on a moveable platform or the like. The transport can be powered by machinery or by means of human muscle power.

It is known to cluster together processing stations to perform subsequent operations on a particular type or carcass part. An example of such a known cluster is a group of processing stations in which a ham of a pig is deboned. In such a known system, a ham is delivered to the first processing station in the cluster, where it is de-skinned. It is then transported, e.g. by a conveyor belt to a next processing station. In this next processing station, an operator takes the ham from the conveyor belt and removes the excess fat. Then the ham is put back on the conveyor belt, where it is transported to the next processing station. In this next processing station, the ham is picked up from the conveyor belt by another operator, who makes the preliminary cuts that make the bone accessible. Then again the ham is put back on the conveyor belt again, which transports it to the next processing station. Here, the next operator removes the ham from the conveyor belt and removes the bone from the ham. He then puts the deboned ham and the bone on the conveyor belt again. The bone and the deboned ham are thus transported to the last processing station of the cluster, where the next operator make a distinction between the deboned ham and the bone, and puts each of them in a dedicated container or on a dedicated conveyor belt.

At that last processing station, for example a wheeled container is available in which the removed bones are collected, and another wheeled container is provided in which the deboned hams are collected. When the container with the bones is full, it is removed from the last processing station of the cluster to the waste department or to storage for transport to e.g. a gelatine or glue making plant. When the container with the deboned hams is full, it is e.g. transported to a processing station or a cluster of processing stations for further processing of the ham meat, such as boiling, grilling, smoking, drying or seasoning.

During the course of the slaughtering process and the further processing, the carcass or carcass part is supported and/or transported by a variety of carriers. Examples of such carriers are an overhead conveyor with stationary of moveable carriers (the moveable carriers being either driven by machinery or by hand), conveyor belts, stationary tables, hooks that penetrate into the carcass or carcass part, wheeled or non-wheeled containers. Carriers can hold or support a single carcass or carcass part, a plurality of the same type of carcass parts or a plurality of different types of carcass parts.

For different steps in the slaughtering process, usually different types of carriers are used. Transfer from one carrier to the other usually takes place manually.

The known systems and methods for slaughtering and further processing of the mentioned red meat slaughter animals are not very efficient from a logistic point of view. Also, often the carcasses are not cut up in the way in which they can provide the highest added value. Also, the known carriers and conveyor devices generally do not allow accurate processing of the carcasses and carcass parts.

In known carriers, the carcass part is usually engaged by one of its ends and the carcass part can move freely in one or more degrees of freedom relative to the carrier. Also, in known systems, the location at which the carrier engages the carcass part is not accurately defined or reproducible. The carriers engage the carcass part in a certain area rather than at an anatomically defined position.

Usually, the foot has already been removed from the carcass part when a ham or fore-end is being processed. The known carriers that are used in the processing of hams and/or fore-ends therefore usually engage the ham in the region of the knee and the fore-end in the region of the elbow, or the leg parts are engaged by what is called the "small bone" instead of by the foot.

A goal of the invention is to provide improvements or at least an alternative for known equipment and methods used in the processing of red meat slaughter animals and/or parts thereof.

According to a first aspect of the invention a system for processing a carcass part of a slaughtered porcine, bovine, ovine, or caprine animal is provided. A prominent envisaged application lies in the processing of a carcass part of a porcine animal, e.g. a leg or shoulder part of a porcine animal.

The carcass part comprises a holding zone, which holding zone comprises bone with soft tissue thereon. The system comprises at least one carrier for carrying said carcass part, and the carrier comprises a retaining assembly for retaining the carcass part by the holding zone, the retaining assembly being adapted to engage on the exterior of the soft tissue.

The first aspect of the invention also provides a method for processing a carcass part of a porcine, bovine, ovine, or caprine slaughtered animal. The method according to the first aspect of the invention which method comprises the steps of providing a carcass part of a slaughtered porcine, bovine or ovine animal, which carcass part comprises a holding zone, which holding zone comprises bone with soft tissue thereon; identifying said holding zone; providing a carrier having a retaining assembly for holding the carcass part by the holding zone; making the retaining assembly engage the soft tissue of the holding zone, and processing the carcass part.

Preferably the retaining assembly according to the first aspect of the invention does not penetrate into the soft tissue.

When the carcass part is a leg carcass part the holding zone can for example be a foot, knee, or the region near the olecranon of the leg carcass part (when such anatomical portion is present).

Preferably the holding zone is chosen close to the center of gravity of the carcass part.

According to a second aspect of the invention a system is provided for processing a carcass part of a slaughtered porcine, bovine, ovine, or caprine animal, which carcass part comprises a first end, a second end and a reference portion, which is present between the first end and the second end, which system comprises at least one carrier for carrying said carcass part of a slaughtered animal, and wherein the carrier comprises a retaining assembly for holding the carcass part by the reference portion, which retaining assembly preferably has a shape that is adapted to the shape and size of said reference portion.

Preferably the reference portion lies between the ends of the carcass part, spaced from both ends.

Preferably the reference portion is chosen close to the center of gravity of the carcass part.

For example in a leg carcass part, e.g. of a pig, the reference portion can be chosen from anatomical portions like; the foot (e.g. a region with the metatarsal bones), the knee, the olecranon (when such anatomical portion is present).

The second aspect of the invention also relates to a method for processing a carcass part of a slaughtered porcine, bovine, ovine, or caprine animal, which carcass part comprises a first end, a second end and a reference part, which is present between the first end and the second end, which method comprises the following steps:
  providing the carcass part,
  identifying the reference part,
  providing a system according to the second aspect of the invention,
  holding the carcass part by the reference part by means of the retaining assembly,
  processing the carcass part while the carrier holds the carcass part.

The second aspect of the invention also relates to a slaughtered pig shoulder parts conveyor device for conveying individual pig shoulder parts, wherein an individual pig shoulder part includes:
  at least a part of the humerus bone,
  at least a part of the radius, and of the ulna
  the olecranon,
  at least a part of the meat that is naturally present on the humerus bone, the radius, the ulna,
said conveyor device comprising:
  a track,
  one or more pig shoulder part carriers movable along said track, each carrier being adapted to carry an individual pig shoulder part,
  wherein each carrier has one shoulder part retaining assembly adapted to engage on a single pig shoulder part so as to retain the pig shoulder part,
  wherein the retaining assembly is an the olecranon retaining assembly that is adapted to engage on the olecranon.

The second aspect of the invention also relates to a slaughtered pig ham parts conveyor device for conveying pig ham parts that comprise:
  a knee,
  at least a part of the femur bone, adjacent to the knee
  at least a part of the tibia bone and fibula bone, adjacent to the knee at least a part of the meat that is naturally present on the femur bone, tibia bone and fibula bone,
said conveyor device comprising:
a track,
one or more pig ham part carriers movable along said track, each carrier being adapted to carry an individual pig ham part, wherein each carrier has one pig ham part retaining assembly adapted to engage on a single pig ham part so as to retain the pig ham part, wherein the retaining assembly is a knee retaining assembly that is adapted to engage on the knee of the pig ham part.

A third aspect of the invention relates slaughtered pig leg parts conveyor device, for conveying individual pig leg parts, wherein an individual pig leg part includes at least a portion of a pig leg and the pig foot, said conveyor device comprising:
a track,
one or more pig leg part carriers movable along said track, each carrier being adapted to carry an individual pig leg part,
wherein each carrier has one pig foot retaining assembly adapted to engage on a single pig foot so as to retain the pig leg part in a position suspended from the carrier,
wherein the retaining assembly includes a pig foot aperture adapted to receive the pig foot.

As will follow from the claims, the description, and the drawings, combinations between the first, second, and third aspect of the invention are well possible, e.g. with respect to features, including any optional features, such as relating to the retaining assembly, the carrier, the one or more trolleys supporting the carrier, and track and with respect to any processing station.

The invention is in particular applicable for fresh red meat processing. Fresh red meat processing in this context refers to processing of meat that has not been subjected to a conservation process that irreversibly reduces the natural flexibility of the soft tissues of the carcass part due to a substantial change in protein structure. Such a substantial change in protein structure occurs e.g. during curing or aging, as for example used in the production of Parma ham or Serrano ham.

The carrier is preferably adapted to carry an individual carcass part, so one carcass part per carrier.

A carrier is possible adapted to carry an individual leg carcass part, e.g. of a pig, so a single leg (or at least a portion thereof) and possible a carcass portion attached to the top end of the leg, e.g. a shoulder portion.

As is preferred a carrier is adapted to act as a sole means for carrying the carcass part, which implies that a single carrier has to be able to bear the weight of the carcass part. In the case of a shoulder part or a ham of a pig, this weight is typically about 15 kilos.

Preferably, the carrier also bears at least a part of the forces that are exerted on the carcass part during processing, e.g. due to cutting or transportation.

In the first aspect of the invention the carcass part is engaged by the carrier at a predetermined holding zone, wherein a bone is present with soft tissue thereon.

Soft tissue can for example be skin, rind, tendons, ligaments, meat, fat, etc. The soft tissue is flexible and has certain elasticity. "Flexible" means that it can be deformed without the use of excessive force, and the elasticity makes that it at least substantially returns to its initial shape when a deforming force is taken away.

The retaining assembly of the carrier according to the first aspect of the invention engages the outside of the soft tissue during processing of the carcass part, preferably during all process steps to which the carcass part is subjected. When the retaining assembly engages on the soft tissue the flexibility of the soft tissue makes that by applying a guiding or orienting force on the carcass part, the carcass part can be somewhat moved, e.g. rotated, relative to the retaining assembly and thus with respect to the carrier. This allows for some flexibility in positioning the carcass part without having to provide the carrier and/or the retaining assembly with additional degrees of freedom, or when the retaining assembly is locked in a certain predetermined position, e.g. due to an indexing mechanism.

The outside surface of the holding zone where the retaining assembly engages the soft tissue preferably does not move relative to the retaining assembly when the guiding or orienting force is applied. In this case, when the guiding or orienting force is taken away from the carcass part, the carcass part returns to the spatial orientation it had relative to the retaining assembly when the carcass part was arranged in the carrier. This return to its initial orientation is at least partly due to the elasticity of the soft tissue.

A further advantage of a retaining assembly of a carrier engaging the carcass part by the soft tissue is that a significant variety of anatomical sizes and shapes of a designated holding zone of the carcass part can be engaged by the retaining assembly. Soft tissue can be deformed, e.g. compressed, to an extent, allowing the retaining assembly to engage varying holding zones, even when the retaining assembly has an aperture into which the holding zone is received of rigid design, i.e. with constant dimensions.

In a combination of the first and second aspect of the invention the carrier is adapted to engage the exterior of the soft tissue of the carcass part on a reference portion of the carcass part.

If the holding zone is a reference portion of the carcass part, and the outside surface of the holding zone where the retaining assembly engages the soft tissue preferably does not move relative to the retaining assembly when a guiding or orienting force is applied, the holding zone can still function as a reference portion after the guiding or orienting force has released the carcass part.

The cross section of the soft tissue holding zone may be deformed by the retaining assembly when it holds the carcass part. The flexibility of the soft tissue in the holding zone allows this deformation, but the force required for this deformation (and the reaction force due to the elasticity of the soft tissue) provides a substantial friction between the holding zone of the carcass part and the retaining assembly. Therefore, due to this deformation, the carcass part is held firmly by the retaining assembly. The soft tissue however still allows movement of the carcass part relative to the retaining assembly.

In an advantageous embodiment, the retaining assembly is adapted to engage the carcass part in the region of the foot. This embodiment is particularly advantageous when hams or fore-ends of pigs are carried and/or processed.

In an advantageous embodiment, the retaining assembly is adapted to engage the foot of a pig in the region of the metatarsal bones. The soft tissue of the carcass part in this region allows the lateral metatarsal bones to move relative to the central metatarsal bones. In the natural position, the lateral metatarsal bones are arranged at least partly behind the central metatarsal bones. It has turned out that it is particularly advantageous if the retaining assembly of the carrier deforms the cross section of this foot region in such a way that the lateral metatarsal bones are forced into a position more or less next to the central metatarsal bones. This deformation requires a relatively small force to obtain a significant flattening of the cross section in the foot region. This is advantageous because this way, the retaining assembly can accommodate pig leg carcass parts having a large variation in natural diameter of the foot region, even when no moveable parts are used to compensate for this natural variation, i.e., even when the retaining assembly has an aperture for receiving said foot region of constant dimensions, e.g. formed as a slot in a rigid member, e.g. formed in a metal plate.

In an advantageous embodiment, the retaining assembly comprises a slotted plate that has been provided with a slot for accommodating the holding zone of the carcass part. Preferably, this slot has a width that is smaller than the smallest diameter of the designated holding zone of the carcass parts that are projected to be held by the carrier. This way, the slot imposes a deformation of the soft tissue in the holding zone, e.g. the foot region, therewith providing a firm grip. The soft tissue still allows for some movement of the carcass part relative to the retaining assembly of the carrier.

The slot can be provided with a projection between a retaining portion of the slot and an entrance portion of the slot, that locally narrows the slot yet does not penetrate into the soft tissue, e.g. embodied as a rounded bump. This reduces the chance of an undesired release of the carcass part. An elastic member, e.g. a leaf spring, may also act to provide a local narrowing of the slot between a retaining portion of the slot and an entrance portion of the slot.

In a possible embodiment, the retaining assembly comprises two jaws that clamp the carcass part, i.e. the holding zone thereof, between them. The jaws can e.g. be pivotally mounted, spring mounted, or e.g. they can be made of leaf springs.

In an embodiment a retaining assembly comprises a forked part adapted to form a receiving space between its forks or teeth for the holding zone of the carcass part without penetrating into the holding zone. When this carrier is mounted in a conveyor having a track, a guide rail that is not connected to the carrier, but is arranged alongside the track, is provided, which guide rail prevents the carcass or carcass part from falling out of the forked part, e.g. at the location of a processing station where the carcass part is subjected to a processing. The guide rail functionality may alternatively be provided using a guide plate system. The guide means, rail or plate, may alternatively be arranged to travel with the carcass part, at least for the length of one or more work stations.

In an advantageous embodiment one or more pivot structures are provided to obtain mobility about one or more pivot axis that allow the carcass part together with the retaining assembly to move relative to for example a track of a conveyor device or a stationary support for the carrier.

The pivoting can be such as to allow for a full rotational motion or for a pivoting through a predetermined angular range.

An indexing mechanism can be associated with one or more of the pivot structures, which determines at least one, preferably multiple, predetermined angular positions.

However, it is also possible that the flexibility of the soft tissue provides enough freedom of movement to the carcass part. Also, it is possible that for some directions of movement pivot axis or translation guide arrangements are provided in the carrier, while for other directions of movement the flexibility of the soft tissue provides enough freedom of movement.

It is also possible that for one or more directions of mobility of the retaining assembly with respect to the carrier, the retaining assembly can assume multiple, discrete and predefined positions, while the flexibility of the soft tissue allows movement of the carcass part relative to these predefined positions. The same goes for any mobility of the carrier with respect to one or more trolleys supporting the carrier on a track (when present) or with respect to a stationary support structure.

The retaining assembly, when designed to engage on the exterior of a designated holding zone of the carcass part, preferably takes the anatomy of the holding zone and/or the reference portion of the carcass part into account. This means that the part or parts of the retaining assembly that engage the carcass part have a shape that is adapted to the geometry of the portion of the carcass part that they come into engagement with.

In a possible embodiment, the precise position where a processing operation has to be carried out on the carcass part held by a carrier is determined by means of a camera vision system, by scanning (e.g. using vision, X-rays or CT-scanning), by measuring a distance or direction from a reference point (such as the holding zone of the carcass or carcass part or the retaining assembly or other part of the carrier), or anatomically, e.g. by feeling (possibly by a feel sensor).

As mentioned above, in a possible embodiment, constructional features may be provided that allow the carcass part and the retaining assembly together to move relative to for example the carrier, a stationary support structure, or a track of a conveyor device. This movement can be translational, rotational and/or a combination thereof, and can take place in one or more planes. Movement in different planes can take place simultaneously or sequentially. The possibility of one or more of these movements allows manipulation of the position and/or orientation of the carcass part relative to, for example, the carrier, a stationary support structure, and/or the track of a conveyor device, also possibly with respect to a processing equipment, e.g. one or more knifes or one or more pulling rolls in such equipment.

It is possible that these movements can be controlled and/or suppressed, so that a carcass part can be brought into a desired position and/or orientation prior to or during carrying out a processing step. Preferably, the carcass part is brought into the desired position and/or orientation automatically before the processing step is carried out, and held in that desired position and/or orientation during the processing step. This saves time for the operator as he does not have to bring the carcass part into the desired position and/or orientation for processing any more before he can start working on the carcass part. This reduces the physical stress on the operator, as it generally takes quite an effort to manipulate the carcass part. Also, the operator does not have to make any effort to keep the carcass or carcass part in the desired position during processing. In some situations this means that the operator even can use both hands for the processing, instead of one for holding the carcass part in position and the other one for carrying out the processing.

A system according to the invention can be provided with means that manipulate the position and/or orientation of the carrier and/or the retaining assembly during the processing step. This allows for example the carcass part to change position and/or orientation relative to the processing equipment such as knives, scrapers or rolls. This makes it for example possible to carry out the processing step on two opposed sides of the carcass part, e.g. whilst the relevant equipment and/or operator remains in a stationary position. It also makes it possible to carry out more complex processes automatically or to e.g. to make for example curved incisions as the carcass part is moved by the carrier.

In a possible embodiment, the carrier is support by one or more trolleys of a conveyor device, which trolleys are movable along an associated track, e.g. along a rails, e.g. an overhead rails.

Preferably the carrier is mobile relative to the one or more supporting trolleys of a conveyor device, and means are provided to control the movements of the carrier relative to the one or more supporting trolleys.

For example, the carrier could be connected to the one or more supporting trolleys by means of a pivot structure with a vertical axis of rotation. This way, different sides of the carcass part can be presented to an operator or to an automated device for carrying out an operation. For example, the carrier can be provided with an indexing mechanism providing multiple, e.g. four preferred orientations about the vertical axis relative to the trolley, each orientation e.g. being at 90° from its adjacent preferred positions. The carrier can then be moved from one preferred orientation to the next e.g. by means of a cam track/cam follower mechanism.

The mobile supported carrier could be provided with a cam follower that is mounted on an arm of the carrier. In the processing station where an operation is carried out that requires a repositioning of the carcass part, a cam track is then provided. Upon approach of this processing station, the cam follower is brought into the cam track. The cam track then guides the cam follower and therewith effects the desired motion of the carrier.

For example, when a horizontal pivot axis structure is provided, the carrier with the carcass part may be tilted, preferably sideways with respect to the track, e.g. upwardly towards an operator positioned along the track, thereby presenting the carcass part to the operator in an ergonomically better way. For example the carrier could then have a cam follower cooperating with a cam track that moves the cam follower generally in a downward or upward direction to effect such a tilting.

The mentioned features for manipulating the orientation and/or position of the carcass or carcass part relative to the track and/or relative to the processing station can also be used for bypassing a certain processing station.

If the holding zone is a reference portion of the carcass part to be processed it is at least roughly known where the different elements of the carcass part are relative to the retaining assembly, so not the whole carcass part has to be scanned or analysed in order to find the right place for the operation to be carried out. In some situations it may not even be required to perform the analysis or measurements any more, because the location where the operation has to be carried out can be deducted accurately enough by just knowing where the reference part is.

It is possible that a retaining assembly engages the carcass part to be processed at a reference portion that is in the middle rather than at one of the ends of the carcass part. The retaining assembly engages the reference portion of the carcass part. The retaining assembly has a firm grip on it that the reference portion of the carcass part that is engaged by it.

However, it is possible that some movement of the carcass part relative to the retaining assembly is still possible when it engages the carcass part.

In a possible embodiment, the retaining assembly comprises two jaws that clamp the reference portion of the carcass part between them.

A retaining assembly may comprises a pin that is forced into or through the carcass part. A retaining assembly with a projecting pin can further comprise an abutment, which cooperates with the projecting pin to hold the reference portion of the carcass part in place.

Engagement of the retaining assembly on a predetermined reference portion of the carcass part not only has the advantage of being able to obtain a good hold of on the carcass part, but also that the position of different portions of the carcass part relative to the retaining assembly are known. This can be helpful when one or more process steps are to be carried out in an automated manner. For example, the deboning process often requires that a specific tendon is cut through. The anatomy of the carcass part to be processed determines the position of such a tendon relative to the reference portion of the carcass part that is held in the retaining assembly of the carrier. Of course, there are some natural variations in shape and size between individual carcass parts, but still when the retaining assembly holds the carcass part its the reference portion, the position of the tendon to be cut is known quite accurately.

Processing steps, such as scraping meat from bones, pulling on a part of the carcass part to be processed, sawing, cutting, derinding and deskinning, may be carried out on a specific part of the carcass part to be processed whilst held by a carrier.

By holding the reference portion of the carcass part in the retaining assembly, and knowing where the retaining assembly is relative to the processing device, and possible carrying out additional measurements or analysis, the position of the part that is to be processed is known as well. This makes it easier to carry out the manual operations because the operator knows where the part that he has to work on is relative to the retaining assembly. Also, it could allow automation of at least some of the processes to be carried out.

In a possible embodiment, the carrier is adapted for holding a carcass part that comprises a shoulder part of a slaughtered animal, e.g. of a pig. This shoulder part comprises at least a part of the humerus bone, at least a part of the radius, at least part of the ulna, and the olecranon, and at least a part of the meat that is naturally present on the humerus bone, radius, ulna, and possibly on the olecranon. When such a carcass part is processed, it is advantageous to use the olecranon as the reference part.

It is advantageous to hold a carcass part by the olecranon, and not by or close to one of the free ends as is known from the prior art, e.g. as the olecranon is commonly located in or near the centre of gravity of the carcass part to be processed. By holding the carcass part by the olecranon, the relatively heavy carcass part can be manipulated easier, as the carcass part does not extend so far from the holding point as compared to the situation when the carcass part would be held by one of its free ends. As the mass of the carcass part is more or less concentrated close to the olecranon, holding the carcass part by the olecranon means that turning the carcass part over requires a smaller turning moment, which leads to smaller mechanical load on the system.

Moreover, holding the carcass part by the olecranon in the olecranon retaining assembly means that the position of the olecranon relative to the carrier is unambiguously known. From the known position of the olecranon, positions of other parts can be deducted. The accuracy of this deduction generally decreases with increasing distance from the fixing point. So, when holding the carcass part by the olecranon, the positions of other parts of the carcass part to be processed can be derived more accurately than in a situation where the carcass part is held by one of its free ends such as the foot portion or the shoulder blade.

Moreover, the olecranon retaining assembly will more or less hinder the movement of the humerus bone relative to the radius, ulna and olecranon. This is due to that the olecranon retaining assembly engages the carcass part close to the joint between the humerus bone on the one side and the radius, ulna and olecranon on the other. This further increases the reliability with which the positions of other parts of the carcass part can be derived based on the known position of the olecranon.

In a possible embodiment, at least a part of the meat that is naturally present on the olecranon is detached from the olecranon. It can be that the meat is actually removed from the carcass part, but it is also possible that one or more cuts are made in the carcass part that sever one or more natural connections between the olecranon and the meat that is naturally present thereon such that a part of surface of the bone is exposed or at least reachable.

In an other possible embodiment, there still is meat or other soft tissue (skin, rind, tendons, ligaments, meat, fat, etc.) on the olecranon when the lock engages the olecranon. The soft tissue has a certain elasticity. When the lock holds the carcass part this elasticity makes that by applying a force on the carcass part, the carcass part can be moved, e.g. rotated, relative to the lock. When this force is taken away from the carcass part, the carcass part returns to the position it had when the lock was applied to it. This allows some flexibility in handling the carcass parts on the one hand and the possibility of using the reference part to determine where other elements of the carcass part are on the other.

The olecranon retaining assembly preferably comprises a first jaw and a second jaw that engage the olecranon on different, preferably opposite, sides. This way, the olecranon can be clamped between the first jaw and the second jaw of the olecranon retaining assembly of the carrier.

In a possible embodiment, the jaws of the olecranon retaining assembly engage directly on the olecranon bone, in such a way that there is no meat present between the jaws and the olecranon bone. This way, no meat loss occurs due to the fixation of the carcass part on the carrier during deboning, because the operator or the device that debones the carcass part is not hindered by the jaws in reaching the meat.

In an other possible embodiment, there is still some soft tissue on the olecranon when the jaws of the olecranon retaining assembly engage the olecranon. Then, use can be made of the elasticity of this soft tissue for temporarily changing the position of the carcass part relative to the lock by applying a force, as described above.

The olecranon retaining assembly preferably further comprises an actuator for moving the first jaw and the second jaw relative to each other such that the olecranon retaining assembly can be opened and closed.

In a different, less preferred, embodiment, the olecranon retaining assembly comprises a pin which can be forced into or through the carcass part in the vicinity of the olecranon. The pin can force the olecranon against a jaw of the olecranon retaining assembly to hold the olecranon in place. Alternatively, the pin can force the olecranon against a guide rail or guide surface arranged along a track of a conveyor device wherealong a carrier is movable.

In an embodiment, the carcass part can be brought in a position wherein it hangs down from the olecranon retaining assembly of the carrier. This means that the shape of the jaws and/or the clamping force that the jaws exert on the olecranon must be such that the carcass part does not drop from the olecranon retaining assembly when the carcass part is not or no longer supported apart from just by the olecranon retaining assembly. Apart from the gravity, there are also other forces that act on the carcass part, in particular during processing. The olecranon retaining assembly has to be able to hold the carcass part against the action of those forces as well. In the case that the olecranon retaining assembly has a first jaw and a second jaw, the carrier preferably has an actuator that is provided with an actuator force supply for providing enough clamping force to the jaws of the olecranon retaining assembly in order to supply the clamping force that is needed.

The carrier may comprises an olecranon retaining assembly connection portion that connects the retaining assembly to the carrier. This carrier may connect the olecranon retaining assembly to a stationary support or to one or more trolleys of a conveyor device.

The olecranon retaining assembly connection portion preferably comprises at least one pivot structure that allows rotation (either a full rotation or within a limited angular range) of the carcass part relative to the stationary support or the trolley. The skilled person will understand that this pivot structure can take many forms, shapes and sizes. It could be for example a pin-and-bushing construction that allows rotation in a single plane, but it could for example also be a ball joint that allows rotations in multiple planes, although less preferred.

When the olecranon retaining assembly has a first jaw and a second jaw, advantageously the first jaw part is forked: it comprises two teeth with a slot there between. The olecranon can be accommodated in the slot, with the teeth on either side. The olecranon has a relatively wide part at its free end, and a relatively narrow part at the other end. Preferably, the width of the slot is such that it can accommodate the narrow part of the olecranon, but that the wide part of the olecranon cannot pass through. This helps to lock the olecranon in place. The slot can have a V-shape, or it can have parallel sides. The teeth can have straight edges or curved ones, with sharp or dull points at their free end.

The second jaw part is advantageously formed as an anvil, which is pressed against the olecranon. The side that engages the olecranon can be a flat or curved surface. The anvil-like second jaw can be advantageously combined with the forked first jaw.

Advantageously, the open side of the slot is wide enough to accommodate the second jaw. That way, the olecranon is enclosed by the two jaws of the olecranon retaining assembly.

The carrier may be adapted for supporting a ham of a slaughtered porcine, bovine, ovine, or caprine animal. A prominent application envisaged here is for a pig ham part.

This ham comprises a knee, at least a part of the femur bone, adjacent to the knee, at least a part of the tibia bone and fibula bone, adjacent to the knee, and at least a part of the meat that is naturally present on the femur bone, the tibia bone and the fibula bone.

It is advantageous to hold such a carcass part by the knee, and not by or close to one of the free ends as is known from the prior art, as the knee is located in or near the centre of gravity of the carcass part to be processed. By holding the carcass part by the knee, the relatively heavy carcass part can be manipulated easier, as the carcass part does not extend so far from the fixing point as compared to the situation when the carcass part would be held by one of its free ends. As the mass of the carcass part is more or less concentrated close to the knee, holding the carcass part by the knee means that turning the carcass part over requires a smaller turning moment, which leads to smaller mechanical load on the system.

Moreover, engaging the carcass part by the knee with the knee retaining assembly means that the position of the knee relative to the carrier is unambiguously known. From the know position of the knee, positions of other parts can be deducted. The accuracy of this deduction generally decreases with increasing distance from the holding point. So, when holding the carcass part by the knee, the positions of other parts of the carcass part to be processed can be derived more accurately than in a situation where the carcass part is held by one of its free ends such as the foot portion or the pelvis.

Moreover, the knee retaining assembly will more or less hinder the movement of the femur bone relative to the tibia bone and fibula bone. This is due to that the knee retaining assembly engages the carcass part close to the knee joint between the femur bone on the one side and the tibia bone and fibula bone on the other. This further increases the reliability with which the positions of other parts of the carcass part can be derived based on the known position of the knee.

In a possible embodiment, at least a part of the meat that is naturally present on the bones at or adjacent to the knee is detached from those bones. It can be that the meat is actually removed from the carcass part, but it is also possible that one or more cuts are made in the carcass part that sever the natural connection or connections between these bones and the meat that is naturally present thereon such that a part of surface of the bone or bones is exposed or at least reachable.

In an other possible embodiment, there still is meat or other soft tissue (skin, rind, tendons, ligaments, meat, fat, etc.) on the knee when the retaining assembly engages the knee. The soft tissue has a certain elasticity. When the retaining assembly holds the carcass part this elasticity makes that by applying a force on the carcass part, the carcass part can be somewhat moved, e.g. rotated with respect to the retaining assembly. When this force is taken away from the carcass part, the carcass part returns to the position it had when the retaining assembly was engaged to it. This allows some flexibility in handling the carcass parts on the one hand and the possibility of using the reference part to determine where other elements of the carcass part are on the other.

A carrier with a knee retaining assembly can comprise a first jaw and a second jaw, that engage the knee on different, preferably opposite, sides. This way, the knee is clamped between the first jaw and the second jaw of the knee retaining assembly.

In a possible embodiment, the jaws of the knee retaining assembly engage directly on the knee, in such a way that there is no meat present between the jaws and the knee. This way, no meat loss occurs due to the fixation of the carcass part on the carrier during deboning, because the operator or the device that debones the carcass part is not hindered by the jaws in reaching the meat.

The knee retaining assembly further comprises an actuator for moving the first jaw and the second jaw or the second jaw and the hook relative to each other such that the knee retaining assembly can be opened and closed.

In a preferred embodiment, the carcass part, e.g. weighing up to 15 kilos, can be oriented hanging down from the knee retaining assembly of the carrier. This means that the shape of the knee retaining assembly and/or the holding force that the jaws exert on the knee must be such that the carcass part does not drop from the knee retaining assembly when the carcass part is not or no longer supported, apart from just by the knee lock. Apart from the gravity, there are also other forces that act on the carcass part, in particular during processing. The knee retaining assembly has to be able to hold the carcass part against the action of those forces as well. In the case that the knee retaining assembly has a first jaw and a second jaw, the carrier preferably has an actuator that is provided with an actuator force supply for providing enough clamping force to the jaws of the knee retaining assembly in order to supply the clamping force that is needed.

In an embodiment, the knee retaining assembly comprises a second jaw for engaging the knee and a first jaw with a pin, e.g. curved, e.g. shaped like a hook. This pin or hook is arranged such that it is forced though the carcass part in the vicinity of the knee. Preferably, the pin is arranged such that it passes between the tibia bone and the fibula bone.

When the embodiment with the second jaw and the first jaw with pin or hook is used, the actuator force supply supplies enough force to force the pin or hook through the carcass part, between the tibia bone and the fibula bone, adjacent to the knee.

The second jaw is advantageously formed as an anvil, against which the knee can be pressed. The side of the anvil that engages the knee can be a flat or curved surface. The anvil-like second jaw can be advantageously combined with the first jaw having the pin or hook.

In a particularly advantageous embodiment, the anvil-like second jaw engages the carcass part at the back of the knee. The first jaw is then e.g. arranged such that the pin can be forced through the meat from the back of the knee to the front of the knee, between the tibia bone and the fibula bone. Preferably, the pin is curved, such that once the tip of the pin has passed through the meat of the carcass part, this tip curves back towards the front of the knee and pushes the knee backwards towards the anvil face of the second jaw.

In accordance with the third aspect of the invention, a carrier is provided that has a retaining assembly that engages an individual carcass part of a pig by the foot, in such a way that the pig carcass part is suspended from the carrier.

It has turned out that this way of carrying an individual pig carcass part can be put to advantageous use in processing of pig carcass parts.

In a possible embodiment, the retaining assembly has a pig foot slot adapted to receive the pig foot, which slot is open at one end thereof to introduced the pig foot sideways into the slot and remove the pig foot sideways from the slot. This allows easy and/or mechanised introduction and/or withdrawal of the pig foot into the pig foot slot. Therewith, arranging the pig carcass part into the retaining assembly of the carrier and/or removing the pig carcass part from the retaining assembly of the carrier can be made easy or be automated.

In a possible embodiment, the pig foot aperture has a rigid reference face, and the retaining assembly is adapted to receive the pig foot with its central metatarsal bones adjacent said rigid reference face, and the retaining assembly is adapted to press the lateral metatarsal towards the reference face.

Preferably, in this embodiment the aperture is a pig foot slot which is open at one end thereof to introduce the pig foot sideways into the slot and remove the pig foot sideways from the slot, wherein the slot has a narrowing entrance portion at its open end leading to a retaining portion of the slot, the retaining portion including the reference face, such that upon sideways introduction of the pig foot into the slot, the narrowing entrance portion presses the lateral metatarsal bones from their natural position into a position closer to the reference face.

There are several advantages to using this region of the pigs foot as a holding zone. A first advantage is that the diameter of this region is about the same for a front leg and for a hind leg. This allows in many cases to use the same carrier for engaging an individual front leg part as well as an individual hind leg part of a pig. Also, using this region as the region where the carrier engages the carcass part, means that no pre-cutting of the pig leg parts is required before arranging the pig leg part in the carrier.

In an advantageous embodiment of any of the carriers described above, the carrier mobile, and further provision is made for locking means, for example a catch, that lock the orientation of the carrier relative to the stationary support structure or the one or more trolleys that the carrier is attached to. This makes that the carcass part can be held in position during processing, or that at least one degree of freedom is then locked. In known systems for processing carcass parts of slaughter red meat animals it is often the operator that has to hold the carcass part in position during processing. This is heavy and unhealthy work, and moreover it makes it impossible to use both hands for the processing.

In an advantageous embodiment of any of the carriers described above, the carrier is further provided with control means that control the orientation of the retaining assembly relative to the stationary support structure or the trolley that the carrier is attached to. These control means can actively adapt or change the orientation of the carcass part relative to the stationary support structure of the trolley that the carrier is attached to, for example when a cut has to be made on the other side of the carcass part. In known systems, it is often the operator that has to bring the carcass part into a different orientation, which is heavy and unhealthy work.

In an advantageous embodiment of any of the carriers described above, the retaining assembly is pivotable or fully rotatable in a plurality of planes. Preferably, at least two of these planes are perpendicular to each other. This allows the carcass part to be manipulated over more degrees of freedom.

In a system according to the invention, preferably a plurality of carriers is provided. These can e.g. be carriers that are each adapted for carrying a single shoulder part or carriers for carrying a single ham of a slaughtered pig.

A system is in an advantageous embodiment further provided with a conveyor for transporting multiple carriers along a track. In general, a single conveyor will only be equipped with one type of carriers. However, in certain circumstances or in certain lay-outs of slaughter animal processing plants, different types of carriers can be used on the same conveyor.

A conveyor preferably comprises a plurality of trolleys, wherein a carrier is supported by one or more, e.g. two, trolleys.

Alongside the track, preferably one or more processing stations are arranged. These processing stations can provide a place for an operator to stand or sit while the operator carries out a process on the carcass part, for example making a cut or carrying out a part of the deboning process. The processing stations and the track together form a processing line.

A processing station can be provided with tools for the operator, like knives or other types of cutters or additional supports for the carcass part (for example to hold it in a certain position or orientation during the processing). Those tools can be connected to the processing station, for example hanging down from flexible cables.

It is also possible that in the processing stations one or more processes are carried out automatically or semi-automatically. In that case, the processing stations may be provided with rotating circular knives, waterjet cutters, sensors, guide rails or other components that make sure automatic processing or semi-automatic processing can take place.

It is possible that in all processing stations different process steps are carried out. It is however also possible that in several processing stations the same process step is carried out, so that several carcass parts undergo the same processing step at the same time.

It is possible that a processing station is arranged at a straight part of the track, so the carcass pass by the processing station in a more or less straight line. It is however also possible that a processing station is arranged at a curved part of the track.

This is in particular advantageous when the process is carried out automatically in the processing station. In that case, the processing station can comprise a carrousel, in which processing units are mounted. The track takes the trolleys with the carriers along a part of the circumference of the carrousel. In use, the carrousel turns at such a speed that the processing units move along with the carriers over the part of the circumference of the carrousel that is followed by the track. The distance between adjacent processing units is chosen accordingly, so that each processing unit moves along together with a carrier, side by side. During this side by side movement, the processing unit performs its process on the carcass part that is held by the carrier. When the carrier and the processing unit reach the point where the track leaves the circumference of the carrousel again, the processing unit is finished with the processing. The track takes the carrier further downstream along the processing line and the rotation of the carrousel takes the processing unit back to the point upstream where the track meets the circumference of the carrousel. There, the processing unit meets an other carrier to move along with, so it can carry out the process on the carcass part that is held by that carrier.

The use of a carrousel is advantageous when the trolley with the carriers are moved continuously, because it provides a simple way for the processing units to return to their initial position so they can start processing the next carcass part. It is also way to obtain extra track length and extra time to carry out a process without a substantial increase in foot print or space used by the processing line.

It is particularly advantageous if the carrousel is as wide a standard processing station, for example 1.2 meters.

The conveyor can subject the trolleys (and therewith the carriers) to either a continuous or a step-wise motion.

In an advantageous embodiment, the conveyor with multiple carriers is an overhead conveyor, wherein the retaining assembly of a carrier is arranged below the trolley to which said carrier is connected, in such a way that the carcass part hangs down from the carrier. Preferably, the carrier and the conveyor allow the part of the carcass part that is to be processed to hang down below the carrier, so that the performing of a process step is not hindered by parts of the carrier or the conveyor.

In an advantageous embodiment, the carcass part hangs down from the carrier during at least one of deskinning, derinding or fat removal. This allows the operator to move the tool for the deskinning, derinding or fat removal in downward direction during the removal of skin, rind or fat.

In known methods for deskinning, derinding or fat removal, the operator moves the tool away from him when carrying out the process. In the known methods, this makes that the carcass part has to be actively held in position during the process. When the operator moves the tool for deskinning, derinding or fat removal downward when working on a suspended carcass part, the processing force on the carcass part works in the same direction as gravity, so it is no longer necessary to actively hold the carcass part in the right position during the processing. This means that the operator can use both hands for carrying out the process, or that he has one hand free.

This improvement in the deskinning, derinding and fat removal operations is even more prominent when the carcass part to be processed is stable due to the presence of bones in the carcass part, and/or when the carcass part is supported against processing forcers exerted in horizontal direction, e.g. by support by stationary guides. Such guides can also be used to present the carcass part to the operator under an angle that allows the operator to maintain an ergonomically sensible position during the processing of the carcass parts.

In an advantageous embodiment, a conveyor further comprises means for controlling the orientation of the carrier and/or retaining assembly relative to the carrier or to the trolley to which said carrier is connected, which means are arranged alongside the track. These means for controlling can be for example a cam track rail, that operates a lever or the like on the carrier.

In an advantageous embodiment, a conveyor comprises means for locking the orientation of the carrier and/or retaining assembly of a carrier relative to the trolley to which said carrier is connected, which means are arranged alongside the track. These means for locking the orientation can be for example a guide rail, that holds a lever or the like on the carrier in a fixed position, e.g. a pneumatic, electronic or hydraulic actuated rail, or a pin that is actuated by for example a pneumatic cylinder, which pin prevents movement of a certain part of the carrier.

In a possible embodiment in which the carriers are moved along a track, guides are arranged alongside at least a part of that track. These guides engage the carcass parts that are conveyed by the carriers and bring the carcass parts into a position that allows the operator to work in an ergonomic position. The guides can also support the carcass parts while the carcass parts are being processed.

When the carcass parts that are moved along the track come into contact with the guides, friction can occur between the guides and the carcass parts. Due to this friction, it is possible that the relative position and/or the relative orientation between the carrier and the carcass part it carries changes. For example, when the carcass part hangs down from the carrier, it will assume a vertical orientation, straight down from the carrier, when it is not in contact with a guide. When the carcass part is in contact with the guide and at the same time the carrier moves it along the track, friction between the carcass parts and the guide will make that the carcass part is no longer straight down from the carrier, but at an angle relative to the vertical. The carcass part is dragged behind the carrier.

This can be a problem when the carcass part is moved along the track during processing, in particular when the processing is carried out automatically. When processing is carried out automatically, it is important to know the position and the orientation of the carcass part, because otherwise cuts may be made at the wrong position in the carcass part. When processing is carried out manually, the changed position and/or orientation of the carcass part relative to the carrier could make that the operator has to manually reposition the carcass part before carrying out the process, which means loss of time and efficiency. In addition, it puts additional physical strain on the operator.

In an advantageous embodiment, this problem is solved by mounting the guides in such a way that they can move along with the carcass part along a part of the track. The guides could for example have a circular of other loop-like form, and rotate around a central axis along with the movement of the carcass parts along the track. Protrusions like pins prevent that the carcass part slides over the guide. As an alternative, the guide can be mounted resiliently in such a way that its mounting allows movement in the direction of the path followed by the carcass parts.

A different approach to solve this problem is to look at the carrier. The carrier can be provided with a position retainer, which prevents that the carcass part changes its position and/or orientation relative to the carrier due to friction with the guides. A position retainer can be used in combination with any of the carriers according to the invention.

In a possible embodiment, a carrier is mounted to a trolley. The trolley is moved along a track and takes the carrier with it. The trolley comprises wheels or sliding blocks that in use are in contact with the track. During the movement of the carcass part and carrier along the track, forces will be exerted on the carcass part in the carrier, for example due to the processing that is performed on the carcass part or because the carcass part is moved relative to the carrier in order to bring it in a position that allows processes to be performed in an ergonomic way. These forces can be directed perpendicular or at an angle to the track, causing the wheels or sliding blocks of the trolley and/or parts of the track to be subjected to unfavourable mechanical loads.

Therefore, in an advantageous embodiment, the trolley comprises rollers or stopper blocks, that bear these mechanical loads such that they do no lead to unacceptable amounts of wear on the trolley parts or on the track.

In a possible embodiment, the retaining assembly of a carrier is arranged above the trolley to which said carrier is connected in a conveyor device. In this system, the trolleys may be arranged at a relatively low level above the floor, preferably such that the carcass parts are presented to the operators at an ergonomic working height.

It is possible a system according to the invention is used in just a part of a slaughterhouse or meat processing factory, while in other parts known systems are used. For example, a known system with carriers can be used during the cutting up of the carcass part into smaller parts; while a system according to the invention with carriers of the type described above is used in the deboning process.

In an advantageous embodiment, a classification station is present, that is for example arranged upstream of a deboning line, which deboning line preferably is equipped with carriers of the invention. In the classification station, it is determined for each individual carcass part that passes through the classification station to what following process the carcass part will be subjected. So, for example, if the system according to the invention is used in combination with a deboning process, it is decided by the classification station which of the individual carcass parts will be deboned or and which ones not. In a sophisticated embodiment, it will even be decided in the classification station which process steps will be taken in the deboning and which ones not. The classification station makes its decisions for example on the basis of parameters of the individual carcass part, like weight, bone-to-meat ratio, fat percentage or the like, which are measured at one or more measuring locations upstream of the classification device. Usually, the decision will be made on the basis of a combination of such parameters.

For example, in an advantageous embodiment, the thickness of the fat layer is measured of each ham or fore-end or shoulder part to be processed. Preferably, this measurement is carried out after separation of the hams or fore-ends or shoulder part from the rest of the carcass, more preferably after the cooling of these carcass parts. Even more preferably, the measurement of the fat thickness is carried out right before the deskinning, derinding and/or fat removal is carried out. Based on the fat thickness that is measured on the individual ham or fore-end or shoulder part, it is decided how much of the fat will be removed for that particular ham or fore-end or shoulder part, and which products can be advantageously made out of it. The cut surface, where the leg part was cut off from the other parts of the carcass part, may be the ideal position to measure fat thickness.

For example, when a ham or fore-end or shoulder part has only a thin layer of fat, advantageously lean products are made out of it, because then only a relatively small amount of fat has to be removed. This saves labour. Also, less weight loss occurs in the processing.

In known systems, the amount of fat remaining on the product after derinding and fat removal is determined for a batch of carcass parts, not for individual products. In the known systems, the operators are instructed batch by batch how much fat has to remain on the products of that batch. The invention allows this to be decided for each carcass part individually.

In a possible embodiment, the measurements of the fat thickness of the individual carcass parts are stored in a control system, which can be stand-alone or part of the overall control system of the meat processing facility or one of the processing lines therein. The control system then decides for each individual carcass part (e.g. a ham or fore-end or shoulder part) how much fat has to remain on that carcass part. Generally, a grading system is used for that, for example with five grades: 1D, 2D, 3D, 4D and 5D. In this system, a 5D-product has almost no fat remaining on it after the fat removal process, while on a 1D-product still a relatively thick layer of fat is present after the fat removal process. For each carcass part it is decided whether a 1D, 2D, 3D, 4D or 5D-product is to be made out of it. This could be for example indicated to the operator who has to remove the (excess) fat.

The indication can be provided in many ways. For example, a display is attached to each carrier, which display indicates 1D, 2D, 3D, 4D or 5D-product is to be made out of the product in the carrier. The indication can be provided in many ways, e.g. by a number or colour code. It is also possible to provide a pin, knob or the like, which is put in a certain position to provide the indication.

When the fat removal is done (partly or entirely) by an automated processing station, the control system that has the measurements stored in it can also be used to control the settings of the tools in the processing station, so that the right amount of fat is removed from each individual carcass part.

In a sophisticated embodiment, also information not pertaining to the individuals carcass per se is taken into consideration when making the decision for the next process or processing steps. Such information can be for example the demand for certain types of products for that particular day (or other relevant time period), the amount of a particular type of products already produced that day in relation to the demand for those products for that day, but also for example information on the availability of one ore more processing lines or processing stations downstream of the classification system.

The carcass parts can be supplied to the classification station in many ways: for example manually, by means of an overhead conveyor system, by means of a belt conveyor, by means of a system according to the invention, or by a combination or any of those.

In an advantageous embodiment, a transfer station is provided for transferring a carcass part from the classification station to a carrier. The transfer station can be provided with an automatic transfer device, that takes or receives carcass parts from the classification station and arranges them in carriers of the system according to the invention. In a sophisticated embodiment, the transfer station distributes the carcass parts from the classification station to different systems that each perform a different process on the carcass parts.

In a sophisticated embodiment, the measurements that are taken for the purpose of the decisions to be made in the classification station are used as well to control the processing stations upstream and/or downstream of the location where the measurements were taken. If for example it turns out that measurements show an unexpected high number of relatively light products, this can trigger an adjustment of the position of a cutter upstream of the measurement location so that more meat or bone is left on the carcass parts upstream. On the other hand, it can also trigger an adjustment of the position of one or more cutters downstream of the measuring location, so that the cutters can make more accurate cuts.

It is possible that multiple classification systems and/or more measuring locations are present in a slaughterhouse or meat processing factory.

In an embodiment, a carrier is arranged on a stationary support structure. The stationary support structure is arranged so as to have a fixed position in the slaughterhouse or factory. Usually, the carrier will have a fixed position relative to the stationary support structure, but preferably the carrier will be arranged in such a way that the carrier's orientation relative to the stationary support structure can change or can be changed. This can for example be achieved by hingedly mounting the carrier on the stationary support structure. The hinge can allow rotation of the carrier in one or more planes.

Alternatively or in addition, it is possible that the carrier is mounted moveably on the stationary support structure, so that the position of the carrier relative to the stationary support structure can change. In this embodiment, the carrier can move back and forth for example, such that the carcass part to be processed can be manipulated in even more degrees of freedom.

Preferably near the stationary support structure, one or more processing stations are arranged. Such a processing station can provide a place for an operator to stand or sit while the operator carries out a process on the carcass part, for example making a cut or carrying out a part of the deboning process. The processing station can also be provided with tools for the operator, like knives or other types of cutters or additional supports for the carcass part (for example to hold it in a certain position or orientation during the processing). Those tools can be connected to the processing station, for example hanging down from flexible cables.

It is also possible that in the processing stations one or more processes are carried out automatically or semi-automatically. In that case, the processing stations may be provided with rotating circular knives, waterjet cutters, sensors, guide rails or other components that make sure automatic processing or semi-automatic processing can take place.

It is possible that a red meat processing plant has a plurality of stationary support structures, each having one or more carriers arranged on them.

Carriers according to any of the aspects of the invention allow for automatically making a reference cut which can be used as a starting point for deskinning, derinding and/or fat removal.

Carriers according to any of the aspects of the invention allow for automatically removing the foot, or at least of the lower part of the foot.

In a fourth aspect, the invention pertains to the logistics of the process.

According to the fourth aspect of the invention, the logistics of the processing of porcine, bovine, ovine, or caprine slaughter animals and parts thereof can be improved in various ways. The application for pigs is most prominently envisaged.

The fourth aspect relates to a system for processing a carcass or carcass part of a porcine, bovine, ovine, or caprine animal, which processing involves a plurality of process steps, which system comprises:
- a transport system, which transport system comprises:
  - an overhead conveyor, which overhead conveyor comprises a track and a plurality of trolleys, which trolleys are movable along said track,
  - a plurality of carriers for holding a carcass or carcass part, each of the carriers being connected to a trolley,
- a plurality of processing stations, which processing stations are arranged along the track, each of the processing stations being adapted to carry out one or more processing steps on a carcass or carcass part,
- a selection device, for determining for each individual carcass or carcass part which processing steps have to be carried out on said carcass or carcass part, which selection device comprises:
  - a carcass measurement unit for determining at least two properties of the carcass or carcass part to be processed,
  - a data collection unit, for receiving measurement data from the carcass measurement unit, data regarding the desired output of the system,
  - a processor for processing the data collected by the data collection unit in order to determine for each individual carcass or carcass part which processing steps have to be carried out on said carcass or carcass part,
- a system control device, which system control device comprise an allocation control device, which allocation control device comprises:
  - an input unit, for receiving information from the selection device regarding which processing steps have to be carried out on said carcass or carcass part,
  - an output unit, for controlling the transport system and/or the processing stations such that each carcass or carcass part is subjected to the processing steps designated to it, characterised in that
the output device of the allocation control device is adapted to make the carcass or carcass part bypass any processing station that is adapted to carry out a process step that the carcass or carcass part is not to be subjected to.

The fourth aspect also pertains to a method for processing wherein use is made of such a system.

The fourth aspect also relates to a method for processing a carcass or carcass part of a porcine, bovine, ovine, or caprine slaughter animal, which processing involves a plurality of process steps, which method comprises the following steps:
- arranging the carcass or carcass part in a carrier of a transport system which is an overhead conveyor, wherein the carrier is connected to one or more trolleys moveable along a track of said overhead conveyor,
- determining at least two properties of the carcass or carcass part,
- determining the desired amount and type of end products that are to be obtained,
- deciding a most advantageous way to process the carcass or carcass part based on the determined properties of the carcass or carcass part and the desired amount and type of end products that are to be obtained, and then deciding which processing steps have to be carried out in which sequence for this most advantageous way of processing said carcass or carcass part,
- determining a routing for the carcass or carcass part along a plurality of processing stations, that each are adapted to carry out at least one processing step of what has been determined the most advantageous way of processing said carcass or carcass part,
- moving the carcass or carcass part along said routing by means of said overhead conveyor,
- bypassing any processing stations along said routing that are adapted to carry out one or more processing steps that are not included in the most advantageous way of processing said carcass or carcass part.

The fourth aspect also pertains to a system used in such a method.

In all systems according to the fourth aspect of the invention, an overhead conveyor is used to transport the carcasses or carcass parts to be processed along the processing stations that carry out the processing steps. An overhead conveyor is most suitable for use in a system according to the fourth aspect of the invention because an overhead conveyor allows the control and manipulate the carcass or carcass part to be processed relative to the conveyor.

The first way in which the logistics can be improved is by optimising the decision in which way to cut up each individual carcass or carcass part. In known systems, this decision is made primarily based on the required output of the processing system. The demand from the clients for a certain day or week is added up in order to establish how many items or how much weight of which end product has to made. Sometimes, additionally a measurement is taken of each carcass or carcass part, in order to determine the weight or the fat percentage at a certain part of the carcass or carcass part. Based on this additional information, it is determined how the carcass or carcass part is to be cut up.

In known systems, there is not so much variation or flexibility in the process steps that a carcass or carcass part is subjected to. The carcasses or carcass parts follow a more or less fixed routing along the processing stations, and in all processing stations a predetermined operation is carried out on all carcasses or carcass parts that pass through. In known systems, there usually are just two or three different routings or combinations of processing steps are available.

The system according to the fourth aspect of the invention aims to optimise the combination of process steps that is carried out on each carcass or carcass part, so that the yield per carcass or carcass part can be optimised and/or the optimal combination of end products can be produced from each carcass or carcass part, so that the amount of money earned per carcass or carcass part can be optimised.

There are several aspects to this optimisation. One aspect is related to providing more flexibility with respect to the number, type and combination of processing steps that are carried out on the individual carcasses or carcass parts gives more options on how to process a specific carcass or carcass part. Providing more flexibility with respect to the number, type and combination of processing steps that are carried out on the individual carcasses or carcass parts can be done by providing a plurality of production lines that each provide a fixed combination of processing steps, as is known from the prior art.

More advantageously, as an alternative or additionally, the flexibility in the processing is achieved by providing the possibility that individual carcasses or carcass parts bypass processing stations. This way, a plurality of processing stations are arranged along a track, each adapted to carry out one or more processing steps. The processing stations that are adapted to carry out process steps that do not have to carried out on a particular carcass or carcass part are bypassed by this carcass or carcass part. The bypassing can be achieved by moving the carcass or carcass part out of reach of the processing station (in particular of the tools of the processing station that carry out the processing step), or by moving the tools of the processing station or the entire processing station out of the way, so that the tools of the processing station do not come into contact with the carcass or carcass part. Of course, a combination of these is possible as well.

An other aspect in optimising the combination of processing steps that are carried out on each individual carcass or carcass part is realised by providing at at least one point in the slaughterhouse or meat processing factory a selection device such as a classification station is present that decides the optimal combination of processing steps for each carcass or carcass part based on available data. This data preferably comprises data obtained from measurements on the specific individual carcass or carcass part for which a decision has to be made, and/or data from measurements on a plurality of carcasses or carcass parts that were processed before the specific carcass or carcass part, and/or data from measurements on a plurality of carcasses or carcass parts that were processed after the specific carcass or carcass part, data on the required demand and/or data pertaining to to what extent the demand is already met by the processing of previous carcasses and/or carcass parts.

Preferably, a plurality of selection devices is available along the routing that each carcass or carcass parts takes along the processing stations. This allows fine-tuning of the routing for each individual carcass part during its processing.

The decision on which process steps are to be carried out on a specific carcass or carcass part is improved if more information is obtained about each individual carcass or carcass part. This way, better use can be made of the improved flexibility in the available combinations of processing steps. In order to obtain more information, a plurality of measurements is carried out on each individual carcass or carcass part. These measurements can for example be measurements of fat percentage at various locations, measurements of size and shape, for example by means of a camera or other optical sensors, and/or CT scans or X-ray measurements for determining the location of bones or other parts.

One of the measurements that can be carried out is the measurement of the weight of a carcass part. The weight of a carcass part that is suspended from an overhead conveyor can be determined at any relevant time during the processing, but also the weight of a part that has been cut off from the carcass or carcass part. Preferably, the weighing takes place in line, for example by weighing a carcass part while it is suspended from a carrier by making a trolley of an overhead conveyor move over a weighing bridge. Alternatively, a weigher can be incorporated in a belt conveyor.

For example, in an advantageous embodiment, the thickness of the fat layer is measured of each ham or fore-end or shoulder part to be processed. Preferably, this measurement is carried out after separation of the hams or fore-ends or shoulder part from the rest of the carcass more preferably after the cooling of these carcass parts. Even more preferably, the measurement of the fat thickness is carried out right before the deskinning, derinding and/or fat removal is carried out. In known systems, the fat percentage or fat layer thickness is only measured during the slaughter process. The measurement usually takes place on the side flanks of the carcass, near the chest or the belly. The measurement result that is obtained is thought to be representative for the entire carcass, but in practice this is not always the case. It could be that for example a generally lean pig has a fat shoulder region or leg.

The fat measurement may be performed when the area to me measured is subjected to a certain pressure, to flatten the fat layers for a correct and consistent fat thickness measurement. The measurement may also be obtained using a probe.

Based on the fat thickness that is measured on the individual ham or fore-end or shoulder part, it is decided how much of the fat will be removed for that particular ham or fore-end or shoulder part, and which products can be advantageously made out of it.

For example, when a ham or fore-end or shoulder part has only a thin layer of fat, advantageously lean products are made out of it, because then only a relatively small amount of fat has to be removed. This saves labour. Also, less weight loss occurs in the processing, which is advantageous from a financial point of view.

In known systems, the amount of fat remaining on the product after derinding and fat removal is determined for a batch of carcass parts, not for individual products. In the known systems, the operators are instructed batch by batch how much fat has to remain on the products of that batch. The invention allows this to be decided for each carcass part individually.

In a possible embodiment, the measurements of the fat thickness of the individual carcass parts are stored in a control system, which can be stand-alone or part of the overall control system of the meat processing facility or one of the processing lines therein. The control system then decides for each individual carcass part (e.g. a ham or fore-end or shoulder part) how much fat has to remain on that carcass part. Generally, a grading system is used for that, for example with five grades: 1D, 2D, 3D, 4D and 5D. In this system, a 5D-product has almost no fat remaining on it after the fat removal process, while on a 1D-product still a relatively thick layer of fat is present after the fat removal process. For each carcass part it is decided whether a 1D, 2D, 3D, 4D or 5D-product is to be made out of it.

In a such an embodiment, there could be for example five processing stations for fat removal: one for making 1D-products, one for making 2D-products, one for making 3D-products, one for making 4D-products and one for making 5D-products. A carcass part that on the basis of the fat layer thickness measurement should be made into a 2D-product bypasses the processing station for 1D-products and the processing stations for 3D-, 4D-, and 5D-products. In this embodiment, each carcass part is processed by only one of the five processing stations for fat removal.

In a variant of this embodiment, multiple processing stations for fat removal, e.g. three processing stations for fat removal are provided. In each processing station, fat can be removed. If only a bit of fat has to be removed from the carcass part, it is presented to the operator or to the automatic fat remover of just one processing station, and it bypasses the other processing stations. If however quite a lot of fat has to be removed from the carcass part, it is presented to the operator or to the automatic fat remover of all processing stations for fat removal, and at all these processing stations fat is removed.

Advantageously, additional measurements are carried out in the course of the process. These additional measurements can be used for obtaining information that could not be obtained earlier in the process (for example because the measuring location could not be reached before), but also for control of the process or of one or more of the individual process steps.

The measurements of course can take place on the carcass or carcass part as it moves along a processing line. However, it is also possible to perform measurements on parts that are removed form the carcass or carcass part, such as pieces of meat that have been removed from the carcass or carcass part.

The obtained measurement data can be used in the selection of the optimal combination of processing steps for a specific carcass or carcass part, but either additionally or alternatively, it can be used for other purposes. For example, it can be used to control one or more processing stations. For example, if measurement data shows that at some point upstream of a certain processing station a relatively high number of small carcass parts are present, the position of a cutting tool is that processing station can be adapted so that said position is better suited for processing small carcass parts. In an other example, if measurement data shows that at some point downstream of a certain processing station a relatively high number of small carcass parts are present, the position of a cutting tool is that processing station can be adapted so that it cuts off less from the passing carcass parts.

An other way of using the information obtained from the measurements and/or from the selection device is to provide information to one or more operators in the processing stations. For example, an image displayed on a screen in front of the operator can be used to indicate to the operator which part of the meat has to be cut loose from the specific carcass or carcass part in front of him.

The system and the method according to the fourth aspect of the invention can be combined with any of the features, including optional features, discussed with reference to any of the first, second and third aspect of the invention.

The fifth aspect of the invention is also directed to improving the logistics of the processing of porcine, bovine, ovine, or caprine slaughter animals or parts thereof.

The fifth aspect of the invention relates to a system for processing a carcass or carcass part of a porcine, bovine, ovine, or caprine slaughter animal, which processing involves a plurality of processing steps, which system comprises:
a primary transport system, which primary transport system comprises:
an overhead conveyor, which overhead conveyor comprises a track and a plurality of trolleys, which trolleys are movable along said track,
a plurality of carriers for holding a carcass or carcass part, each of the carriers being connected to one or more trolleys,
a plurality of processing stations, which processing stations are arranged along the track, each of the processing stations being adapted to carry out one or more processing steps on a carcass or carcass part, wherein in at least one processing station a step of removing a part of the carcass or carcass part is carried out,
a secondary transport system, which secondary transport system is arranged adjacent to the processing station in which said part is removed from the carcass or carcass part, which secondary transport system is adapted to receive said part.

The fifth aspect of the invention also relates to the use of such a system in processing.

The fifth aspect also relates to a method for processing a carcass or carcass part of a porcine, bovine, ovine, or caprine slaughter animal, which processing involves a plurality of processing steps, which method comprises the following steps:
arranging the carcass or carcass part in a carrier of a transport system which is an overhead conveyor, wherein the carrier is connected to one or more trolleys moveable along a track said an overhead conveyor,
transporting said carcass or carcass part to a processing station,
at said processing station, separating a part from the carcass or carcass part,
arranging said separated part in or on a secondary conveyor, which is arranged adjacent to said processing station,
transporting the rest of the carcass or carcass part away from said processing station by means of the overhead conveyor,
transporting the separated part away from said processing station by means of the secondary conveyor.

In a system according to the fifth aspect of the invention, in at least one of the processing stations, a part of the carcass or carcass part is separated from the rest of the carcass or carcass part, respectively. The carcasses or carcass parts pass through the processing station by means of an overhead conveyor.

In accordance with the fifth aspect of invention, a secondary conveyor is arranged adjacent to said processing station. This secondary conveyor is adapted to receive the part that is separated. The rest of the carcass or carcass part is transported further by the overhead conveyor.

In known systems, the separated part and the rest of the carcass or carcass part are transported together towards the end of a series of processing stations. There, an operator is confronted with a mixture of different products and/or intermediate products. The different types of products have to be sorted out before they can be transported further. Usually, the products are presented in an arbitrary orientation or even on a heap to the operator that has to do the sorting. This makes the task of the sorter to be physically demanding and time consuming.

In a system according to the fifth aspect of the invention, the separated parts are taken away form the rest of the carcass or carcass part in an orderly way. This improvement to the logistics results in that the sorting at the end of a series of processing stations is no longer necessary.

In a possible embodiment, the secondary conveyor receives just one kind of separated parts, e.g. high value parts, or even just one kind of end product or intermediate product, e.g. a particular muscle part, for example a tenderloin. The secondary conveyor then takes these separated parts to a packing station, to storage or to a processing station that is adapted process that particular separated part.

It is possible that the secondary conveyor comprises multiple conveyor belts that are arranged side by side, or that the secondary conveyor has a conveyor belt with multiple tracks. In such an embodiment, advantageously each of the conveyor belts or each of the tracks receives products of the same kind. For example, when there three conveyor belts arranged side by side, or the conveyor belt has three different tracks, one belt or track can be used to receive and transport prime cuts, one for scraps and smaller parts of (useable) meat and one for waste.

It is possible that multiple processing stations are provided with a secondary conveyor. Preferably, each processing station in which a part is separated from the rest of the carcass or carcass part is provided with its own secondary conveyor. It is also possible that a processing station removes two or more parts subsequently. In that case, advantageously for each location within the processing station in which a part is removed, a dedicated secondary conveyor is provided.

It is possible that a processing station is operated by a human operator, who for example makes the desired cuts with an ordinary knife or with a wizard knife. In that case, the operator e.g. makes a cut to separate a part from the carcass or carcass part and then puts the separated part on or in the secondary conveyor.

It is also possible that the separated part is not held or supported while it is cut loose from the rest of the carcass or carcass part. In that case, it falls off the rest of the carcass or carcass part when the separation is complete. The second conveyor is then preferably arranged such that the separated part falls directly onto or into the secondary conveyor. Alternatively, a chute or the like can be arranged that catches the separated part and takes it to the secondary conveyor.

In a preferred embodiment, all separated parts are arranged in the same orientation on or in the secondary conveyor. This makes subsequent processing easier, because an operator or machine that takes the separated parts off the secondary conveyor has all separated parts presented to it in the same orientation. Usually, this can be achieved in a relatively simply way, especially when the processing station operates automatically. An automatically operating processing station will separate the part always in the same way from the rest of the carcass or carcass part. By catching the separated parts directly when they are separated by the automatic processing station, their orientation will be consistent.

Preferably, the secondary conveyor transports receives the separated part on a moving surface or in a moving holder or carrier. Preferably, the speed of the receiving surface, holder or carrier is such that the separated parts do not fall on top of each other. This way, the separated products are presented individually. This facilitates picking them up from the secondary conveyor, even to the extent that it could be automated.

The separated parts can be end products, intermediate products or waste.

In the system according to the fifth aspect of the invention, one or more selection devices can be provided that determine which processing steps have to be performed on the individual carcasses and/or carcass parts. These selection stations preferably select the appropriate subsequent processing steps for the individual carcass or carcass part on the basis of data measured on the specific carcass or carcass part, data measured on other carcasses or carcass parts upstream or downstream of the specific carcass or carcass parts, and/or general data, such as the demand for certain end products on a specific day or other time slot.

Measurements can be performed on carcasses or carcass parts that are arranged in carriers connected to the overhead conveyor, but measurements can also be performed on carcasses or carcass parts that are already on a secondary conveyor.

The obtained measurement data can be used in the selection of the optimal combination of processing steps for a specific carcass or carcass part, but either additionally or alternatively, it can be used for other purposes. For example, it can be used to control one or more processing stations. For example, if measurement data shows that at some point upstream of a certain processing station a relatively high number of small carcass parts are present, the position of a cutting tool is that processing station can be adapted so that said position is better suited for processing small carcass parts. In an other example, if measurement data shows that at some point downstream of a certain processing station a relatively high number of small carcass parts are present, the position of a cutting tool is that processing station can be adapted so that it cuts off less from the passing carcass parts.

An other way of using the information obtained from the measurements and/or from the selection device is to provide information to one or more operators in the processing stations. For example, an image displayed on a screen in front of the operator can be used to indicate to the operator which part of the meat has to be cut loose from the specific carcass or carcass part in front of him.

The fifth aspect of the invention can advantageously be used for processing carcass parts that have been subjected to a cooling process during which cooling process the carcass parts were still covered with skin.

Advantageously, when applying the fifth aspect of the invention, the carcass part is deskinned and/or derinded before deboning and/or removal of the prime cuts. This can be advantageous with respect to the logistics of the process. Deskinning and derinding taking places before deboning and removal of the prime cuts has the consequence that these steps do not have to be performed any more on the separated parts (e.g. the prime cuts), so they can be packaged, stored or processed further right away. Furthermore, it can be advantageous to perform the deskinning and/or derinding when the carcass parts still have the bones in them, as this makes the carcass parts more stable, so they do not deform so much under the influence of the processing forces induced by the deskinning and/or derinding. This facilitates the deskinning and derinding. Also, it is more efficient to deskin and/or derind the carcass part as a whole instead of deskinning and/or derinding the separated parts individually.

The system and the method according to the fifth aspect of the invention can be combined with any feature, including optional features, discussed with reference to any of the first, second, or third aspect of the invention.

Figure 1:
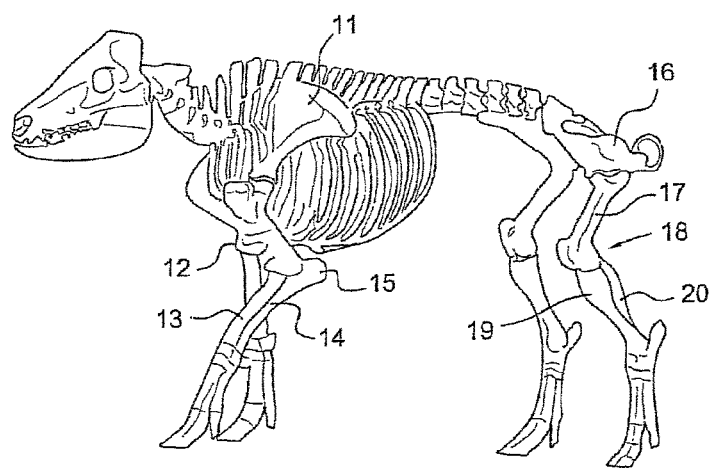
Figure 2A:
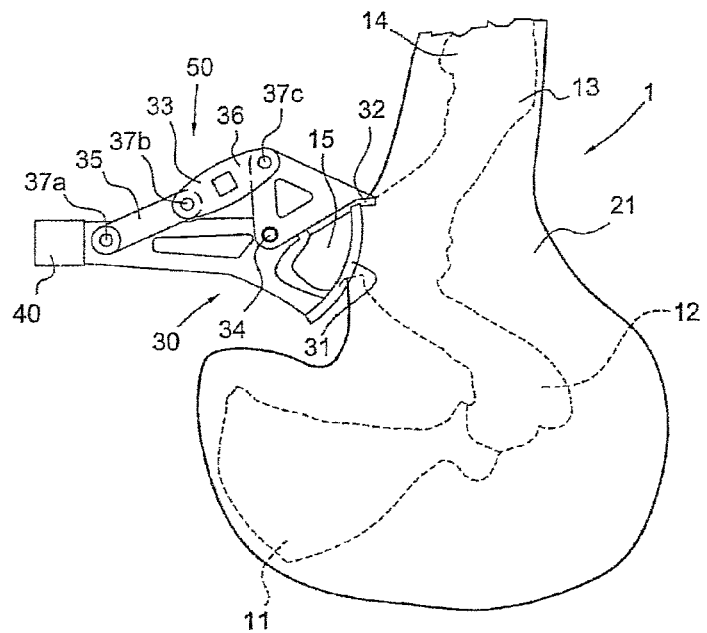
Figure 2B:
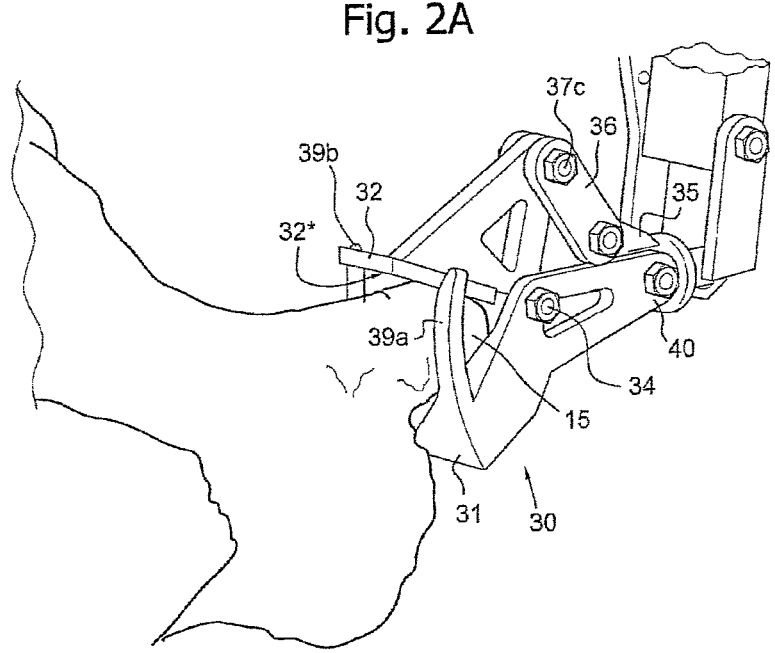
Figure 2C:
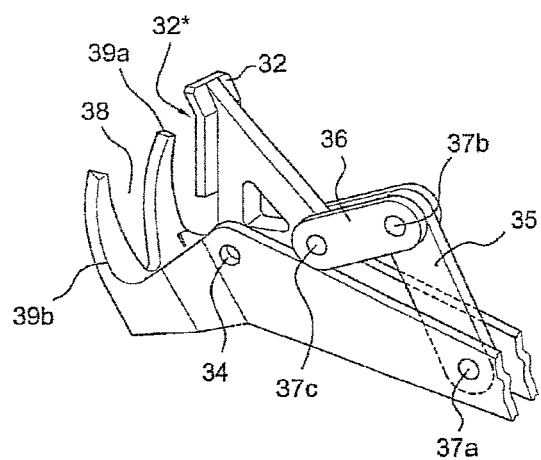
Figure 3A:
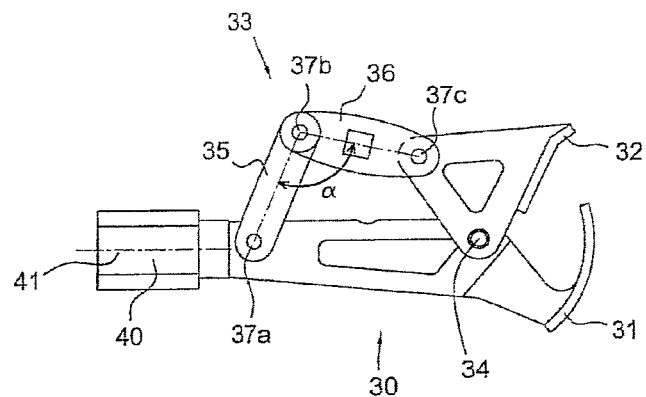
Figure 3B:
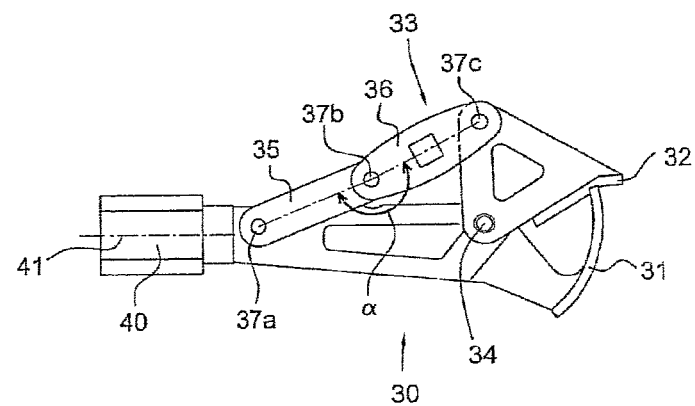
Figure 4A:
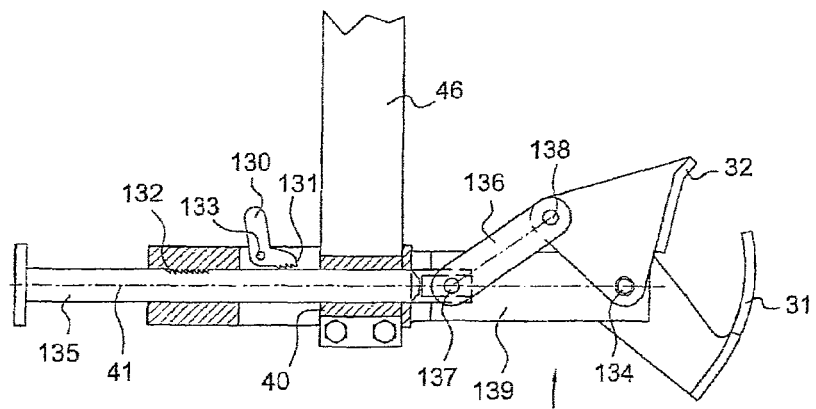
Figure 4B:
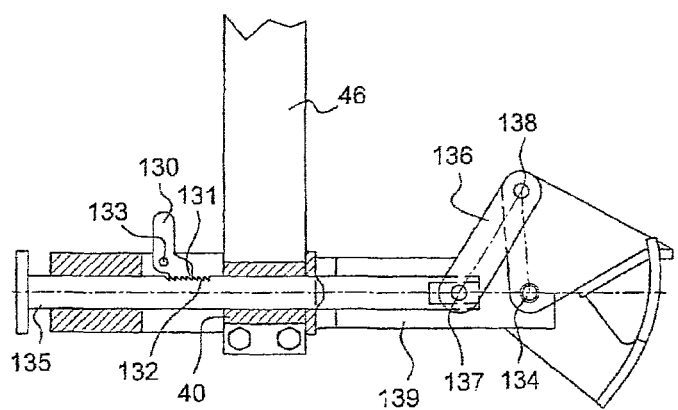
Figure 5:
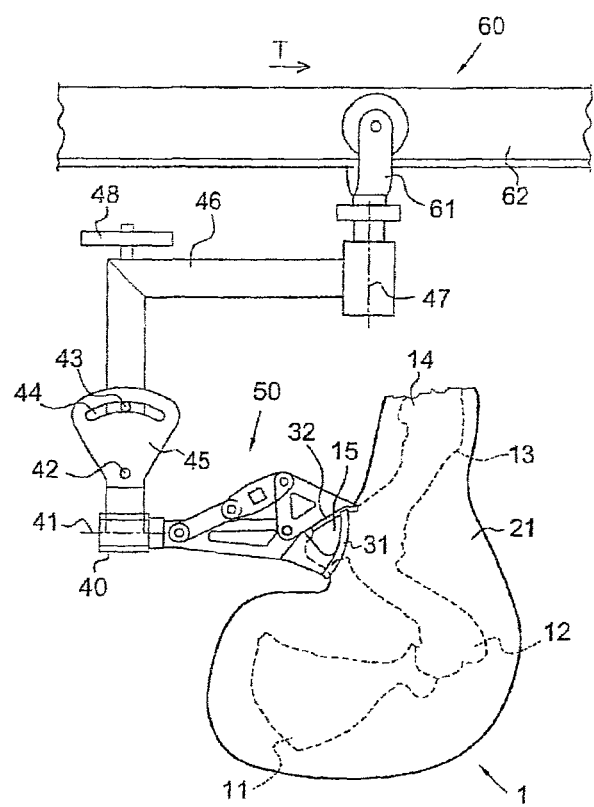
Figure 6:
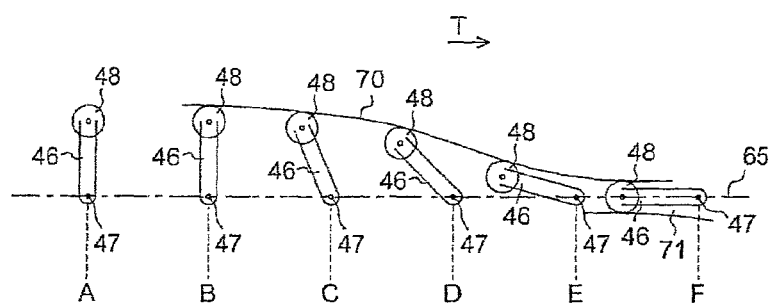
Figure 7:
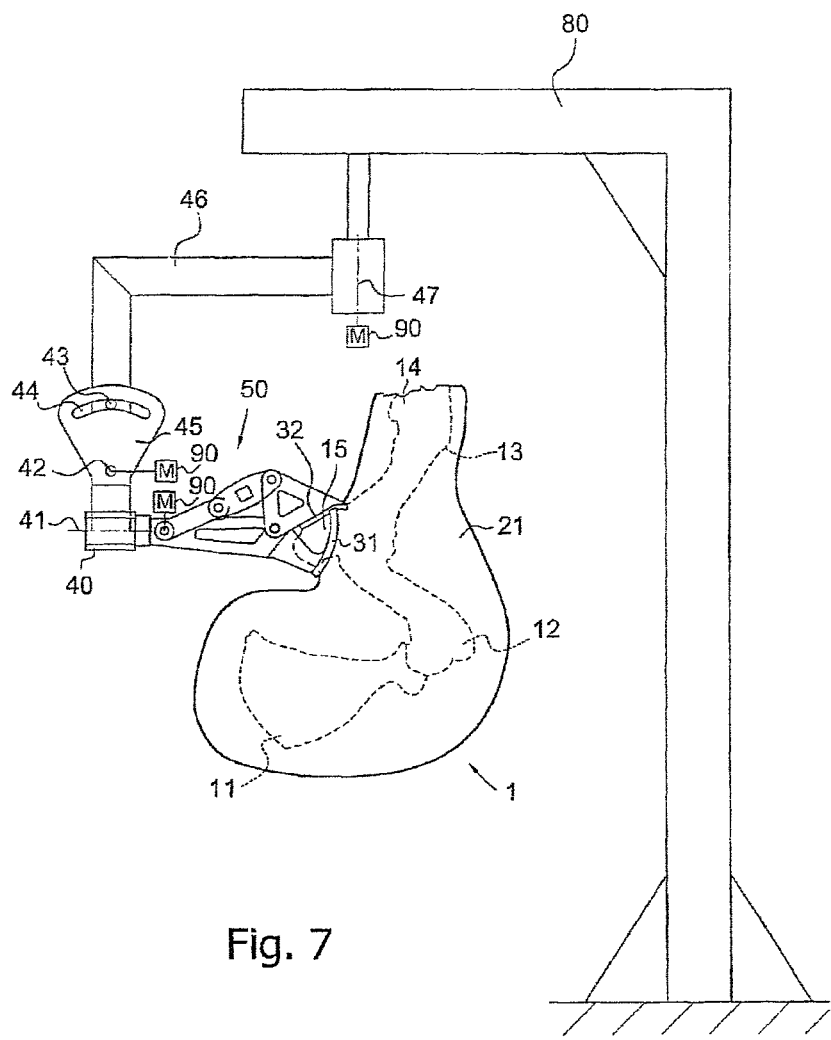
Figure 8:
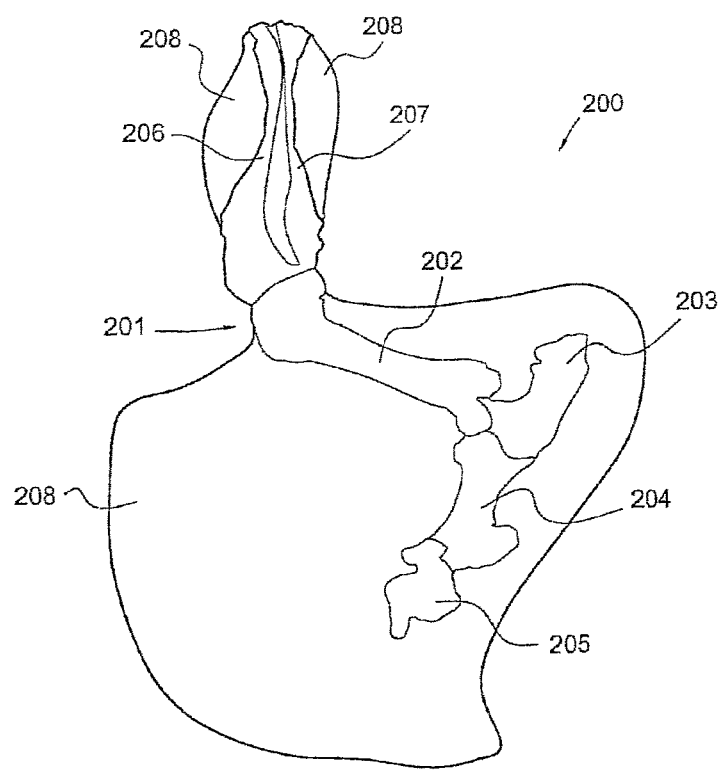
Figure 9:
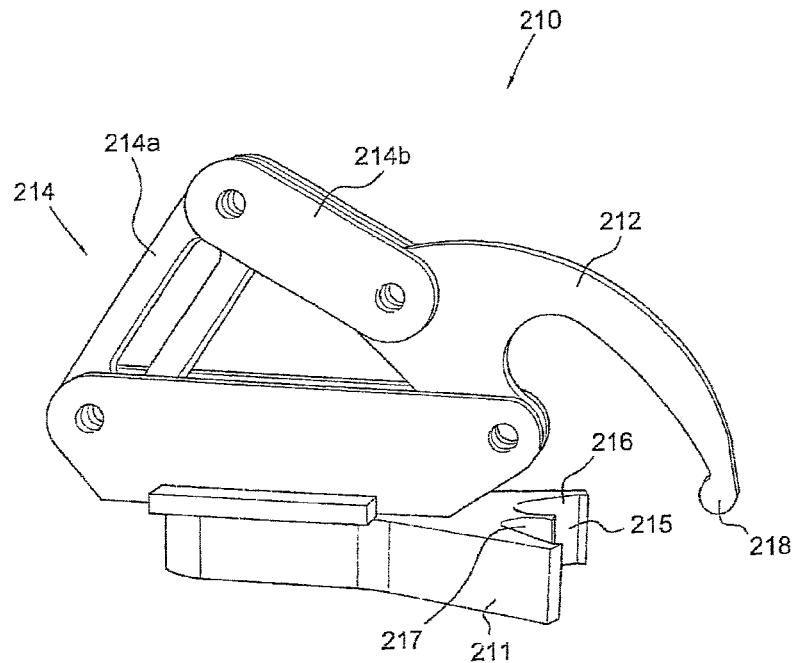
Figure 10:
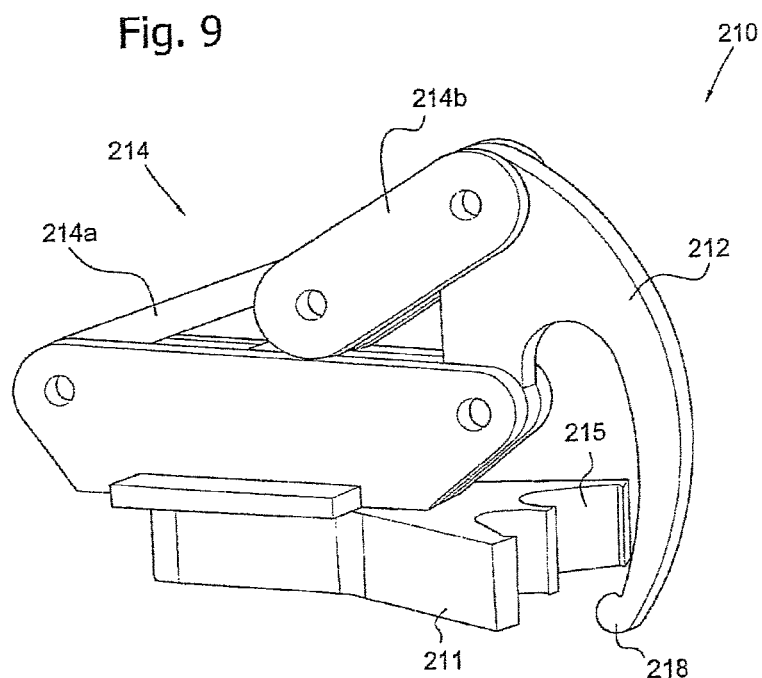
Figure 11:
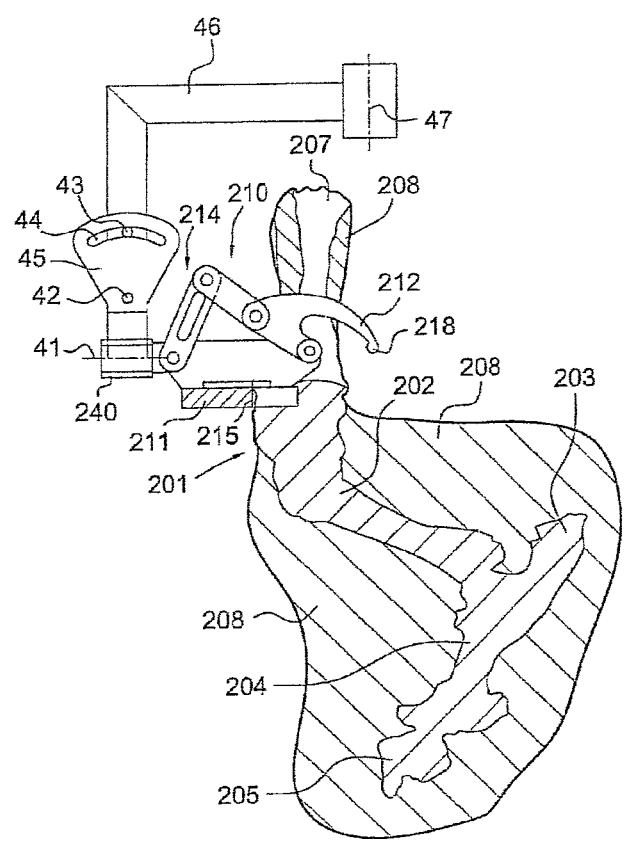
Figure 12:
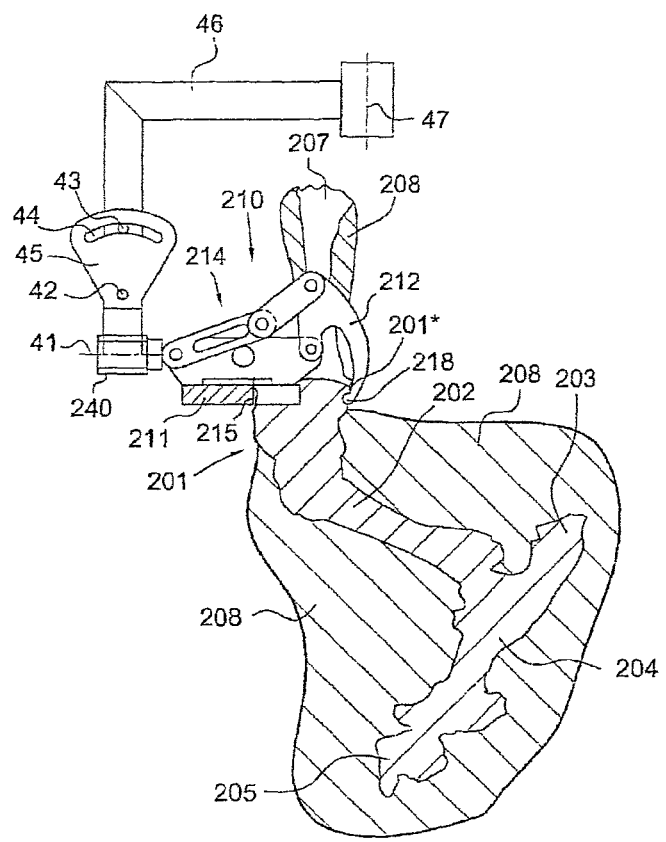
Figure 13A:
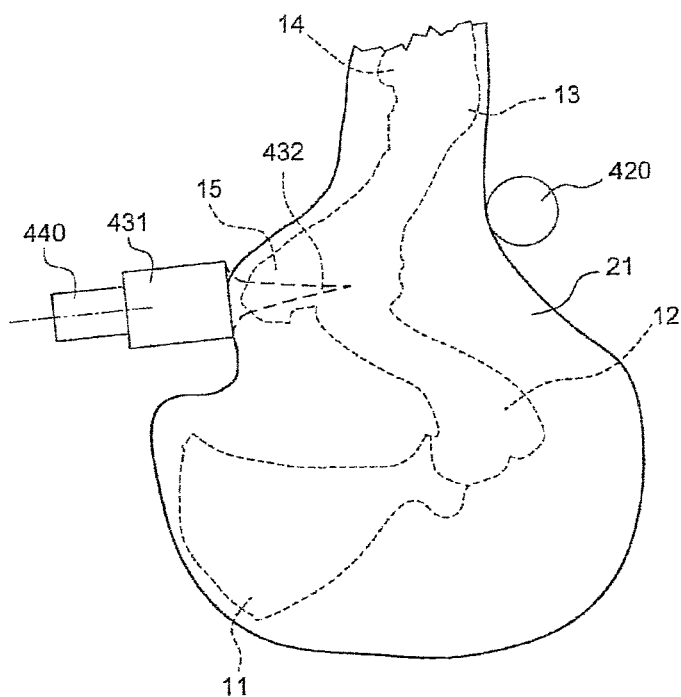
Figure 13B:
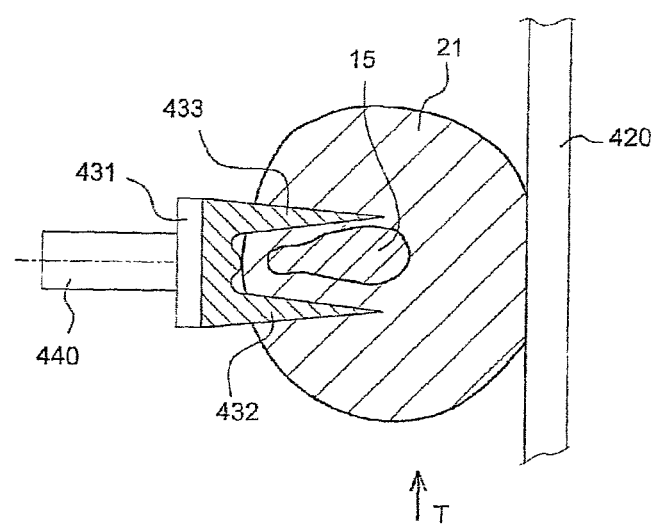
Figure 14:
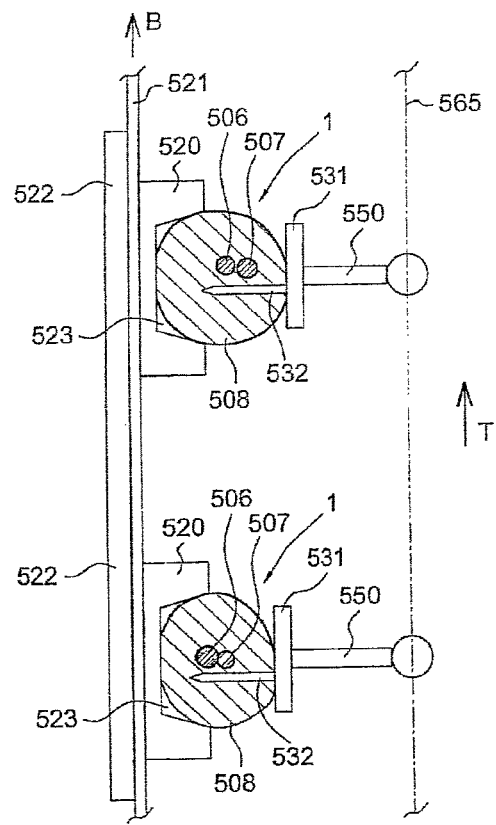
Figure 15:
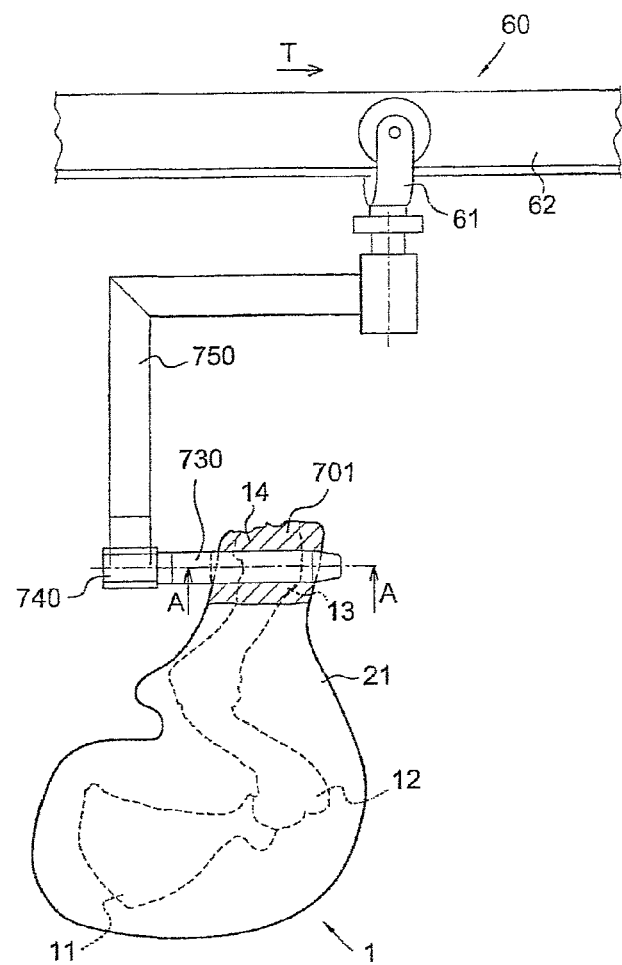
Figure 16A:
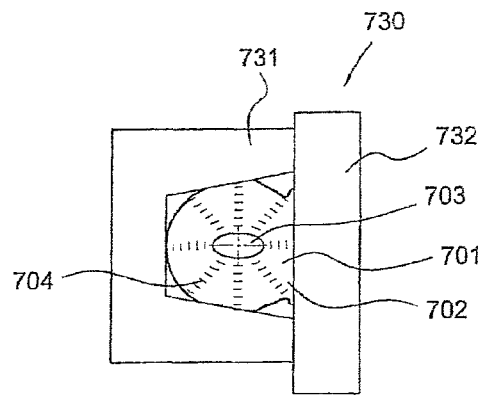
Figure 16B:
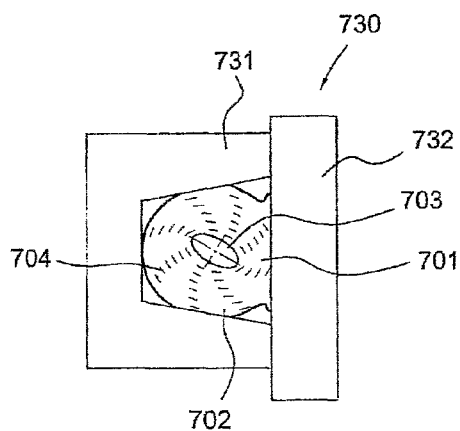
Figure 17:
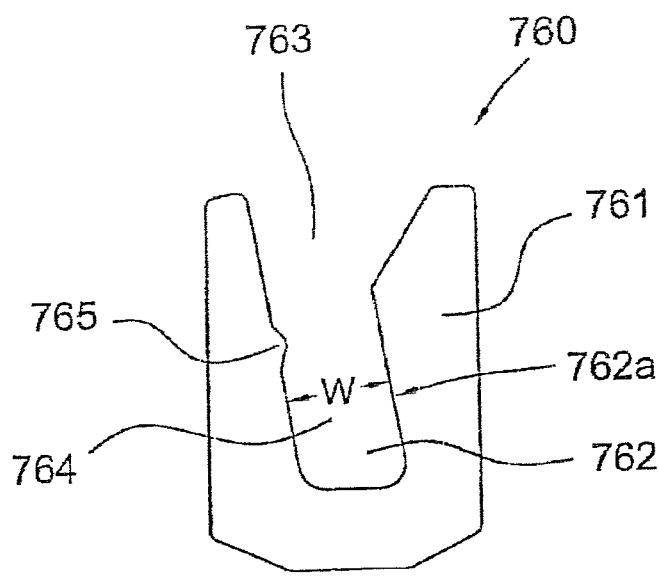
Figure 17A:
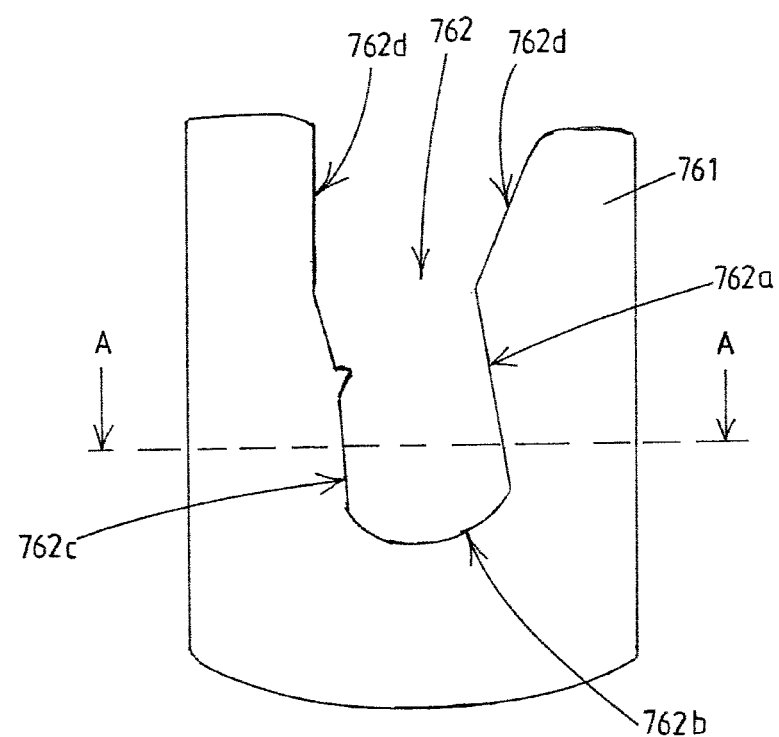
Figure 18C:
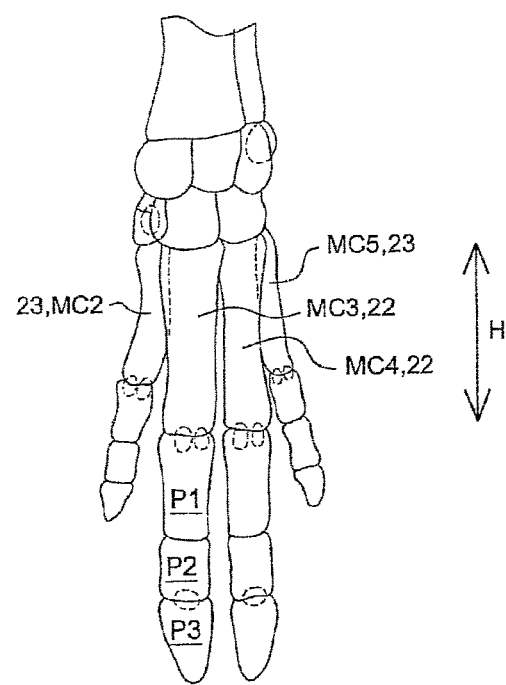
Figure 19:
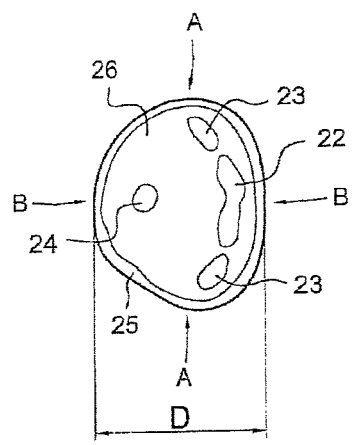
Figure 20:
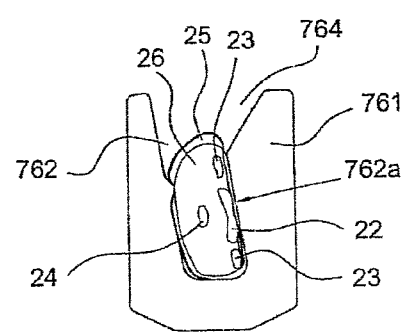
Figure 21:
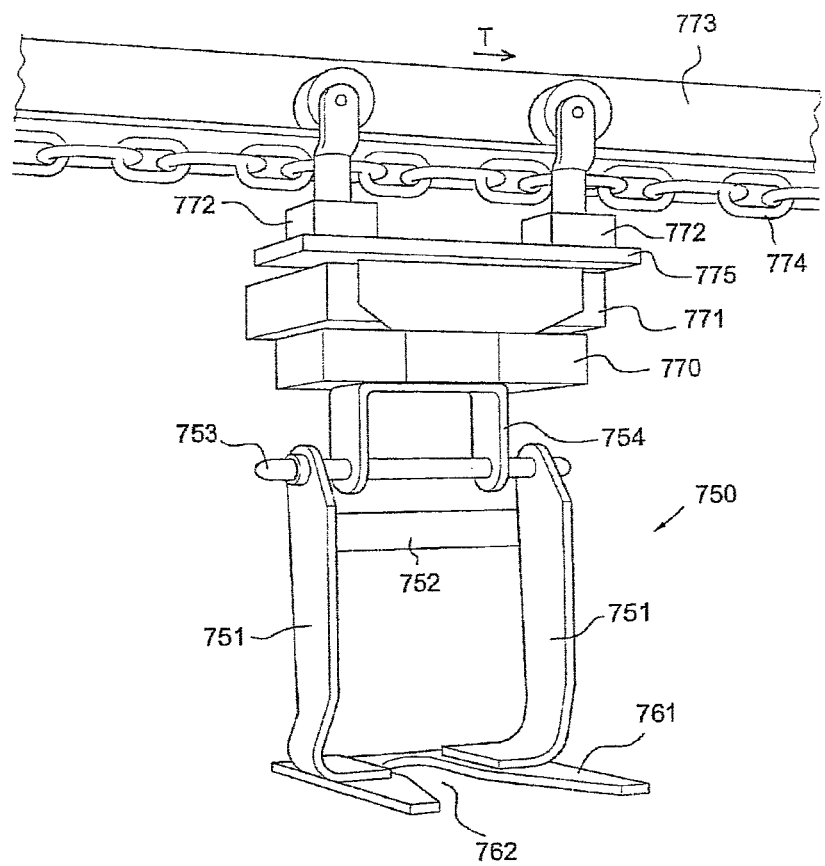
Figure 22A:
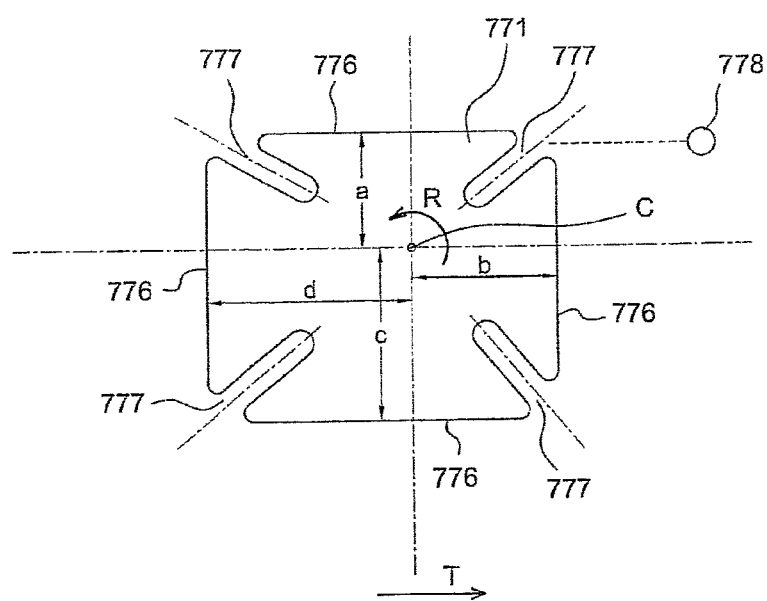
Figure 22B:
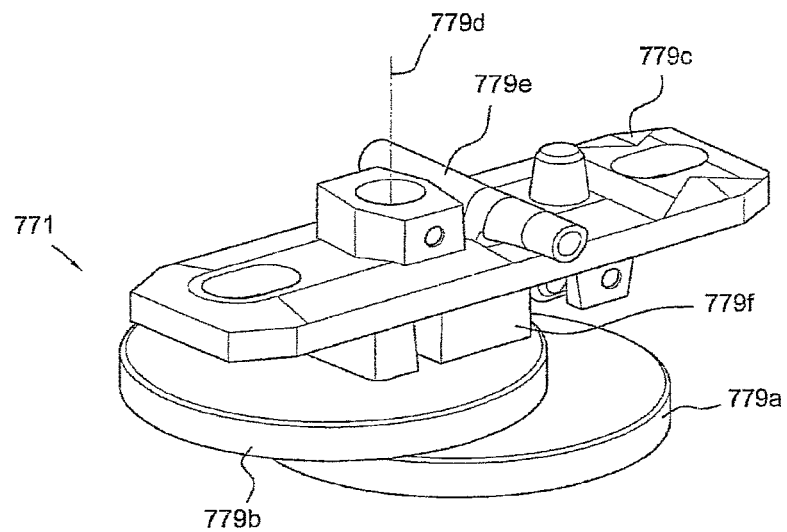
Figure 22C:
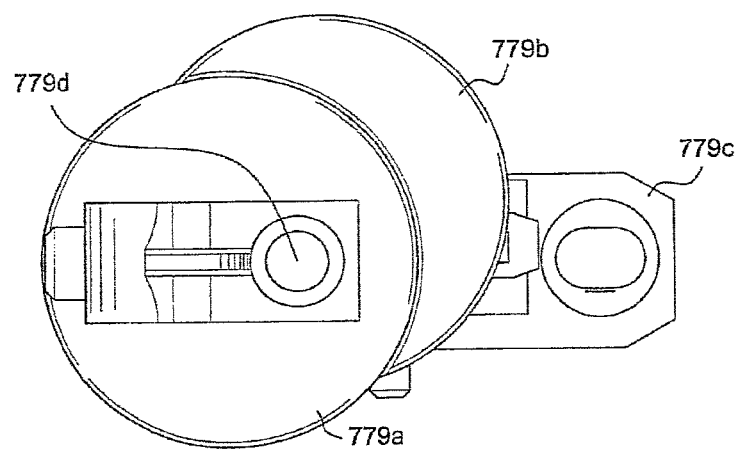
Figure 22D:
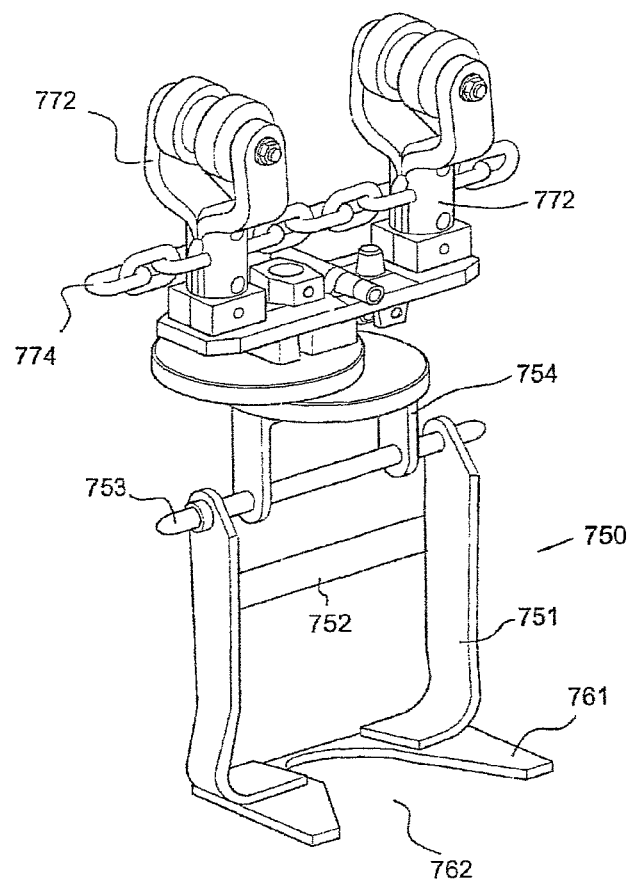
Figure 23:
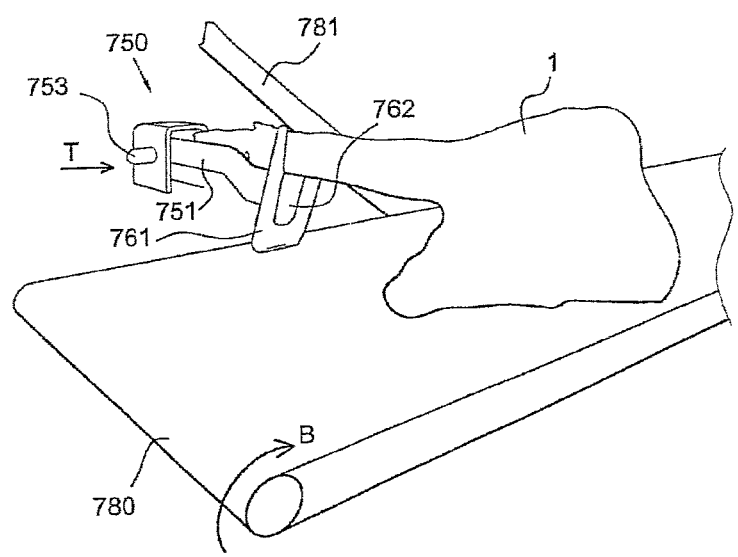
Figure 23A:
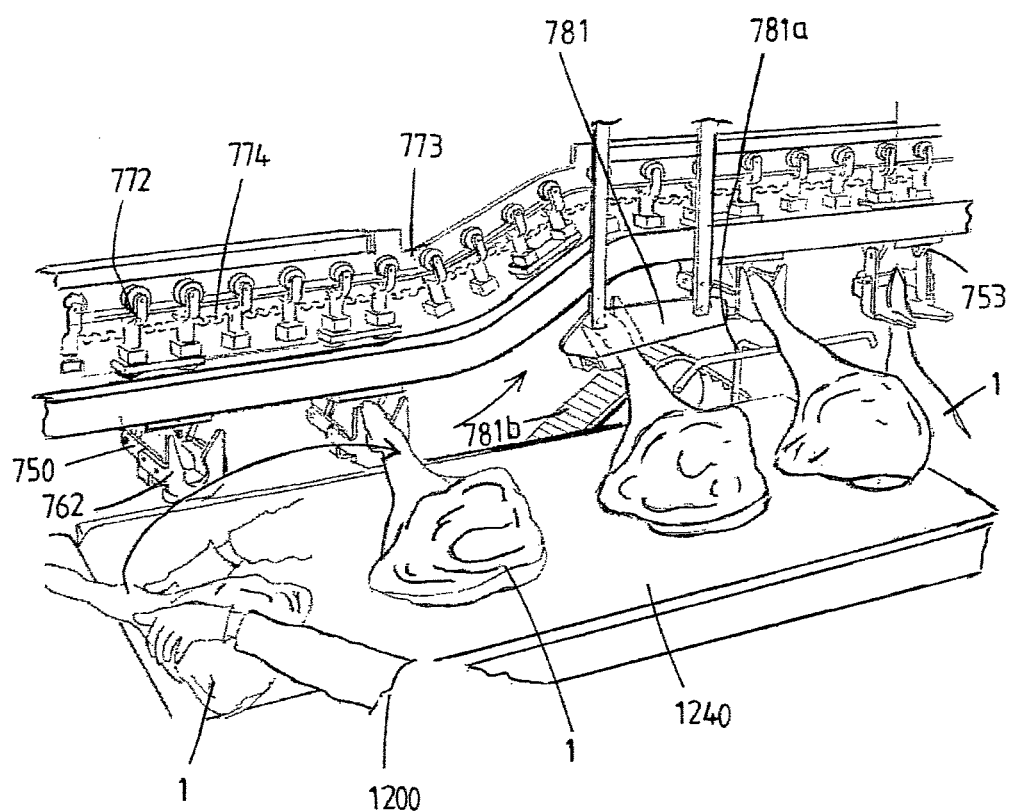
Figure 24A:
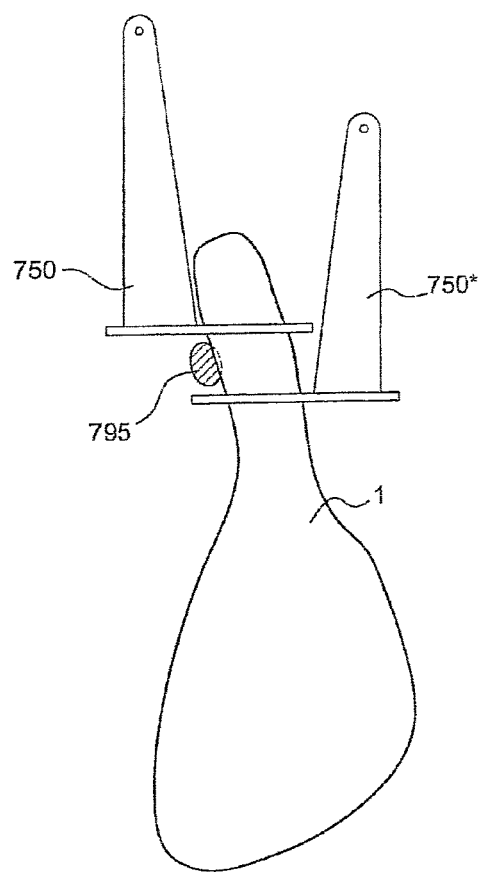
Figure 26:
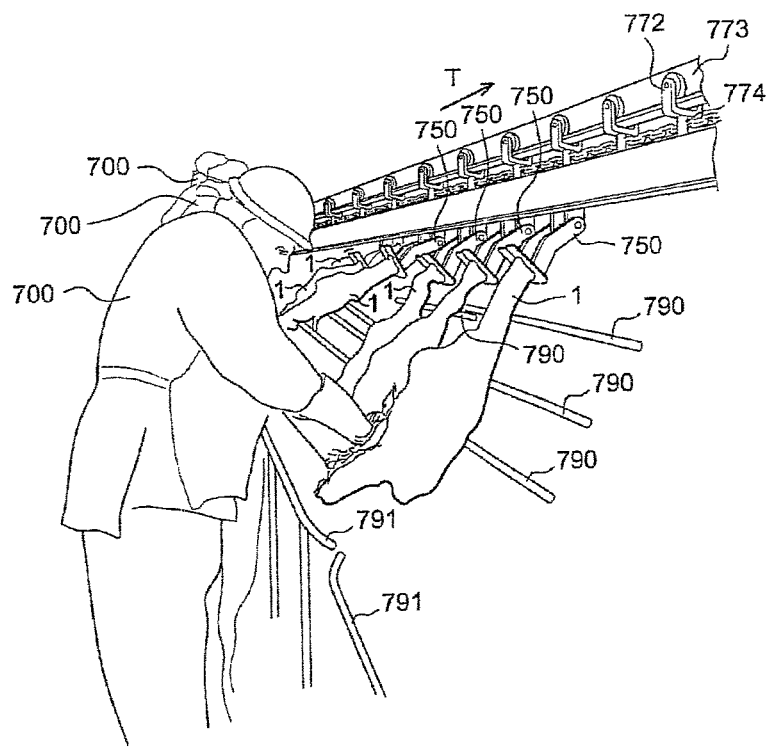
Figure 26:
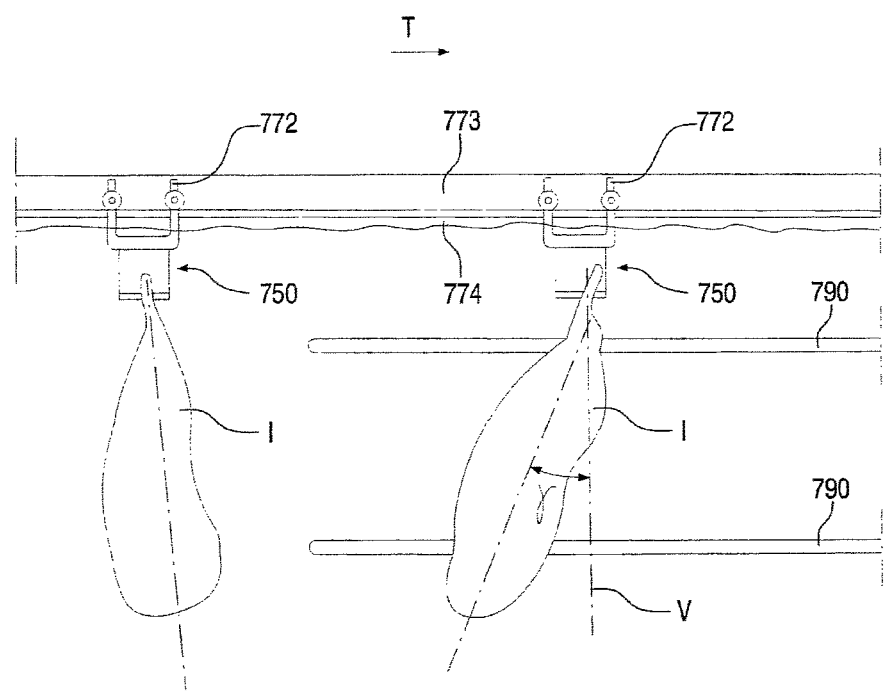
Figure 26:
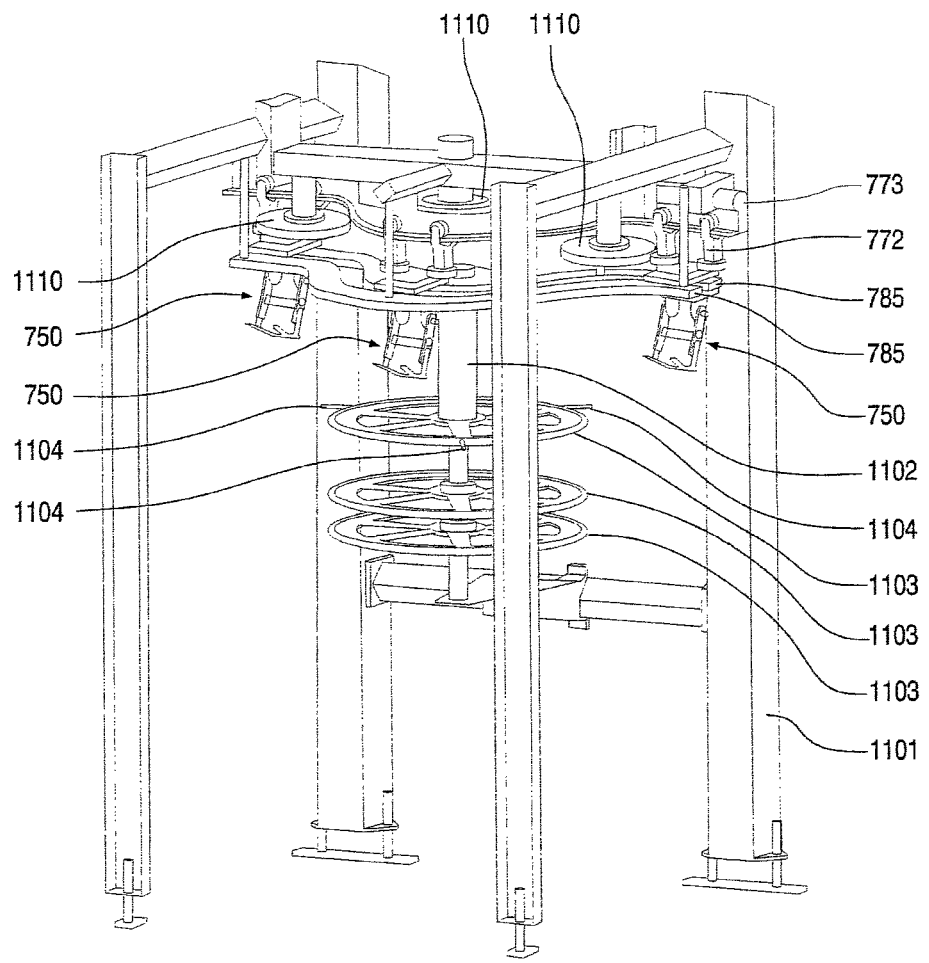
Figure 26:
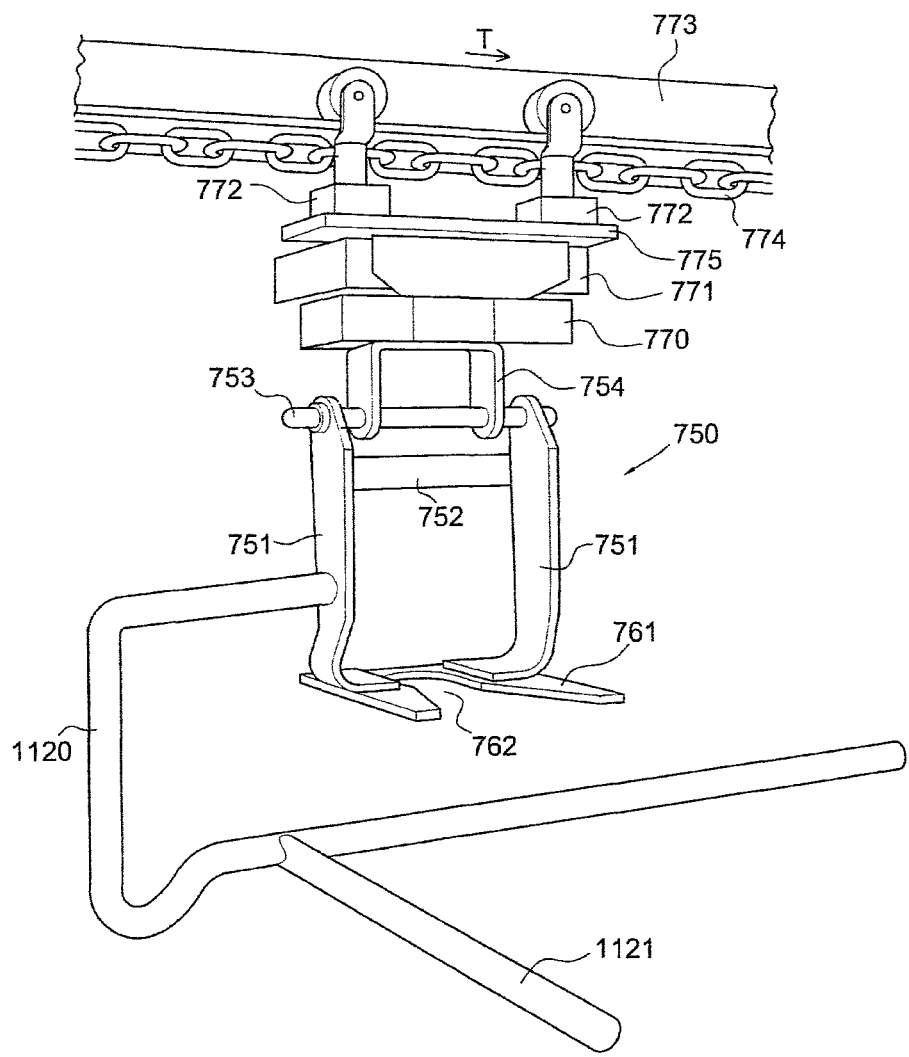
Figure 26X:
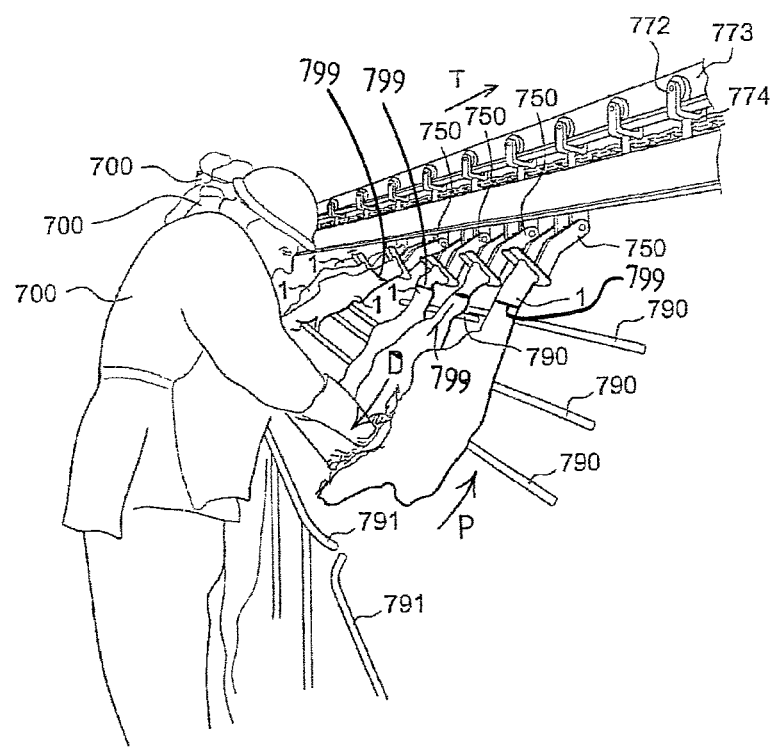
Figures 1, 26X:
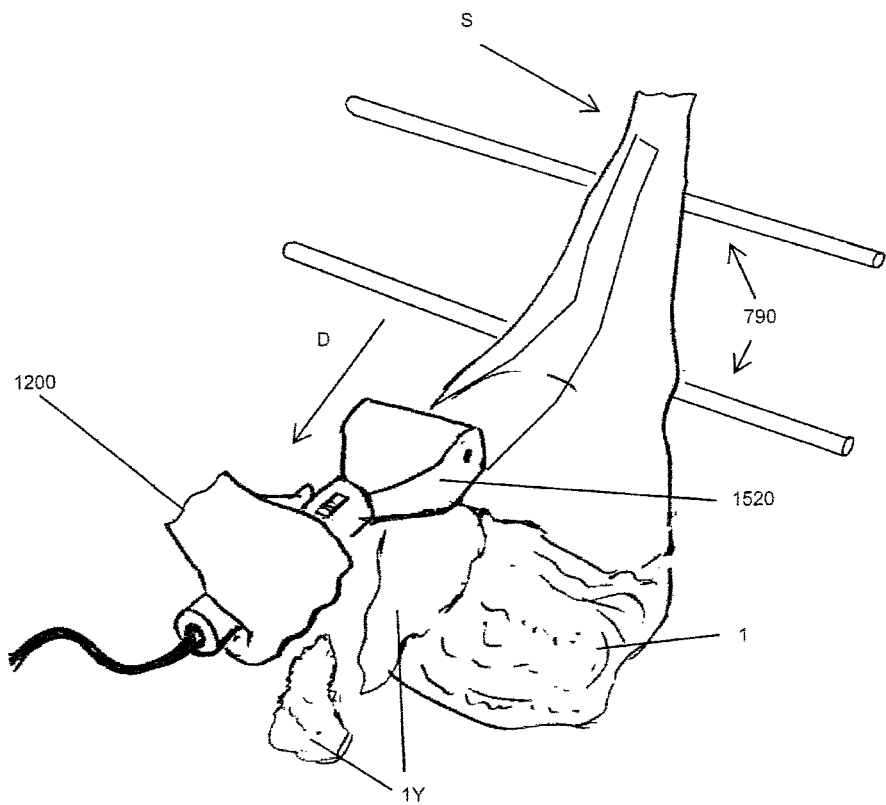
Figures 2, 26X:
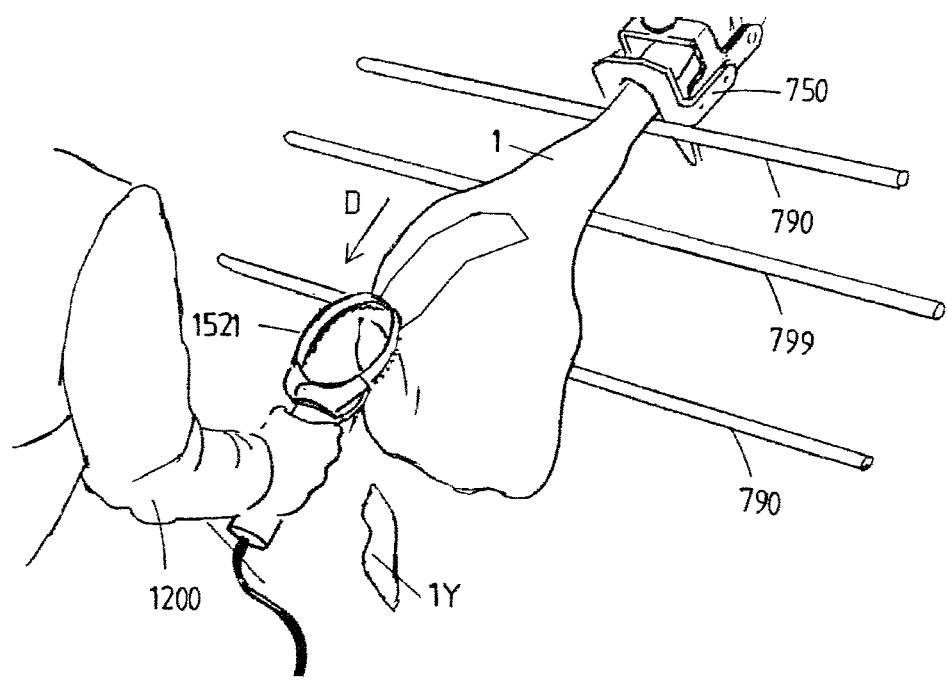
Figures 3, 26X:
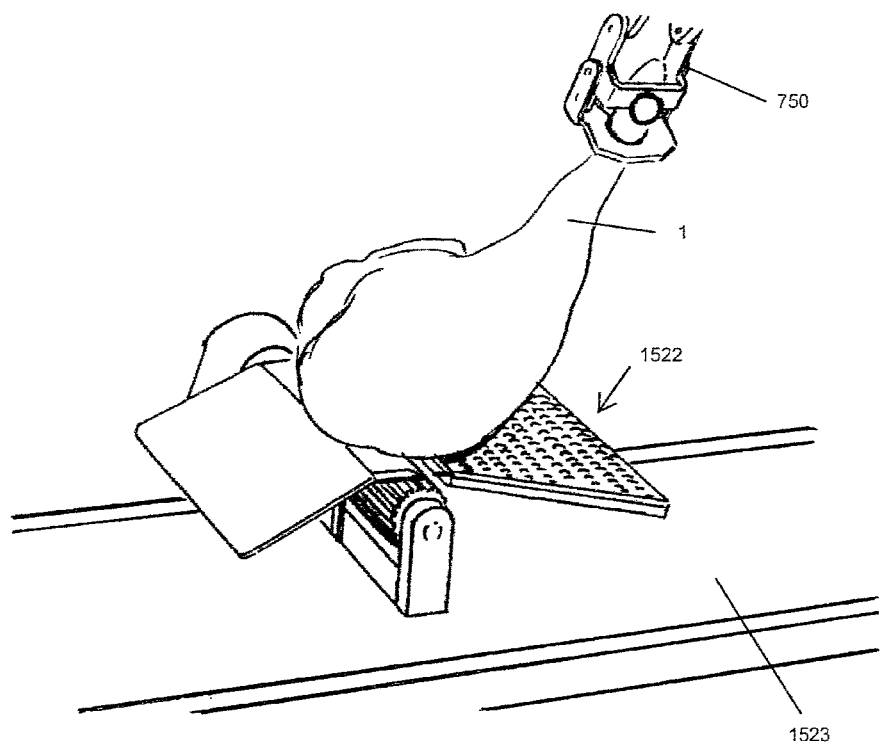
Figures 4, 26X:
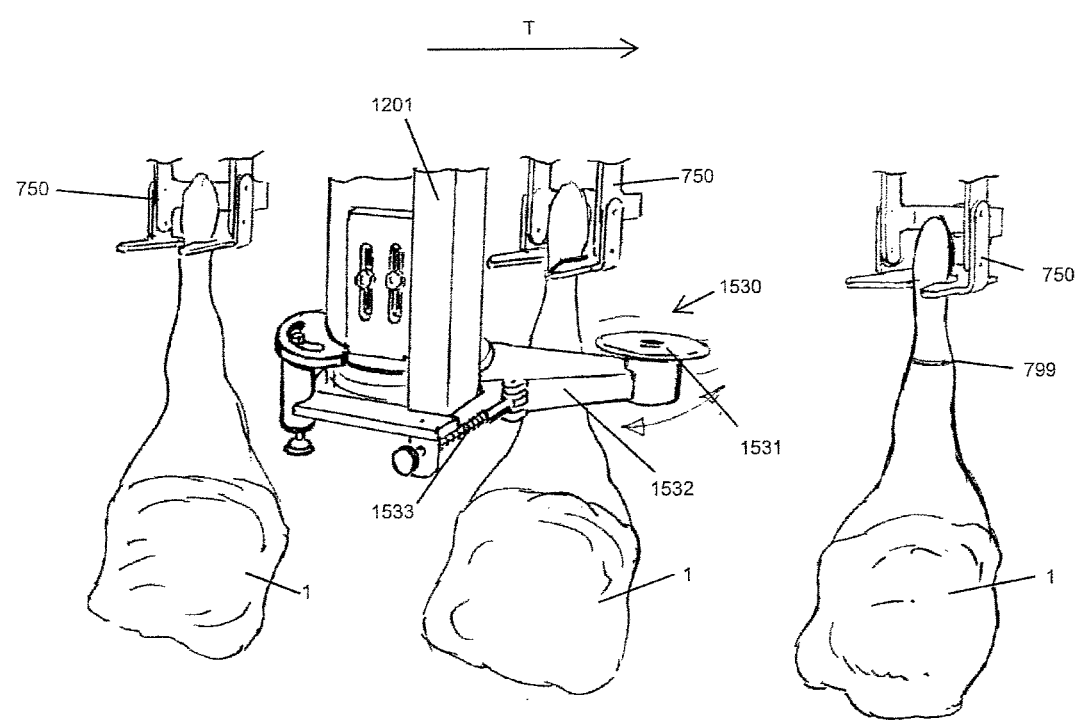
Figures 5, 26X:
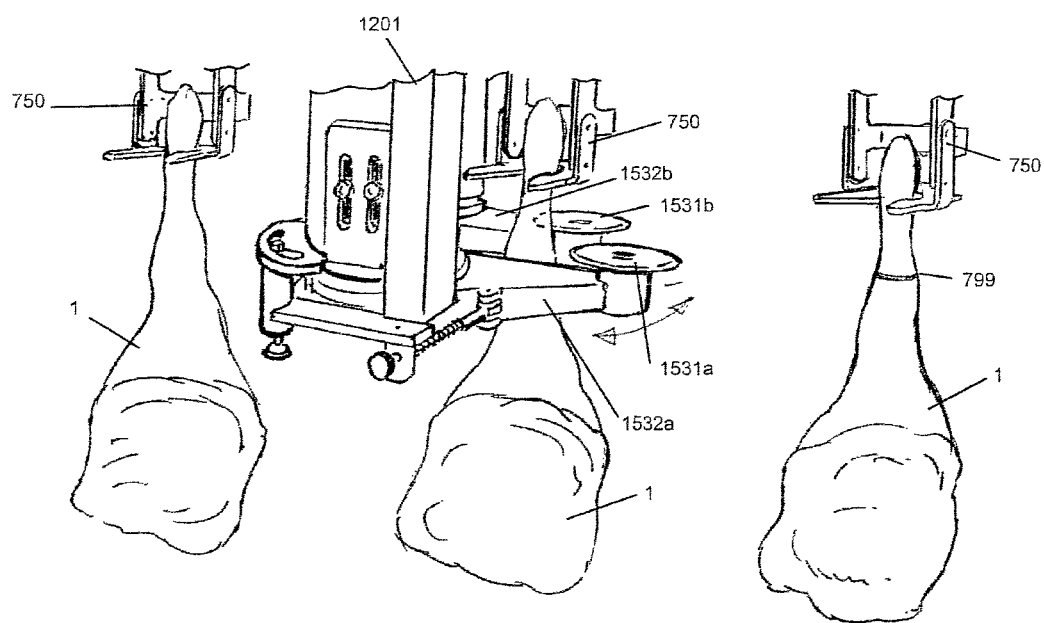
Figures 6, 26X:
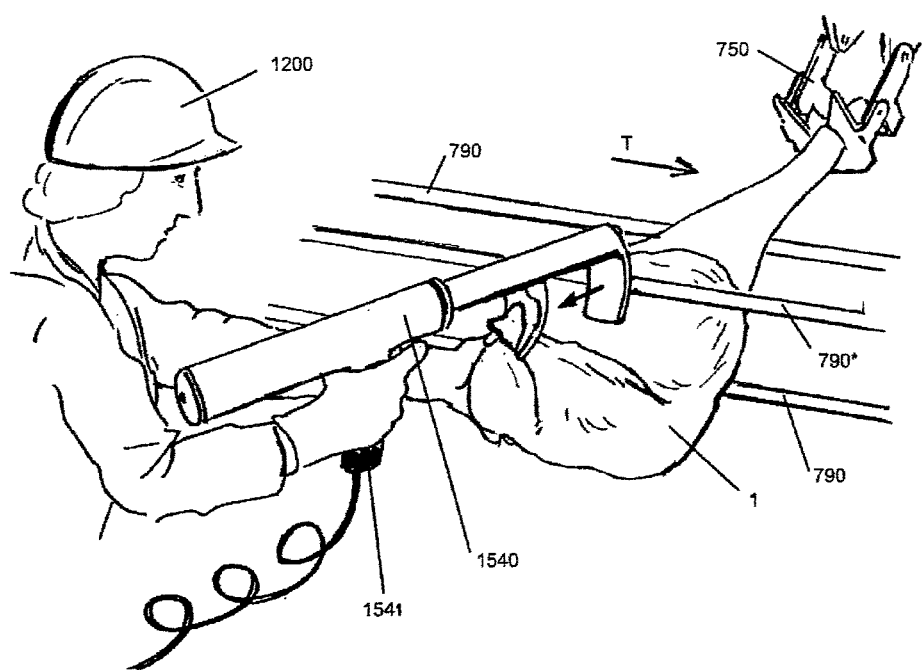
Figures 7A, 26X:
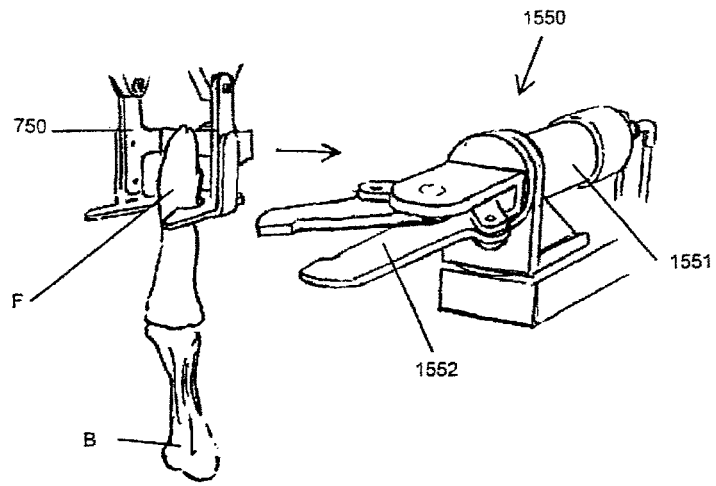
Figures 7B, 26X:
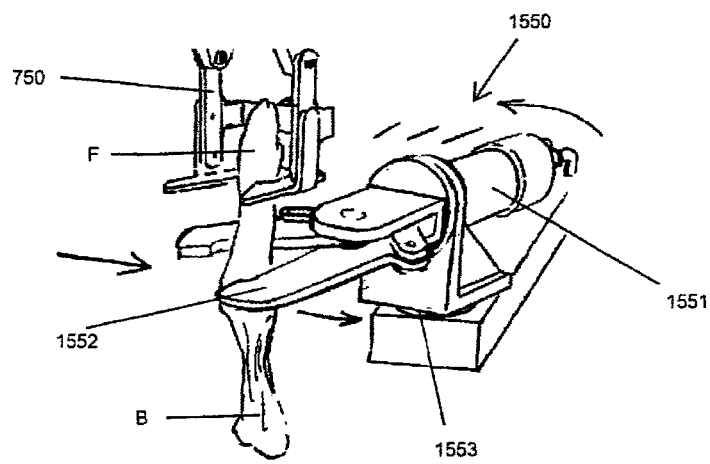
Figures 7C, 26X:
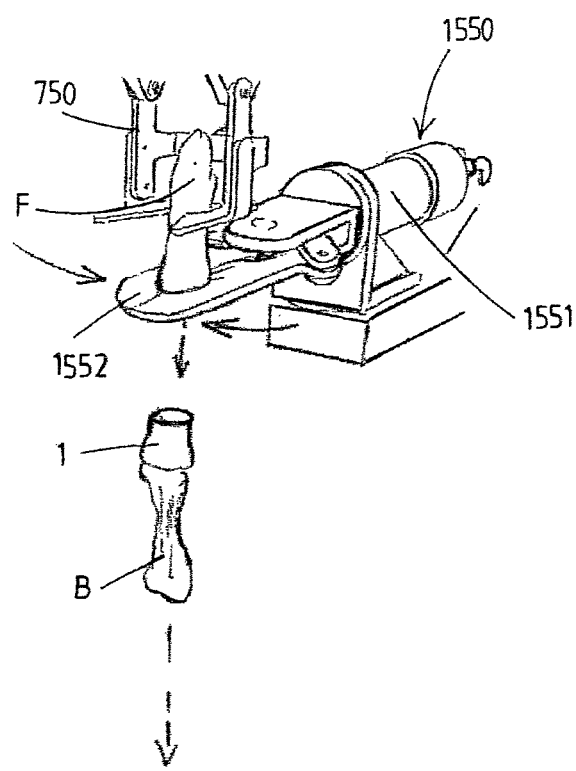
Figure 27A:
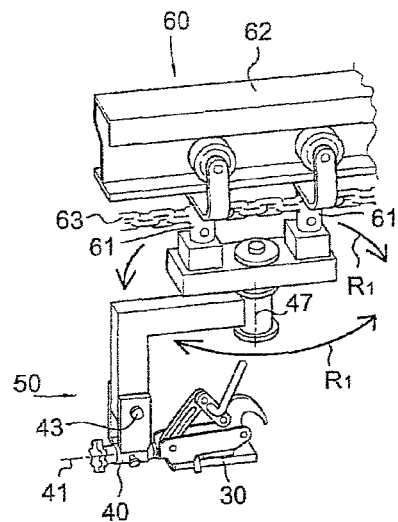
Figure 27B:
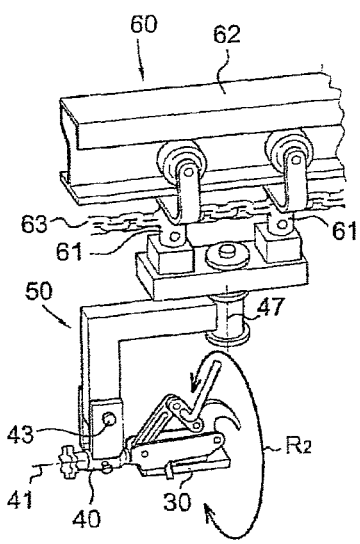
Figure 27C:
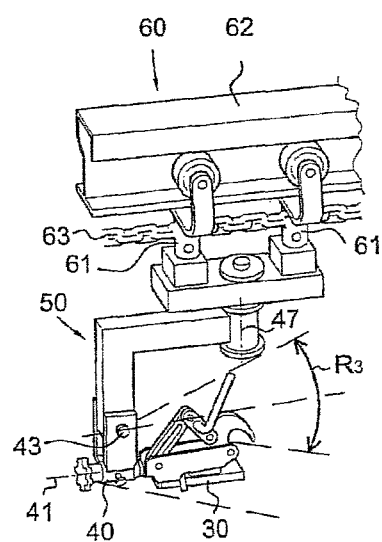
Figure 28:
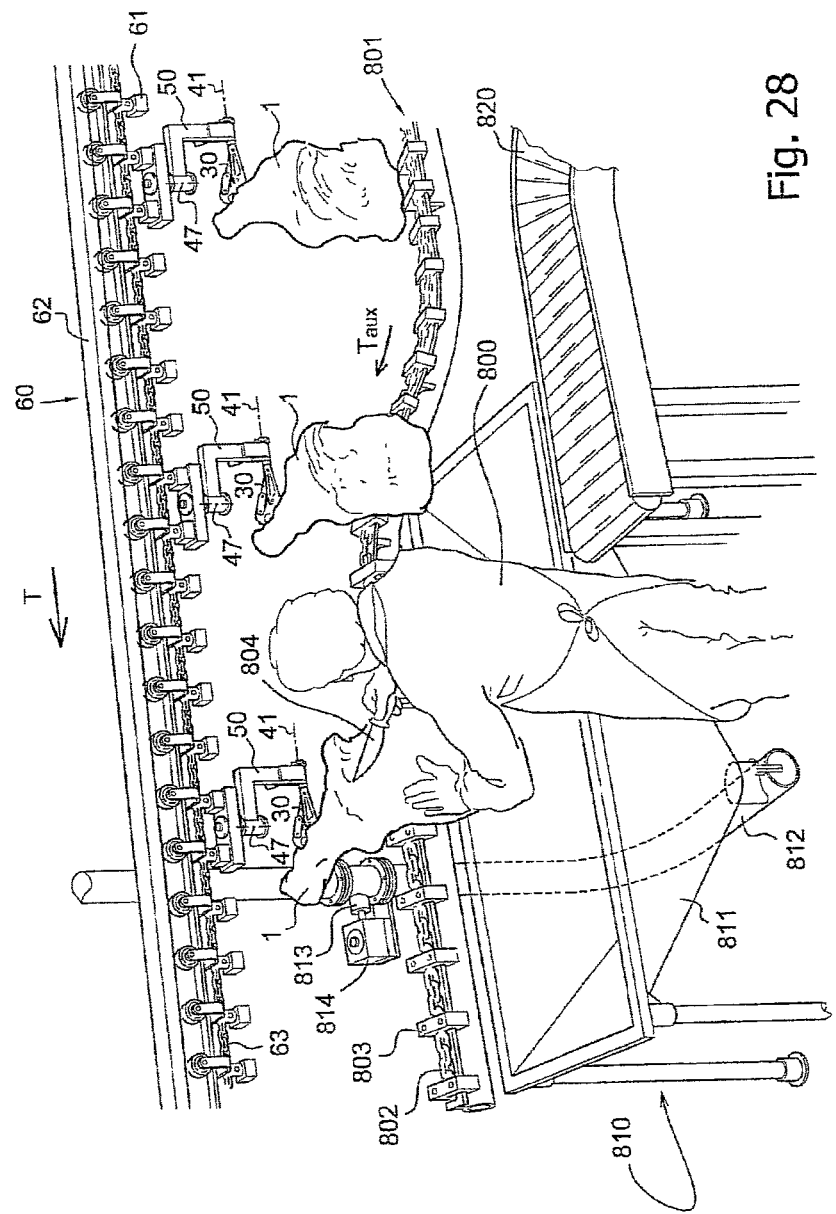
Figure 29:
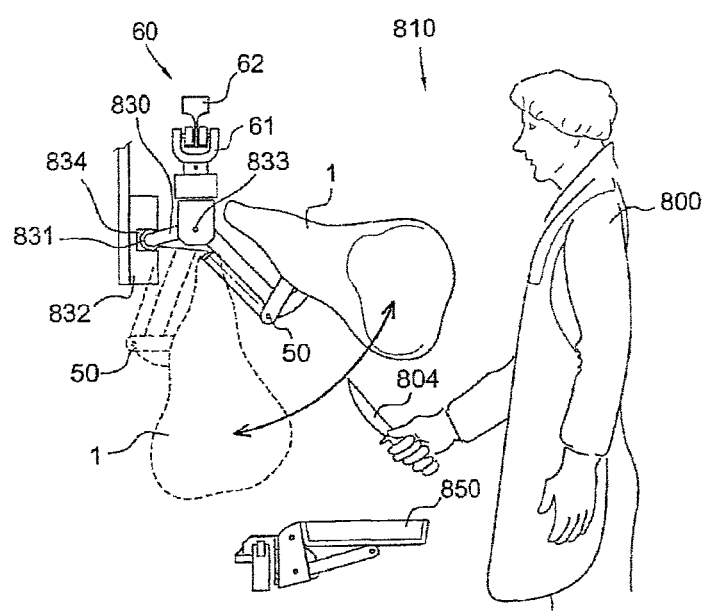
Figure 30:
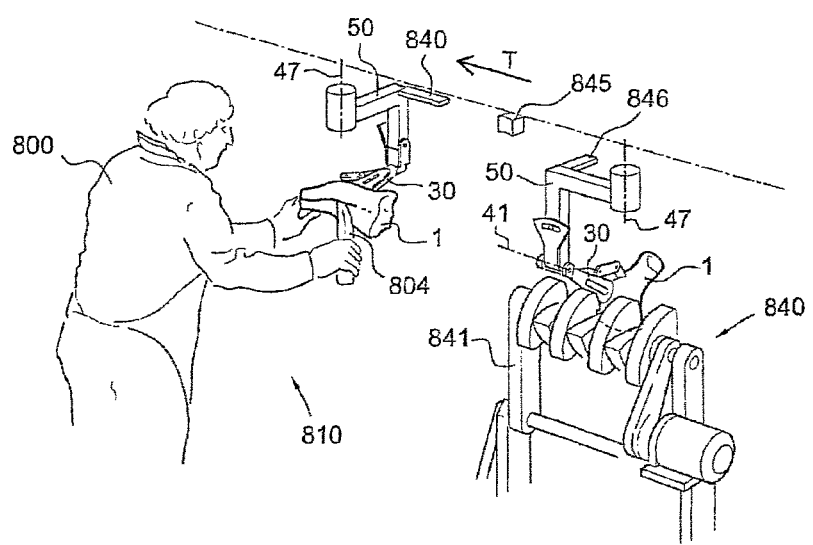
Figure 31:
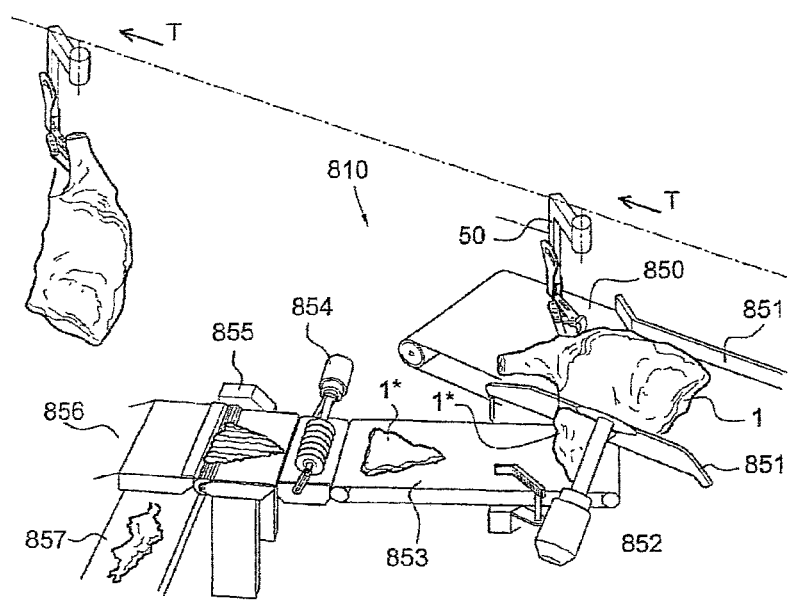
Figure 33:
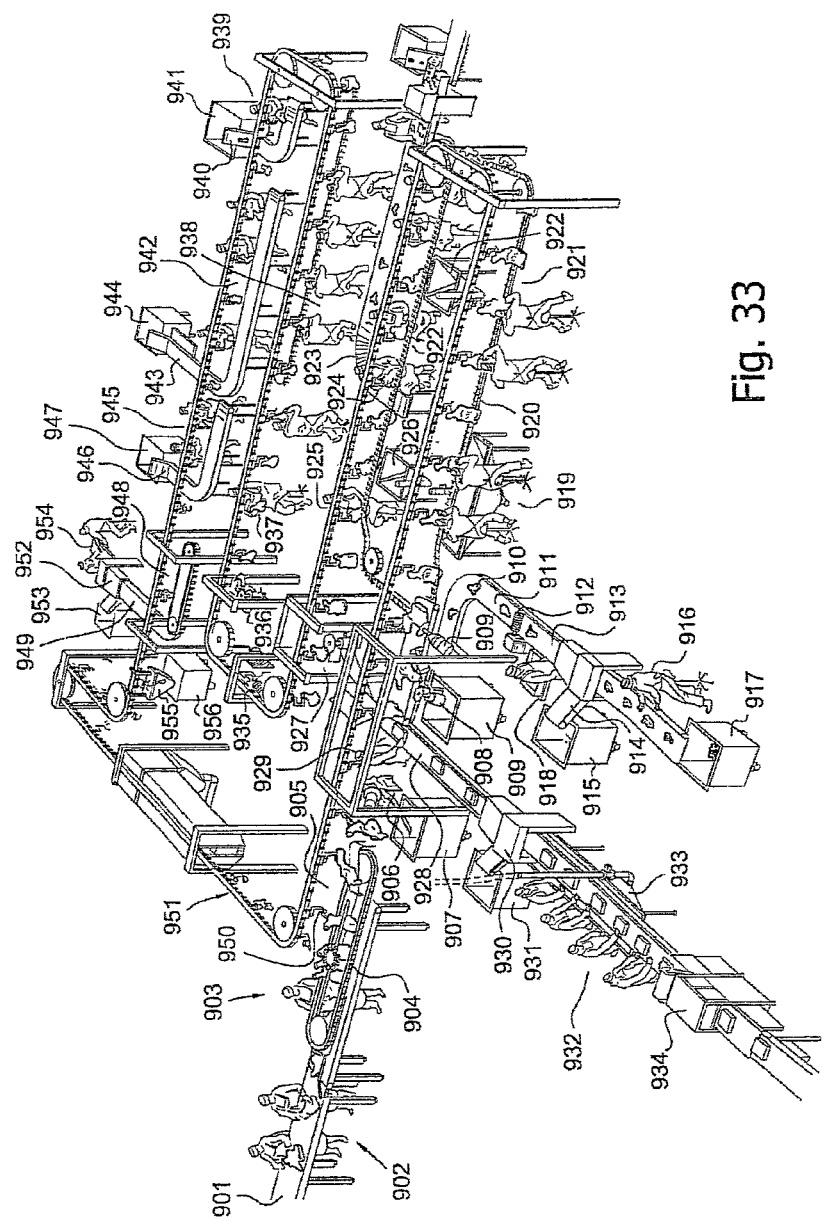
Figure 34:
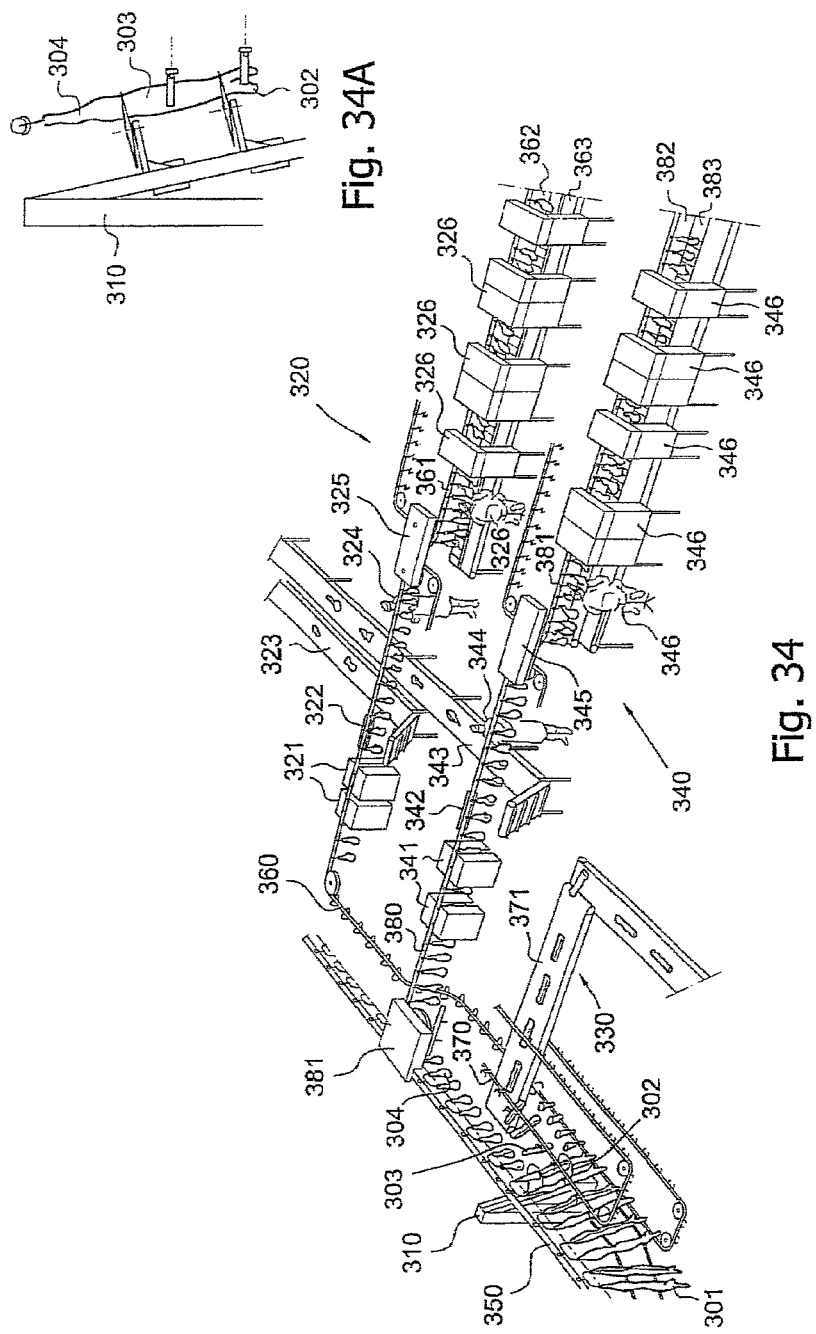
Figure 35:
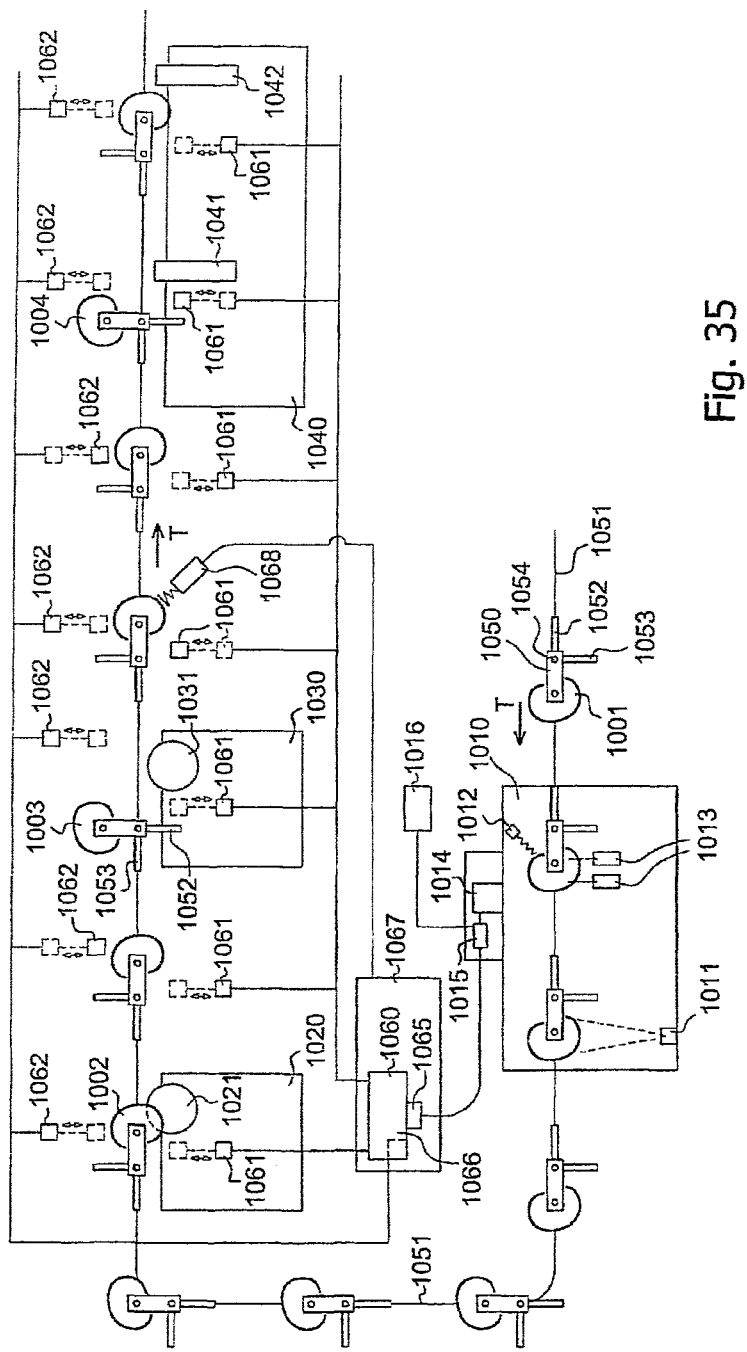
Figure 36:
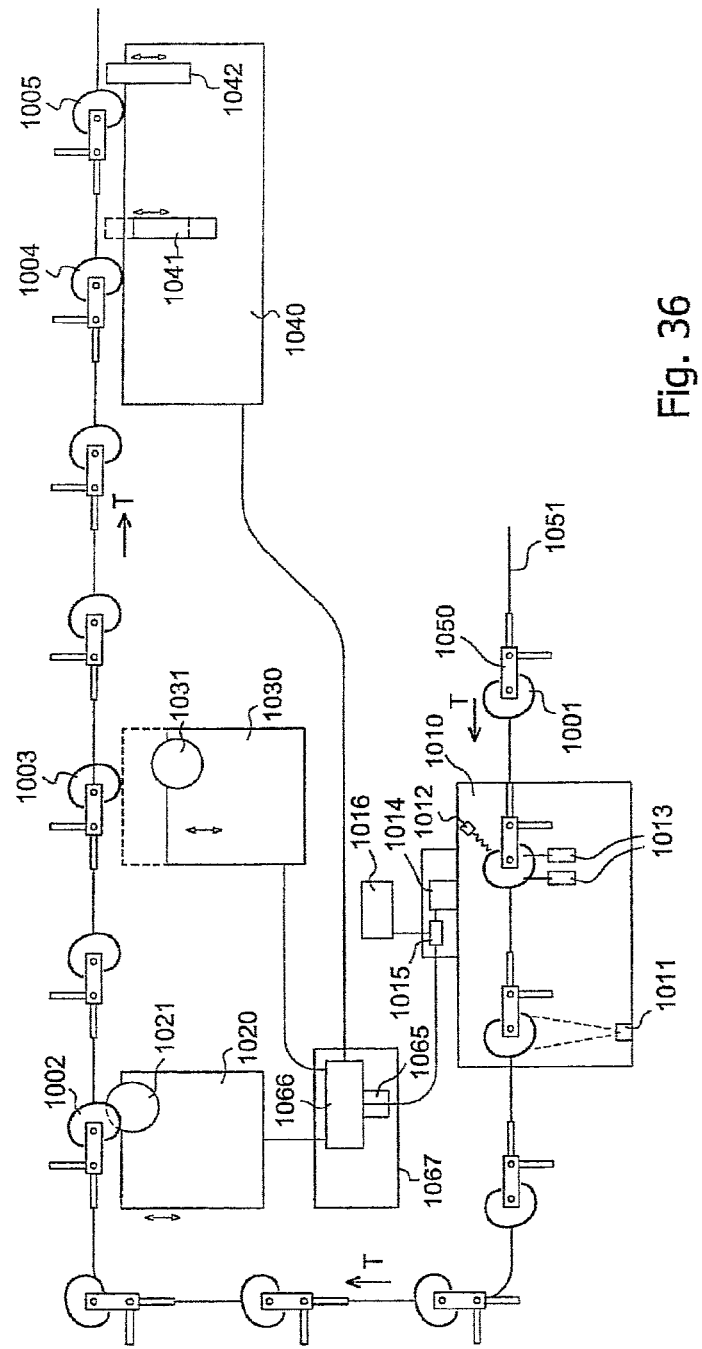
Figure 37:
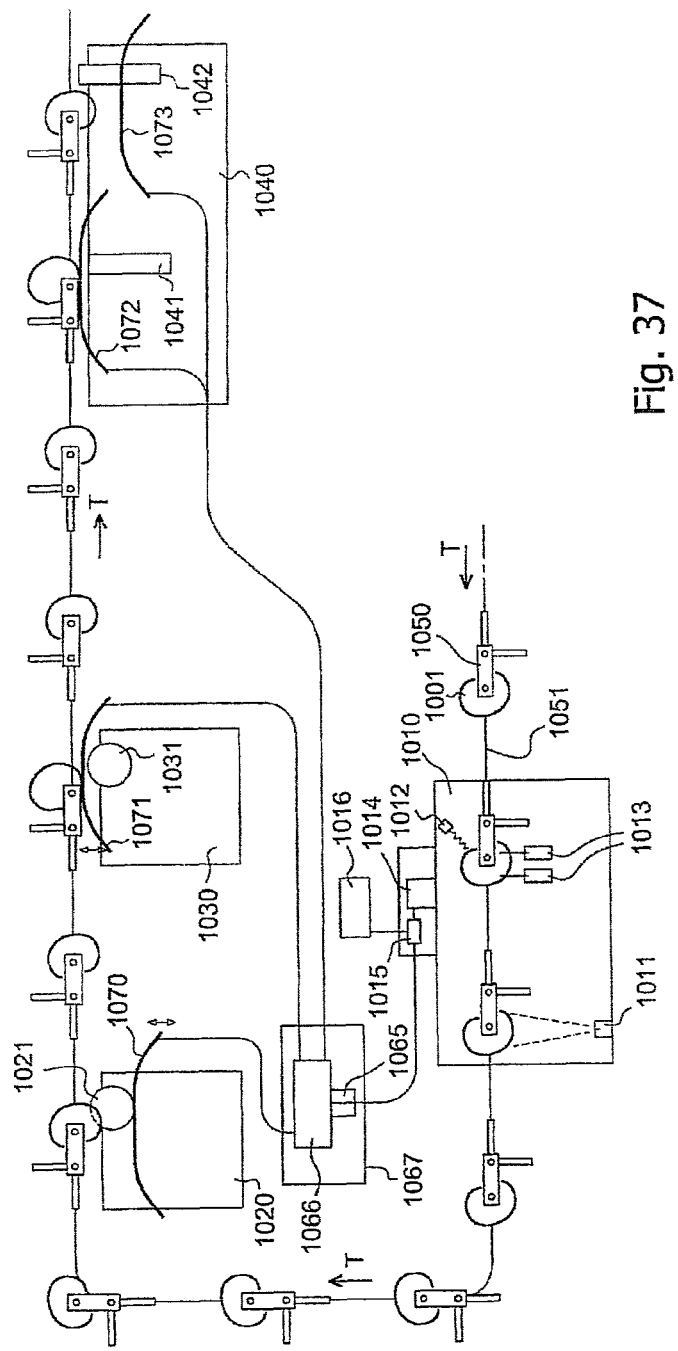

The invention will be explained in more detail under referral to the drawing, in which non-limiting embodiments of the invention are shown. The drawing shows in:

FIG. 1: a skeleton of a pig,

FIG. 2A: a side view of a first embodiment of a carrier according to the invention, FIG. 2B: the embodiment of FIG. 2A in perspective, FIG. 2C: a rear view of the embodiment of FIG. 2A, in perspective, FIG. 3A: the olecranon retaining assembly 30 of FIG. 2A in the open position, FIG. 3B: the olecranon retaining assembly 30 of FIG. 2A in the closed position, FIG. 4A and FIG. 4B: an alternative embodiment of the actuator of the olecranon retaining assembly, FIG. 5: a carrier according to the invention, connected to a trolley of a conveyor device, FIG. 6: a schematic representation of how automatic manipulation can be achieved, FIG. 7: a carrier being arranged on a stationary support structure, FIG. 8: an example of a carcass part comprising a ham, FIG. 9: an example of a knee retaining assembly, FIG. 10: the knee retaining assembly of FIG. 9 in its locked position, FIG. 11: a carcass part comprising a ham being arranged in a carrier according to the invention that is provided with a knee retaining assembly, partly in cross section, FIG. 12: the embodiment of FIG. 11, but now with the knee retaining assembly in its locked position, FIG. 13A and FIG. 13B: a further embodiment of a retaining assembly according to the invention, FIG. 14: a further embodiment of a system according to the invention, FIG. 15: an example of a carrier according to the invention, FIG. 16A and FIG. 16B: schematically a cross section according to line A-A of FIG. 15, FIG. 17 and FIGS. 17a-17d: a preferred embodiment of a slotted retaining assembly of a carrier in accordance with the invention, FIGS. 18A and 18B: the bone structure of a front leg and of a hind leg of a pig, FIG. 18C the bone structure of a pig foot, FIG. 19: a cross section through a pig's foot in the area of the metatarsal bones, FIG. 20: the pig foot of FIG. 19 arranged in the retaining assembly of FIG. 17, FIG. 21: a retaining assembly in accordance with FIG. 17 and FIG. 20 and an associated carrier, FIGS. 22A, B and C: two possible embodiments of an indexing or rotation member, FIG. 22D a carrier with the rotation member of FIGS. 22B and C;

FIG. 23: a loading or transfer station for arranging a carcass part into a carrier according to the invention, FIG. 23A: a further embodiment of the loading station according to the invention, FIGS. 24A and B: transfer from one carrier of a first conveyor to a carrier of a second conveyor, FIG. 25: a side view of a further embodiment of the carrier of FIG. 21, FIG. 25*: a side view of a further embodiment of the carrier of FIG. 21, FIG. **25\*\*: a side view of a further embodiment of the carrier of FIG. 21, FIG. 25\*\*\*: a further possible embodiment of a trolley having rollers, FIG. 25\*\*\*A: a detail view of the embodiment of FIG. 25\*\*\*, FIG. 25\*\*\*B: a variant of the embodiment of FIG. 25\*\*\*, FIG. 25#A: a further embodiment in accordance with the invention, FIG. 25#B: the embodiment of FIG. 25#A in combination with a chain conveyor system, FIG. 25#C: a different conveyor which can be used in combination with the embodiment of FIG. 25#A, FIG. 25#D: the embodiment of FIG. 25#D applied in a processing station, FIG. 26: the carrier of FIG. 21 being applied in a system for processing carcass parts, such as hams or fore-ends, FIG. 26*: the effect of friction between a carcass part in a carrier and stationary product support guides, FIG. 26\*\*: rotatable product support guides for reducing the effect of friction between carcass parts and product support guides, FIG. 26\*\*\*: an adapted carrier, FIG. 26X: the embodiment of FIG. 26 being applied for deskinning, derinding and/or removal of fat, FIG. 26X-1: a manual deskinning process in accordance with the invention in more detail, FIG. 26X-2: a fat removal process in accordance with the invention, FIG. 26X-3: a semi-automatic derinding tool 1522, FIG. 26X-4: an embodiment of a processing station making a reference cut 799, FIG. 26X-5: an embodiment of a processing station in which a reference cut can be made on both sides of the carcass part, FIG. 26X-6: a processing station for detaching (either partly or entirely) a shoulder blade from a carcass part, FIG. 26X-7A-FIG. 26X-7C: an embodiment of such an automatic foot cutter, FIGS. 27A-27C: a carrier according to the invention, indicating possible degrees of freedom for the retaining assembly, FIG. 28: a conveyor with carriers according to the invention in use in a system for processing carcass parts, FIG. 29: a further use of carriers according to the invention in a system for processing carcass parts, FIG. 30: a further use of carriers according to the invention in a system for processing carcass parts, FIG. 31: a further use of carriers according to the invention in a system for processing carcass parts, FIG. 32: a further use of carriers according to the invention in a system for processing carcass parts, FIG. 32*: further embodiment of a system according to the invention, FIG. 32*A: a variant of the embodiment of FIG. 32*, FIG. 32*B: a further variant of the embodiments of FIGS. 32* and 32*A, FIG. 32*C: a top view of a system according to the embodiment of FIG. 32*B, FIG. 32*D: the embodiment of FIG. 32*C, but now the containers 1215 for receiving the separated parts are shown, FIG. 32*E: a top view of a system according to the embodiment of FIG. 32*, FIG. 32*F: the embodiment of FIG. 32* (and FIG. 32*E) with the containers drawn in the figure, FIG. 32\*\*: a more sophisticated version of the embodiment of FIG. 32*, FIG. 32\*\*A: a variant of the embodiment of FIG. 32\*\*, FIG. 32\*\*B: a further variant of the embodiment of FIG. 32\*\* and FIG. 32\*\*A, FIG. 32\*\*C: a top view of an embodiment of a system in accordance with FIG. 32\*\*, in a variant, FIG. 32\*\*D: a variant to the embodiment of FIG. 32\*\*C, FIG. 32\*\*\*A: a further embodiment of a system according to the invention, FIG. 32\*\*\*B: a variant of the embodiment of FIG. 32\*\*\*A, FIG. 32\*\*\*C: a further variant to the embodiment of FIGS. 32\*\*\*A and 32\*\*\*B, FIG. 32\*\*\*D: a further embodiment of the system according to the invention, FIG. 32\*\*\*E: a variant of the system of FIG. 32\*\*\*D, FIG. 32\*\*\*E1: weighing in more detail, FIG. 32\*\*\*E2: a processing station in more detail, FIG. 32\*\*\*E3: the end of a processing line, FIG. 32\*\*\*F: a processing station comprising a robot, FIG. 32*G: a processing station that comprises a scanning device, FIG. 32***H: a processing station in which data is collected about the carcass parts 1 to be processed, FIG. 33: an embodiment of a system for processing carcass parts of red meat slaughter animals in accordance the invention, FIG. 34 and FIG. 34A: a further embodiment of a system according to the invention, FIG. 35: a further embodiment of a system according to the invention, FIG. 36: a further embodiment of a system according to the invention, FIG. 37: a further embodiment of a system according to the invention.

FIG. 1 shows a skeleton of a pig. In the front part, the scapula (shoulder blade) 11, humerus 12, radius 13, ulna 14 and olecranon 15 are indicated. In the ham area, indicated are the pelvis 16, the femur 17, the knee 18, the tibia 19 and the fibula 20.

FIG. 2A shows a side view of a first embodiment of a carrier 50 according to the invention.

In the embodiment of FIG. 2A, the carrier 50 is adapted for carrying a shoulder part of a slaughtered pig. The shoulder part comprises at least a part of the humerus bone 12, at least a part of the radius 13, of the ulna 14, and the olecranon 15. It further comprises at least a part of the meat 21 that is naturally present on the humerus bone 12, the radius 13, and the ulna 14.

In this example, as is preferred in combination with carrier 50, the olecranon 15 is at least partly, preferably completely, free from meat 21 so that the bone structure thereof is exposed, as is indicated in FIG. 2A.

The carrier 50 comprises an olecranon retaining assembly 30 which is adapted to engage on the olecranon.

Preferably, as in this example, the assembly 30 is such that it supports one its own the entire pig shoulder part, without the need for any additional support for the shoulder part.

In the example shown here the olecranon retaining assembly has a first jaw 31 and a second jaw 32, which are movable relative to one another. In the opened position of the jaws 31, 32 the olecranon 15 can be placed between the jaws 31, 32. In the closed position of the jaws 31, 32 the olecranon 15 is clampingly held between the jaws 31, 32.

The olecranon retaining assembly 30 comprises an actuator 33 for causing the relative motion of the first and second jaws 31, 32 with respect to each other.

In this embodiment, the first jaw 31 is integral with a connector portion 40 of the retaining assembly 30, which connector portion serves to connect the retaining assembly to the carrier 50.

The second jaw is pivotable about axis 34 with respect to the first jaw 31 and the connector portion 40.

In this example the first jaw 31 engages the olecranon 5 at the side of the humerus 12, while the second jaw 32 engages the olecranon 5 at the side of the radius 13 and ulna 14.

In this example the first jaw 31 has two teeth 39a,b and between them an olecranon slot 38, here—as is preferred—a V-shaped slot 38. The slot 38 has such a shape that the olecranon 5 can be fitted in, with a teeth of the first jaw 31 on either side of the olecranon 5.

In the example of FIG. 2A, the second jaw 32 is adapted to push the olecranon 15 in the slot of the first jaw 31 and to hold the olecranon 15 in said slot 38. In this example the second jaw 32 fits between the teeth of the first jaw 31 as the olecranon 15 is within the slot 38.

FIG. 2B shows the embodiment of FIG. 2A in perspective. In FIG. 2B, it is clearly visible that the olecranon 15 is arranged in the slot 38 of the first jaw 31, between the teeth 39a,b.

The second jaw 32, which is designed here as an anvil, has a surface 32* that engages the olecranon 15 and pushes it into the slot 38.

The actuator 33 provides a closing force to the second jaw 32, in order to keep the olecranon 15 reliably in the slot 38.

FIG. 2C shows the olecranon retaining assembly 30 of the embodiment of FIG. 2A from the rear, this time without a carcass part. The slot 38 and the teeth 39a,b of the first jaw 31 are clearly visible, as is the second jaw 32.

In general it is preferred that a locking mechanism is associated with the jaws 31, 32 to keep the jaws 31, 32 locked in the closed position, so that the hold of the retaining assembly onto the shoulder part is highly reliable, even when additional forces are exerted onto the jaws by the shoulder part, e.g. due to motions during transportation, changes in orientation of the shoulder part, and/or forces exerted during a processing, e.g. cutting, onto the shoulder part.

In the example of FIG. 2A, the actuator 33 comprises a toggle lever mechanism, which allows to lock the retaining assembly, here the jaws 31, 32, in its closed position when the toggle lever mechanism is in its over-center position. The locking effect can only be undone by operation of the actuator, not by forces exerted on the retaining assembly by the shoulder part.

In this example the toggle lever mechanism includes a first arm 35 and a second arm 36. The first arm is connected pivotally at one end to the connector portion 40 via pivot axis 37a and at the other end to the second arm via pivot axis 37b. The other end of the second arm is connected to the second jaw via pivot axis 37c, which is remote from the axis 34. All axis 37a,37b,37c and 34 are parallel.

FIG. 3A shows the olecranon retaining assembly 30 of FIG. 2A in the opened position. In this position, it is ready to receive the olecranon 15. In his example the arms 35, 36 of the toggle lever mechanism of actuator 33 are at a relative angle α that is less than 180°.

FIG. 3B shows the olecranon retaining assembly 30 of FIG. 2A in the closed or locked position. In this position, the second jaw 32 pushes the olecranon 15 (not shown) into the slot of the first jaw 31, such that the olecranon 5 is clamped between the jaws 31, 32.

In FIG. 3B, the angle α between the arms 35 and 36 is more than 180°. This provides an over-center position of the arms 35, 36. This means that opening the jaws 31, 32 is only possible through actuation of the actuator 33, so as to move the arms into a less than 180° position.

In a possible embodiment, the toggle lever mechanism is manually operated by a handle that is attached to one of the arms 35, 36. An operator operates the handle manually to open or close the olecranon retaining assembly 30. It is however also possible that the carrier is part of system that is automated to a higher extent, and that the handle is operated by a control system, without direct interference of an operator.

It is also possible that the toggle lever mechanism is operated by moving the carrier relative to an external operating element, such as a guide bar arranged along a track where the carrier passes along. The guide bar then engages the toggle lever mechanism (either directly or for example through a handle), and changes the relative position of the arms of the toggle lever mechanism.

As is preferred the connector portion 40 of the retaining assembly 30 is rotational with respect to the carrier 50.

In the examples of FIGS. 3, 4, 5, and 7 the connector portion 40 is rotatable about a horizontal axis 41, preferably through 360°, with respect to the carrier body.

As is preferred the horizontal axis 41 extends through the space between the jaws 31, 32 where the olecranon 15 is received.

FIGS. 4A and 4B show an alternative embodiment of the actuator of the olecranon retaining assembly 30. Reference 46 indicates a portion of the body of the carrier 50.

FIG. 4A shows the olecranon retaining assembly 30 with the jaws 31, 32 in the opened position. In FIG. 4B, the olecranon retaining assembly 30 is closed.

As is preferred, the connector portion 40 of the retaining assembly is rotatable about horizontal axis 41 with respect to the body of the carrier 50, here shown as body portion 46.

In the embodiment of FIGS. 4A and 4B, the actuator comprises an actuating rod 135. The actuating rod 135 is connected to one of the jaws 31, 32 by means of a mechanism that comprises the arm 136. In the example of FIGS. 4A and 4B, the actuating rod 135 is connected to the pivotal second jaw 32 via said arm 136.

The first jaw 31 is fixedly connected to the olecranon retaining assembly connector portion 40. The skilled person will understand that it is also possible that the actuating rod 135 is connected to the first jaw 31 while the second jaw 32 is fixedly connected to the olecranon retaining assembly connector portion 40, or that both the first jaw and the second jaw are moveable relative to the olecranon retaining assembly connector portion 40, either sharing a single actuating rod 135 or each having an actuating rod or other type of actuator of their own.

The embodiment of FIGS. 4A and 4B operates as follows: in the open position of the olecranon retaining assembly 30, the actuating rod 135 is in a retracted position. This situation is shown in FIG. 4A. The arm 136 is pivotably connected to actuating rod 135 by means of pin 137. Pin 138 connects arm 136 to the second jaw 32, which is in turn pivotably connected to body 139 of connector portion 40 by a pin 134 that allows the second jaw 32 to rotate relative to body 139.

FIG. 4B shows the actuating rod 135 in a forward position. With the actuating rod 135 in this forward position, the jaws 31,32 of the olecranon retaining assembly 30 are in their closed position. The positions and dimensions of the link 135, the pins 137, 138 and 134 are such that when the actuating rod 135 moved from its retracted position to its forward position, the jaws 31,32 of the olecranon retaining assembly move from their open position to their closed position. Likewise, when the actuating rod 135 is moved from its forward position to its retracted position, the jaws 31,32 move from their closed position to their open position.

The actuating rod 135 itself can be actuated by any suitable driver, such as a pneumatic or hydraulic cylinder, an electric motor, or manually. The driver can be designed to supply the actuator force that is necessary to keep the carcass part in the olecranon retaining assembly while the olecranon retaining assembly bears the weight of the carcass part and while operations are carried out on that carcass part.

In the embodiment of FIGS. 4A and 4B, in addition or as an alternative to any continuous actuator force supplied by the driver of the actuator rod 135, a ratchet 130 is provided. The ratchet 130 has teeth 131. The actuating rod 135 is also provided with teeth 132, preferably locally. The teeth 131 of the ratchet 130 and the teeth 132 of the actuating rod 135 are such that the ratchet allows movement of the actuating rod 135 from its retracted position to its forward position, but that it blocks movement of the actuating rod 135 from its forward position to its retracted position. Therewith, the ratchet 130 blocks opening of the olecranon retaining assembly 30.

When the olecranon retaining assembly 30 has to open again, for example in order to release the olecranon of the carcass part that it is holding, the ratchet is pivoted back around axis 133, so the actuating rod 135 is released and the olecranon retaining assembly 30 can be opened.

In an advantageous embodiment of the example of FIGS. 4A and 4B, the actuating rod 135 has a band of teeth 132 that extend around its circumference. The width of that band is adapted to the size of the ratchet, and will generally be smaller than the length of the actuating rod. The advantage of that is that the smooth, non-teethed part of the actuating rod can then be used as part of the hinge that allows rotation of the carcass part relative to the stationary structure or the trolley of the transport system to which the olecranon retaining assembly is connected.

FIG. 5 shows a portion of an example of a conveyor device for individual pig shoulder parts according to the invention. The conveyor device includes a track 62, here formed as an overhead rail (which is preferred). One or more trolleys 61 are movable along the rail 62, possibly interconnected, e.g. by a cable or chain, possible a drive arrangement being provided to propel the trolleys along the track.

A carrier assembly 50 is connected to one or more trolleys 61, here to a single trolley 61, of the conveyor device 60. It is also envisaged that a carrier 50 is connected to two trolleys.

The carrier in the example of FIG. 5 is a carrier according to FIG. 2A. However, also other designs of carriers, e.g. as explained in more detail in this application, can be used.

The conveyor device 60 is used to transport the carcass part held by the carrier 50 along the track, which track runs along one or more processing stations. In the processing stations, a process is carried out on carcass part that passes by, e.g. a manual process or an automated process. The carcass part can be transported continuously or in a stepwise manner in direction of transport T.

The carrier 50 comprises an olecranon retaining assembly support 40. The olecranon retaining assembly support comprises a hinge 41. In this example, hinge 41 has an axis of rotation that is directed horizontally, parallel to the direction of transport T.

As an optional feature, the carrier 50 also includes a second horizontal pivot axis 42 for the retaining assembly, that is non-parallel to the first horizontal pivot axis 41, here perpendicular. So the retaining assembly can be rotated about two non-parallel axis 41, 42 with respect to the carrier body 46.

In this example the connector portion 40 is rotatable mounted about axis 41 on an intermediate member 45 that is rotatable mounted about axis 42 to the carrier body, here carrier arm 46.

In this example the intermediate member includes a guiding plate 45 that is provided in order to limit the freedom of movement of the olecranon retaining assembly 30 about the second axis 42. The guiding plate 45 has a slot 44, through which pin 43 fitted on the arm 46 projects.

As a preferred optional feature, the carrier 50 is rotationally mounted to the one or more trolleys 61 about a vertical axis 47.

In an embodiment wherein the retaining assembly is connected to the carrier via two non-parallel horizontal pivot axis and the carrier is connected to the one or more trolleys via a third vertical axis, the carcass part can basically be manoeuvred with three rotational degrees of freedom.

This manipulation can be effected by an operator while he is carrying out the process, for example a deboning operation, on the carcass part. However, it is also possible that the manipulation is effected automatically, for example during the transfer from one processing station to the next.

In the embodiment of FIG. 5, a guide disk or other follower 48, e.g. a cam follower cooperating with a cam track, has been provided to allow automatic rotation of the carrier about axis 47.

In a variant to the embodiment of FIG. 5, the guiding plate 45 is not provided with a continuous slot, 44, but with a plurality of discrete hole, into which pin 43 fits. When the olecranon retaining assembly has to assume a different orientation, the pin 43 is withdrawn from the hole in which is was present, and arranged in one of the other holes in the guiding plate 45.

FIG. 6 shows schematically an example of how automatic manipulation can be achieved.

Dash-dot line 65 indicates the track that the trolleys follow. When a trolley is in position A, its associated support arm 46 extends substantially perpendicular to the direction of transport T. When the trolley has arrived at position B, guide disk 48 has come into contact with guide 70, e.g. a guide rail. As the trolley progresses towards position F, guide 70 forces support arm 46 towards the dash-dot line 65, making the support arm 46 coming to extend substantially parallel to the track (dash-dot line 65). When the trolley has arrived at position F, a second guide 71 is present, on the opposite side of guide disk 48. Together, guides 70 and 71 hold the support arm 46 in an orientation parallel to the track.

In the example of FIG. 6, the means for controlling the orientation of the olecranon retaining assembly (guide 70) and the means for fixing the orientation of the olecranon retaining assembly in at least one degree of freedom (last part of the guide 70 together with the guide 71) are arranged alongside the track of the transport system. It is however also possible to integrate such means into the carrier assembly. For example, servo motors can be used for this purpose.

Integrating the means for manipulating and/or fixing the orientation into the carrier assembly is in particular useful when the carrier assembly is arranged on a stationary support structure 80, such as is shown in FIG. 7. In such a case, no use can be made of relative movement of the carrier assembly and its surroundings, as the stationary support structure 80 will generally have a fixed position in the slaughterhouse or factory.

FIG. 7 schematically shows three servo motors 90 being integrated into the carrier assembly, one for each rotational degree of freedom. Of course, it is also possible to use less or more motors, and/or to use them for actuating a translation.

With reference to FIG. 8 a device and system according to the invention will be disclosed wherein the carcass part is a ham of a slaughtered pig, which ham comprises a knee, at least a part of the femur bone, adjacent to the knee, at least a part of the tibia bone and fibula bone, adjacent to the knee and at least a part of the meat that is naturally present on the femur bone, tibia bone and fibula bone.

An example of a pig ham part 200 is shown in FIG. 8. The ham comprises a knee 201, the femur bone 202, the ischium 203, the pubis 204, the illium 205, the tibia 206 and the fibula 207. The ham also comprises at least part of the meat 208 that is naturally present on those bones. At least some of the meat in the knee area has been removed or loosened from the bones. The bones in the knee area are preferably fully or partly exposed, or these bones can be at least partly reached by pushing aside the loosened meat. However, the invention can also be applied when the knee is still covered by meat.

In FIG. 9 a preferred embodiment of a knee retaining assembly 210 is shown.

The knee retaining assembly for holding a pig ham part is preferably mounted in a carrier, e.g. a carrier having one or more of the features discussed with reference to one or more of FIGS. 2-7, e.g. a carrier that is part of a conveyor device.

The knee retaining assembly comprises a first jaw 212 and a second jaw 211 that are movable with respect to each other between an opened position, wherein the knee can be placed between the jaws 212, 211, and a closed position, wherein the knee is clamped between the jaws 212, 211.

In this preferred embodiment the knee retaining assembly 210 comprises a first jaw with a projecting meat penetrating pin, here in the form of a hook 212, and a second jaw 211, here formed as an abutment member or block.

The knee retaining assembly further comprises an actuator that causes the relative motion of the first and second jaws 212, 211. In this example, the actuator comprises a linkage mechanism 214, most preferably a toggle lever mechanism as explained with reference to FIG. 3 with arms 214*a* and 214*b*.

In use, the abutment block 211 is arranged so as to engage the bones at or adjacent to the knee joint from the side that faces forward in a live pig. The abutment block 211 preferably has a front face 215 of which the shape is adapted to the shape of the bones that are engaged by the front surface 215.

In the example of FIG. 9, the front face of the second jaw 215 comprises one or more, preferably—as in this example—two recesses 216 and 217. These recesses 216 and 217 are each adapted to accommodate a portion of the tibia 19. Only one recess 216,217 is in use at a time. By providing two recesses 216, 217, the retaining assembly including the second jaw 211 can be used for processing both the left leg and the right leg.

In an advantageous embodiment, the second jaw 211 can adopt two positions: one it which one of the recesses 216,217 can receive the tibia 19 of a left leg, and one in which the other recess 217,216 can receive the tibia 19 of a right leg. Preferably, the second jaw 211 can be clicked into the right position.

The first jaw or hook 212 is moveable, here pivotable, relative to the second jaw or abutment block 211. The movement of the hook 212 relative to the second jaw is controlled by the linkage mechanism 214, which in turn can be driven by any suitable means.

The hook 212 is preferably shaped in such that it can pass between the tibia and the fibula, through the carcass part. The linkage mechanism 214 is preferably such that it makes the hook 212 move in such a way that the tip 218 of the hook moves towards the second jaw after it has passes between the fibula and the tibia, so that the tip 218 of the hook 212 engages the knee from behind and pushes it against the abutment block of the second jaw 211.

The driver can be adapted to provide the actuator force that is necessary to hold the carcass part in the knee retaining assembly while the carcass part is carried by the carrier and/or while the carcass part is processed. Instead or additionally, it is possible to have the linkage mechanism generate the actuator force itself. In the example of FIG. 9, the linkage mechanism 214 can for example be forced past its over-center point by its driver. This is shown in FIG. 10, where the knee retaining assembly of FIG. 9 is shown in the locking position in which it locks the knee of a carcass part. To move the hook 212 back up again so that the carcass part can be released from the knee lock, the link mechanism 214 has to be forced back through its dead point, which requires additional force.

Like in the olecranon retaining assembly, the actuator in the knee retaining assembly can be realised in many ways. It is for example possible to apply the actuating rod of FIGS. 4A and 4B in the knee retaining assembly. Other embodiments of actuators for both retaining assemblies are possible as well, for example spring loaded actuators.

The knee retaining assembly itself can also take different forms. Instead of using a first jaw with a projecting pin as described above, it is also possible to clamp the knee between a first jaw and a second jaw, and hold the knee by friction. In another embodiment, one of the jaws can have a V-shaped slot like the olecranon retaining assembly.

FIG. 11 shows a ham part of a pig being arranged in a carrier according to the invention that is provided with a knee retaining assembly, partly in cross section.

In FIG. 11, the knee retaining assembly 210 is arranged in a carrier of the type shown in FIGS. 5 and 7. Likewise, the carrier assembly of FIG. 11 can be connected to a trolley of a conveyor device or to a stationary support structure. The reference numerals of the carrier assembly that are used in FIG. 11 indicate the same components as in FIG. 5 and FIG. 7.

In FIG. 11 it is shown that the knee of a carcass part comprising a ham is forced against the front face 215 of the abutment block 211. By doing so, hook 212 is forced through the carcass part, between the tibia and the fibula. The carcass part can be put in the position of FIG. 11 by manual force of an operator, or in an automated way.

FIG. 12 shows the embodiment of FIG. 11, but now with the knee retaining assembly in its locked position. The link mechanism 214 has been moved such that the tip 218 of the hook 212 now is in engagement with the hollow of the knee 201*. The hook 212 therewith pushes the front of the knee against the front face of the abutment block 211 of the knee lock. This way, the carcass part is locked in the knee lock.

FIG. 13 shows a further possible embodiment of a retaining assembly according to the invention. In this embodiment, the retaining assembly is assumed to be part of a carrier of a conveyor device, wherein the carrier is movable along a track of the conveyor device, e.g. in transport direction T indicated in FIG. 13B.

FIG. 13A shows this embodiment in side view. FIG. 13B shows this embodiment in a partial cross section, in top view. In the example, a pig shoulder part is arranged in the carrier, but this embodiment of the system can also be used in combination with hams or other carcass parts.

The pig shoulder part as shown in FIG. 13 comprises at least a part of the humerus bone 12, at least a part of the radius 13, ulna 14 and olecranon 15. Also at least a part of the shoulder blade 11 is present. It further comprises at least a part of the meat 21 that is naturally present on the humerus bone 12, radius 13, ulna 14 and olecranon 15. In this embodiment, the olecranon is still covered with meat.

In the embodiment of FIG. 13, the retaining assembly is provided with one or more, here two meat penetrating teeth 432,433. The teeth 432, 433 are mounted on a block 431, which is in turn connected to a connector portion 440 of the retainer assembly.

The portion 440 bearing the block with one or more meat penetrating teeth is connected to a carrier, which is not shown in the drawing, e.g. as explained with reference to any of the preceding figures.

The teeth 432, 433 are forced into the meat of the carcass part, in the vicinity of or directly at a reference portion of the carcass part. In this case, the reference portion is the olecranon 15, and the teeth 432, 433 are brought into the meat of the carcass part on either side of the olecranon 15. The two teeth together suppress movement of the carcass part relative to the base block 431 in all but one degrees of freedom. Only the translation in the longitudinal direction of the teeth 432, 433 is not suppressed.

The teeth 432, 433 carry the weight of the carcass part.

One or more guide rail 420 arranged along at least a section of the track of the conveyor device suppress movement of the carcass part relative to the block 431 in the longitudinal direction of the one or more teeth 432, 433, in the direction away from the base block, and pushes the carcass part towards this base block 431. This way, the carcass part becomes locked between the base block 431 and the one or more guide rails 420.

In an advantageous embodiment of a system according to the invention in which a retaining assembly of the type according to FIG. 13 is applied, the teeth 432, 433, the base block 431 and the base portion 440 are arranged on a carrier of a transport system. The carrier transports the carcass parts along a path. In such a system, the guide rail can be arranged stationary along the path, at that position or those positions where the locking of the carcass part in the carrier is required, for example at position where process steps are carried out on the carcass parts. So, guide rail 420 could very well be incorporated in a processing station. Instead of or in addition to a guide rail, for example a guide plate or guide block can be applied.

In a system according to the invention where a stationary support structure is provided with one or more carriers having a lock according to FIG. 13, the guide rail can be made moveable towards the base block 431. Instead of or in addition to a guide rail, for example a guide plate or guide block can be applied.

The teeth 432, 433 can take a different shape than the one shown in FIG. 13. For example, pins with a constant cross sectional area over at least part of their length can be used.

In the embodiment shown in FIG. 13, the teeth 432, 433 are introduced in the carcass part on either side (left and right) of the olecranon 15. It is also possible to introduce them for example in front of the olecranon and behind the olecranon 15. That way, more advantage can be taken of the stability that the bone structure gives the carcass part. The weight of the carcass part is then not only exerted on meat parts of the carcass part, but also on bone parts.

FIG. 14 shows, in top view, in partial cross section, a further embodiment of a system according to the invention.

FIG. 14 shows carriers 550 of a conveyor device that are movable in a transport direction T along path 565. To each of the carriers, a base block 531 is connected that bears at least one protruding and meat penetrating pin 532. This pin 532 can have a sharp, rounded or blunt tip.

The pin 532 is introduced into the meat of carcass part 1, which in the example of FIG. 14 is a ham. However, the embodiment of FIG. 14 can also be used for other types of carcass parts.

In the example of FIG. 14, the pin 532 is introduced into meat 508, next to the tibia 506 and the fibula 507. It is however also possible that the pin 532 is introduced between the tibia and the fibula.

Alongside at least a part of the path 565 runs a second conveyor, here having a belt 521. Preferably belt 521 is an endless belt. Instead of or in addition to the belt 521, one or more cords, cables, chains or the like may be applied. The belt 521 moves along with the carriers, in the same direction (see arrow B) and with the same speed, at least for the part of belt 521 that runs alongside the path 565. On the belt 521, at regular intervals counter blocks 520 are provided. The pitch between subsequent counter blocks 520 is the same as the pitch between subsequent carriers 550. The counter blocks 520 are each provided with a recess 523 for receiving the carcass part. The carriers push the carcass parts into these recesses 523, such that the carcass part is locked in the carrier.

Behind the belt 521, a guide plate 522 may be provided, to support the belt 521 against the force of the carcass parts being pushed in the recesses 523 of the counter blocks 520. Likewise, such a guide plate (not shown in the drawing) may be present to support the carriers to withstand this force.

FIG. 15 shows an example of a carrier 750 according to the invention. In this example, the carrier 750 is connected to a trolley 61, that runs along an overhead track 62 of an overhead conveyor device 60.

The carrier 750 comprises a retaining assembly 730 with a connector portion 740.

In this example, the retaining assembly 730 engages a carcass part 1, which in this example is a ham, somewhere in a holding zone 701 of the carcass part (indicated by the hatching in FIG. 15).

The carrier shown in FIG. 15 can further have one or more features that are shown and discussed herein in relation to carriers and conveyor devices.

FIG. 16 shows schematically a cross section according to line A-A of FIG. 15. In this cross section, jaws 731 and 732 of the retaining assembly 730 can be seen. Between the jaws the carcass part 701 is clamped.

At the holding zone of the carcass part where the retaining assembly 730 engages, the carcass part 701 has both bone 703 and soft tissue 702 in its cross section. The jaws 731,732 engage the soft tissue.

FIG. 16A shows the spatial orientation of the bone 703 relative to the retaining assembly 730 as of the moment the retaining assembly was brought into engagement with the carcass part.

FIG. 16B shows the situation in which the bone 703 when a guiding or orienting force is exerted on the carcass part. The circumference of the soft tissue still has the same position relative to the jaws 731,732. The bone 703 is however rotated relative to its initial orientation of FIG. 16A. The flexibility of the soft tissue 702 allows this. The series of stripes 704 visualise the deformation of the soft tissue 702 due to this rotation of the bone 703.

The rotation of the bone relative to the circumference of the soft tissue results in mechanical stresses in the soft tissue. When the guiding or orienting force is no longer applied, the bone returns to its initial spatial orientation of FIG. 16A due to the elasticity of the soft tissue, and the mechanical stresses that were caused by the rotation disappear.

With reference to FIGS. 17-26 now several exemplary embodiments of a slaughtered pig leg parts conveyor device and system according to the invention, preferably in accordance with the first, second and third aspect of the invention, will be discussed.

The conveyor device and system are in particular envisaged for the conveyance, and possible processing during conveyance, of a fore leg part or hind leg part of a slaughtered pig. In these examples it is assumed that the fore leg part or hind leg part includes at least the foot (at least the relevant region thereof as discussed below) and an adjoining portion of the leg of the pig. For example the fore leg part is a fore end as is known in the art. For example the hind leg part includes the ham.

The conveyor device can advantageously be used in combination with one or more processing stations, wherein the conveyed pig leg part is subjected to a process.

For example the process may involve the making of one or more cuts in the leg part, e.g. to cut off a portion of the leg part and/or as a preparatory action for a further process, e.g. for a deboning process.

It is envisaged that one or more processes are performed with automated devices.

It is also envisaged that one or more processes are performed manually, e.g. using had tool(s), e.g. a knife, and/or a hand-held power tool.

In such a conveyor device conveyor device a track is provided, preferably a rail, most preferably an overhead rail.

As is preferred the track is endless.

The track may have a significant length, e.g. extending between and/or along multiple processing stations in a pig slaughtering facility.

The track may be dedicated to a single processing station and/or processing machine in such a facility, e.g. as an endless circular track.

One or more, preferably a multitude, e.g. more than 50, pig leg part carriers are movable along the track, each carrier being adapted to carry an individual pig leg part.

Each carrier has one pig foot retaining assembly adapted to engage on a single pig foot so as to retain the pig leg part in a position suspended from the carrier.

The retaining assembly includes a pig foot aperture adapted to receive the one pig foot.

FIG. 21 shows a portion of an example of such a conveyor device. The carrier 750 has a retaining assembly with a pig foot slot 762, here formed in a rigid slot plate 761, which slot 762 is dimensioned to receive the pig foot in a clamping manner so as to support the pig leg part suspended from the retaining assembly.

The slot 762 is open at one end thereof to introduced the pig foot sideways into the slot and remove the pig foot sideways from the slot 762.

Before discussing the carrier 750 in more detail, first a preferred embodiment of the slot plate 761 will be discussed In general the slot 762 in the plate 761 is adapted to receive the region of the pig foot where the metatarsal bones are present.

FIG. 18A shows the bone structure of a front leg of a pig, while FIG. 18B shows the bone structure of a hind leg of a pig. FIG. 18A shows the scapula (shoulder blade) 11, humerus 12, radius 13, ulna 14 and olecranon 15. FIG. 18B shows the femur 17, the tibia 19 and the fibula 20.

FIG. 18c shows the bone structure of the foot of a pig. The structure is basically the same for the front and hind leg. As is known a pigs foot contains four digits. The central digits, indicated with MC3 and MC4 are functional and basically bear the load of the pig, whereas the lateral digits MC2 and MC5 are basically non-functional. In pigs the latter are referred to as dewclaws. The references MC2, MC3, MC4 and MC5 refer to metacarpal or metatarsal bones of the pig foot.

In FIG. 18C the references P1, P2, P3 refer to phalanges of the pigs foot.

FIG. 18A and FIG. 18B show the central metatarsal bones 22 and the lateral metatarsal bones 23. The same bones are also shown in FIGS. 19 and 20.

In FIG. 18c the reference H indicates a region of the foot of the pig that is advantageous for use as a holding zone. This region includes metatarsal bones 22 and 23 of the foot.

There are several advantages to using this region of the pigs foot as a holding zone. A first advantage is that the diameter of this region is about the same for a front leg and for a hind leg. This allows to use the same locking plate 761 for engaging an individual front leg part as well as an individual hind leg part of a pig. This means that hams and fore-ends can be held by the same locking plate 761, so the same carrier can be used for both.

A second advantage of using this region of the foot as a holding zone is illustrated in FIG. 19 and FIG. 20.

FIG. 19 shows a cross section through a pig's foot in the area of the metatarsal bones 22 and 23, so in the region H as indicated in FIG. 18c. The cross section as shown in FIG. 19 is generally the same for a front leg or a hind leg.

FIG. 19 shows the pigs foot in natural state, before engagement with the slot plate 761. As can be seen the lateral metatarsal bones 22 are situated adjacent to the main phalanges 23 in the natural position as shown in FIG. 19. A relatively large tendon 24 runs through the cross section. The outside layer 25 of the cross section comprises skin, rind and a bit of fat. Around the tendon 24 and the metatarsal bones 22, 23, mainly meat 26 is present.

So, in the cross section of the holding zone as shown in FIG. 19, the metatarsal bones 22, 23; the soft tissue surrounding the bone comprises skin, rind and fat 25, tendon 24 and meat 26 are present.

Tests have shown that deforming the foot in the region of the metatarsal bones by applying pressure in the direction of arrows A requires quite a lot of force. This is basically when the pressure is applied in lateral direction on the foot. On the other hand, when pressure is applied in the direction of arrows B, that is generally pressing the front side and the rear side of the foot towards one another, this region of the foot is much easier to deform; it requires less force to obtain a certain deformation and the ultimate deformation that can be achieved is larger.

Use of this knowledge can be made when suspending the pig leg part from a retaining assembly having a pig foot aperture or slot, e.g. with a slot plate 761 as shown in FIG. 17. This is shown in FIG. 20.

The slot plate 761 has an aperture embodied as a pig foot slot 762 which is open at one end thereof to introduce the pig foot sideways into the slot and remove the pig foot sideways from the slot.

The slot has an entrance portion 763, here as is preferred a narrowing entrance portion, at a side of the slot plate. The entrance portion may include one or more entry faces arranged at an angle with respect to the main axis of the slot.

The entrance portion 763 leads to a retaining portion 762 of the slot with includes a blind end. It is intended that a properly introduced pig foot is received in the retaining portion.

As is preferred the slot 762 has a rigid reference face 762a in the retaining portion of the slot. As shown in FIG. 20 the pig foot is preferably introduced such into the slot that the central metatarsal bones 22 are generally adjacent said rigid reference face 762a, so with the front side of the pig foot facing said rigid reference face 762a.

The introduction of the pig foot into the entrance portion 763 causes a gradual compression of the pig foot region. Due to the retaining portion of the slot 762 being narrower than the undisturbed cross-section of the pig foot region received therein, the lateral metatarsal bones have been pressed towards the central metatarsal bones and also towards the reference face 762a. This clamping of the pig foot provides a reliable suspension of a leg part of the pig, e.g. up to a weight of 15 kg.

As explained the sideways introduction of the pig foot into the slot in this orientation will require a limited force as compression of the pig foot in the direction perpendicular to the introduction direction is relatively easy. This e.g. allows for manual introduction of the pig foot into the slot 762.

As is preferred the slot plate 762 also includes a protrusion 765 between the entrance portion and the retaining portion of the pig foot slot. This protrusion generally defines a narrowest passage of the slot so as to keep the pig foot in the retaining portion once it has been properly inserted.

As an alternative, or in combination with a protrusion 765, the retaining assembly may include (in a non-shown embodiment) a blocking member that is movable between a blocking position, wherein the blocking member extends across at least part of the width of the slot 762 so as to block the pig foot from leaving the pig foot slot, and a retracted position wherein the pig foot can be removed from the slot. For example the blocking member is a pivotal lever. For example the blocking member is adapted to be operated manually or equipped with a cam follower that can cooperate with a dedicated cam track arranged along the track where operation of blocking member is desired.

The width of the slot will in practice preferably been chosen such that a pig foot with the smallest cross-sectional dimensions (indicated with diameter D in FIG. 19) of the pig leg parts to be conveyed and/or processed, will still be compressed upon introduction into the slot (having width W smaller than diameter D). The compression and/or other deformation of the soft tissue of the pig foot attributes to a tight fit and solid grip of the slot plate onto the pig foot.

The slot 762 is adapted to accommodate a holding zone of a carcass part. However, holding zones of carcass parts come in a range of diameters due to the natural variation in shapes and sizes of carcass parts. The width W has to be chosen such that also carcass parts that have a holding zone of a relatively small diameter are retained in the slot 762.

Preferably, the width W of the locking part 764 of the slot 762 is smaller than the smallest diameter in the range of expected diameters of the holding zone, so smaller than the smallest diameter than the lock is expected to retain. The holding zone comprises bone surrounded by soft tissue. The soft tissue can be compressed or otherwise deformed to some extent, so the holding zone of the carcass or carcass part can be arranged in the relatively narrow slot 762. The protrusion 765 reduces the risk of undesired release of the holding zone out of the locking part 764 of the slot 762.

In a possible embodiment of the conveyor device, stationary guides are arranged alongside the track that is followed by the carriers, and these guides can be set up to bring and support the leg part in an such orientation that it is presented to an operator in an ergonomically advantageous way. For example, the guides can pivot the leg part towards the operator and hold it in that position during processing. The flexibility of the soft tissue allows this to take place without the carcass part slipping relative to the locking plate 761.

When the guides release the carcass part again, the carcass part will return to its initial orientation relative to the carrier. This return can be caused or assisted by the elasticity of the soft tissue and/or by external influences, such as gravity or an other set of guides.

FIG. 17A shows a further embodiment of the locking plate 761 with the slot 762. FIG. 17B, C, D show possible cross sections A of locking plate 761. The locking plate shown in FIG. 17B, C, D can be the locking plate of FIG. 17A, or any other locking plate, in particular any other locking plate as shown in this patent application.

FIG. 17A indicates reference face 762a, end face 762b and opposite face 762c. Also, entrance faces 762d are indicated.

In the embodiments shown in FIG. 17B, C, D, the reference face 762a and the opposite face 762c have been provided with a bevelled or rounded edge. The purpose of these adaptations to the shape of these faces is to have one line (or surface) in contact with the carcass part instead of two. When these faces would be straight and perpendicular to the top face and bottom face of the locking plate, any swinging of the carcass part relative to the locking plate would result in the carcass part moving down relative to the locking plate. The swinging of the carcass part would result in the carcass part being alternatingly in contact with the top edge of the reference face 762a and the bottom edge of the opposite face 762c at one time and with the bottom edge of the reference face 762a and the top edge of the opposite face 762c at an other. This, in combination with gravity, makes that the carcass part more or less "walks" down relative to the locking plate 761.

This can be avoided by avoiding that swinging of the carcass part leads to alternating contact points between carcass part and locking plate.

One way of achieving this is to give the reference face 762a and/or the opposite face 762c a bevelled or rounded edge. The top of the rounded or bevelled face, which is in contact with the carcass part can be either located at or near halfway the thickness of the locking plate 761, as is shown in FIG. 17B and FIG. 17D. Alternatively, it can also be located near the top of bottom surface of the locking plate 761, as is shown in FIG. 17C.

Preferably, the shape of both the reference face 762a and the opposite face 762c is adapted to create one contact point, line or surface. However, it is also possible that just one of those two has an adapted shape.

In addition, also the end face 762b can be provided with and adapted shape, e.g. rounded or bevelled. If desired, this can also be done with the entrance faces 762d, for example if this is easier from a manufacturing point of view.

FIG. 21 shows a locking plate 761 in accordance with FIG. 17 and FIG. 20 being used in a carrier 750.

The carrier 750 is connected to two trolleys 772 via a connection plate 775. The trolleys 772 are connected to a drive chain 774. The drive chain 774 moves the trolleys over a track 773, that follows a path along a series of processing stations. In FIG. 21, the direction of transport of the trolleys 772, and therewith the direction of transport of the carrier 750 is indicated by arrow T.

In the carrier according to FIG. 21, the locking plate 761 as shown in FIGS. 17 and 20 is shown. The slot 762 of the locking plate 761 is arranged at an angle relative to the direction of transport T. Preferably, a carcass part is arranged in the slot 762 of the locking plate 761 in the way shown in FIG. 20. In that case, with the slot 762 arranged at an angle as shown in FIGS. 17 and 20, the carcass part has an initial spatial orientation that allows it to be presented to an operator in and ergonomically sensible way. If the processing is carried out automatically or semi-automatically, the initial orientation allows the carcass part to be orientated in a way that makes it easily accessible for the processing tools.

The carrier 750 in this example comprises two flanges 751, a hinge pin 753 and a bracket 754. The flanges 751 are connect to each other by strip 752 for additional stability. The bracket is connected to guide block 770, on top of which a rotation element 771 is arranged. The rotation element is rotatable around a vertical axis relative to the connection plate 775. When the rotation element 771 rotates relative to the connection plate 775, the elements of the carrier that are arranged beneath it (the guide block 770, the bracket 754, the hinge pin 753, the flanges 751, the strip 752 between the flanges and the locking plate 761) rotate with the rotation element 771.

In the embodiment of FIG. 21, the hinge pin 753 provides the possibility to rotate the locking plate 761 around an axis parallel to the part of the track 773 that the trolleys 772 are on. So, if the track 773 runs horizontally, hinge pin 753 allows rotation of the locking plate 761, and therewith of the carcass or carcass part that is held by the locking plate, around a horizontal axis.

The rotation or indexing element 771 provides the locking plate 761 with the possibility to rotate about an axis that is perpendicular to the part of the track 773 that the trolleys 772 are on. So, if the track 773 runs horizontally, hinge pin 753 allows rotation of the locking plate 761, and therewith of the carcass or carcass part that is held by the locking plate, around a vertical axis.

The rotation element 771 is used to control the orientation of the locking plate 761 of the carrier 750 with respect to rotation about the vertical axis (or an axis in the vertical plane and perpendicular to the part of the track 773 that the trolleys 772 run on if the track 773 does not run horizontally at that specific part). This can for example be achieved by giving the rotation element 771 a shape of the type shown in FIG. 22A. FIG. 22 A shows the top view.

The rotation or indexing element has a rotation centre C, four sides 776 and slots 777 extending inward from the corners between the sides in the direction of the rotation centre C. The four sides are arranged at different distances from the rotation centre C, as is indicated by the arrows a,b,c, and d in FIG. 22A.

Alongside the track, at fixed positions, one or more pins 778 are arranged. These fixed positions correspond to the positions along the track where the carrier has to be rotated by the rotation element 771. The distance of the pins relative to the track is such that upon passing of a carrier that moves in direction of transport T, a pin 778 becomes accommodated in one of the slots 777. Because this pin is stationary and the rotation element 771 is rotatable, the relative movement of the rotation element 771 in the direction of transport T and the pin 778 causes the rotation element 771 to turn over 90° in the direction of arrow R.

By using combinations of pins that are arranged at different distances from the track, either alone or in series, the rotation element 771 (and therewith the elements of the carrier that are arranged beneath it) can be rotated in steps of 90°. This makes that the locking plate has four rotational positions (in relation to rotation about an axis in an vertical plan perpendicular to the track) in which it can hold the carcass or carcass part. The flexibility of the soft tissue allows the carcass or carcass part to rotate around any of these four positions of the locking plate.

FIG. 22B shows another embodiment of the rotation element 771. In this embodiment, the rotation element 771 comprises two eccentric disks 779a, b that have a fixed position stacked onto each other. Together, the eccentric disks 779a, b are rotatable relative to base 779c about axis 779d. The axis is offset from the center of either disk. The relative position of the two eccentric disks 779a,b is shown in FIG. 22C, which shows a bottom view of the rotation element of FIG. 22B.

The base 779c is connected to two trolleys 772, that are in this example connected to drive chain 774 of an overhead conveyor, as is shown in FIG. 22D.

The position of the eccentric disks 779a, b relative to the base 779c is controlled by guides that are arranged alongside the path that is imposed upon the carriers by the overhead conveyor. The advantage of using the rotation element of FIG. 22B is that this rotation element allows a smooth rotational movement.

The rotation element 771 of FIG. 22B further comprises a locking element 779e. that cooperates with block 779f to temporarily lock the position of the eccentric disks 779a,b relative to the base 779c. Locking element 779e is actuated by guides or other elements arranged alongside the path that is imposed upon the carriers by the overhead conveyor to lock or unlock the position of the eccentric disks 779a,b relative to the base 779c.

FIG. 22D shows the rotation element of FIG. 22B used in a carrier of the type shown in FIG. 21. Although not shown in FIG. 22D, a guide block 770 as shown in FIG. 21 can be used in the carrier of FIG. 22D as well.

The skilled person will understand that FIG. 22 shows only two of the many possible ways to control the orientation of the carrier about an axis in a vertical plane perpendicular to the track.

At the level of the guide block 770, support guides can be provided against or between which the guide block 770 of the carrier can be led when the carrier moves along the track. The support guides support the carrier via the guide block 770 so that it does not rotate around the vertical axis (or the axis in a vertical plane perpendicular to the track if the track does not run horizontally at that specific location) under the influence of the forces that occur during processing.

FIG. 23 shows a loading station for arranging a carcass part into a carrier. In the example, the carrier as shown in FIG. 21 is used. In the loading station of FIG. 23, use is made of the ability of the carrier to rotate the locking plate 761 about hinge pin 753. The skilled person will understand that this loading station can also be used in combination with different carriers, as long as the carrier allows rotation about an axis parallel to the track and the lock is suitable for sliding in the carcass part from the side of the lock.

The loading station is adapted for use together with a plurality of carriers 750 that move along a track. For reasons of clarity, in FIG. 23 only one carrier is shown.

The loading station comprises a conveyor belt 780 and a guide 781. The top of the moving surface of the conveyor belt is adapted to move in the same direction as the direction of transport T of the carriers.

Initially, just before reaching the loading station, the carrier hangs down from the track under the influence of gravity or because it is actively positioned. When the carrier reaches the conveyor belt 780, the conveyor belt picks up the lower side of the carrier so that it comes to lie on the moving top surface of the conveyor belt.

In this position, the retaining assembly is turned upward, such that the open end of the slot 762 in the locking plate is upward. An operator then puts a carcass part on the conveyor belt 780. The holding zone of the carcass part is arranged lightly in the entrance part of the slot 762.

The conveyor belt moves the carcass part towards guide 781. The carrier moves along with it, having substantially the same speed. The carcass part comes into engagement with the guide 781, which forces the holding zone into the retaining portion of the slot 762 of the locking plate 761. This way, the operator does not have to apply force to move the holding zone of the carcass part 1 from the entrance portion into the retaining portion of the slot 762 in the locking plate 761. The elasticity of the soft tissue of the foot is utilized to clamp it into the slot. Optionally, a further external clamping force can be applied, but usually that will not be necessary.

FIG. 23A shows a further embodiment of the loading station according to the invention.

In the embodiment of FIG. 23A, the carcass parts 1 are received on a supply conveyor 1240. The carcass parts 1 arrive at the supply conveyor 1240 in a more or less random orientation. An operator 1200 working at the processing station grabs a carcass part 1 and arranges it with the lower part of the foot 1X in the entrance opening of the slot 762 of the carrier 750. The operator does not have to put the foot 1X entirely in the slot 762, just arranging it in the wide part of the entrance opening suffices.

The supply conveyor 1240 runs at about the same speed as the trolleys 772 with the carriers 750, so the carcass parts 1 move along with the carriers 750.

A rotating belt guide 781b supports the foot area of the carcass part 1 when it comes into engagement with guide 781. Guide 781a provides further support and guidance. Together, guides 781, 781a and 781b force the foot 1X into the slot 762 of the carrier 750.

By the time the carcass part 1 reaches the end of supply conveyor 1240, the foot 1X is securely positioned in the slot 762 of the carrier 750. The carcass parts falls of supply conveyor 1240, and the carrier hinges downwardly around hinge pin 753. The carcass part 1 is now suspended from carrier 750, and it is ready to be moved along the track 773 by the trolleys 772 and the drive chain 774.

In a possible variant to this embodiment, a weigher is arranged just upstream of the supply conveyor 1240, e.g. like is shown in FIG. 32***E1.

The same concept of moving the carcass part in or out of the locking plate 761 by means of guides can also be applied for transferring the carcass part form a carrier of a first conveyor device to a carrier of a second conveyor device, or in general from a first carrier to a second carrier.

The invention envisages a transfer station where pig leg parts or other carcass parts are transferred directly from the first conveyor to the second conveyor.

The conveyor devices are embodied such that at the transfer station the motion of the carriers of the first and second conveyors is synchronized so that a carcass part that is initially suspended from the retaining assembly of a carrier of the first conveyor device is transferred into the slot of the retaining assembly of a carrier of the second conveyor device, the carcass part remaining suspended in the transfer process by at least one of the retaining members.

As is preferred the transfer station comprises one or more ejection guides are arranged along the track of the first conveyor device, the ejection guide being arranged so as to contact the carcass part, preferably under the slot member, e.g. within 5 centimeters, the ejection guide forcing the carcass part out of said slot and into the slot of the carrier of the second conveyor device during passage of the part along the ejection guide.

As is preferred in the transfer station the paths of the retaining assemblies of the first and second conveyor are at different heights, and the retaining assemblies are brought during the transfer process in an overlapping position—when seen from above.

To do this, the locking plates of the two carriers are arranged such that the slots of the locking plates are more or less in line with each other. However, in general the locking plates will be arranged at a different height.

Figure 24B:
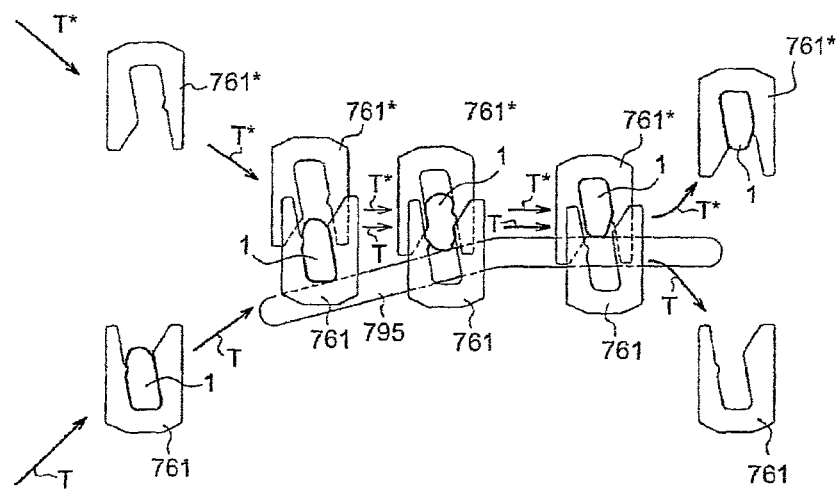

FIG. 24 shows this in side view (FIG. 24A) and in top view (FIG. 24B).

FIG. 24A shows a carcass part, such as a pig leg part that comprises the foot and at least a part of the leg of a pig, 1 that is transferred from a first carrier 750 to a second carrier 750*. Transfer guide 795 (shown only in cross section) moves the holding zone of the carcass part 1 out of the slot of the plate of the first carrier 750 into the slot of the plate of the second carrier 750*.

FIG. 24B shows this process in top view. For reasons of clarity, only the locking plates of the carriers are shown.

At the start of the transfer process, the plate 761 of the first carrier holds a carcass part 1 by the holding zone. The plate 761 of the first carrier and the locking plate 761* of the second carrier move towards each other.

The plates 761 and 761* are brought into a position in which they partly overlap and in which the slots of both plates 761, 761* are generally in line which each other. Transfer guide 795 comes into contact with the carcass or carcass part 1. The shape of the transfer guide 795 is such that it moves the carcass part 1 from the plate 761 of the first carrier into the plate 761* of the second carrier as the carriers move on in their direction of transport T, T*, as is illustrated in FIG. 24B.

When the carcass part 1 is arranged in the plate 761* of the second carrier, the carriers move away from each other again.

FIG. 25 shows a side view of a special embodiment of the carrier of FIG. 21. The reference numerals used for the difference parts in FIG. 25 correspond to those of FIG. 21.

In the embodiment of FIG. 25, the carrier is provided with a cam follower 787, that runs into a cam track 786 that is arranged along at least a part of the path that is followed by the carrier 750. The cam track 786 prescribes the position of the cam follower 787 when the carrier 750 is moved along the track 773. Therewith, the rotation of the plate 761 about hinge pin 753 can be controlled.

As is preferred the cam follower 787 is arranged on the strip 752 that connects the flanges 751. The skilled person will understand that the cam follower could alternatively be arranged at a different location on one or more of the flanges or other position of the movable part of the carrier.

FIG. 25 also illustrates the preferred embodiment wherein one or a pair of parallel support guides 785 is arranged at a stationary location along the track 773, preferably at a processing station where a carcass part held by the carrier is processed. The guide or guides 785 are adapted to cooperate with passing carriers, in particular such that a guide block 770 of a carrier 750 slides along the guide 785 or between the pair of spaced apart parallel guides 785. The guide 785 or pair of guides 785 is designed to prevent rotation of the carrier around a vertical axis, as well as to prevent sideways movement of the part of the carrier above the guide block 770. In a simple embodiment each guide 785 is a linear bar of low friction material, e.g. plastic.

FIG. 25* shows a further embodiment of a trolley 772 with a carrier 750 according to the invention. In FIG. 25*, a carrier according to the third aspect of the invention is shown, but instead a carrier according to the first or second aspect of the invention could be used in this embodiment.

Just like in the embodiment of FIG. 25, the embodiment of FIG. 25* comprises a pair of spaced apart parallel support guides 785, between which guide block 770 of the trolley runs. In the embodiment of FIG. 25*, the trolley 772 has been provided with rollers 788. The rollers 788 are arranged on both sides of the guide block 770, such that they too run between the support guides 785. When the guide block 770 is in the position shown in FIG. 25*, the rollers preferably do not touch the support guides 785.

Due to forces exerted on the trolley during the processing of a carcass part that is held by the carrier, in the embodiment of FIG. 25, the guide block 770 can be pulled against one of the support guides 785 or it could be tilted such that its upper edge on one side is pushed against one support guide 785 and its lower edge on the opposite side is pushed against the other support guide. This leads to undesirable friction between the guide block 770 and the support guides 785, excessive wear and increase power consumption for the drive system that moves the trolleys along the track.

In the embodiment of FIG. 25*, in such a situation, the guide block 770 will not come into direct sliding contact with the support guides 785. Instead, one or more of the rollers 788 will engage one or both of the support guides 785.

As is preferred the rollers 788 are spherical rollers having a greater diameter in the center than at the ends of the roller.

The rollers 788 prevent excessive mechanical loads on the support guides 785. As the guide block 770 provide with rollers does not come into sliding frictional contact with the support guides 785, the guide block 770 also does not become subjected to excessive mechanical loads and resulting wear.

Due to the ability of the rollers 788 to rotate around their axis of rotation 789, excessive friction between parts of the trolley and the support guides 785 is prevented. This reduces the wear of both the trolley and the support guides 785. It also reduces the power consumption of the drive system of the trolleys.

Preferably, there is some clearance between the rollers 788 and the support guides 785 when the guide block 770 is in a neutral position (that is: when the guide block is not pushed or pulled out of its position straight below the track 773). This way, there is no friction between the trolley and the support guides when the guide block 770 is in its neutral position, which prevents unnecessary wear and unnecessary power consumption of the drive system.

However, it is also possible that the system is laid out such that there is contact between the rollers 788 and the support guides 785 when the guide block is in its neutral position. This way, additional support is provided for the trolley.

Another aspect of the embodiment of FIG. 25* is that the cam follower 787 and the cam track 786 are arranged differently than in the embodiment of FIG. 25. The skilled person will immediately recognise that the arrangement shown in FIG. 25* is interchangeable with the arrangement of cam follower and cam track as shown in FIG. 25. The arrangement of the cam follower and cam track can be chosen independently from the arrangement of the guide block and support guides. It is also possible that no cam track and cam follower are used to control the orientation of the carrier.

FIG. 25 shows a further embodiment of a trolley 772 with a carrier 750 according to the invention. In FIG. 25, a carrier according to the third aspect of the invention is shown, but instead a carrier according to the first or second aspect of the invention could be used in this embodiment.

Just like in the embodiment of FIG. 25, in FIG. 25** a pair of parallel support guides 785 is provided, between which guide block 770 of the trolley runs. And just like in the embodiment of FIG. 25*, in the embodiment of FIG.

25 rollers 788 are provided. However, in the embodiment of FIG. 25**, the rollers 788 are not mounted on the trolley but on the support guides 785**.

FIG. 25 shows what happens when the guide block 770 is pulled out of its neutral position. This situation could for example occur when the carcass part 1 is tilted to a processing position by product guides 790, and the hinge formed by hinge pin 753** is jammed.

In the situation shown in FIG. 25, the guide block 770 is tilted relative to the rest of the trolley. The guide block 770 then comes into contact with the rollers 788**, and high mechanical loads and excessive friction is prevented.

FIG. 25 shows a further possible embodiment of a trolley having rollers 788. In this embodiment, the rollers are not arranged next to each other, when seen in the direction of transport, but one downstream of the other. In this embodiment, the guide block can even be dispensed with, if desired. The rollers 788' are mounted on wheel support 784. For reasons of clarity, the support guides 785 are not shown in FIG. 25***, only in FIG. 25*****A.

FIG. 25*A shows a roller 788' from a different angle, and how it is positioned relative to both support guides 785**.

Preferably, there is some clearance between the rollers 788 and the support guides 785 when the top of the carrier is in its neutral position (that is: when the part of the carrier just below the trolley is not pushed or pulled out of its position straight below the track 773). This way, there is no friction between the trolley and the support guides when the top of the carrier is in its neutral position, which prevents unnecessary wear and unnecessary power consumption of the drive system.

In this embodiment, the placement of the rollers 788' makes that they are able to take up not only tilting of the carrier around a horizontal axis parallel to the direction of the track, but also rotation of the carrier around a vertical axis.

In the embodiment of FIG. 25*, a rotational element 771 is present. In this embodiment, the rotational element is a Geneva drive wheel. In the embodiment shown in FIG. 25***, the wheel support 784 is mounted in a fixed position relative to the trolley 772. The Geneva drive wheel 771 and the carrier 750 are rotatable relative to the trolley 772**.

The embodiment of FIG. 25* is provided with means for locking the position of the Geneva drive wheel 771 relative to the trolley 772. This allows the Geneva drive wheel 771** to bring the carrier with the carcass part in the right orientation for carrying out a processing step before reaching the processing station in which that processing step will be carried out. When the carrier is in the right orientation, the Geneva drive wheel can be locked at least for the duration of the processing step. This way it is prevented that the processing forces cause rotation of the Geneva drive wheel, therewith taking the carcass part out of its right orientation. Preferably, the orientation of the Geneva drive wheel remains locked until a different orientation of the carcass part, and therewith of the carrier, is required.

In the embodiment shown in FIG. 25*, the Geneva drive wheel 771 is provided with a protrusion 771a, that has four notches 771b. At the wheel support 784, a cantilever is mounted, which has a first arm 782a, a second arm 782b and a rotation axis 783. The wheel support 784 has a notch 784a, which in any of the four positions of the Geneva drive wheel 771 is aligned with one of the notches 771b in the protrusion 771a** of the Geneva drive wheel.

The first arm 782a of the cantilever 782 has a tip 782c that fits into the mutually aligned notches 784a and 771 b. When the tip 782c is in the mutually aligned notches 784a and 771 b, the Geneva drive wheel 771 cannot rotate relative to the wheel support 784. Therewith, rotation of the carrier 75 relative to the trolley 772 is prevented.

When the carrier has to be brought into a different orientation, the tip 782c of the first arm 782a has to be taken out of the mutually aligned notches 784a, 771b. To achieve this, the cantilever 782 is actuated, such that it is rotated around its axis 783. The actuation of the cantilever can be achieved by engaging the second arm 782b of the cantilever. By pushing the second arm 782b inwardly, (so, towards the rollers 788') the tip 782c of the first arm 782a of the cantilever comes out of the notches 784a, 771 b. The Geneva drive wheel 771 can then be brought into one of its other three orientations.

When the Geneva drive wheel 771 (and therewith the carrier 750) is in its desired orientation, again one of the notches 771b in the Geneva drive wheel's protrusion 771a is aligned with the notch 784a in the wheel support 784. The cantilever 782 then is moved back into the position shown in FIG. 25*, with the tip 782c into the aligned notches 771b and 784a**. The orientation of the Geneva drive wheel relative to the trolley is then locked again.

The cantilever 782 can be actuated in many alternative ways. For example, it is possible that a guide element, stationary positioned alongside the track 773 engages the first or second arm of the cantilever at the desired moment, or at the desired point along the track 773. It is also possible that such a guide only engages the second arm to take the tip 782 out of the notches, and that a spring rotates the cantilever back to the position in which the tip is in the notches.

FIG. 25*B shows a variant of the embodiment of FIG. 25***. In the embodiment of FIG. 25***B, the carrier 750** is attached to two trolleys instead of to a single trolley.

The skilled person will understand that features of the embodiments of FIG. 25* and FIG. 25***B, like the two rollers 788'** and the locking mechanism for the Geneva drive wheel can also be applied in other carriers and/or with other trolleys or other transport systems, either together or alone.

FIG. 25#A shows a further embodiment in accordance with the invention. In this embodiment, the carrier 750 is not connected to a trolley but to a connector plate 792. The connector plate connects the carrier 750 to a conveyor system.

FIG. 25#B shows the embodiment of FIG. 25#A in combination with a chain conveyor system 1500. The conveyor system of FIG. 25#B comprises a chain 1501, which is guided over chain wheels 1502. The connector plate 792 is connected to the chain 1501. FIG. 25#B shows a simple layout of the conveyor, but the skilled person will understand that it is possible that the chain is laid out in a more complicated path.

FIG. 25#C shows a different conveyor which can be used in combination with the embodiment of FIG. 25#A. In this case, the conveyor comprises a guide beam 1510, which has a slot 1511 at the top. Guide wheels 1512 are attached to the connector plate 792. The shafts on which the guide wheels 1512 are mounted run through the slot 1511 in the guide beam 1510. In FIG. 25C only a straight guide beam is shown, but the skilled person will understand that the guide beam can be curved as well.

FIG. 25#D shows the embodiment of FIG. 25#D applied in a processing station, with an operator 1200 processing a carcass part 1.

The skilled person will understand that also other carriers can be applied in the embodiments of FIG. 25#A-D.

FIG. 26 shows the carrier of FIG. 21 being applied in a system for processing carcass parts, such as hams or fore-ends. The skilled person will understand that the system of FIG. 26 can be used for other carcass parts as well.

In the system of FIG. 26, a track 773 is provided, over which trolleys 772 run. The trolleys 772 are driven by a drive chain 774.

The system further comprises a plurality of carriers 750. Each of the carriers 750 is connected to one or more trolleys 772. Each of the carcass parts 1 to be processed is arranged in a carrier 750, which transports the carcass parts 1 to and along processing stations. In FIG. 26, T indicates the direction of transport.

In FIG. 26, such a processing station is shown. In this processing station, three operators 700 perform manual operations on the passing carcass parts 1. For example, they cut loose a piece of meat or they sever a bone or a part thereof from the surrounding tissue.

Before entering the processing station, the rotational element 771 of the carriers (see e.g. FIG. 21) brings the carcass parts 1 in a suitable orientation with respect to rotation about the vertical axis.

Between the track 772 and the operators 700, product support guides 790 are arranged. The product support guides 790 are positioned and shaped such that they engage the carcass parts 1 upon entrance in the processing station, and that they subsequently bring the carcass parts 1 into an orientation with respect to rotation about the hinge pin 753 that is suitable for the operation that the operators are to carry out.

In known systems, the operator had to pick up a carcass part and position it himself. This of course takes time. Also, the handling of the usually relatively heavy carcass parts puts physical strain on the operators. By offering the carcass parts 1 to the operators already in a position that is suitable for the processing that they have to perform, time is saved and the work of the operators 700 is improved from an ergonomic point of view.

In addition, in the system of FIG. 26, the operators can use both hands for carrying out the operation on the carcass parts. For example, they can grab the carcass part and tension it with one hand and make the cut with a knife they hold in their other hand. This is a natural way of performing such an operation, which has shown to lead to shorter learning periods for the operators 700.

In FIG. 26 is shown that between the operators 700 and the carcass parts 1, a fence 791 is arranged. The height of this fence is such that the operators can lean against this fence when working. This helps the operator 700 to focus on the cutting action, which makes the work easier to learn and easier to do.

In a particular embodiment of the system of FIG. 26, the processing system is used for deboning. In that case, it is advantageous if at least one of the product support guides 790 is arranged at the level of a joint of a bone to be removed. That way, the operator can bend the joint open over the product support guide 790. As the product support guide 790 is relatively small in diameter, the operator can bend open the joint over a significant angle, which allows him to reach the tissue behind the joint better then when he would for instance bend the joint over the edge of a table. Cutting through the tissue behind the joint facilitates the deboning process.

The product support guides 790 can be used in combination with any of the carriers according to the invention. It is not necessary that the carrier itself allows rotation; it is also possible that the carcass part is rotated relative to the carrier when it comes into engagement with the product support guides 790.

FIG. 26* shows two trolleys 772, each having a carrier 750 attached thereto. The trolleys are both connected to drive chain 774, which moves the trolleys 772 along track 773. Each carrier 750 carries a carcass part 1, such as a pig leg part that comprises the pig foot and at least a part of the pig leg.

At some point along the track, product support guides 790 are arranged. When a carcass part 1 comes into engagement with the product support guides, it is brought into a position in which an operator can ergonomically carry out a process (e.g. as shown in FIG. 26) or in which an automatic processing station can carry out a process.

When the carcass part 1 is moved over the product support guides 790 in the direction of transport T due to the motion of the trolleys 772 over the track 773, friction occurs between the carcass part 1 and the product support guides 790. Before the carcass part 1 comes into engagement with the product support guides 790, the carcass part 1 hangs down vertically from the carrier 750, as is shown on the left in FIG. 26*. When the carcass part 1 comes into engagement with the product support guides 790, it is not only tilted in the direction perpendicular to the product support guides (as is shown in FIG. 26) but also in the plane of the product support guides 790. This is shown on the right in FIG. 26*, by the angle $\gamma$ between the carcass part 1 and the vertical plane V (which extends in a vertical direction perpendicular to the product support guides).

In many cases, this will not be a problem. When an operator carries out a process in a processing station, he can most likely still carry out his process. However, it could be that he has to carry out the process with his body in a not so ergonomical position.

In some cases however, the carcass part 1 dragging behind relative to the carrier and trolley due to the friction between the carcass part and the product support guides cause problems. This is in particular the case when the process in the processing station is carried out automatically. In such a case, the position of the carcass part 1 relative to the tools of the processing station has to be precisely known, otherwise the process cannot be carried out accurately enough.

This problem can be solved in several ways. First of all, it is possible to make the product support guides 790 move along with the carcass part 1 in the carrier 750. This can for example be achieved by replacing the stationary product support guides shown in FIG. 26 and FIG. 26* by an auxiliary conveyor as shown in FIG. 28 (reference numeral 801 in FIG. 28).

An other way of providing product support guides that move along with the carcass parts is to use circular (or at last loop-shaped) product support guides and to mount them on a vertical axis that allows rotation of the product support guides around that axis. This is shown in FIG. 26**.

FIG. 26** shows a frame 1101, in which a rotatable shaft 1102 has been mounted. To this rotatable shaft 1102, circular product support guides 1103 have been mounted. The circular product support guides could all have the same diameter. In that case, the hold the carcass part in a vertical position against the forces exerted on the carcass part when the process is carried out. It is however also possible that the circular support guides 1103 have different diameters, e.g. the top one having a relatively small diameter, the middle one having a somewhat larger diameter and the bottom one having the largest diameter. That way, the carcass parts are tilted towards the operator that carries out the process.

In the embodiment of FIG. 26**, the carriers 750 are attached to trolleys 772. The trolleys run over track 773 and are connected to each other by a drive chain (not shown).

The drive chain runs over corner wheels 1110, so that the trolleys follow the track 773, that is curved in the vicinity of the circular product guides 1103. The corner wheels 1110 work in the same way as when carrousel machines are applied in a processing line.

It is possible that one or more of the circular product support guides 1103 are provided with stops 1104. These stops 1104 can be pins, blocks or other kinds of protrusions. They make sure that the carcass parts 1 maintain their desired position relative to the product support guides 1103.

A different approach is to adapt the carriers in such a way that the carriers prevent that the carcass parts 1 tilt away from their desired position. A possible way of achieving that is shown in FIG. 26*.

FIG. 26* shows a modified version of the carrier of FIG. 21. The skilled person will understand that the same or a similar modification can also be carried out on the other carriers according to the invention.

FIG. 26* shows a brace 1120 that has been attached to the carrier 750. The brace 1120 loops down from the locking plate 761, and then back, so that it extends behind the carcass part when a carcass part is present in the carrier.

The brace 1120 is provided with protrusion 1121, that is arranged perpendicular or ant an angle to the track 773. When a carcass part that is in the carrier tilts away to some extent in the direction opposite to the direction of transport T, the protrusion 1121 comes into engagement with the carcass part and prevents it from tilting away further.

The skilled person will understand that the brace 1120 can be attached to the carriers in different ways and at different locations. The brace can be moveable relative to the rest of the carrier or maintain a fixed position relative to the carrier. In the brace is moveable, its position can e.g. be controlled by stationary guides that are arranged adjacent to the track that the carriers follow.

FIG. 26X shows the embodiment of FIG. 26 being applied for deskinning, derinding and/or removal of fat. The skilled person will understand that the method for removal of skin, rind and/or fat described below can as an alternative be carried out using other types of carriers according to the invention. The carcass part processed in FIG. 26X could for example be a pig leg part, comprising a pig foot and at least a part of the pig leg.

When an operator removes skin, rind and/or fat, he usually uses a wizard knife or an other dedicated tool. The operator starts by making the wizard knife or tool come into engagement with the carcass part. According to the prior art, he would start at the part away from the foot area. So, if the carcass part hangs down from the foot as in the situation of FIG. 26X, he would according to the prior art start at the bottom, and then move the wizard knife or other tool upwards, in the direction of arrow P.

Carrying out the deskinning, derinding and/or fat removal this way requires that the operator holds the carcass part he processes with one hand. Because of the upwardly directed processing force, the carcass part will be inclined to shift position and move relative to the carrier.

Also, the deskinning, derinding and/or fat removal starts at an area that is relatively soft and flexible. Therefore, the tissue in the outer layers of the carcass part will move before the wizard knife or other tool catches a grip on it. This is inconvenient, reduces accuracy and could lead to safety issues.

In the process for deskinning, derinding and/or fat removal according to the invention, the wizard knife or other tool first engages the carcass part just below the carrier, preferably in the area between the carrier and the knee or elbow. In this area, the carcass part is rather rigid, as only thin layers of meat, fat and rind are present there. By bringing the wizard knife or other tool into engagement with the carcass part in this area, the wizard knife or other tool almost immediately grips into the carcass part.

Then, in accordance with the invention, the operator moves the wizard knife or other tool downwards, in the direction of arrow D in FIG. 26X. The downwardly directed force this brings about makes that the carcass part retains it position relative to the carrier. The product support guides 790 (if present) also support the carcass part against the processing forces, preventing the carcass part to be pushed away by processing forces.

As a consequence, the operator no longer has to actively hold the carcass part in the right position during deskinning, derinding and/or fat removal. This reduces the physical strain on the operator.

In an advantageous embodiment of the method for deskinning, derinding and/or fat removal according to the invention, a reference cut 799 is made into the carcass part at the location where the wizard knife or other tool first engages the carcass part, so just below the carrier, preferably in the area between the carrier and the knee or elbow. This reference cut 799 can then be used as a starting point for the deskinning, derinding and/or fat removal.

The reference cut 799 makes it even easier for the wizard knife or other tool to grip the carcass part upon engagement, and it also makes sure that all carcass parts are deskinned, derinded and/or defatted from the right area on.

In the system shown in FIG. 26X, the reference cut 799 can be made automatically, by arranging a stationary knife or rotary cutter at the right height next to the track 773, upstream of the processing stations in which the deskinning, derinding and/or fat removal is carried out.

FIG. 26X-1 shows a manual deskinning process in accordance with the invention in more detail. The carcass part processed in FIG. 26X-1 could for example be a pig leg part, comprising a pig foot and at least a part of the pig leg.

In the deskinning processing station, carcass part 1 is preferably supported by support guides 790. The support guides 790 bring the carcass part 1 in a position in which the operator 1200 can easily perform the deskinning process. Also, the support guides 790 support the carcass part 1 against the processing forces that the deskinning brings about.

In the manual deskinning process, the operator 1200 uses a deskinning tool 1520. In the deskinning process according to the invention, the operator 1200 starts the process by bringing the deskinning tool 1520 in contact with the carcass part 1 in the area S, just below the carrier. From there, the deskinning tool is moved downward in direction D, towards the wide part of the carcass part 1. Skin parts 1Y are removed during this process, and preferably they drop down onto a conveyor or in a container.

FIG. 26X-2 shows a fat removal process in accordance with the invention. The carcass part processed in FIG. 26X-2 could for example be a pig leg part, comprising a pig foot and at least a part of the pig leg.

Again, carcass part 1 is preferably supported by support guides 790. The support guides 790 bring the carcass part 1 in a position in which the operator 1200 can easily perform the fat removal process. Also, the support guides 790 support the carcass part 1 against the processing forces that the fat removal brings about.

In the manual fat removal process, the operator 1200 uses a fat removal tool, such as a wizard knife 1521. In the fat removal process according to the invention, the operator 1200 starts the process by bringing the fat removal tool 1521 in contact with the carcass part 1 at the highest point of the area of the carcass part from which the fat needs to be removed. The "highest point" is to be understood as the highest point of the area to be processed as it is presented to the operator. As the carcass part 1 will usually be presented to the operator with the foot directed upward, so the highest point of the area to be processed as presented to the operator would be the lowest point of that area if the carcass part would be in its natural position (with the foot down).

In case of fat removal, it could very well be that the area to be processed does not extend to the part of the carcass part between the knee or elbow and the carrier. In that case, in accordance with the invention, preferably the first contact between the fat removal tool and the carcass part is simply at the highest point of the area to be processed, seen in the position of the carcass part as presented to the operator.

When the fat removal tool 1521 is brought into engagement with the carcass part 1, it is moved in downward direction D, towards the wide part of the carcass part 1. Fat 1Y is removed during this process, and preferably it drops down onto a conveyor or in a container.

FIG. 26X-3 shows a semi-automatic derinding tool 1522, which is arranged on a support 1523. In this embodiment, the carrier 750 takes the carcass part 1 over the derinding tool 1522. Preferably, an operator (not shown) makes sure that the right part of the carcass part comes into contact with the derinding tool 1522 and that the right force is applied.

The carcass part processed in FIG. 26X-3 could for example be a pig leg part, comprising a pig foot and at least a part of the pig leg.

FIG. 26X-4 shows an embodiment of a processing station making a reference cut 799, which reference cut could for example be used as a starting point for deskinning, derinding and/or fat removal.

The carcass part processed in FIG. 26X-4 could for example be a pig leg part, comprising a pig foot and at least a part of the pig leg.

In this embodiment, the device 1530 for making a reference cut comprises a single rotating disk knife 1531 which is mounted on a moveable arm 1532. The device is mounted onto the frame 1201 of the processing station.

The carcass parts 1 are lead through the processing station by the carriers 750. The path the carriers follow makes that the carcass part 1 comes into engagement with the rotating knife 1531. Spring 1533 makes that an appropriate force is applied when making the cut.

The moveable arm 1532 is rotatable about a vertical axis. This allows the rotating disk knife 1531 to maintain the proper cutting depth over the entire length of the cut.

In the embodiment of FIG. 26X-4, the reference cut is made on one side of the carcass part.

FIG. 26X-5 shows an embodiment of a processing station in which a reference cut can be made on both sides of the carcass part. The cuts can be mutually aligned so that in fact a single cut is formed around the carcass part, but this is not necessary.

The embodiment of FIG. 26X-5 is a double version of the embodiment of FIG. 26X-4: it comprises two rotating disk knives 1531a,b, which each are mounted on a moveable, spring loaded arm 15321,b. The rotating disk knives are mounted on either side of the path that the carcass parts follow. Preferably, the rotating disk knives are mounted at the same height.

FIG. 26X-6 shows a processing station for manually detaching (either partly or entirely) a shoulder blade Z from a carcass part 1. The carcass part processed in FIG. 26X-6 could for example be a pig front leg part, comprising a pig foot and at least a part of the pig front leg.

The detaching of the shoulder blade Z, even in case of a partial detachment, requires a lot of force. Therefore, even in the manually process, a shoulder blade detachment tool 1540 is used.

A carrier 750 brings the carcass part 1 to be processed to the shoulder blade detachment processing station. In this embodiment, preferably support guides 790 make sure that the carcass part is presented to the operator 1200 in an appropriate orientation.

Fully or partly detaching the shoulder blade requires that the operator pulls the shoulder blade towards him. This means that the support guides 790 cannot provide support to the carcass part against the processing forces in this case. Therefore, an additional product support guide 790* is provided, that is arranged over the carcass part. So, the carcass part 1 is held between the product support guides 790 and the additional product support guide 790*.

At the start of the detaching process, the operator arranges pulling plate 1541 of the shoulder blade detachment tool 1540 behind the shoulder blade. By pulling the trigger 1542 of the tool 1540, the pulling plate 1541 moves towards the operator 1200 and pulls the shoulder blade Z at least partly loose from the carcass part 1. The carcass part 1 is held in position by the additional product support guide 790*.

Tool 1540 pulls the shoulder blade largely free from the carcass part. Any remaining connections between the shoulder blade and the rest of the carcass part can later by cut through with a knife.

In a further embodiment of the invention, an automatic foot cutter is arranged next to the track, for cutting off the foot or the low part of the foot just above of just below the carrier. The automatic foot cutter preferably comprises a rotating disk knife or a scissors-like cutter.

FIG. 26X-7A-FIG. 26X-7C show an embodiment of such an automatic foot cutter 1550. The carcass part processed in FIG. 26X-7A-FIG. 26X-7C could for example be a pig leg part, comprising a pig foot and at least a part of the pig leg.

In the embodiment of FIG. 26X-7A-FIG. 26X-7C, the automatic foot cutter is arranged at the end of a deboning processing line. So, largely all meat has been removed from the carcass parts 1 as they arrive at the automatic foot cutter 1550. At this point, the carcass part merely comprises a foot F and some bone B.

Carrier 750 takes the carcass part 1 to the foot cutter 1550 by moving it in the direction of transport T. The foot cutter comprises an actuator 1551 and a cutter 1552. The actuator can for example be a pneumatic or hydraulic cylinder.

In FIG. 26X-7A it is shown that the carcass part 1 approaches the foot cutter 1550. FIG. 26X-7B shows that the foot has been brought between the two jaws of the cutter 1552 by the carrier 750. The foot cutter 1550 rotates around axis 1553 in order to follow the movement that the carrier 750 imposes on the carcass part 1.

FIG. 26X-7C shows that the actuator 1551 has actuated the cutter 1552 by bringing together the jaw parts of the cutter 1552. The cutter has cut off the bone B from the foot F.

The foot cutter can for example be used to remove the carcass part from the carrier. In an alternative embodiment, the foot cutter only cuts through the soft tissue of the foot, not through the bone. After that, it is easy to remove the foot from the carrier.

In the embodiments of FIGS. 26X1 to 26X-7, carriers according to the third aspect of the invention are shown. The skilled person will understand that as an alternative, other carriers can be used as well.

FIGS. 27A-27C show a carrier 50 according to the first aspect of the invention, indicating possible degrees of freedom R1, R2, R3 for the lock 30. As FIGS. 27A-27C show, these degrees of freedom R1, R2, R3 can all be realised in a single embodiment of the carrier 50. It is on the other hand also possible that only one or two of these degrees of freedom are provided.

FIG. 27A shows that rotation in the direction R1 can be realised by providing a vertical rotation axis 47.

FIG. 27B shows that rotation in the direction R2 can be realised by providing a horizontal rotation axis 41, directed substantially in the direction of track 62 of the transport system 60.

FIG. 27C shows that rotation in the direction R3 can be realised by providing a horizontal rotation axis 43, directed substantially perpendicular to the direction of track 62 of the transport system 60.

In the embodiment of FIGS. 27A-27C, each carrier 50 is carried by two trolleys 61 of the conveyor device or transport system 60, so that the weight of the carcass or carcass part is carried by two trolleys instead of one. This reduces the mechanical requirements for the trolleys.

In the embodiment of FIGS. 27A-27C, the retaining assembly is arranged such that the carcass or carcass part comes to hang substantially in a center pane between the two trolleys 61. This way, the mechanical load is divided evenly between the two trolleys and no additional moment is exerted on the carrier and the transport system. In general, it is advantageous if the centre of gravity of the carcass or carcass part is arranged in line with the centre line of the trolley or set of trolleys that carry the weight of the carcass or carcass part.

The skilled person will understand that the features of the degrees of freedom, each carrier being carried by a plurality of trolleys and the aligning of the centre of gravity or the carcass or carcass part with the centre line of the (set of) trolley(s) do not have to be combined in a single embodiment. They can be used independently from each other.

The skilled person will also understand that the embodiment of FIGS. 27A-27C or some of its features can be used in combination with a carrier according to other aspects of the invention as well.

FIG. 28 shows carriers according to the invention in use in a system for processing carcass parts 1 of slaughtered porcine, bovine, ovine, or caprine animals. The skilled person will understand that in the embodiment of FIG. 28, instead of or in addition carriers according to other aspect of the invention can be used as well. The carcass part processed in FIG. 28 could for example be a pig leg part, comprising a pig foot and at least a part of the pig leg.

The system according to the FIGS. 28 to 37 are in particular advantageous when processing carcass parts that have been subjected to a cooling process during which cooling process the carcass parts were still covered with skin.

In the embodiment of FIG. 28, each of the carriers 50 is connected to two trolleys 61 of transport system 60. Between the carriers 50 some empty trolleys 61 are present, in order to obtain the desired pitch between subsequent carriers 50. It is however not necessary that these empty trolleys are there. The transport system 60 moves the trolleys and the attached carriers along the track 62 in the transport direction T.

An operator 800 is present in a processing station 810 along the track 62. In this particular processing station, two parts of the carcass part are cut off manually, using knife 804. One part that is cut off is waste, the other part is a meat cut for human consumption.

In front of the operator, a funnel 811 is arranged, which is connected to a vacuum transport system. The vacuum system comprises discharge tube 812. When the operator 800 has cut off the waste piece, he drops it into the funnel 811. A valve 813 opens, e.g. after actuation by the operator by means of switch 814 in front of him, which causes a vacuum to be applied. By this vacuum, the waste piece is drawn into discharge tube 812 and transported to waste.

Arranging the funnel 811 right in front of the operator is in accordance with the fourth aspect of the invention. Here, the funnel 811 together with the vacuum system forms a secondary conveyor for transporting the waste piece away from the processing station 810.

Arranged next to the operator 800 is a second secondary conveyor 820. When the operator has cut off the meat cut for human consumption he puts it onto the second secondary conveyor 820. This conveyor 820 takes the meat cut away from the processing station and brings it to storage, to a packaging department or to an area where subsequent processing is performed.

In this set up, the removed meat pieces are removed from the transport system right at the processing station where they were cut loose from the rest of the carcass part. This is advantageous compared to known systems wherein pieces that are cut loose are transported along with the rest of the carcass part to an end station, where the different types of products and/or rest material is sorted and distributed further. The logistics of the system according to FIG. 28 are far more efficient, because the sorting action does not have to take place any more.

Below the track 62 of the main transport system 60, an auxiliary conveyor 801 has been arranged. The auxiliary conveyor 801 comprises support blocks 803, that are connected by a chain 803. Instead of a chain, a cable could be used. Arrow $T_{aux}$ indicates the direction of transport of the support blocks 803.

Some distance upstream of the processing station 810, the auxiliary conveyor 801 is arranged so far below the track 62 of the main transport system 60 that the carcass parts 1 in the carriers 50 do not come into contact with the auxiliary conveyor 801. This can be seen in FIG. 28, where the carcass part 1 on the right hangs free from the auxiliary conveyor 801.

Closer to the processing station 810, the auxiliary conveyor 801 slopes upwardly, such that the support blocks 803 come into contact with the carcass part above them. The upward movement is continued. This causes the support blocks 803 of the auxiliary conveyor 801 to tilt the carcass part 1 and lock 30 of the carrier 50 to tilt around rotation axis 41. This is shown in FIG. 28, with respect to the carcass part 1 in the middle.

The carcass part 1 is presented to the operator 800 at the processing station 810 at an ergonomically sensible height and with the face of the carcass part into which he has to make the cuts directed towards him, and positioned and oriented such that the operator 800 can make cuts without having to make unnatural, complicated or otherwise strain causing movements of his body.

Not shown in FIG. 28, downstream of the processing station 810, the auxiliary conveyor releases 801 the carcass parts again, so that they return to their initial position as shown by the right carcass part 1 in FIG. 28.

If necessary, after that the carcass parts are turned around the vertical axis 47 in order to make a different face of the carcass part face the next processing station.

FIG. 29 shows a further use of carriers according to invention in a system for processing carcass parts 1. The skilled person will understand that in the embodiment of FIG. 29, instead of or in addition thereto features of carrier of other aspects of the invention can be used as well.

FIG. 29 shows an operator 800 being present in a processing station 810, along the track 62 of transport system 60. Trolleys 61 run over the track 62 with a carrier 50 attached to it. The carrier 50 carries a carcass part 1. The operator 800 has a knife 804 for manually making a cut in the carcass part 1. After he has cut loose a part from the carcass part 1, he can put this removed part onto discharge conveyor 850, which is arranged in front of him, as a secondary conveyor in accordance with the fourth aspect of the invention.

The carcass part processed in FIG. 29 could for example be a pig leg part, comprising a pig foot and at least a part of the pig leg.

In the embodiment of FIG. 29, the carrier 50 is provided with an arm 830 to which a cam follower 831 is connected. The carrier 50 is pivotable around axis 833 relative to the trolley 61. At the processing station 810, a guide 832 with a cam track 834 is arranged. The guide 832 and cam track 834 are such that they catch the cam follower 831 of a carrier 50 approaching the processing station 810.

The carcass part 1 is transported to the processing station 810 with its longitudinal axis substantially vertical. This is indicated in FIG. 29 in phantom. When the carcass part 1 approaches the operator 800, the cam track 834 changes direction such that it prescribes a downward movement of the cam follower 831. With in this case the lock being fixed relative to the rest of the carrier, this downward movement of the cam follower 831 results in the carcass part 1 being tilted towards the operator 800. The thus obtained tilted position of the carcass part 1 is shown in solid lines in FIG. 29.

The tilted position is preferably such that the carcass part 1 is presented to the operator 800 at the processing station 810 at an ergonomically sensible height and with the face of the carcass part into which he has to make the cuts directed towards him, and positioned and oriented such that the operator 800 can make cuts without having to make unnatural, complicated or otherwise strain causing movements of his body.

After the operator 800 has made his cuts or performed his other operations on the carcass part 1, the cam tack 834 slopes upward again, bringing the carcass part 1 back into its initial orientation.

FIG. 30 shows a further use of carriers according to the first aspect of the invention in a system for processing carcass parts 1. The skilled person will understand that in the embodiment of FIG. 30, instead of or in addition thereto features of the carriers according to other aspects of the invention can be used as well.

In FIG. 30, the transport system 60 with track 62 and trolleys 61 is not shown for reasons of clarity. However, the same system as shown in FIG. 28 and FIG. 29 can be used. T indicates again the direction of transport of the carriers 50, as imposed by the transport system 60.

In FIG. 30, two subsequent processing stations 840, 810 are shown. In the first processing station 840, an automatic operation is carried out by device 841 on a first face of the carcass part 1. The carrier 50 is oriented in such a way that the face that is to be processed is turned towards the processing device 841.

In the second processing station 810, a subsequent operation is carried out on a different face of the carcass part 1. In this example, the second operation involves making a cut in the carcass part 1.

Between the first processing station 840 and the second processing station 810, the carrier is pivoted about its vertical rotation axis 47. This way, the carcass part 1 is present to the operator in a relatively favourable way. The pivoting can be effected by pivoting means that are arranged next to the track of the transport system that cooperates with a part of the carrier or trolley. For example, the carrier is provided with a projecting part 846, such as a cam or arm, that engages a stationary object 845 such as a pin or a block that is arranged adjacent to the track upon passing this object 845. As the transport system continues its forward movement, the stationary object 845 makes the projecting part 846 pivot so that it can pass the stationary object 845. With the pivoting of the projecting part 846, the carrier is pivoted too.

In the example of FIG. 30, positioning the carcass part to make the cut requires a tilting of the carcass part 1 about axis 41 as well. In this example, there are no provisions made to carry out this tilting automatically. So, in this example, the operator grips the carcass part 1 and tilts is manually about axis 41.

Despite this tilting being a manual action, the physical strain it puts on the operator 800 is far less than in known methods, because the carrier bears the weight of the carcass part and because the operator only has to impose one movement, that is the same for all carcass parts. This means that he does not have to reach or to manipulate the carcass part in a complicated way.

FIG. 31 shows a further use of carriers according to the invention in a system for processing carcass parts 1. The skilled person will understand that in the embodiment of FIG. 31, instead of or in addition thereto features of carriers according to other aspects of the invention can be used as well. The carcass part processed in FIG. 31 could for example be a pig leg part, comprising a pig foot and at least a part of the pig leg.

In FIG. 31, the carcass part 1 is transported by the carrier 50 to the processing station 810. In the processing station 810, part 1\* has to be cut off from the rest of the carcass part. The part 1\* is then processed further in the processing station 810, while the rest of the carcass part leaves the processing station while still being retained by the carrier 50.

Like in FIG. 30, the transport system 60 with rail 62 and trolleys 61 has not been shown for reasons of clarity. However, the same system as shown in FIG. 28 and FIG. 29 can be used. T indicates again the direction of transport of the carriers 50, as imposed by the transport system 60.

In processing station 810, by way of example, a first conveyor belt 850 is present. This first conveyor belt 850 is arranged such that it engages the carcass part 1 and tilts the carcass part so that it comes to lie on its side on the conveyor belt 850. The position and orientation of the carrier 50 is such that the right side of the carcass part is turned upward, and that the part 1\* that has to be cut off is over the side of the first conveyor belt 850.

In this example the first conveyor belt is provided with optional guides 851.

The processing station 810 further comprises—as example—a rotary cutter 852. This rotary cutter 852 is arranged next to the conveyor belt 850, here in the area of one of the guides 851.

Upon the passing of a carcass part 1, the guide 851 lifts the part 1\* up and brings it into engagement with the rotary cutter 852, that cuts the part 1\* off the rest of the carcass part.

The rest of the carcass part moves on and drops off the end of the first conveyor belt 850. The carrier 50 then supports the weight of the carcass part again and transports it further.

The cut off part 1\* drops onto a secondary conveyor 853, which is arranged just below the cutter 852, in accordance with the fourth aspect of the invention. The secondary conveyor transports the separated part 1\* to a cutting device 854. The cutting device 854 makes cuts into the skin the is present on the part 1\*.

Then, the secondary conveyor 853 transports part 1\* to deskinner 855. Deskinner 855 removes the skin from part 1\*. The removed skin drops from the deskinner 855 onto third conveyor 857. Chute 856 takes the deskinned part 1\* away from this processing station 810.

FIG. 32 illustrates a further use of carriers according to the invention in a system for processing carcass parts 1. The skilled person will understand that in the embodiment of FIG. 32, instead of or in addition thereto features of carriers according to other aspects of the invention can be used as well. The carcass part processed in FIG. 32 could for example be a pig leg part, comprising a pig foot and at least a part of the pig leg.

In FIG. 32, the processing station comprises a plurality of processing devices 860, that are arranged in a revolving carrousel or turret machine 861, as is preferred having a vertical axis of rotation. In this example, the processing devices 860 are deboning devices, but the skilled person will understand that also other types of processing devices can be arranged in a carrousel.

It is particularly advantageous if the carrousel has a diameter that corresponds to the width of a standard processing station for an operator in a slaughterhouse, for example between 1 and 1.5 metres, e.g. 1.2 meters. In that case, it can be built into the processing line just like other known manned processing stations in a slaughterhouse.

Like in FIG. 30 and FIG. 31, the transport system 60 with rail 62 and trolleys 61 is not shown in detail for reasons of clarity. However, a system as shown in FIG. 28 and FIG. 29 can be used. T indicates again the direction of transport of the carriers 50, as imposed by the transport system 60. Rc indicates the direction of rotation of the carrousel. The circular motion of the devices 860 is synchronized with the passage of the carriers 50 along a section of the circumference of the carrousel 860.

Transport system 60 is adapted to convey carriers 50 each holding a carcass part 1 sequentially to the carrousel type processing station 810. In this example the carcass parts 1 have already been prepared for a deboning process.

For a part of the circular rotation of the carrousel, the carrier 50 with the carcass part 1 moves together with one of the deboning devices 860. During the time of this synchronized movement, the deboning device removes the soft tissue 1\* from the bone **1\*\* of the carcass part 1. The device 860 may e.g. include two spaced apart members that pass on opposite sides to a bone 1\*\* of the carcass part that is held by the carrier 50**, as is illustrated here.

The removed soft tissue, which is mainly meat in this example, drops onto secondary conveyor 865, e.g. a belt conveyor extending beneath the position where the tissue drops. This conveyor 865 moves the removed soft tissue away from the carousel to its next destination, e.g. storage or further processing. This is an implementation of the fourth aspect of the invention.

The rest of the carcass part 1, including the bone **1\*\* is still held by the carrier 50, which brings it to the next processing station at a position remote from the carrousel 861**.

A single carrousel 860 can be held in a single frame, e.g. as schematically shown in FIG. 32. It is however also possible that two or more carrousels are arranged in a single frame.

In FIG. 32 it is illustrated that a single processing step is carried out using the carrousel. It is however also possible that a plurality of processing steps is carried out in a single carrousel.

It is possible to have one or more carrousels in a system and/or in a slaughterhouse or meat processing factory. It is possible that along the track of a single overhead conveyor, one or more carrousels are arranged.

FIG. 32\* is shown to illustrate a further embodiment of a system according to the invention and preferred or optional details thereof. The carcass part processed in FIG. 32\* could for example be a pig leg part, comprising a pig foot and at least a part of the pig leg.

In this embodiment, two tracks 773 have parallel track sections as the tracks pass through a group of processing stations wherein multiple operators 1200 stand on opposed sides of the tracks in rows of one, or preferably multiple, operators 1200. It will be appreciated that in a simpler version a single track 773 extends along one row of one or more operators 1200.

As is preferred the tracks 773 are overhead tracks 773 held by a frame 1201 at a height between 1.5 and 3.0 metres above the floor 1203 of the slaughterhouse. Preferably the frame 1201 is attached to the floor for increased stability.

Here, the frame 1201 includes a vertical post 1201a, here centrally between the tracks 773, and horizontal arms 1201b, each arm 1201b supporting a track 773. As is preferred multiple of these T-shaped frames 1201 are arranged in a row to support the tracks 773 as they pass through the group of processing stations.

When two tracks 773 extend through a group of opposed manned processing stations 1205, it is possible that on one track 773, the carriers 750 receive left shoulders, left fore-ends or left hams, and that on the other track 773, the carriers 750 receive right shoulders, right fore-ends or right hams.

Trolleys 772 run over each of the tracks 773. As is preferred a pair of parallel support guides 785 is supported by the frame 1201 for each tracks, e.g. the trolley having a guide block that passes between the pair of guides 785.

Carriers 750 are suspended from one or more trolleys 772.

In FIG. 32\*, carriers 750 according to the third aspect of the inventions are shown, but the skilled person will understand that other carriers can be used as well.

Each carrier here is adapted to hold a single carcass part 1.

One or more manned processing stations 1205 are arranged along each track.

Each processing station 1205 preferably comprises a platform 1210 for an operator 1200 to stand on, preferably the platform being raised above the floor.

Preferably a fence 1211 is provided at the station in front of the platform for the operator 1200 for safety and for extra stability for the operator 1200. E.g. the fence 1211 extends up to the hip region of the operator, e.g. between 1 and 1.3 meter.

As an optional feature a tray 1212, e.g. a tool tray, is arranged in front of the operator 1200, e.g. mounted on the fence 1211 at the side facing away from the operator 1200.

As is preferred for manned processing stations, the frame 1201 is additionally provided with one or more product support guides 790 are adapted to maintain the products to be processes in a predetermined orientation, preferably an orientation suspended from the carrier and tilted towards the operator 1200, so that the carcass parts 1 can be manually processed, e.g. with manually held (power) tool(s) by the operator 1200 in an ergonomic way.

Here, as in a possible embodiment, for each track one or more horizontal support guide rods 790 are mounted on the frame 1201 (in a manner not shown here), to support and guide the carcass part at multiple distinct positions relative to the point of engagement with the carrier 750.

In front of each of the operators 1200, generally underneath the path of the carcass parts 1, one or more mobile open topped containers 1215 are arranged, preferably on the floor 1203 or on a low height support structure.

Preferably each container 1215 has a bottom and a rectangular peripheral wall. Preferably each container 1215 is adapted for transportation by forklift, e.g. having pockets to receive the parallel forks of a forklift.

The operators throw the parts they remove from the carcass parts 1 in these containers 1215, or the removed parts drop in these containers under the influence of gravity. Having the products drop straight down into the containers 1215 avoids that the operator is exposed to undesired physical strain. The removed parts can be waste, end products or intermediate products.

In an advantageous embodiment, each processing station 1205 manned by a single operator is adapted to receive two containers 1215, preferably side by side in the direction of conveyance of the track 773. This way, when one container is full it can be removed without interruption of the work carried out in the processing station. While the full container is removed and replaced by an empty one, the operator can use the other container.

In a possible embodiment the platform 1205 and/or fence 1211 are mobile between an operating position and a retracted, e.g. swung away, position, to allow for replacement of a container 1215.

FIG. **32*A is shown to illustrate possible variations of the embodiment of FIG. 32*. The carcass part processed in FIG. 32*A** could for example be a pig leg part, comprising a pig foot and at least a part of the pig leg.

In the embodiment of FIG. **32*A, at least some of the processing stations 1205 are equipped with one or more additional open topped bins 1216**, which are arranged close to the operator in the processing station. The operator can throw little scraps of meat or waste into these additional bins, like pieces of blooded meat or inflamed parts.

Preferably the one or more bins 1216 are supported at a height above the container 115, e.g. at the height of the hips of the operator 1200.

Preferably a bin 1216 is arranged above the platform 1205 at the side of the operator, so as to extend to the side of the operator.

Preferably a bin 1216 is arranged at the side of the fence 1211 facing away from the operator, e.g. next to the tool tray 1212. It will be appreciated that the bin 1216 is dimensioned so as to leave open the access to the open topped container 1205.

FIG. **32*B is shows to illustrate a variant of the embodiments of FIGS. 32* and 32*A. The carcass part processed in FIG. 32*B** could for example be a pig leg part, comprising a pig foot and at least a part of the pig leg.

In the embodiment of FIG. **32*B, there is only a single track 773, e.g. passing along a single row of manned processing stations. This layout makes it easy to remove and/or replace containers 1215 when they are full, as the frame 1201 is embodied to allow for access to the containers 1205 by transport equipment, e.g. a forktruck or forklift, at the side remote from the platform 1210 and for the removal/replacement via said side. The skilled person will understand that this layout is also possible in the embodiment without the additional bins 1216**.

FIG. **32*C is shown to illustrate a top view of a single track carcass part processing system with one or more rows of manned processing stations, generally according to the embodiment of FIG. 32*B. The carcass part processed in FIG. 32*C** could for example be a pig leg part, comprising a pig foot and at least a part of the pig leg.

In FIG. **32*C the containers 1215** are not shown in detail, for reasons of clarity.

In the top view of FIG. **32*C, it is clear that the track 773 forms an endless loop. In practice, this will be preferred for many slaughterhouse applications, regardless of the other features of the system. The trolleys with the carriers are moved along the track 773 in direction of transport T. Corner or guide wheels 1207 guide the drive chain 774 (not shown in FIG. 32*C) so it follows the course of the track 773 there where the track 773** takes a turn.

As is preferred one of the wheels 1207 is mounted in a chain tensioning station 1208. In this tension station 1208, the wheel 1207 is movably arranged in order to keep the drive chain 774 under tension during operation.

In the embodiment shown in FIG. **32*C, the one or more rows of multiple processing stations 1205 side by side are arranged such that the operators stand, e.g. on platforms 1210, at the inside of the loop formed by the track 773**.

The structural beams or posts 1201a of the frame 1201 are arranged on the outside of the loop formed by the track 773. This way, it is easy to remove and replace the containers 1215 in which the operators drop the parts they separate from the carcass parts they process. Preferably a path 1218 (see FIG. **32*D) for transport equipment, e.g. a forklift 1217, is present along the outside of the track 773 at each section where the manned processing stations are inside the track 773**.

As an alternative, it is also possible that the processing stations are arranged such that the operators stand on the outside of the loop formed by the track 773.

The frame 1201 could also alternatively be arranged on the inside of the loop formed by the track 773. Combinations are also possible: some operators inside the loop and others outside, and/or some parts of the frame 1201 inside the loop and others outside. In practice, the layout of the system will always be chosen such that it matches the specific circumstances of the meat processing facility best.

FIG. **32*C further illustrates the provision of a carcass part supply conveyor 1240**, e.g. a belt conveyor which runs in direction of transport T.

The supply conveyor 1240 performs the supply of carcass parts that are to be processed into the looped track processing system, e.g. the single track looped system as shown in FIG. **32*C. The supply conveyor 1240 will usually be a conveyor belt, but it is conceivable that other types of conveyors are used instead, e.g. a roller conveyor or a conveyor comprising individual carriers. Alternatively, it is possible that instead of by supply conveyor 1240**, the carcass parts are brought into the system by means of a container.

The looped processing system includes one or more loading stations 1241, where the carcass parts are one-by-one arranged in a carrier 750, e.g. manually or automated, e.g. using a robot, which carrier 750 will take the carcass part it receives along the processing stations 1205 by moving it along the track 773. In practice, each carrier will preferably hold a single carcass part. For example, a system according to FIG. 23 could be used to automatically arrange carcass parts in the carriers.

The supply of carcass parts to the loading station or stations 1241 can take place with the conveyor 1240 or batchwise, e.g. in containers.

FIG. 32*D shows the embodiment of FIG. 32*C, but now containers 1215 for receiving the separated parts are shown. The carcass part processed in FIG. 32*D could for example be a pig leg part, comprising a pig foot and at least a part of the pig leg.

In the situation shown in FIG. 32*D, most of the processing stations 1205 have a container 1215 arranged in them, but not all. The processing stations that do not have a container 1215 present are waiting to receive an empty container, after the previous one was removed because it was full. A fork-lift 1217 or the like could be used to remove full containers 1215 and bring in empty ones.

In order to avoid having to stop the processing in the entire system of FIG. 32*D when a container 1215 in one of the processing stations is removed because it is full, several options are available.

It is possible to always have an empty stand-by container arranged close to each processing station 1205 (or one for a limited number of processing stations, e.g. for two or three processing stations), so that the exchange of a full container with an empty one can be carried out very quickly.

It is also possible that for each processing station it is estimated when the container 1215 would be full, e.g. based on experience of based on the monitoring of the processes carried out in each processing station. Just before the container of a processing station is expected to be full, an empty container is arranged close to that particular processing station, so that when the container 1215 of that processing indeed is full, the exchange of the full container with an empty one can be carried out very quickly.

The level to which a container 1215 in a processing station is filled can be monitored by the control system of the processing system, e.g. by continuously or intermittently measuring the weight of each container 1205 present in the station, by means of a level gauge in the containers or associated with the container, or by means of an automated vision system including a camera.

A simple way to monitor the level of filling of the containers and to make sure that not too much time is lost in replacing a full container 1215 with an empty one, would be to make it possible for the operator 1200 at the processing station to give a signal when the container is almost full and/or when it is totally full. Such a signal could be given by the operator pushing a button or operating another trigger device at his processing station. The pushing of this button then triggers a signal for the logistics crew (who are in charge of removing full containers and replacing them by empty ones) to bring an empty container to the processing station from which the signal came. Preferably, the operator triggers the signal before the container 1215 in his processing station is entirely full, so he does not have to wait for an empty container to be brought to his processing station when the container 1215 in front of him is entirely full.

The signal the logistics crew receives could take many forms. It could be that a indicator light shows up on a schematic representation of the processing system, indicating the processing station that is (or will shortly become) in need of an empty container. It could also be that on a screen showing a schematic representation of the processing system, the colour of the processing station that wants to receive an empty container changes. It could also be that at the actual processing station, a light is turned on. The light or colour signals could be accompanied by a sound signal.

In a different approach, not all processing stations are occupied by human operators all the time. For example, the processing stations are grouped in pairs of two adjacent processing stations. Only one of the processing stations of the pair is occupied by an operator. When the container 1215 of the occupied processing station is full, the operator moves to other processing station of the pair and continues processing the carcass parts there, carrying out the same process he did in the other processing station of the pair. Preferably, a signal is created for the logistics crew so they know the container of that particular processing station is full. They then have time to replace it by an empty one until the container in the other processing station of the pair is full.

FIG. 32*E is shows to illustrate a top view of a system according to the invention, generally including details of the embodiment according to the embodiment of FIG. 32*. The carcass part processed in FIG. 32*E could for example be a pig leg part, comprising a pig foot and at least a part of the pig leg. In FIG. 32*E, the containers 1215 are not shown, for reasons of clarity.

In the top view of FIG. 32*E, it is clear that the two tracks 773 of this two-looped processing system form two endless loops; an outer loop and an inner loop.

Each track arrangement is generally according to the looped track described with reference to FIG. 32*C.

The trolleys with the carriers are moved along the tracks 773 in direction of transport T. Corner or guide wheels 1207 guide the drive chains 774 (not shown in FIG. 32*E) so they can follow the course of the tracks 773 where the tracks 773 take a turn.

One of the wheels 1207 of each track is mounted in a tensioning station 1208. In a tension station 1208, the wheel 1207 is movable order to keep the respective drive chain 774 under tension during operation.

In the embodiment of FIG. 32*E, the processing stations 1205 or one or more parts thereof (e.g. the platform 1210, fence 1211, and if present tray 1212) are moveable, so they can make room for the transport equipment, e.g. fork-lift, allowing it to replace a full container by an empty one. In FIG. 32*E and FIG. 32*F the platform and fence of the processing station 1205' are in the moved away position. FIG. 32*F shows the embodiment of FIG. 32* (and FIG. 32*E) with the containers drawn in the figure.

FIG. 32** is shown to illustrate features of a more sophisticated version of the embodiment of FIG. 32*. In this embodiment, the containers 1215 in general have been replaced by one or more conveyors. The carcass part processed in FIG. 32** could for example be a pig leg part, comprising a pig foot and at least a part of the pig leg.

Right in front of each of the operators 1200, as is preferred on the side of the fence 1211 facing away from the operator 1200, optionally a weighing device 1220 is arranged. When the operator 1200 has cut off a portion, e.g. a prime cut, from the carcass part 1 presented to him, he puts or drops the prime cut on the weighing device 1220 in front of him. The weighing device then determines the weight of the cut-off portion, and this data is stored in the overall control system of the processing system.

As a preferred feature a buffer belt conveyor 1221 extends away from each operator position (generally transverse to the direction of the track 773), towards the frame 1201, here to the central region between the two opposed rows of operators 1200, to a main conveyor 1222, here a belt conveyor, that extends in the direction of the tracks 773 along the posts 1201a of the frame, e.g. to a collection station where prime-cuts are collected, e.g. in one or more containers.

Here, each buffer belt 1221 extends between the weighing device 1220 and the main conveyor 1222. From the weighing device 1220, the cut-off portion (that is: the part separated from the carcass part), e.g. prime cut is then moved (by the operator or by the weighing device (e.g. a belt thereof)) onto the buffer belt conveyor 1221. The weighing device may also be integrated in the buffer belt 1221.

The buffer belt 1221 moves the prime cut to a prime cuts or main conveyor 1222. Advantageously a computerized overall control system of the processing system registers for each prime cut when and at what station it is placed on the prime cuts conveyor 1222. This way, the system knows in when which prime cut arrives at the end of the prime cuts conveyor 1222. In a sophisticated embodiment, the buffer belt puts the separated part on the main conveyor 1222 only after the control system has indicated that there is space on the main conveyor for this separated part.

Prime cuts are high value meat pieces, like pork tenderloin.

If desired the containers 1205 are here replaced by one or multiple parallel conveyors for separated parts that each extend in the direction of the track 773 at a level below the path of the suspended carcass parts, e.g. at the height of the knees of the operator, e.g. between 0.4 and 0.9 meter above the floor.

In the embodiment shown here, at a lower level than the prime cuts conveyor 1222, a separated parts conveyor 1235 has been arranged. This further separated parts conveyor 1235 has multiple, here three, parallel tracks 1230, 1231, 1232. Each track is used for transporting a different kind of separated part that is removed from the carcass part. For example, the first track 1230 receives the secondary cuts (smaller pieces of meat that are however suitable for human consumption), the second track 1231 receives waste and the third track 1232 receives bones.

At the end of each track 1230, 1231, 1232, the parts present on the respective tracks are moved to a destination specific for the type of parts present on each track. In the embodiment shown in the drawings, three tracks are present. However, alternatively, a different number of tracks is possible. There could be less tracks (one or two), but also more than three, e.g. five or even ten.

FIG. **32\*\*A shows a variant of the embodiment of FIG. 32\*\*. The carcass part processed in FIG. 32\*\*A** could for example be a pig leg part, comprising a pig foot and at least a part of the pig leg.

In the embodiment of FIG. **32\*\*A, at least some of the processing stations are equipped with one or more additional bins 1216, e.g. one next to the weighing device 1220** when present, which are arranged close to the operator in the processing station. The operator can throw little scraps of meat of waste into these additional bins, like pieces of blooded meat or inflamed parts.

FIG. **32\*\*B shows a further variant of the embodiment of FIG. 32\*\* and FIG. 32\*\*A. The carcass part processed in FIG. 32\*\*B** could for example be a pig leg part, comprising a pig foot and at least a part of the pig leg.

In the embodiment of FIG. **32\*\*B, two main or prime cuts conveyors 1222 have been provided in the central region, here on opposed sides of the vertical post 1201a. Each prime cuts conveyor 1222 receives the prime cuts from carcass parts transported along one of the tracks 773**.

It is possible that the prime cuts conveyors 1222 each take the prime cuts arranged thereon to a different location. As an alternative, the prime cuts conveyors could both take the prime cuts disposed thereon to the same location. In a variant to that, the prime cuts conveyors 1222 merge at some point. After the merging point, prime cuts from both conveyors are transported further together to a point at which the prime cuts are collected for further processing, storage or packaging.

In the embodiments of FIGS. **32\*\*, 32\*\*A and 32\*\*B, each further separated parts conveyor 1235 has three different tracks 1230,1231,1232** for transporting different kinds of separated parts. In an alternative embodiment, the further separated parts conveyors have a different number of tracks.

It is also possible that instead of a separated parts conveyor 1235 with multiple tracks, multiple conveyors are used, that are arranged side by side. In general, each conveyor will take the separated parts thereon to a dedicated end point, where the separated parts will be received for further processing, storage and/or packaging. As each conveyor or conveyor track carries a specific kind of separated part, at the end point of each conveyor or conveyor track a specific kind of separated part is received.

When one or both further separated parts conveyors are made up out of multiple parallel conveyors, it is possible that not all conveyors transport the parts thereon in the same direction.

FIG. **32\*\*C is shown to illustrate optional and/or preferred features of a two-looped processing system, generally including features explained with reference to FIG. 32\*\*. The carcass part processed in FIG. 32\*\***. Could for example be a pig leg part, comprising a pig foot and at least a part of the pig leg.

In this embodiment, two generally parallel looped tracks 773 are shown; an outer track and an inner track. The trolleys transport carriers (not shown) along these tracks 773. Each carrier is preferably adapted and used to hold a single carcass part to be processed. It is possible that on one track 773, e.g. the outer track, the carriers receive left shoulders, left fore-ends or left hams, and that on the other track, e.g. the inner track, the carriers receive right shoulders, right fore-ends or right hams.

The carcass parts to be processed can be supplied to the system by means of supply conveyors 1240, e.g. one for each track of the system. At one or more loading stations 1241, which are arranged here at the end of the supply conveyors 1240, each carcass part is arranged in a carrier. The carriers are moved along one of the tracks 773 by means of trolleys that are preferably driven by a drive chain or cable.

The carcass parts can be arranged manually or automatically in their respective carriers.

The carcass parts are passed along rows of processing stations 1205, here two rows of multiple manned processing stations 1205 per looped track 773.

For example prime cuts that are separated from the carcass parts during the processing are put on the prime cuts or main conveyor 1222. Other separated parts are arranged on one of the conveyors that form part of a further separated parts conveyor 1235. It is possible that the separated parts, being prime cuts or other separated parts are actively put on their respective conveyor by an operator or by an automatic processing station, but it is also possible that the separated part is allowed to drop down from the carcass part from which it is separated onto the conveyor.

It is possible that stationary guides 790 are provided that hold the carcass part in the right orientation, e.g. tilted towards the operator 1200, so that the separated part drops onto the right conveyor.

The separated parts conveyors 1235 take the separated parts thereon to mobile containers 1218, that are preferably arranged at one end of straight and linear embodied conveyors 1235. Each of these containers 1218 receives a specific kind of separated part, the kind of separated part that is put on the conveyor at which's end the container 1218 is arranged.

Mobile containers 1219 are provided to receive prime cuts or other separates parts from each of the prime cuts or main conveyors 1222. Near the end of each of the prime cuts conveyors 1222, computer controlled flippers 1223 are arranged that are connected to the computerized overall control system. The flippers 1223 are controlled to steer each prime cut into a desired container 1219.

It is possible that the computerized overall control system of the processing system has recorded which prime cut has been put where and when on the prime cuts conveyor 1222. In that case, the overall control system knows in which order the prime cuts will arrive at the end section 1224 of the prime cuts conveyor 1222. Based on that information, the right flipper 1223 can be activated at the right time, so the prime cut ends up in the right container 1219.

As an alternative or in addition, a camera can be arranged above the prime cuts conveyor 1222. The camera can be coupled to a vision system that recognises the prime cuts. With that information fed into the overall control system, the right flipper 1223 can be activated at the right time, so the prime cut ends up in the right container 1219. The images of the camera can also be shown to an operator, who then controls the flippers 1223, either directly or indirectly.

The containers 1218 and 1219 can be in the same room as tracks 773 with the processing stations, or in a different room.

FIG. 32D shows a variant to the embodiment of FIG. 32C. In FIG. 32D, just a single looped track 773 is present. The carcass part processed in FIG. 32D could for example be a pig leg part, comprising a pig foot and at least a part of the pig leg.

FIG. 32*A is shown to illustrate a further possible detail a system according to the invention. The carcass part processed in FIG. 32*A could for example be a pig leg part, comprising a pig foot and at least a part of the pig leg.

In this embodiment, all separated parts are transported away from the processing station by means of a separated parts conveyor 1235. Preferably, this separated parts conveyor 1235 has multiple tracks 1230, 1231, 1232, each track preferably receiving a specific kind of separated parts. For example, prime cuts could be placed on track 1230, secondary cuts (useable meat, but in smaller bits) on track 1231 and waste on track 1232.

In the embodiment shown in the drawings, three tracks are present. However, alternatively, a different number of tracks is possible. There could be less tracks (one or two), but also more than three, e.g. five or even ten.

One or more funnels 1245 could be provided in front of each operator standing 1200 on a platform 1210, on the inside of the fence 1211 when present, in order to make it easier for the operator to drop the part he separated from the carcass part onto the correct track 1230, 1231, 1232. Usually, just one part will be separated at a processing station 1205, so it would suffice to have a single funnel at a processing station. If desired a single funnel 1245 is provided that is movable between distinct positions corresponding to a selected separated parts conveyor. Alternatively, more funnels 1245 could be present in one or more of the processing stations.

FIG. 32*B shows a variant of the embodiment of FIG. 32*A. The carcass part processed in FIG. 32***B could for example be a pig leg part, comprising a pig foot and at least a part of the pig leg.

In the embodiment of FIG. 32*B, three conveyors 1230), 1231*, 1232*, e.g. operable at distinct speeds, are used instead of the single conveyor 1235 with the multiple tracks 1230, 1231, 1232**.

In the embodiment shown in the drawings, three conveyors are present. However, alternatively, a different number of conveyors is possible. There could be less conveyors (one or two), but also more than three, e.g. five or even ten.

FIG. 32*C shows a further variant to the embodiment of FIGS. 32*A and 32*B. The carcass part processed in FIG. 32*C could for example be a pig leg part, comprising a pig foot and at least a part of the pig leg.

In the embodiment of FIG. 32*C, a funnel 1245' arranged within reach of the operator 1200 is connected to vacuum transport system 1246**. The vacuum transport system is in particular suitable to remove contaminated pieces of waste (e.g. material that could be a risk for the health of the operators or for the consumers of the processed meat, such as inflamed parts) from the processing station in a safe way. The dangerous waste is removed from the processing station in a closed system, which significantly reduces the risk of contamination of the other processing stations or of one or more conveyors.

Each processing station 1205 could be equipped with a funnel 1245' connected to a vacuum system for removal of dangerous waste. Alternatively, only those processing stations at which it is likely that dangerous waste is likely to be encountered could be equipped with such a funnel.

The skilled person will understand that funnels 1245 (or chutes in general) as shown in FIGS. 32*A, 32*B and 32*C can be used in combination with all embodiments of the invention. Also, the killed person will understand that funnels or chutes 1245' connected to a vacuum system 1246 for the removal of hazardous waste as shown in FIG. 32*C can be used in combination with all embodiments of the invention.

FIG. 32*D shows a further embodiment of the system according to the invention. The carcass part processed in FIG. 32*D could for example be a pig leg part, comprising a pig foot and at least a part of the pig leg.

The system comprises two generally parallel tracks 773, with two rows of multiple manned processing stations arranged along each of the tracks; the rows of inner track being on the inside of the inner track and the rows of the outer track on the outside of said track, generally the rows on the inside and the outside being opposed to one another.

In the embodiment of FIG. 32*D, the processes in the processing stations are carried out by human operators 1200**.

As is preferred the operators stand on platforms 1210. The height of the platform above the floor is preferably adapted to the distance of the track 773 from the floor in the area where the processing station is arranged. Optionally, the height of the platform above the floor can be adjusted to the operator's body length.

Carcass parts 1 are in this example supplied to the system by means of conveyors 1238. From conveyor 1238, the carcass parts 1 pass over weighing device 1239, where the carcass parts 1 are weighed individually.

The weight of each carcass part 1 is stored in the computerized overall control system of the processing system. The weighing device 1239 is an optional feature.

From the weighing devices 1239, the carcass parts proceed to the supply conveyor 1240, which brings the carcass parts 1 to loading station 1241. At the loading station, each carcass part 1 is arranged in a carrier 750. In this embodiment, this is done manually. The loading process is facilitated by the supply conveyor 1240, which raises the carcass parts 1 to the level of the carriers 750. This way, the operator does not have to lift the carcass parts 1 off the conveyor 1240 in order to arrange them in a carrier. This makes that less physical strain is put on the operator.

Carriers take the carcass parts 1 along the track 773 along a series of processing stations. Preferably, in the first series of processing stations, skin, rind and/or fat is removed from the carcass parts. After that, the carcass part is deboned in the next series of processing stations. It is however also possible that the carcass part is only deboned in the processing stations, and that later skin, rind and/or fat is removed from the meat parts that were separated from the carcass parts.

In this example the operators 1200 drop the parts they separate from the carcass parts 1 onto separated parts conveyor 1235. The separated parts can be end products, intermediate products or waste.

Preferably, the separated parts conveyor 1235 has at least two separate and parallel tracks. At some processing stations, one or more funnels 1245 are available. If the operator drops a separated part into the funnel 1245, the separated part comes on the right track of the conveyor 1235 without any additional effort or attention of the operator.

A weighing device 1220 can be arranged at one or more processing stations. The operator in such a processing station separates a part from the carcass part and puts the separated part on the weighing device. The weighing device weighs the separated part and preferably stores the weight in the computerized overall control system.

The separated parts conveyor 1235 takes the separated parts to the discharge conveyors 1251 and 1252. Separated parts on the track of conveyor 1235 that is closest to the operators come onto discharge conveyor 1251. Discharge conveyor 1251 drops these separated parts into a container 1218. Separated parts on the track of conveyor 1235 that is further from the operators come onto discharge conveyor 1252. Along this discharge conveyor 1252, three operators are present. They take specific types of separated parts from discharge conveyor 1252 and put them on a conveyor 1253 that is arranged next to them. The conveyor 1253 takes the separated parts to a container 1281. This way, all containers 1218 receive a specific type of separated parts. When a container 1218 it full, it is removed and exchanged for an empty one. Where the full container 1218 is then brought to depends on the nature of the separated parts it contains.

The separated parts conveyors 1235 may run in the same direction as the trolleys with the carriers along the track 773, but one or more of them can also run in the opposite direction. This is shown in FIG. **32\*\*\*D. The conveyors 1235 run in the same direction as the carriers following the track 773 in the vicinity of the processing stations 1205 in the front of the figure. Near the processing stations in the back of the picture, the conveyors 1235** and the carriers move in opposite directions.

FIG. **32\*\*\*E is shows to illustrate variations of the system of FIG. 32\*\*\*D. The carcass part processed in FIG. 32\*\*\*E** could for example be a pig leg part, comprising a pig foot and at least a part of the pig leg.

The supply of carcass parts 1 to the system, the separated parts conveyor 1235 receiving the separated parts and the discharge conveyors and containers 1218 are the same as in FIG. **32\*\*\*D**, but may be designed differently.

In the embodiment of FIG. **32\*\*\*E, a number of, here all of, the processing stations are automated processing stations 1250. There are still some operators positioned alongside the tracks 773**, but they are merely there for checking the operation of the automated processing stations, for inspection and/or for some trimming if necessary.

The automated processing stations are preferably embodied as carrousel type devices 1260.

One or more chutes 1261 are arranged below each of the carrousels 1260 to receive parts that are separated by the automated processing stations 1250 and to put them on the separated parts conveyor 1235.

FIG. **32\*\*\*E1 shows the weighing by weigher 1239 in more detail. The carcass parts 1 are supplied to the system by belt conveyor 1238. From belt conveyor 1238, they pass over weigher 1238 to supply conveyor 1240. From the supply conveyor 1240** each carcass part is arranged in a carrier.

The operation of the weigher 1239 is such that only one carcass part 1 is on it.

When the electronics of the weigher 1239 sense a carcass part 1 is present on the weigher, the carcass part is weighed. The weight data is processed by weigher electronics 1239$a$ and 1239$b$. From the weigher electronics, the data can be shown on a screen 1239$c$, and/or transferred to an overall control system of the processing line downstream of the weigher or of the entire meat processing facility.

FIG. **32\*\*\*E2 shows a processing station in more detail. An operator 1200 is manually cutting off a piece of the carcass part 1, which passes by the processing station while being suspended from a carrier 750. Product support guides 790 present the carcass part 1** in such a position to the operator that he can make the cut in an ergonomic way, e.g. tilted towards the operator.

The weigher 1220 is arranged directly in front of the operator 1200, and under the suspended carcass part 1. After he separated the piece from the carcass part, the operator 1200 puts the separated piece on the weigher 1220 in front of him.

The weigher 1220 weighs the separated piece, and optionally shows the weight on the (optional) display 1220$a$. After weighing, the weigher 1220 or operator 1200 transfers the separated piece onto a separated parts conveyor 1235 (not shown) or onto the buffer belt (when present).

In a variant to this embodiment, not just the separated piece is weighed, but also the part that remains in the carrier 750. This can for example be done by moving the trolley that holds carrier 750 over a weighing bridge in the track it run on, or by fixing a weigher to the product support guides 790. The force with which the carcass part in the carrier leans against this weigher can be used to calculate the weight of the carcass part. As a further alternative, the carcass part can be lifted up and led over a weigher that is arranged in a horizontal plane.

FIG. **32\*\*\*E3 shows the end of a processing line, for example like the ones shown in FIG. 32\*\*\*D or FIG. 32\*\*\*E** in more detail.

The separated parts 1\* arrive in this part of the system via conveyor 1252. Mobile flippers 1223 direct each separated part 1\* to one of the operators 1200. In a sophisticated embodiment the overall control system of the processing line knows of each separated part when it arrives and preferably also which properties it has. In such an embodiment, the flippers 1223 direct each separated part to a predetermined operator position.

The operator 1200 takes a separated meat part 1X that was presented to him and carries out a process (e.g. making a cut) on the work bench 1256 in front of him. At least some of the operator positions are provided with a weigher 1255, so the separated parts 1* can be weighed before and/or after the processing by the operator.

Waste that is cut off by the operators can be disposed via bins 1257.

Instead of or in addition to a carrousel 1260 shown in FIG. 32*E, a robot 1270 can be applied in an automated processing station arranged along a track 773. It is possible to mount a robot 1400 alongside the track 773, as is shown in FIG. 32*F. In FIG. 32*F, the robot is mounted on the floor, but alternatively, it could be mounted to the ceiling, or to the frame that also holds the track 773. As a further alternative, one or more robots could be mounted on a carrousel.

In the embodiment shown in FIG. 32*F, the robot has two arms 1402,1402 and three joints 1403,1404, 1405. At the free end of the second robot arm 1402, a tool 1410 (e.g. a wizard knife or an other kind of knife) is attached. The joints allow rotation in the directions R1, R2, R3, R4 and R5 as indicated in FIG. 32*F.

The robot shown in FIG. 32*F is very versatile in the movements it can make, but it is also highly complex. A robot like this can move the tool relative to the carcass part 1 following a path that is required to carry out the process and at the same time make the tool follow the carcass part 1 in its motion along the track 773.

As an alternative, it is possible to use a simpler robot, for example one that can carry out the movement relative to the carcass part 1 that is required for carrying out the process. The robot itself can then be mounted on a carriage or a carrousel, which carriage or carrousel follows the carcass part 1 in its motion along the track.

In particular when one or more processes are carried out on the carcass part held by a carrier, e.g. carrier 750, in an automated way, using machinery instead of a human operator for making at least some of the cuts into the carcass parts, it can be very useful to know the spatial position and/or orientation of one or more elements of each carcass part, and/or the dimension thereof, and/or what shape they have. Because of the natural variation in animals, these parameters show quite a large variation, even in carcass parts coming from same animals from the same farm.

FIG. 32*G shows a processing station 1205 that comprises a scanning device 1430 for the carcass part, e.g. an optical scanning device or another, preferably non-contact, scanning device, e.g. using laser technology.

The carcass part scanned in FIG. 32*G could for example be a pig leg part, comprising a pig foot and at least a part of the pig leg.

The scanning device here comprises a ring 1431 that comprises a scanner, e.g. a CT-scanner. At the beginning of the scanning process, the ring 1431 is positioned around a section of the carcass part that has to be scanned.

The scanning device 1430 follows the movement of the carcass part 1 along the track 773 by moving along a rail 1432, which is e.g. mounted to frame 1201.

During the movement of the scanning device 1430 along rail 1432, the scanning device also moves to scan along the length of the carcass part, here the ring 1431 is moved in vertical direction. During this vertical movement, the CT-scanner performs a scan of the carcass part 1 in the ring. The scanning can be performed during an upward movement of the ring, during a downward movement of the ring or during both.

By the time the scanning device 1430 reaches the end of the rail 1432, the scan is completed, here the ring 1431 is in its lowermost position again, below the carcass part 1. The scanning device then returns to its initial position at the most upstream part of the rail 1432. The scanned carcass part continues its movement along the track 773.

As an optional feature, the processing station shown in FIG. 32*G has an auxiliary conveyor 1420, comprising one or more carcass part clamps 1422 that can open and close on command, and that move along with the clamped carcass part, here by means of a driven chain 1421 (e.g. looped) on which said clamps 1422 are mounted. A clamp 1422 is operated to hold a carcass part 1 during the movement through the processing station 1205 with the scanning device and move along with the carcass part 1 through the processing station. This gives additional stability to the carcass part, reducing any swinging of the carcass part and therewith improving the quality of the data that can be obtained during the scanning.

The data that was acquired in the scanning process, is preferably transformed into an image, which can be presented to an operator, and/or be stored into the computerized overall control system. The data can instead or in addition be used to control equipment and or processes in processing stations downstream of the processing station with the scanning device. FIG. 32*G shows the variant in which the collected data is processed to form an image, which can be presented to an operator at any point in the processing system.

Collected scanning device data can be coupled to an individual carcass part, but combined data can also be used to spot trends in series of carcass parts (e.g. carcass parts all coming from the same farm) or to detect possibilities for optimising the processing.

In variations to this embodiment, also other types of scanning devices can be used.

FIG. 32*H also shows a processing station 1205 in which data is collected about the carcass parts 1 to be processed. The carcass part examined in FIG. 32*H could for example be a pig leg part, comprising a pig foot and at least a part of the pig leg.

In the processing station 1205 of FIG. 32*H, data is collected by means of a vision system 1450. The vision system of FIG. 32*H comprises multiple, here two, cameras 1451 that are arranged on two opposite sides of the track 773. This way, images can be obtained from both the front and the back of the carcass part to be processed. Together, this gives much information about the carcass part. It is, as an alternative lower cost version, also possible to use just a single camera.

The image or images obtained by the vision system can be presented to an operator, and/or be stored into the overall control system. The data can instead or in addition be used to control equipment and or processes in processing stations downstream of the processing station with the scanning device. FIG. 32*H shows the variant in which the collected data is processed as a combination of two images, each shown on a screen 1460. The images can be presented to an operator at any point in the processing system. Data obtained using the vision system may be used to determine fat thickness, meat colour and/or blood meat presence etc.

Collected vision system data can be coupled to an individual carcass part, but combined data can also be used to spot trends in series of carcass parts (e.g. carcass parts all coming from the same farm) or to detect possibilities for optimising the processing. For example, the images can be used to detect a wrong or sub-optimal setting of an automated processing device upstream of the processing station with the vision system.

With a suitable positioning of the vision system early in the processing line, the vision system allows to detect abnormalities in carcass parts or in groups of carcass parts early in the process. This way, corrections can be made before the abnormalities cause trouble, e.g. by removing the entire carcass part from the line or by removing the part of the carcass part in which the abnormality occurs.

FIG. 33 shows an embodiment of a system for processing carcass parts of red meat slaughter animals in accordance with the invention. In particular, the system of FIG. 33 is used for deboning of fore-ends, e.g. of pigs.

Conveyor belt 901 brings the fore-ends that are to be deboned to the system. Already right at the conveyor 901, first processing station 902 is arranged. At this first processing stations, two operators carry out some pre-processing of the fore-ends. In particular, they make a cut to expose the bone. Right downstream of this first processing station 902, a second processing station 903 is arranged. The second processing station 903 receives the fore-ends with the exposed bone from the first processing station 902. In the second processing station 903, the fore-ends are arranged in a loading apparatus 904 by a single operator.

In a third processing station 905, the fore-ends are received from the loading apparatus 904 and automatically arranged in carriers 950 of overhead conveyor 951. The overhead conveyor 951 then brings the fore-ends to fourth processing station 906, where the leg is cut off the fore-end by means of an automatically operated knife. The leg that is cut off falls into wheeled container 907, that is arranged below the knife of the fourth processing station 906. When the wheeled container 907 is full, it is removed and replaced by an empty one.

From the fourth processing station 906, the overhead conveyor transports the fore-end to the fifth processing station 908. Here, the lip part of the chin is removed by an automatically operated knife. The removed lip parts fall into wheeled container 908, that is arranged below the knife of the fifth processing station 907. When the wheeled container 908 is full, it is removed and replaced by an empty one.

The overhead conveyor 951 then takes the fore-ends to the sixth processing station 909. Here, the chin is cut off automatically. The chins 910 fall from the sixth processing station onto the secondary conveyor 911, which transports them to further processing stations 912, 913, 914, 916. In the first further processing station 912, pre-cuts are made into the chins 910. Then, in the second further processing station 913, an operator checks for any anomalies, such as abscesses. Chins that contain such anomalies, he puts into container 918 and therewith removes them from the further process.

In the third further processing station 914, rind is removed form the chins. The removed rind is transferred to wheeled container 915, which is arranged at the discharge of the third further processing station 914.

At the fourth further processing station 916 a final check is performed, and then the chins are discharged into wheeled container 917. When container 917 it full, it is moved to a storage facility and replace with an empty one.

Meanwhile, the overhead conveyor 951 moves the fore-ends further to the sixth processing station 919. At the sixth processing station 919, two operators open the neck strip. An auxiliary conveyor 920 that is arranged below the overhead conveyor 951 engages the fore-ends and lifts the lower part of the fore-ends up. This way, the fore-ends are presented to the operators of the sixth processing station 919 in such a way that they can easily make the cut, in an ergonomically advantageous way.

The fore-ends then move on to the seventh processing station 921. This is a large processing station, in which six operators together move the neck bones of the fore-ends. For the waste that is produced in the process of removing the neck bone, a funnel 922 that is connected to a vacuum system is arranged at the location where the waste is produced. The last 924 of the six operators actually removes the neck bone from the fore-end. He puts the neck bone on secondary conveyor 923 that takes the neck bones away.

The overhead conveyor 951 moves the fore-ends then along the eighth processing station 925. Here, an operator checks whether the neck bone has been removed correctly and entirely. If not, he corrects this. Any waste that he separates from the fore-end he can put in funnel 926, that is again connected to a vacuum system. The funnel 926 is arranged directly adjacent to the operator of the eighth processing station 925.

The overhead conveyor 951 then moves the fore-ends to the tenth processing station 927. There, the but is cut off by means of an automatic cutter. The buts fall off the fore-end onto secondary conveyor 928. In this example, secondary conveyor 928 is a belt conveyor, that transports the buts along a number of further processing stations.

At the first further processing station 929 for the buts, an operator brings the buts into the desired position and orientation for this further processing.

At the second further processing station 930 for the buts, the rind is removed by means of an automatic derinder. The removed rind is discharged into a wheeled container 931 that is arranged at the discharge end of the automatic derinder.

At the third further processing station 932 for the buts, four operators trim the buts to prepare them for packaging. The waste material they cut off can be put into funnel 933, which is arranged right in front of the operators of the third further processing station 932 for the buts. The funnel 933 is connected to a vacuum system.

At the fourth further processing station 934 for the buts, the buts are automatically packaged. From the fourth further processing station 934 for the buts, the packaged buts are transported to storage.

Meanwhile, the overhead conveyor 951 moves the fore-ends further to the eleventh processing station 935. At the eleventh processing station 935, skin massage is performed on the fore-ends.

From there, the fore-ends are transported to the twelfth processing device 936, by means of the overhead conveyor 951. At the twelfth processing station 936, a pre-cut for the derinding is made (automatically).

The overhead conveyor 951 transports the fore-ends further to the thirteenth processing station 937, where a single operator finalises the derinding.

The overhead conveyor 951 then transports the fore-ends further to the fourteenth processing station 938, where five operators work to expose the humerus bone.

The overhead conveyor 951 then transports the fore-ends further to the fifteenth processing station 939, where a single operator works to remove the exposed humerus bone. The operator puts the removed humerus bones onto secondary conveyor 940, which discharges the removed humerus bones into wheeled container 941.

The overhead conveyor 951 then transports the fore-ends further to the sixteenth processing station 942, where three operators work to roll out the cushion. The waste they trim off in this process can be put on the secondary conveyor 943, which is arranged right in front of the operators. The secondary conveyor 943 discharges the waste into wheeled container 944.

The overhead conveyor 951 then transports the fore-ends further to the seventeenth processing station 945, where two operators work to remove the cushion. They put the separated cushions on the secondary conveyor 946, which is arranged right in front of them. The secondary conveyor 946 discharges the cushions into wheeled container 947.

The overhead conveyor 951 then transports the fore-ends further to the eighteenth processing station 948, where the meat is removed automatically from the radius bone. The removed meat falls onto secondary conveyor 949.

The secondary conveyor 949 takes the meat to an automatic derinder 952. The automatic derinder discharges the removed rind into wheeled container 953, that is arranged at the discharge end of the derinder 952.

The derinded meat is then presented to two operators at further processing station 954. The operators perform a final inspection, and if necessary, some trimming.

After the removal of the meat at the eighteenth processing station 948, only the radius bone is still carried by the carrier 950 of the overhead conveyor 951. At the final processing station 955, the bone is removed from the carrier 950. It is discharged directly into wheeled container 956.

The now empty carrier 950 is returned to the third processing station 905 by the overhead conveyor 951, where a fore-end is arranged in it again.

In a process of the type described above, the carcass part looses much of its rigidity when the majority of the bones have been removed. However, the applicant has found that if the rind is not removed before the majority of the bones is, the rind provides enough stability to the carcass part to process it further.

Therefore, it can be advantageous if the derinding of the part of the carcass part that is arranged in (in particular: suspended from) the carrier takes place after the removal of the majority of the bones.

It is possible that this derinding is carried out while the carcass part is still suspended from the carrier. A further advantage of this is that the carcass part is still held by the holding zone or reference portion that is was held by all along the process. This means that the location and orientation of the elements of the carcass part remains known for the derinding process.

In a variant to the embodiment of FIG. 33, deskinning, derinding and fat removal takes place after arranging the carcass part in the carrier of the system in which it is processed (e.g. deboned) but before the removal of prime cuts, e.g. right after the removal of the chin. This variant is in particular suitable for processing carcass parts that have been cooled with the skin on.

FIG. 34 shows a further embodiment of a system according to the invention.

In the example of FIG. 34, a first overhead conveyor 350 brings red meat carcass halves 301 into the system.

At a first processing station 310, the carcass halves 301 are cut into three parts: a fore-end 302, a middle part 303 and a ham 304. FIG. 34A shows this in more detail.

Before they are separated from the rest of the carcass half, the fore-ends are already engaged by first fore-end conveyor 360. Once the separation of the fore-end from the rest of the carcass half is complete, the first fore-end conveyor 360 carries the weight of the separated fore-ends and transports them to a fore-end processing system.

The fore-end processing system comprises a selection station 321. In this selection station some measurements are performed on the fore-end (such as measurement of weight and fat percentage at various locations), and an automated visual inspection takes place using an image analysis-system. On the basis of the measurement results and the results of the visual inspection, it is decided which processing steps will be carried out on each individual fore-end.

Downstream of the selection station 321, the fore-ends are distributed over two processing lines. Some of the fore-ends are removed from the first fore-end conveyor 360 by discharge station 322. Those fore-ends fall onto secondary conveyor 323, which transports them to a first fore-end processing line (not shown).

The fore-ends that remain in first fore-end conveyor are subjected to a final check by a human inspector before they are transferred to a second fore-end processing line 320 by means of transfer station 325. The second fore-end processing line 320 comprises second fore-end conveyor 361, which is an overhead conveyor, and a plurality of processing stations 326 that are arranged along the track of the second fore-end conveyor 361. At the processing stations, process steps are carried out on the passing fore-ends, either manually, automatically or semi-automatically.

For aiding the processing of the fore-ends, an auxiliary conveyor 326 is provided below the second fore-end conveyor 361. The auxiliary conveyor 362 engages the fore-ends and lifts the lower part of the fore-ends up. This results in that the fore-ends are tilted toward the operator or towards the tools of the processing stations. It also provides additional support, so that the processing forces do not move the fore-ends too much relative to the tools used in the processing stations.

Further, a discharge conveyor 363 is provided for receiving any waste that is produced in the processing station and for removing it from the fore-end processing system.

Preferably, at least the second fore-end processing line 320 is flexible with respect to the process steps that are carried out. For example, the operators that work in the processing stations 326 in which one or more processing steps are carried out manually, are instructed (for example by means of a screen in front of them or otherwise adjacent to them) separately for each individual fore-end that is transported through their processing station whether to perform their process step or not, or e.g. to make a cut at an indicated location. The instructions come from the selection station 321. The information from the selection station 321 is preferably also used to control the automated processing stations 326 of the second fore-end processing line 320. Based on this information, processing stations can be controlled to stay idle or to carry our one or more processing steps when a particular fore-end passes through, or to make a cut at a certain location.

Before they are separated from the rest of the carcass half, the middle parts are already engaged by middle part conveyor 370. Once the separation of the middle part from the rest of the carcass half is complete, the middle part conveyor 370 carries the weight of the separated middle parts. The separated middle parts are then arranged on a conveyor 371 and transported further to a middle parts processing system (not shown in further detail).

When the fore-end and middle part are removed, only the ham still is arranged in the carrier of the first overhead conveyor 350. This first overhead conveyor takes the hams to a transfer station 381, where the hams are taken out of the carriers of the first overhead conveyor 350 and arranged in carriers of a ham conveyor 380. The ham conveyor 380 is also an overhead conveyor.

The ham conveyor 380 takes the hams to either a first ham processing line (not shown) or a second ham processing line 340.

The ham processing system comprises a selection station 341. In this selection station some measurements are performed on the ham (such as measurement of weight and fat percentage at various locations), and an automated visual inspection takes place using an image analysis-system. On the basis of the measurement results and the results of the visual inspection, it is decided which processing steps will be carried out on each individual ham.

Downstream of the selection station 341, the hams are distributed over two processing lines. Some of the hams are removed from the first ham conveyor 380 by discharge station 342. Those hams fall onto secondary conveyor 343, which transports them to a first ham processing line (not shown).

The hams that remain in first ham conveyor are subjected to a final check by a human inspector before they are transferred to a second ham processing line 340 by means of transfer station 345. The second ham processing line 340 comprises second ham conveyor 381, which is an overhead conveyor, and a plurality of processing stations 346 that are arranged along the track of the second ham conveyor 381. At the processing stations, process steps are carried out on the passing hams, either manually, automatically or semi-automatically.

For aiding the processing of the hams, an auxiliary conveyor 346 is provided below the second ham conveyor 381. The auxiliary conveyor 382 engages the hams and lifts the lower part of the hams up. This results in that the hams are tilted toward the operator or towards the tools of the processing stations. It also provides additional support, so that the processing forces do not move the hams too much relative to the tools used in the processing stations.

Further, a discharge conveyor 383 is provided for receiving any waste that is produced in the processing station and for removing it from the ham processing system.

Preferably, at least the second ham processing line 340 is flexible with respect to the process steps that are carried out. For example, the operators that work in the processing stations 346 in which one or more processing steps are carried out manually, are instructed (for example by means of a screen in front of them or otherwise adjacent to them) separately for each individual ham that is transported through their processing station whether to perform their process step or not, or e.g. to make a cut at an indicated location. The instructions come from the selection station 341. The information from the selection station 341 is preferably also used to control the automated processing stations 326 of the second ham processing line 340. Based on this information, processing stations can be controlled to stay idle or to carry our one or more processing steps when a particular ham passes through, or to make a cut at a certain location.

FIG. 35 shows a further embodiment of a system according to the invention.

In this embodiment, an overhead conveyor is provided (not shown for reasons of clarity), which comprises a track 1051. Carriers 1050 are lead by trolleys (not shown for reasons of clarity) along the track 1051 in direction of transport T. The trolleys are preferably connected to adjacent trolleys by means of a chain or cable.

Each of the carriers carries a red meat carcass or carcass part to be processed. The processing is carried out by processing stations 1020, 1030, 1040. First processing station 1020 is adapted to make a first cut using circular knife 1021. Second processing station 1030 is adapted to make a second cut using circular knife 1031. Third processing unit 1040 performs two derinding steps that are carried out by rollers 1041 and 1042, respectively.

The system of FIG. 35 further comprises a selection device 1010. The selection device 1010 comprises a measurement unit with a plurality of sensors 1011, 1012, 1013. The sensors 1011, 1012, 1013 determine different properties of the carcass or carcass part to be processed by the system. The measurement data is collected by data collection unit 1014, and then processed by processor 1015. The processor also receives data from data input 1016 about the required output of the system, in term of which end products should be produced and how much of each type of end product is to be produced. The processor 1015 determines which process steps are to be carried out on each individual carcass or carcass part to be processed based on the combined information from the data collection unit 1014 and the data input 1016.

This information is then transferred to a system control device 1067, that comprises an allocation control device 1060. The allocation control device 1060 receives the instructions with respect to the processing of each individual carcass or carcass part in its input unit 1065. Output unit 1066 of the allocation control device 1060 is in the example of FIG. 35 connected to cams 1061, 1062 that are arranged at various locations along the track 1051 of the overhead conveyor.

In the embodiment of FIG. 35, the carriers are all provided with orientation control arms 1052 and 1053. Furthermore, all carriers are rotatable about a vertical axis 1054 relative to the trolley to which they are connected.

The cams 1061, 1062 are all moveable between a position close to the track and a position further away from the track. The positions are shown in solid and dashed lines respectively in FIG. 35. When they are in a position close to the track, they are engaged by one of the arms 1052, 1053 of the carriers that pass by. When this happens, the cam stops the arm, while the trolley moves the carrier on. This causes the carrier to rotate about axis 1054. By means of this rotation, the carrier can bring the carcass or carcass part it hold either within reach or out of reach of the tools of a processing station.

In the example of FIG. 35, carcass part 1002 has to be processed by the first processing station 1020. The carrier is in such a position that the circular knife 1021 can engage the carcass part 1002.

In contrast, the carcass part 1003 should not be processed by second processing station 1030. Therefore, cam 1062 just upstream of the second processing station 1030 assumed its position close to the track just before the carrier holding carcass part 1003 was about to pass. As a result, this cam 1062 engaged arm 1053 of the carrier holding carcass part 1003, which resulted in that the carcass part 1003 was pivoted away form the circular knife 1031.

If carcass part 1003 is to be processed by the next processing station, the cam 1061 just downstream of processing station 1030 will be arranged in its position close to the track 1051, thereby engaging arm 1052 and pivoting the carrier back about axis 1054.

The same way, in the example of FIG. 35, carcass part 1004 has been pivoted away because it should not be processed by roller 1041.

In the embodiment of FIG. 35, furthermore a measuring device 1068 has been provided. It takes measurements of the carcass parts passing by at a location downstream of the second processing station 1030. The measurement data is transmitted to the system control device 1067, that uses the information from the measuring device 1068 as input for the control of the processing stations 1020 and 1030. Measuring device 1068 can for example comprise a camera, that checks whether the first and second cuts are made at the right positions. If not, the position of the knife 1021, 1031 can be adapted based on the information provided by the measuring device 1068.

FIG. 36 shows a further embodiment of a system according to the invention.

In this embodiment, an overhead conveyor is provided (not shown for reasons of clarity), which comprises a track 1051. Carriers 1050 are lead by trolleys (not shown for reasons of clarity) along the track 1051 in direction of transport T. The trolleys are preferably connected to adjacent trolleys by means of a chain or cable.

Each of the carriers carries a red meat carcass or carcass part to be processed. The processing is carried out by processing stations 1020, 1030, 1040. First processing station 1020 is adapted to make a first cut using circular knife 1021. Second processing station 1030 is adapted to make a second cut using circular knife 1031. Third processing unit 1040 performs two derinding steps that are carried out by rollers 1041 and 1042, respectively.

The system of FIG. 36 further comprises a selection device 1010. The selection device 1010 comprises a measurement unit with a plurality of sensors 1011,1012,1013. The sensors 1011,1012,1013 determine different properties of the carcass or carcass part to be processed by the system. The measurement data is collected by data collection unit 1014, and then processed by processor 1015. The processor also receives data from data input 1016 about the required output of the system, in term of which end products should be produced and how much of each type of end product is to be produced. The processor 1015 determines which process steps are to be carried out on each individual carcass or carcass part to be processed based on the combined information from the data collection unit 1014 and the data input 1016.

This information is then transferred to a system control device 1067, that comprises an allocation control device 1060. The allocation control device 1060 receives the instructions with respect to the processing of each individual carcass or carcass part in its input unit 1065. Output unit 1066 of the allocation control device 1060 is in the example of FIG. 36 connected to cams 1061, 1062 that are arranged at various locations along the track 1051 of the overhead conveyor.

In the embodiment of FIG. 36, the tools of the processing stations the entire processing stations are moveable to and away from the track 1051. If a carcass part passes by that has to be processed, the tool or processing station assumes its position close to the track, so that the tool or tools of the processing station can engage the carcass or carcass part to be processed. If a carcass or carcass part passes by that should not be processed by the processing station, the processing station or the respective tool assumes its position away from the track, so the tool of the processing station does not come into engagement with that particular carcass part.

In the example of FIG. 36, carcass part 1002 has to be processed by the first processing station 1020. Processing station 1020 is therefore positioned close to the track 1051 so that the circular knife 1021 can engage the carcass part 1002 in order to make the first cut.

In contrast, the carcass part 1003 should not be processed by second processing station 1030. Therefore, the entire processing station 1030, and with it circular knife 1031, has been retracted to its position away from the track 1051. Carcass part 1003 can now pass processing station 1030 without being cut into by the circular knife 1031.

Likewise, the carcass part 1004 should not be processed by the first roller 1041 of third processing station 1040. Third processing station 1040 has a fixed position relative to the track 1051, but its rollers 1041,1042 are moveable to and away from the track. Because carcass part 1004 should not be processed by the first roller 1041 of the third processing station 1040, first roller 1041 has been retracted to its position away from the track 1051. Carcass part 1004 can now pass the first roller 1041 of the third processing station 1040 without being treated by the roller 1041.

Carcass part 1005 should be processed by the second roller 1042 of the third processing station 1040. Therefore, roller 1042 has assumed its position close to the track so it can engage and process carcass part 1005.

Although not shown, the embodiment of FIG. 36 can be provided with a measuring device for control of the processing stations just like the embodiment of FIG. 35.

FIG. 37 shows an embodiment of a system according to the invention.

In this embodiment, an overhead conveyor is provided (not shown for reasons of clarity), which comprises a track 1051. Carriers 1050 are lead by trolleys (not shown for reasons of clarity) along the track 1051 in direction of transport T. The trolleys are preferably connected to adjacent trolleys by means of a chain or cable.

Each of the carriers carries a red meat carcass or carcass part to be processed. The processing is carried out by processing stations 1020, 1030, 1040. First processing station 1020 is adapted to make a first cut using circular knife 1021. Second processing station 1030 is adapted to make a second cut using circular knife 1031. Third processing unit 1040 performs two derinding steps, that are carried out by rollers 1041 and 1042, respectively.

The system of FIG. 37 further comprises a selection device 1010. The selection device 1010 comprises a measurement unit with a plurality of sensors 1011, 1012, 1013. The sensors 1011, 1012, 1013 determine different properties of the carcass or carcass part to be processed by the system. The measurement data is collected by data collection unit 1014, and then processed by processor 1015. The processor also receives data from data input 1016 about the required output of the system, in term of which end products should be produced and how much of each type of end product is to be produced. The processor 1015 determines which process steps are to be carried out on each individual carcass or carcass part to be processed based on the combined information from the data collection unit 1014 and the data input 1016.

This information is then transferred to a system control device 1067, that comprises an allocation control device 1060. The allocation control device 1060 receives the instructions with respect to the processing of each individual carcass or carcass part in its input unit 1065. Output unit 1066 of the allocation control device 1060 is in the example of FIG. 37 connected to cams 1061, 1062 that are arranged at various locations along the track 1051 of the overhead conveyor.

In the embodiment of FIG. 37, moveable guides 1070 are provided that can engage a passing carcass or carcass part.

The guides 1070 are moveable between a position close to the track 1051 and a position away from the track 1051. When a guide 1070 is in its position close to the track, it engages a passing carcass or carcass part and pushes the carcass or carcass part out of reach of the tools of the processing station the guide is arranged close to.

In the example of FIG. 37, carcass part 1002 has to be processed by the first processing station 1020. Guide 1070 is therefore positioned away from the track 1051 so that the circular knife 1021 can engage the carcass part 1002 in order to make the first cut.

In contrast, the carcass part 1003 should not be processed by second processing station 1030. Therefore, the guide 1071 is positioned close to the track 1051. Carcass part 1003 is pushed out of reach of the circular knife 1031 so that carcass part 1003 can now pass processing station 1030 without being cut into by the circular knife 1031.

Likewise, the carcass part 1004 should not be processed by the first roller 1041 of third processing station 1040. Therefore, the guide 1072 is positioned close to the track 1051. Carcass part 1004 is pushed out of reach of the first roller 1041 so that carcass part 1004 can now pass first roller 1041 without being processed by it.

Carcass part 1005 should be processed by the second roller 1042 of the third processing station 1040. Therefore, guide 1073 has assumed its position away from the track so that second roller 1042 can engage and process carcass part 1005.

Although not shown, the embodiment of FIG. 37 can be provided with a measuring device for control of the processing stations just like the embodiment of FIG. 35.

The embodiments of FIGS. 35, 36 and 37 show ways in which certain processing stations in a processing line can be bypassed. This allows that carcass parts, e.g. pig legs, are processed differently while they all go through the same processing line. This adds flexibility to the meat processing system.

It is possible to incorporate bypassing, for example in the form shown in FIGS. 25, 36 and 37, into the processing systems according to other embodiments shown in this application, eg. the embodiments shown in FIG. 32-34.

CLAUSES

The invention pertains to systems, methods and devices according to any one of the following clauses:

1. System for processing a carcass part of a slaughtered porcine, bovine, ovine, or caprine animal, e.g. a carcass part of a porcine animal, e.g. a leg or shoulder part of a porcine animal, which carcass part comprises a holding zone, which holding zone comprises bone with soft tissue thereon, which system comprises at least one carrier for carrying said carcass part, and which carrier comprises a retaining assembly for retaining the carcass part by the holding zone, the retaining assembly being adapted to engage on the exterior of the soft tissue.

2. System according to clause 1, wherein the retaining assembly is adapted to bear the weight of the carcass part.

3. System according to one or more of the preceding clauses, wherein the retaining assembly comprises a plate with a slot adapted to receive the holding zone.

4. System according to clause 3, wherein the slot has an entrance portion and a retaining portion, wherein the entrance portion is wider than the retaining portion.

5. System according to one or more of the clauses 3-4, wherein a protrusion extends into the slot.

6. System according to one or more of the preceding clauses, wherein the system comprises a plurality of carriers, and wherein the system further comprises a conveyor device which comprises:
   a track,
   a plurality of trolleys that are moveable along said track,
   possibly, a drive system for driving the trolleys along said track,
   wherein each of the carriers is connected to at least one trolley.

7. System according to clause 6, wherein the carrier is rotatable about an axis of rotation with respect to said one or more trolleys, e.g. a vertical axis, and wherein the carrier comprises a rotation element for rotating the carrier about said axis of rotation.

8. System according to clauses 6 and 7, wherein the axis of rotation extends in a vertical plane and perpendicular to the track.

9. System according to one or more of the preceding clauses, wherein the retaining assembly is pivotable about at least one axis with respect to the carrier, e.g. a horizontal axis.

10. System according to clauses 6 and 9, wherein the retaining assembly is pivotable about a horizontal pivot axis with respect to the one or more trolleys, and wherein said pivot axis is or can be oriented parallel to the track.

11. System according to any of the clauses 6-10, wherein the system further comprises a cam track, which cam track is arranged along the track of the conveyor device, and wherein at least one carrier is provided with a cam follower, which cam follower is adapted to cooperate with said cam track in controlling the position and/or orientation of at least a part of the carrier.

12. System according to any of the clauses 6-11, wherein at least one processing station is arranged along the track, which processing station comprises at least one product support guide for supporting the carcass part during the processing.

13. System according to clause 12, wherein the product support guide is arranged to change the orientation of the carcass part relative to the track of the transport system.

14. System according to any of the clauses 6-13, wherein at least one of the carriers comprises either an olecranon retaining assembly, a knee retaining assembly, or a retaining assembly with a pig foot aperture, preferably a pig foot slot.

15. Method for processing a carcass part of a porcine, bovine, ovine, or caprine slaughtered animal,
   which method comprises the following steps:
   providing a carcass part of a slaughtered porcine, bovine or ovine animal, which carcass part comprises a holding zone, which holding zone comprises bone with soft tissue thereon,
   identifying said holding zone,
   providing a carrier having a retaining assembly for holding the carcass part by the holding zone,
   making the retaining assembly engage the soft tissue of the holding zone,
   processing the carcass part.

16. Method according to clause 15, wherein the method further comprises the step of making the carrier come to bear the weight of the carcass or carcass part.

17. Method according to clause 15 or 16, which method further comprises the step of applying a guiding or orienting force is applied onto the carcass part such that the position and/or orientation of the carcass part relative to the retaining assembly changes under deformation of the soft tissue.

18. Method according to clause 17, wherein the part of the surface of the holding zone where the retaining assembly engages the holding zone does not move relative to retaining assembly when a guiding or orienting force is applied.

19. Method according to any of the clauses 15-18, wherein holding zone is a reference part of the carcass part, wherein the holding zoned preferably comprises one of olecranon, the knee, the foot, the shoulder blade, the pelvis.

20. Method according to any of the clauses 15-19, wherein the method further includes moving one or more carriers along a track of a conveyor device.

21. Method according to clause 20, wherein at least one carrier is rotatable relative to the track of the conveyor device, e.g. about a vertical axis, and wherein the method comprises the rotating said carrier relative to the track.

22. System for processing a carcass part of a slaughtered porcine, bovine, ovine, or caprine animal,
which carcass part comprises a first end, a second end and a reference portion, which is present between the first end and the second end,
which system comprises at least one carrier for carrying said carcass part of a slaughtered animal, and wherein the carrier comprises a retaining assembly for holding the carcass part by the reference portion, which retaining assembly preferably has a shape that is adapted to the shape and size of said reference portion.

23. System according to clause 22, wherein the retaining assembly is adapted to bear the weight of the carcass part.

24. System according to clause 22 or 23, wherein the carcass part comprises a shoulder part of a slaughtered animal, in particular of a porcine animal, which shoulder part comprises:
  at least a part of the humerus bone,
  at least a part of the radius, ulna, and
  the olecranon,
  at least a part of the meat that is naturally present on the humerus bone, radius, ulna and olecranon,
  in which carcass part the olecranon is the reference part,
  in which system the retaining assembly of the carrier is an olecranon retaining assembly engaging on the olecranon, preferably on the bone structure of the olecranon.

25. System according to clause 24, wherein the olecranon retaining assembly comprises:
  a first jaw, for engaging a first side of the olecranon,
  a second jaw, for engaging a second side of the olecranon, such that the olecranon can be clamped between the first jaw and the second jaw,
  an actuator, for moving the first jaw and the second jaw relative to each other.

26. System according to clause 22 or 23, wherein the carcass part comprises a ham of a slaughtered animal, in particular of a porcine animal, which ham comprises:
  a knee,
  at least a part of the femur bone, adjacent to the knee
  at least a part of the tibia bone and fibula bone, adjacent to the knee
  at least a part of the meat that is naturally present on the femur bone, tibia bone and fibula bone,
  in which carcass part the knee is the reference part, and in which system the retaining assembly is a knee retaining assembly engaging on the knee.

27. System according to clause 26, wherein the knee retaining assembly comprises:
  a first jaw, which first jaw is provided with a projecting and penetrating pin for penetrating the carcass part between the tibia bone and the fibula bone, adjacent to the knee,
  a second jaw, for engaging the knee,
  an actuator, for moving the first jaw with the projecting pin and the second jaw relative to each other.

28. System according to any of the preceding clauses, wherein the retaining assembly is pivotable or rotational about at least one axis with respect to the carrier, e.g. a horizontal axis.

29. System according to any of the preceding clauses, wherein the retaining assembly is rotatable in a plurality of planes relative to a stationary support structure or the track of a conveyor device.

30. System according to clause 29, wherein at least two planes in which the retaining assembly is rotatable are perpendicular to each other.

31. System according to any of the preceding clauses, wherein the orientation of the retaining assembly can be locked by a locking device.

32. System according to any of the preceding clauses, wherein the carrier further comprises control means for controlling the orientation of the retaining assembly.

33. System according to any of the preceding clauses, wherein the system further comprises:
  at least one a processing station,
  a conveyor device transporting the carriers along a track, the processing station being arranged along said track,
    wherein the conveyor comprises at least one trolley, wherein each carrier is connected to one or more trolleys.

34. System according to clause 33, wherein the system further comprises means for controlling the orientation of the carrier relative to the one or more trolleys to which said carrier is connected, which means are arranged alongside the track.

35. System according to clause 33 or 34, wherein the conveyor device is an overhead conveyor, and wherein the retaining assembly of a carrier is arranged below the one or more trolleys to which said carrier is connected.

36. System according to clause 33 or 34, wherein the retaining assembly of a carrier is arranged above the one or more trolleys to which said carrier is connected.

37. System according to any of the clauses 33-36, wherein the system further comprises locking means for locking the orientation of the lock of a carrier relative to the one or more trolleys to which said carrier is connected.

38. System according to any of the preceding clauses, wherein the system further comprises:
  a stationary support structure, the carrier being arranged on said stationary support structure,
  a processing station, the processing station being associated with said stationary support structure,
  and possibly a carcass part supply means for supplying a carcass part to the carrier.

39. System according to clause 38, wherein the stationary support comprises means for controlling the orientation of the carrier and/or the retaining assembly of a carrier relative to said stationary support.

40. System according to clause 38 or 39, wherein the stationary support comprises locking means for locking the orientation of the carrier and/or the retaining assembly of a carrier relative to said stationary support.

41. System according to any of the preceding clauses, wherein the system further comprises a classification system for determining to which further processing steps the carcass part will be subjected.

42. System according to clause 41, wherein the system further comprises a plurality of further processing lines for carrying out further processing steps on the carcass part, which processing lines are arranged in parallel, and a transfer station which is adapted to use input from the classification system, which transfer station is adapted to transfer a carcass part to one of the further processing lines, wherein information from the classification is used to control the transfer station.

43. Method for processing a carcass part of a slaughtered porcine, bovine, ovine, or caprine animal, which carcass part comprises a first end, a second end and a reference part, which is present between the first end and the second end, which method comprises the following steps:
providing the carcass part,
identifying the reference part,
providing a system according to clause 22,
holding the carcass part by the reference part by means of the retaining assembly,
processing the carcass part while the carrier holds the carcass part.

44. Method according to clause 43, further comprising the step of making the carrier bear the weight of the carcass part.

45. Method according to clause 43 or 44, wherein the carcass part comprises a shoulder part of a slaughtered animal, in particular of a porcine animal, which shoulder part comprises:
at least a part of the humerus bone,
at least a part of the radius, ulna, and
the olecranon,
at least a part of the meat that is naturally present on the humerus bone, radius, ulna and olecranon,
wherein the olecranon is the reference part,
and wherein an olecranon retaining assembly is engaged on the olecranon.

46. Method according to clause 43 or 44, wherein the carcass part comprises a ham of a slaughtered animal, in particular of a porcine animal, which ham comprises:
a knee,
at least a part of the femur bone, adjacent to the knee
at least a part of the tibia bone and fibula bone, adjacent to the knee
at least a part of the meat that is naturally present on the femur bone, tibia bone and fibula bone,
wherein the knee is the reference part,
and wherein a knee retaining assembly is engaged on the knee.

47. Method according to clause 45, which method further comprises the step of detaching meat from the olecranon, such that a part of the olecranon bone becomes exposed or at least reachable from the outside of the carcass part, which step is carried out before introducing the olecranon in the olecranon retaining assembly,
and wherein the olecranon retaining assembly engages the olecranon at a location that is at least substantially free from meat.

48. Method according to clause 45, wherein the carcass part that is provided has the olecranon bone at least partly covered by soft tissue, wherein the retaining assembly is made to engage the carcass part by the soft tissue on the olecranon bone.

49. Method according to clause 45, in which method an olecranon retaining assembly is provided that comprises a first jaw and a second jaw, and wherein the olecranon is held in the olecranon retaining assembly by clamping said olecranon between said first jaw and said second jaw.

50. Method according to clause 46, which method further comprises the step of detaching meat from the knee, such that a part of the bones of or adjacent to the knee becomes exposed or at least reachable from the outside the carcass part, which step is carried out before locking the knee in the knee retaining assembly,
and wherein the knee retaining assembly engages the knee at a location that is at least substantially free from meat.

51. Method according to clause 50, wherein the carcass part that is provided has the knee at least partly covered by soft tissue, wherein the retaining assembly is made to engage the carcass part by the soft tissue on the knee.

52. Method according to clause 50, in which method a knee retaining assembly is provided that comprises a hook, and wherein the knee is held in the knee retaining assembly by making the hook of the knee retaining assembly penetrate the carcass part between the tibia bone and the fibula bone, adjacent to the knee.

53. Slaughtered pig shoulder parts conveyor device for conveying individual pig shoulder parts, wherein an individual pig shoulder part includes:
at least a part of the humerus bone,
at least a part of the radius, and of the ulna
the olecranon,
at least a part of the meat that is naturally present on the humerus bone, the radius, the ulna,
said conveyor device comprising:
a track,
one or more pig shoulder part carriers movable along said track, each carrier being adapted to carry an individual pig shoulder part,
wherein each carrier has one shoulder part retaining assembly adapted to engage on a single pig shoulder part so as to retain the pig shoulder part,
wherein the retaining assembly is an the olecranon retaining assembly that is adapted to engage on the olecranon.

54. Conveyor device according to clause 53, wherein the olecranon retaining assembly comprises:
a first jaw adapted to engage a first side of the olecranon,
a second jaw adapted to engage a second side of the olecranon,
which first and second jaws are movable relative to one another between an opened position wherein the olecranon can be introduced between the first and second jaws, and a closed position, wherein the olecranon is held between the first and second jaws,
an actuator, for moving the first jaw and the second jaw relative to each other.

55. Conveyor device according to clause 54, where the first jaw has two teeth and between them an olecranon slot 38 adapted to receive a portion of the olecranon, preferably a V-shaped slot.

56. Conveyor device according to clause 55, where the second jaw is adapted to push the olecranon in the slot of the first jaw and to hold the olecranon in said slot.

57. A carrier for an individual pig shoulder part, wherein an individual pig shoulder part includes:
at least a part of the humerus bone,
at least a part of the radius, and of the ulna
the olecranon,
at least a part of the meat that is naturally present on the humerus bone, the radius, the ulna,
wherein the carrier is adapted to carry an individual pig shoulder part and has one shoulder retaining assembly adapted to engage on a single pig shoulder part so as to retain the pig shoulder part, wherein the retaining assembly is an the olecranon retaining assembly that is adapted to engage on the olecranon.

58. Method for conveying and/or processing a pig shoulder part, wherein use is made of a device and/or a carrier according to one or more of the preceding clauses 53-57.

59. Slaughtered pig ham part conveyor device, which pig ham part comprises:
- a knee,
- at least a part of the femur bone, adjacent to the knee
- at least a part of the tibia bone and fibula bone, adjacent to the knee
- at least a part of the meat that is naturally present on the femur bone, tibia bone and fibula bone, said conveyor device comprising:
- a track,
- one or more pig ham part carriers movable along said track, each carrier being adapted to carry an individual pig ham part, wherein each carrier has one pig ham part retaining assembly adapted to engage on a single pig ham part so as to retain the pig ham part, wherein the retaining assembly is a knee retaining assembly that is adapted to engage on the knee of the pig ham part.

60. Conveyor device according to clause 59, wherein the knee retaining assembly comprises:
- a first jaw, which first jaw is provided with a projecting pin adapted to penetrate the carcass part between the tibia bone and the fibula bone, adjacent to the knee,
- a second jaw, for engaging the knee,
- an actuator adapted to move the first jaw with the projecting pin and the second jaw relative to each other between an opened position wherein the knee can be introduced between the first and second jaws, and a closed position, wherein the knee is held between the first and second jaws and the pin is penetrated into the carcass part.

61. A carrier for an individual pig ham part, wherein an individual pig ham part includes:
- at least a part of the humerus bone,
- at least a part of the radius, and of the ulna
- the olecranon,
- at least a part of the meat that is naturally present on the humerus bone, the radius, the ulna, wherein the carrier is adapted to carry an individual pig ham part and has one shoulder retaining assembly adapted to engage on a single pig ham part so as to retain the pig ham part, wherein the retaining assembly is an the olecranon retaining assembly that is adapted to engage on the olecranon.

62. Method for conveying and/or processing a pig ham part, wherein use is made of a device and/or a carrier according to one or more of the preceding clauses 59-61.

63. Slaughtered pig leg parts conveyor device, for conveying individual pig leg parts, wherein an individual pig leg part includes at least a portion of a pig leg and the pig foot, said conveyor device comprising:
- a track,
- one or more pig leg part carriers movable along said track, each carrier being adapted to carry an individual pig leg part, wherein each carrier has one pig foot retaining assembly adapted to engage on a single pig foot so as to retain the pig leg part in a position suspended from the carrier, wherein the retaining assembly includes a pig foot aperture adapted to receive the pig foot.

64. Conveyor device according to clause 63, wherein the retaining assembly is rotatable about vertical axis, and wherein the carrier is provided with a rotation or an indexing mechanism providing multiple predetermined angular positions of the retaining assembly about said vertical axis 65. Conveyor device according to clause 63 or 64, wherein the retaining assembly has a pig foot slot adapted to receive the pig foot, which slot is open at one end thereof to introduced the pig foot sideways into the slot and remove the pig foot sideways from the slot.

66. Conveyor device according to one or more of the preceding clauses 63-65,
wherein the retaining assembly includes a pig foot aperture adapted to receive the pig foot, the aperture having a rigid reference face, the retaining assembly being adapted to receive the pig foot with its central metatarsal bones adjacent said rigid reference face, and the retaining assembly being adapted to press the lateral metatarsal towards the reference face.

67. Conveyor device according to clause 66, wherein the aperture is a pig foot slot which is open at one end thereof to introduce the pig foot sideways into the slot and remove the pig foot sideways from the slot, wherein the slot has a narrowing entrance portion at its open end leading to a retaining portion of the slot, the retaining portion including the reference face, such that upon sideways introduction of the pig foot into the slot, the narrowing entrance portion presses the lateral metatarsal bones from their natural position into a position closer to the reference face.

68. Conveyor device according to clause 67, wherein the retaining assembly comprises a protrusion between the entrance portion and the retaining portion of the pig foot slot that defines a narrowest passage of the slot so as to keep the pig foot in the retaining portion.

69. Conveyor device according to clause 66, 67 or 68, wherein the retaining assembly comprises a rigid slot member in which the pig foot slot is formed, e.g. a metal plate.

70. Conveyor device according to one or more of the clauses 65, 67-69, wherein the retaining assembly comprises a blocking member that is movable between a blocking position, wherein the blocking member extends across at least part of the width of the slot so as to block the pig foot from leaving the pig foot slot, and a retracted position wherein the pig foot can be removed from the slot.

71. Conveyor device according to one or more of the preceding clauses 63-70, wherein the retaining member is pivotal about a horizontal axis, preferably freely pivotal.

72. Conveyor according to one or more of the preceding clauses 63-71, wherein the retaining assembly has a bracket including a slot member in which the pig foot receiving slot is formed, a top member at a higher elevation than said slot member, and one or more flanges between said top member and the slot member, wherein preferably the bracket comprises two spaced apart flanges supporting the slot member.

73. Conveyor device according to clause 72, wherein the slot in the slot member is arranged laterally offset from the one or more legs of the bracket.

74. Conveyor device according to clauses 71 and 72, wherein the top member has a horizontal pivot member that allows for pivoting of the bracket about a horizontal axis.

75. Conveyor device according to clause 71, wherein the conveyor device comprises a cam track arranged at a location along the track where a pivoting of the retaining assembly about the horizontal pivot axis is desired, and wherein the retaining assembly comprises a corresponding cam follower, e.g. a roller fitted to the one or more legs of the bracket.

76. Conveyor devices according to any of clauses 65, 67-70, and clause 71, wherein the slot has a main axis and wherein the main axis is between 5 and 20 degrees with respect to a plane perpendicular to the horizontal pivot axis.

77. Conveyor device according to clauses 64 and 71, wherein the indexing mechanism has a predetermined position wherein the horizontal pivot axis is parallel to the track.

78. Conveyor device according to clause 64, wherein the carrier comprises a locking arrangement associated with the indexing mechanism, said locking arrangement comprises a locking member that locks the retaining assembly in a predetermined position, possibly the locking arrangement comprising a mobile locking element that is actuable by an external operator.

79. Conveyor device according to clause 64, wherein the indexing mechanism includes a Geneva drive wheel body having a vertical rotation axis and slots at multiple angular positions in the body, each slot being adapted to receive therein a pin that is arranged along the track so as to obtain an intermittent rotary motion of the retaining assembly about said vertical axis 80. Conveyor device according to clause 79, wherein the body has a rectangular contour with the vertical rotation axis being offset from the center of the body, each slot having a main axis that is radial with respect to the offset vertical rotation axis, preferably each slot having its opening in a corner region of the body.

81. Conveyor device according to clause 64, wherein the indexing mechanism includes two eccentrically stacked circular disc body portions, wherein the body has a vertical rotation axis that is offset from the center of each of the disc body portions, and wherein the conveyor device comprises one or more guide members arranged along the track at locations where rotation of the retaining assembly about said vertical axis is desired, the one or more guide members being arranged to cooperate with the circular peripheral face of a disc body portion to effect said rotation.

82. Conveyor device according to one or more of the preceding clauses 63-81, wherein each track comprises a rail, preferably an overhead rail, and wherein each carrier is connected to the rail via one or more trolleys.

83. Conveyor device according to clause 82, wherein a carrier is connected to the rail via two trolleys that are spaced apart in the direction of the track, each trolley preferably being pivotally connected about a vertical axis to a common connection member of the carrier.

84. Conveyor device according to one or more of the clauses 63-83, wherein the retaining assembly has a pig foot slot adapted to receive the pig foot, which slot is open at one end thereof to introduced the pig foot sideways into the slot and remove the pig foot sideways from the slot, and wherein the conveyor device comprises one or more ejection guides arranged along the track at a location where removal of a pig foot from the slot is desired, the ejection guide being arranged so as to contact the pig leg part, preferably under the slot member, e.g. within 5 centimeters, the ejection guide forcing the pig foot out of the slot during passage of the pig leg part along the ejection guide.

85. Conveyor device according to one or more of the preceding clauses 63-84, wherein the retaining member is pivotal about a horizontal axis, preferably freely pivotal, and wherein—at a processing station wherein a pig leg part is subject to a process, e.g. a manual cutting process wherein one or more cuts are manually made in the leg part—one or more product supporting guides are arranged along the track, wherein the conveyor device is preferably adapted to arrive at said processing station with the horizontal pivot axis parallel to the track, and wherein the product supporting guides engage the leg part and cause a tilting of the leg part and retaining assembly about said horizontal pivot axis into a sideways inclined position with respect to the track, e.g. the station having one or more standing positions, e.g. platforms, for operators that perform a manual operation on the leg part.

86. Conveyor device according to one or more of the preceding clauses 63-84, wherein the retaining member is pivotal about a horizontal axis, preferably freely pivotal, and wherein—at a processing station wherein a pig leg part is subject to a process, e.g. a manual cutting process wherein one or more cuts are manually made in the leg part—one or more product supporting members are movably arranged along the track in said processing station, each product supporting member being moved in synchronisation with a pig leg part, wherein the conveyor device is preferably adapted to arrive at said processing station with the horizontal pivot axis parallel to the track, and wherein the product supporting member is adapted to engage the leg part and cause a tilting of the leg part and retaining assembly about said horizontal pivot axis into a sideways inclined position with respect to the track, e.g. the station having one or more standing positions, e.g. platforms, for operators that perform a manual operation on the leg part.

87. Conveyor device according to one or more of the preceding clauses 63-86, wherein at a processing station wherein a pig leg is subject to a process, e.g. a manual cutting process wherein one or more cuts are manually made in the leg part—one or more support guides are arranged along the track, a support guide cooperating with a guide face of a carrier, e.g. of a guide block of the carrier, and preventing unwanted rotation of the carrier about a vertical axis and/or unwanted sideways movement of the carrier.

88. Slaughtered pig leg parts conveyor system comprising a first and a second slaughtered pig leg parts conveyor device for conveying individual pig leg parts, wherein an individual pig leg part includes at least a portion of a pig leg and the pig foot, each of said first and second conveyor device, preferably according to one or more of the preceding clauses 63-87, each conveyor device comprising:
   a track,
   one or more pig leg part carriers movable along said track,
      each carrier being adapted to carry an individual pig leg part, wherein each carrier has one pig foot retaining assembly adapted to engage on a single pig foot so as to retain the pig leg part in a position suspended from the carrier,
   wherein the retaining assembly includes a pig foot aperture adapted to receive the pig foot,
   wherein the retaining assembly has a slot adapted to receive the pig foot, which slot is open at one end thereof to introduced the pig foot sideways into the slot and remove the pig foot sideways from the slot,
   wherein the system includes a transfer station where pig leg parts are transferred directly from the first conveyor to the second conveyor,
   wherein the conveyor devices are embodied such that at the transfer station the motion of the carriers of the first and second conveyors is synchronized so that a leg part that is initially suspended from the leg retaining assembly of a carrier of the first conveyor device is transferred into the slot of the leg retaining assembly of a carrier of the second conveyor device, the leg part remaining suspended in the transfer process by at least one of the leg retaining members.

89. System according to clause 88, wherein the transfer station comprises one or more ejection guides are arranged along the track of the first conveyor device, the ejection guide being arranged so as to contact the pig leg part, preferably under the slot member, e.g. within 5 centimeters, the ejection guide forcing the pig foot out of said slot and into the slot of the carrier of the second conveyor device during passage of the pig leg part along the ejection guide.

90. System according to clause 88 or 89, wherein in the transfer station the paths of the leg retaining assemblies of the first and second conveyor are at different heights, and the leg retaining assemblies being brought in an overlapping position—when seen from above.

91. System according to clause 90, wherein the leg retaining assemblies of the carriers of the first and of the second conveyor device each have a bracket including a slot member in which the pig foot receiving slot is formed, a top member at a higher elevation than said slot member, and one or more flanges between said top member and the slot member, and wherein the slot in the slot member is arranged laterally offset from the one or more legs of the bracket.

92. Method for conveying individual pig leg parts, each pig leg part including at least a portion of a pig leg and the pig foot, wherein use is made of a conveyor device or conveyor system according to one or more of the preceding clauses 63-91.

93. Method according to clause 92, wherein front pig leg parts and hind pig leg parts are conveyed with the same conveyor device.

94. System for processing a carcass or carcass part of a porcine, bovine, ovine, or caprine animal, which processing involves a plurality of process steps,
which system comprises:
a transport system, which transport system comprises:
an overhead conveyor, which overhead conveyor comprises a track and a plurality of trolleys, which trolleys are movable along said track,
a plurality of carriers for holding a carcass or carcass part, each of the carriers being connected to a trolley,
a plurality of processing stations, which processing stations are arranged along the track, each of the processing stations being adapted to carry out one or more processing steps on a carcass or carcass part,
a selection device, for determining for each individual carcass or carcass part which processing steps have to be carried out on said carcass or carcass part,
which selection device comprises:
a carcass measurement unit for determining at least two properties of the carcass or carcass part to be processed,
a data collection unit, for receiving measurement data from the carcass measurement unit, data regarding the desired output of the system,
a processor for processing the data collected by the data collection unit in order to determine for each individual carcass or carcass part which processing steps have to be carried out on said carcass or carcass part,
a system control device, which system control device comprise an allocation control device, which allocation control device comprises:
an input unit, for receiving information from the selection device regarding which processing steps have to be carried out on said carcass or carcass part,
an output unit, for controlling the transport system and/or the processing stations such that each carcass or carcass part is subjected to the processing steps designated to it, characterised in that
the output device of the allocation control device is adapted to make the carcass or carcass part bypass any processing station that is adapted to carry out a process step that the carcass or carcass part is not to be subjected to.

95. System according to clause 94, wherein at least one of the processing stations has a processing station control unit that is controlled by the system control device, and wherein the system control device further comprises a process measuring device which is adapted to take measurements of one or more process parameters upstream and/or downstream of said processing station, which measurement results are used by the processing station control unit in the controlling of the processing steps carried out by said processing station.

96. System according to clause 95, wherein the process measuring device is adapted to perform measurements on a carcass or carcass part that has been processed by the processing station.

97. System according to any of the clauses 94-96, wherein at least one processing station comprises a tool that carries out one or more process steps, which tool has an active position in which it comes into engagement with a carcass or carcass part that is to be processed and a non active position in which a carcass or carcass part that is not to be processed by the tool can bypass the tool,
and wherein the allocation control unit controls the position of said tool.

98. System according to any of the clauses 94-97, wherein at least one processing station is moveable relative to the track of the transport system between an active position in which it comes into engagement with a carcass or carcass part that is to be processed and a non active position in which a carcass or carcass part that is not to be processed by the processing station can bypass the tool,
and wherein the allocation control unit controls the position of said processing station.

99. System according to any of the clauses 94-98, wherein at least one carrier is moveable relative to the track of the transport system, which carrier has an active position and/or active orientation relative to the track in which the carrier brings the carcass or carcass part that it is holding into engagement with a tool of a processing station so said carcass or carcass part can be processed by said processing station, and a non active position and/or non-active orientation relative to the track in which the carcass or carcass part that is held by said carrier the tool bypasses the tool,
and wherein the allocation control unit controls the position and/or orientation of said carrier.

100. System according to any of the clauses 94-99, wherein the transport system comprises a primary overhead conveyor, which primary overhead conveyor comprises:
a track,
a plurality of trolleys, which trolleys are movable along said track,
a plurality of carriers for holding a carcass or carcass part, each of the carriers being connected to a trolley,
and wherein the system further comprises:
a plurality of primary processing stations, which processing stations are arranged along the track of the primary overhead conveyor, each of the primary processing stations being adapted to carry out one or more processing steps on a carcass or carcass part,
a secondary overhead conveyor, which secondary overhead conveyor comprises:
a track,
a plurality of trolleys, which trolleys are movable along said track,
a plurality of carriers for holding a carcass or carcass part, each of the carriers being connected to a trolley,
a plurality of secondary processing stations, which processing stations are arranged along the track of the secondary overhead conveyor, each of the secondary processing stations being adapted to carry out one or more processing steps on a carcass or carcass part, a tertiary overhead conveyor, which tertiary overhead conveyor comprises:
a track,
a plurality of trolleys, which trolleys are movable along said track,
a plurality of carriers for holding a carcass or carcass part, each of the carriers being connected to a trolley,
a plurality of tertiary processing stations, which processing stations are arranged along the track of the tertiary overhead conveyor, each of the tertiary processing stations being adapted to carry out one or more processing steps on a carcass or carcass part,
a rehanger for taking a carcass or carcass part out of a carrier of the primary overhead conveyor and arranging said carcass or carcass part in a carrier of either the secondary or the tertiary overhead conveyor,
wherein the allocation control system determines whether said carcass or carcass part is arranged in a carrier of the secondary or the tertiary overhead conveyor.

101. System according to any of the clauses 94-100, wherein at least one processing station comprises a carrousel.

102. System according to any of the clauses 94-102, wherein at least one processing station comprises a plurality of carrousels that are arranged in a single frame.

103. System according to any of the clauses 94-102, wherein the carrier is a carrier according to one or more of the preceding clauses.

104. Method for processing a carcass or carcass part of a porcine, bovine, ovine, or caprine slaughter animal, which processing involves a plurality of process steps,
which method comprises the following steps:
arranging the carcass or carcass part in a carrier of a transport system which is an overhead conveyor, wherein the carrier is connected to one or more trolleys moveable along a track of said overhead conveyor,
determining at least two properties of the carcass or carcass part,
determining the desired amount and type of end products that are to be obtained,
deciding a most advantageous way to process the carcass or carcass part based on the determined properties of the carcass or carcass part and the desired amount and type of end products that are to be obtained, and then deciding which processing steps have to be carried out in which sequence for this most advantageous way of processing said carcass or carcass part,
determining a routing for the carcass or carcass part along a plurality of processing stations, that each are adapted to carry out at least one processing step of what has been determined the most advantageous way of processing said carcass or carcass part,
moving the carcass or carcass part along said routing by means of said overhead conveyor,
bypassing any processing stations along said routing that are adapted to carry out one or more processing steps that are not included in the most advantageous way of processing said carcass or carcass part.

105. Method according to clause 104, wherein each of the processing stations has one or more tools to carry out the processing step or processing steps, and wherein the bypassing is achieved by moving the carcass or carcass part out of reach of the tools of a processing station that is adapted to carry out a processing step that is not part of said most advantageous way of processing said carcass or carcass part.

106. Method according to clause 104 or 105, wherein each of the processing stations has one or more tools to carry out the processing step or processing steps, and
wherein the bypassing is achieved by moving the tools of a processing station that is adapted to carry out a processing step that is not part of said most advantageous way of processing said carcass or carcass part out of reach of the carcass or carcass part.

107. Method according to any of the clauses 104-106, wherein each of the processing stations has one or more tools to carry out the processing step or processing steps, and
wherein the bypassing is achieved by moving the processing station that is adapted to carry out a processing step that is not part of said most advantageous way of processing said carcass or carcass part out of reach of the carcass or carcass part.

108. Method according to any of the clauses 104-107, wherein the method comprises the additional steps of:
performing a measurement and/or analysis of the carcass or carcass part at a measurement location along its routing along the processing stations,
using the result of the measurement and/or analysis in the control of at least one processing stations upstream or downstream of the measurement location.

109. Method according to any of the clauses 104-108, wherein the carrier used in the system is a carrier according one or more of the preceding clauses.

110. System for processing a carcass or carcass part of a porcine, bovine, ovine, or caprine slaughter animal, which processing involves a plurality of processing steps,
which system comprises:
a primary transport system, which primary transport system comprises:
an overhead conveyor, which overhead conveyor comprises a track and a plurality of trolleys, which trolleys are movable along said track,
a plurality of carriers for holding a carcass or carcass part, each of the carriers being connected to one or more trolleys,
a plurality of processing stations, which processing stations are arranged along the track, each of the processing stations being adapted to carry out one or more processing steps on a carcass or carcass part, wherein in at least one processing station a step of removing a part of the carcass or carcass part is carried out,
a secondary transport system, which secondary transport system is arranged adjacent to the processing station in which said part is removed from the carcass or carcass part,
which secondary transport system is adapted to receive said part.

111. System according to clause 110, wherein the secondary transport system comprises at least one of an overhead conveyor, a belt conveyor, a wheeled container.

112. System according to clause 110 or 111, wherein the system comprises a plurality of secondary conveyors, each being arranged to transport parts that are separated from the rest of the carcass or carcass part at a different location.

113. System according to any of the clauses 110-112, wherein the secondary conveyor is arranged such that it catches a separated part falling from the processing station that the secondary conveyor is associated with.

114. System according to any of the clauses 110-113, wherein the secondary conveyor has a moveable surface for receiving the separated parts.

115. System according to clause 114, wherein the moveable surface of the secondary conveyor is adapted to move at such a speed that the received separated parts are distributed over the moveable surface and do not lie on top of each other.

116. System according to any of the clauses 110-115, wherein at least one processing station comprises a carrousel.

117. System according to any of the clauses 110-116, wherein at least one processing station comprises a plurality of carrousels that are arranged in a single frame.

118. System according to any of the clauses 110-117, wherein the carrier is a carrier according to one or more of the preceding clauses.

119. System according to any of the clauses 110-118, wherein at least one of the processing stations has a processing station control unit that is controlled a the system control device,
and wherein the system control device further comprises a process measuring device which is adapted to take measurements of one or more process parameters upstream and/or downstream of said processing station, which measurement results are used by the processing station control unit in the controlling of the processing steps carried out by said processing station.

120. Method for processing a carcass or carcass part of a porcine, bovine, ovine, or caprine slaughter animal, which processing involves a plurality of processing steps,
which method comprises the following steps:
arranging the carcass or carcass part in a carrier of a transport system which is an overhead conveyor, wherein the carrier is connected to one or more trolleys moveable along a track said an overhead conveyor,
transporting said carcass or carcass part to a processing station,
at said processing station, separating a part from the carcass or carcass part,
arranging said separated part in or on a secondary conveyor, which is arranged adjacent to said processing station,
transporting the rest of the carcass or carcass part away from said processing station by means of the overhead conveyor,
transporting the separated part away from said processing station by means of the secondary conveyor.

121. Method according to clause 120, wherein the separated parts are moved from the processing station to the secondary conveyor by means of gravity.

122. Method according to clause 120 or 121, wherein the separated parts on a secondary conveyor all have the same orientation relative to said secondary conveyor.

123. Method according to clause 122, wherein the removing of the separated parts from said secondary conveyor uses this particular orientation.

124. Method according to any of the clauses 120-123, wherein the carrier used in the system is a carrier according to one or more of the preceding clauses.

125. Method according to any of the clauses 120-124, wherein the method comprises the additional steps of:
performing a measurement and/or analysis of the carcass or carcass part at a measurement location along its routing along the processing stations,
using the result of the measurement and/or analysis in the control of at least one processing stations upstream or downstream of the measurement location.

The invention claimed is:

1. A slaughtered pig leg parts conveyor device, for conveying individual pig leg parts, wherein an individual pig leg part includes at least a portion of a pig leg and a pig foot, said conveyor device comprising:
a track; and
one or more pig leg part carriers movable along said track, each carrier being adapted to carry an individual pig leg part,
wherein:
each carrier has one pig foot retaining assembly adapted to engage on a single pig foot so as to retain the pig leg part in a position suspended from the carrier,
the retaining assembly includes a pig foot aperture adapted to receive the pig foot,
the retaining assembly is rotatable about a vertical axis, and
the carrier is provided with a rotation or an indexing mechanism providing multiple predetermined angular positions of the retaining assembly about said vertical axis.

2. The conveyor device according to claim 1, wherein:
the retaining member is pivotal about a horizontal axis,
the indexing mechanism has a predetermined position where the horizontal pivot axis is parallel to the track,
at a processing station where a pig leg part is subject to a process, one or more product support guides are arranged along the track, and
the product support guides engage the pig leg part and hold the pig leg part in a desired position and/or orientation relative to the track during the processing of that pig leg part.

3. The conveyor device according to claim 1, wherein:
the retaining member is pivotal about a horizontal axis,
the indexing mechanism has a predetermined position where the horizontal pivot axis is parallel to the track,
at a processing station where a pig leg part is subject to a process, one or more product support guides are arranged along the track, and
said product support guides engage the pig leg part and cause a tilting of the pig leg part relative to the carrier and/or to the track about said horizontal pivot axis into a sideways inclined orientation with respect to the track and maintain said orientation.

4. The conveyor device according to claim 1, wherein:
the retaining member is pivotal about a horizontal axis,
at a processing station where a pig leg part is subject to a process, one or more product support guides are arranged along the track,
the conveyor device is adapted to arrive at said processing station with the horizontal pivot axis parallel to the track, and
the product support guides engage the pig leg part and cause a tilting of the pig leg part and retaining assembly about said horizontal pivot axis into a sideways inclined position with respect to the track.

5. The conveyor device according to claim 4,
wherein at the processing station, the pig leg part is subject to a manual cutting process where one or more cuts are manually made in the pig leg part.

6. The conveyor device according to claim 4,
wherein the station has one or more standing positions, for operators that perform a manual operation on the pig leg part.

7. The conveyor device according to claim 1,
wherein the device comprises at least one product support guide which is loop-shaped, and wherein the loop-shaped product support guide is rotatable around an axis, said loop-shaped product guide being adapted to be rotated in synchronisation with a pig leg part that is moved along the track.

8. The conveyor device according to claim 7, wherein the rotatable loop-shaped product support guide is provided with one or more stops for preventing undesired tilting of the pig leg part relative to the track.

9. The conveyor device according to claim 1, wherein the carrier is provided with a brace, for preventing undesired tilting of the pig leg part relative to the track.

10. The conveyor device according to claim 1, wherein:
the retaining member is pivotal about a horizontal axis,
at a processing station where a pig leg part is subject to a process, one or more product supporting members are movably arranged along the track in said processing station, each product supporting member being moved in synchronisation with a pig leg part,
the conveyor device is adapted to arrive at said processing station with the horizontal pivot axis parallel to the track, and
the product supporting member is adapted to engage the pig leg part and cause a tilting of the leg part and retaining assembly about said horizontal pivot axis into a sideways inclined position with respect to the track.

11. The conveyor device according to claim 10, wherein at the processing station, the pig leg part is subject to a manual cutting process where one or more cuts are manually made in the pig leg part.

12. The conveyor device according to claim 10, wherein the station has one or more standing positions, for operators that perform a manual operation on the pig leg part.

13. The conveyor device according to claim 1, wherein at a processing station where a pig leg is subject to a process, one or more support guides are arranged along the track, a support guide cooperating with a guide face of a carrier, and preventing unwanted rotation of the carrier about a vertical axis and/or unwanted sideways movement of the carrier.

14. The conveyor device according to claim 1,
wherein the trolley is provided with at least one roller, and
wherein at a processing station where a pig leg is subject to a process, one or more support guides are arranged along the track, a support guide cooperating with the at least one roller for preventing unwanted rotation of the carrier about a horizontal axis and/or about a vertical axis and/or unwanted sideways movement of the carrier.

15. The conveyor device according to claim 1,
wherein at a processing station where a pig leg is subject to a process, one or more carrier and/or trolley support guides are arranged along the track, of which at least one support guide is provided with one or more rollers, the at least one roller of said support guide cooperating with a guide face of a carrier and/or of the trolley, and preventing unwanted rotation of the carrier and/or trolley about a vertical axis and/or unwanted sideways movement of the carrier and/or trolley.

16. The conveyor device according to claim 1, wherein the carrier comprises a locking arrangement associated with the indexing mechanism, said locking arrangement comprises a locking member that locks the retaining assembly in a predetermined position, possibly the locking arrangement comprising a mobile locking element that is actuable by an external operator.

17. The conveyor device according to claim 1, wherein the indexing mechanism includes a Geneva drive wheel body having a vertical rotation axis and slots at multiple angular positions in the body, each slot being adapted to receive therein a pin that is arranged along the track so as to obtain an intermittent rotary motion of the retaining assembly about said vertical axis.

18. The conveyor device according to claim 17, wherein the body has a rectangular contour with the vertical rotation axis being offset from the center of the body, each slot having a main axis that is radial with respect to the offset vertical rotation axis.

19. The conveyor device according to claim 1, wherein the rotation mechanism includes two eccentrically stacked circular disc body portions, wherein the body has a vertical rotation axis that is offset from the center of each of the disc body portions, and wherein the conveyor device comprises one or more guide members arranged along the track at locations where rotation of the retaining assembly about said vertical axis is desired, the one or more guide members being arranged to cooperate with the circular peripheral face of a disc body portion to effect said rotation.

20. The conveyor device according to claim 1,
wherein the retaining member is freely pivotal about a horizontal axis.

21. The conveyor according to claim 1, wherein the retaining assembly has a bracket including a slot member in which the pig foot receiving slot is formed, a top member at a higher elevation than said slot member, and one or more flanges between said top member and the slot member.

22. The conveyor device according to claim 21, wherein the slot in the slot member is arranged laterally offset from the one or more legs of the bracket.

23. The conveyor device according to claim 21, wherein the retaining member is pivotal about a horizontal axis, and wherein the top member has a horizontal pivot member that allows for pivoting of the bracket about said horizontal axis.

24. The conveyor device according to claim 1, wherein the retaining member is pivotal about a horizontal axis, wherein the conveyor device comprises a cam track arranged at a location along the track where a pivoting of the retaining assembly about the horizontal pivot axis is desired, and wherein the retaining assembly comprises a corresponding cam follower.

25. A method for conveying individual pig leg parts, each pig leg part including at least a portion of a pig leg and a pig foot, the method comprising the steps of:
arranging the pig leg part in a carrier of a conveyor device according to claim 1, the pig foot aperture of the retaining assembly receiving the pig leg foot; and
rotating the retaining assembly about a vertical axis into a predetermined angular position of the retaining assembly.

26. The method according to claim 25, wherein:
the retaining part is pivoted about a horizontal axis and the indexing mechanism is in a predetermined position in which said horizontal pivot axis is parallel to the track, and
the pig leg part is engaged by a pig leg support guide that is arranged along the track, and the pig leg part is held in a desired position and/or orientation relative to the track during the processing of that pig leg part by said pig leg support guide.

27. The method according to claim 25, wherein:
the retaining part is pivoted about a horizontal axis and the indexing mechanism is in a predetermined position in which said horizontal pivot axis is parallel to the track,
the pig leg part is engaged by one or more pig leg part support guides which are arranged along the track, and a tilting of the leg part relative to the carrier and/or to the track about said horizontal pivot axis into a sideways inclined orientation with respect to the track and maintaining said orientation is caused by said one or more pig leg part support guides.

28. The method according to claim 25, wherein:

the retaining part is pivoted about a horizontal axis and the indexing mechanism is in a predetermined position in which said horizontal pivot axis is parallel to the track, a pig leg part is subject to a process at a processing station, in said processing station, one or more product supporting members are movably arranged along the track, each product supporting member is moved in synchronisation with a pig leg part, the conveyor device arrives at said processing station with the horizontal pivot axis parallel to the track, and the leg part is engaged by the product supporting member and the product supporting member causes a tilting of the leg part and retaining assembly about said horizontal pivot axis into a sideways inclined position with respect to the track.

29. The method according to claim 25, wherein:

a pig leg part is subject to a process at a processing station, one or more support guides are arranged along the track, and a support guide cooperates with a guide face of a carrier, and/or at least one roller of a trolley, to prevent unwanted rotation of the carrier about a vertical axis and/or unwanted sideways movement of the carrier.

30. The method according to claim 25, wherein front pig leg parts and hind pig leg parts are conveyed with the same conveyor device.

* * * * *